United States Patent
Manzari et al.

(10) Patent No.: US 11,212,449 B1
(45) Date of Patent: Dec. 28, 2021

(54) USER INTERFACES FOR MEDIA CAPTURE AND MANAGEMENT

(71) Applicant: Apple Inc., Cupertino, CA (US)

(72) Inventors: Behkish J. Manzari, San Francisco, CA (US); Morten Poulsen, San Francisco, CA (US); Richard John Henry Shields, Sunnyvale, CA (US); Nicholas D. Lupinetti, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/220,596

(22) Filed: Apr. 1, 2021

Related U.S. Application Data

(60) Provisional application No. 63/090,622, filed on Oct. 12, 2020, provisional application No. 63/083,853, filed on Sep. 25, 2020.

(51) Int. Cl.
*H04N 5/232* (2006.01)
*G06T 13/00* (2011.01)

(52) U.S. Cl.
CPC ....... *H04N 5/232935* (2018.08); *G06T 13/00* (2013.01); *H04N 5/232945* (2018.08)

(58) Field of Classification Search
CPC .. H04N 5/23238; H04N 5/341; H04N 5/3415; H04N 2013/0088; H04N 5/232935; H04N 5/232945; G06T 3/0018; G06T 13/00; G06T 13/20; G06T 13/40; G06T 13/80
See application file for complete search history.

(56) References Cited

U.S. PATENT DOCUMENTS

| | | |
|---|---|---|
| 4,518,237 A | 5/1985 | Mizokami |
| 4,933,702 A | 6/1990 | Komatsuzaki et al. |
| 5,463,443 A | 10/1995 | Tanaka et al. |
| 5,557,358 A | 9/1996 | Mukai et al. |
| 5,615,384 A | 3/1997 | Allard et al. |

(Continued)

FOREIGN PATENT DOCUMENTS

| | | |
|---|---|---|
| AU | 2013368443 B2 | 3/2016 |
| AU | 2017100683 B4 | 1/2018 |

(Continued)

OTHER PUBLICATIONS

Applicant-Initiated Interview Summary received for U.S. Appl. No. 16/599,433, dated Apr. 20, 2021, 7 pages.

(Continued)

*Primary Examiner* — Charles L Beard
(74) *Attorney, Agent, or Firm* — Dentons US LLP

(57) ABSTRACT

The present disclosure generally relates to user interface for capturing and managing media (e.g., photo media, video media). In some examples, user interfaces for capturing media (e.g., photo media, video media) are described. In some examples, user interfaces for displaying camera controls and indicators are described. In some examples, user interfaces for adjusting media (e.g., photo media (e.g., a sequence of images, a single image), video media) are described. In some examples, user interfaces for managing the file format of media (e.g., photo, video media) are described. In some examples, user interfaces for storing media (photo media (e.g., a sequences of image, a single still image), video media) are described.

45 Claims, 37 Drawing Sheets

(56) References Cited

U.S. PATENT DOCUMENTS

| | | | |
|---|---|---|---|
| 5,825,353 A | 10/1998 | Will | |
| 6,262,769 B1 | 7/2001 | Anderson et al. | |
| 6,268,864 B1* | 7/2001 | Chen | G06T 13/80 |
| | | | 345/428 |
| 6,278,466 B1* | 8/2001 | Chen | G06T 13/00 |
| | | | 345/473 |
| 6,359,837 B1 | 3/2002 | Tsukamoto | |
| 6,429,896 B1 | 8/2002 | Aruga et al. | |
| 6,522,347 B1 | 2/2003 | Sakai et al. | |
| 6,621,524 B1 | 9/2003 | Iijima et al. | |
| 6,677,981 B1* | 1/2004 | Mancuso | G06T 3/4038 |
| | | | 348/36 |
| 6,809,724 B1 | 10/2004 | Shiraishi et al. | |
| 6,809,759 B1 | 10/2004 | Chiang | |
| 6,819,867 B2 | 11/2004 | Mayer et al. | |
| 6,900,840 B1* | 5/2005 | Schinner | H04N 5/243 |
| | | | 348/333.01 |
| 6,901,561 B1 | 5/2005 | Kirkpatrick et al. | |
| 7,463,304 B2 | 12/2008 | Murray | |
| 7,515,178 B1 | 4/2009 | Fleischman et al. | |
| 7,583,892 B2* | 9/2009 | Okumura | H04N 5/232945 |
| | | | 396/282 |
| 8,185,839 B2* | 5/2012 | Jalon | G06F 16/168 |
| | | | 715/769 |
| 8,189,087 B2 | 5/2012 | Misawa et al. | |
| 8,295,546 B2 | 10/2012 | Craig et al. | |
| 8,379,098 B2 | 2/2013 | Rottier et al. | |
| 8,405,680 B1 | 3/2013 | Gomes et al. | |
| 8,423,089 B2 | 4/2013 | Song et al. | |
| 8,493,408 B2 | 7/2013 | Williamson et al. | |
| 8,624,836 B1 | 1/2014 | Miller et al. | |
| 8,638,371 B2 | 1/2014 | Laberge et al. | |
| 8,675,084 B2 | 3/2014 | Bolton et al. | |
| 8,723,988 B2 | 5/2014 | Thorn | |
| 8,736,704 B2 | 5/2014 | Jasinski et al. | |
| 8,736,716 B2 | 5/2014 | Prentice | |
| 8,742,890 B2 | 6/2014 | Gocho et al. | |
| 8,762,895 B2 | 6/2014 | Mehta et al. | |
| 8,885,978 B2 | 11/2014 | Cote et al. | |
| 8,896,652 B2 | 11/2014 | Ralston | |
| 9,001,226 B1* | 4/2015 | Ng | H04N 5/23203 |
| | | | 348/211.11 |
| 9,094,576 B1 | 7/2015 | Karakotsios | |
| 9,153,031 B2 | 10/2015 | El-Saban et al. | |
| 9,172,866 B2 | 10/2015 | Ito et al. | |
| 9,207,837 B2 | 12/2015 | Paretti et al. | |
| 9,223,486 B2 | 12/2015 | Shin et al. | |
| 9,230,241 B1 | 1/2016 | Singh et al. | |
| 9,230,355 B1 | 1/2016 | Ahuja et al. | |
| 9,245,177 B2 | 1/2016 | Perez | |
| 9,246,961 B2 | 1/2016 | Walkin et al. | |
| 9,250,797 B2 | 2/2016 | Roberts et al. | |
| 9,264,660 B1* | 2/2016 | Petterson | H04L 12/1827 |
| 9,288,476 B2* | 3/2016 | Sandrew | H04N 13/296 |
| 9,298,263 B2 | 3/2016 | Geisner et al. | |
| 9,313,397 B2 | 4/2016 | Harris et al. | |
| 9,313,401 B2 | 4/2016 | Frey et al. | |
| 9,342,230 B2 | 5/2016 | Bastien et al. | |
| 9,349,414 B1 | 5/2016 | Furment et al. | |
| 9,360,671 B1 | 6/2016 | Zhou | |
| 9,423,868 B2 | 8/2016 | Iwasaki | |
| 9,448,708 B1 | 9/2016 | Bennett et al. | |
| 9,451,144 B2 | 9/2016 | Dye | |
| 9,467,812 B2 | 10/2016 | Jung et al. | |
| 9,544,563 B1* | 1/2017 | Chin | H04N 5/232935 |
| 9,602,559 B1 | 3/2017 | Barros et al. | |
| 9,609,221 B2* | 3/2017 | Kim | H04N 5/23277 |
| 9,628,416 B2 | 4/2017 | Henderson | |
| 9,667,881 B2 | 5/2017 | Harris et al. | |
| 9,686,497 B1 | 6/2017 | Terry | |
| 9,704,250 B1 | 7/2017 | Gilmour et al. | |
| 9,716,825 B1* | 7/2017 | Manzari | G06F 3/0488 |
| 9,767,613 B1* | 9/2017 | Bedikian | G06F 3/04845 |
| 9,942,463 B2 | 4/2018 | Kuo et al. | |
| 9,948,589 B2 | 4/2018 | Gonnen et al. | |
| 9,973,674 B2 | 5/2018 | Dye et al. | |
| 10,021,294 B2* | 7/2018 | Kwon | H04N 5/23222 |
| 10,055,887 B1* | 8/2018 | Gil | G02B 27/017 |
| 10,095,385 B2 | 10/2018 | Walkin et al. | |
| 10,152,222 B2 | 12/2018 | Ozawa et al. | |
| 10,176,622 B1* | 1/2019 | Waggoner | G06T 15/10 |
| 10,187,587 B2 | 1/2019 | Hasinoff et al. | |
| 10,225,463 B2* | 3/2019 | Yun | G11B 27/34 |
| 10,230,901 B2 | 3/2019 | Harris et al. | |
| 10,270,983 B1 | 4/2019 | Van Os et al. | |
| 10,289,265 B2 | 5/2019 | Kulkarni | |
| 10,297,034 B2 | 5/2019 | Nash et al. | |
| 10,304,231 B2 | 5/2019 | Saito | |
| 10,313,652 B1* | 6/2019 | Falstrup | G06F 3/04817 |
| 10,326,942 B2 | 6/2019 | Shabtay et al. | |
| 10,375,313 B1 | 8/2019 | Van Os et al. | |
| 10,379,719 B2 | 8/2019 | Scapel et al. | |
| 10,397,469 B1* | 8/2019 | Yan | H04N 5/23267 |
| 10,397,500 B1 | 8/2019 | Xu et al. | |
| 10,447,908 B2 | 10/2019 | Lee et al. | |
| 10,467,729 B1 | 11/2019 | Perera et al. | |
| 10,467,775 B1* | 11/2019 | Waggoner | H04N 19/597 |
| 10,521,091 B2 | 12/2019 | Anzures et al. | |
| 10,521,948 B2 | 12/2019 | Rickwald et al. | |
| 10,523,879 B2 | 12/2019 | Dye et al. | |
| 10,574,895 B2* | 2/2020 | Lee | H04N 5/232935 |
| 10,585,551 B2* | 3/2020 | Lee | H04N 21/4223 |
| 10,614,139 B2 | 4/2020 | Fujioka et al. | |
| 10,645,294 B1* | 5/2020 | Manzari | H04N 5/232945 |
| 10,652,470 B1 | 5/2020 | Manzari et al. | |
| 10,657,695 B2 | 5/2020 | Chand et al. | |
| 10,659,405 B1 | 5/2020 | Chang et al. | |
| 10,674,072 B1 | 6/2020 | Manzari et al. | |
| 10,681,282 B1 | 6/2020 | Manzari et al. | |
| 10,698,575 B2 | 6/2020 | Walkin et al. | |
| 10,798,035 B2 | 10/2020 | Lewis et al. | |
| 10,845,968 B2 | 11/2020 | Scapel et al. | |
| 10,902,661 B1 | 1/2021 | Mourkogiannis et al. | |
| 10,958,850 B2* | 3/2021 | Kwak | H04N 5/2257 |
| 11,039,074 B1* | 6/2021 | Manzari | H04N 5/232939 |
| 2002/0140803 A1 | 10/2002 | Gutta et al. | |
| 2002/0171737 A1 | 11/2002 | Tullis et al. | |
| 2003/0001827 A1 | 1/2003 | Gould et al. | |
| 2003/0025802 A1 | 2/2003 | Mayer, Jr. et al. | |
| 2003/0025812 A1 | 2/2003 | Slatter et al. | |
| 2003/0107664 A1 | 6/2003 | Suzuki | |
| 2003/0122930 A1 | 7/2003 | Schofield et al. | |
| 2003/0174216 A1 | 9/2003 | Iguchi et al. | |
| 2004/0041924 A1 | 3/2004 | White et al. | |
| 2004/0061796 A1 | 4/2004 | Honda et al. | |
| 2004/0189861 A1 | 9/2004 | Tom et al. | |
| 2004/0201699 A1 | 10/2004 | Parulski et al. | |
| 2005/0134695 A1 | 6/2005 | Deshpande et al. | |
| 2005/0189419 A1 | 9/2005 | Igarashi et al. | |
| 2005/0206981 A1* | 9/2005 | Hung | H04N 1/40056 |
| | | | 358/527 |
| 2005/0237383 A1 | 10/2005 | Soga et al. | |
| 2005/0248660 A1 | 11/2005 | Stavely et al. | |
| 2005/0270397 A1 | 12/2005 | Battles | |
| 2006/0033831 A1* | 2/2006 | Ejima | H04N 9/04515 |
| | | | 348/333.01 |
| 2006/0132482 A1* | 6/2006 | Oh | G06T 15/20 |
| | | | 345/419 |
| 2006/0158730 A1 | 7/2006 | Kira | |
| 2006/0170791 A1 | 8/2006 | Porter et al. | |
| 2006/0187322 A1 | 8/2006 | Janson et al. | |
| 2006/0209067 A1* | 9/2006 | Pellacini | G06T 15/50 |
| | | | 345/426 |
| 2006/0228040 A1 | 10/2006 | Simon et al. | |
| 2007/0024614 A1 | 2/2007 | Tam et al. | |
| 2007/0025711 A1 | 2/2007 | Marcus et al. | |
| 2007/0025723 A1* | 2/2007 | Baudisch | H04N 5/262 |
| | | | 396/287 |
| 2007/0031062 A1* | 2/2007 | Pal | H04N 5/23238 |
| | | | 382/284 |
| 2007/0040810 A1 | 2/2007 | Dowe et al. | |
| 2007/0097088 A1 | 5/2007 | Battles | |
| 2007/0109417 A1 | 5/2007 | Hyttfors et al. | |

(56) References Cited

U.S. PATENT DOCUMENTS

| | | |
|---|---|---|
| 2007/0113099 A1 | 5/2007 | Takikawa et al. |
| 2007/0140675 A1 | 6/2007 | Yanagi et al. |
| 2007/0153112 A1* | 7/2007 | Ueda .................. G03B 19/12 |
| | | 348/335 |
| 2007/0165103 A1 | 7/2007 | Arima et al. |
| 2007/0228259 A1 | 10/2007 | Hohenberger |
| 2007/0254640 A1 | 11/2007 | Bliss |
| 2007/0257992 A1 | 11/2007 | Kato |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1* | 6/2008 | DeAngelis .......... A63B 24/0021 |
| | | 348/169 |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0284855 A1 | 11/2008 | Umeyama et al. |
| 2008/0298571 A1 | 12/2008 | Kurtz et al. |
| 2008/0309811 A1* | 12/2008 | Fujinawa .......... H04N 5/232945 |
| | | 348/333.01 |
| 2009/0021576 A1* | 1/2009 | Linder .................... G06T 7/30 |
| | | 348/36 |
| 2009/0021600 A1 | 1/2009 | Watanabe |
| 2009/0022422 A1* | 1/2009 | Sorek ................... G06T 3/4084 |
| | | 382/284 |
| 2009/0027515 A1* | 1/2009 | Maruyama ........... H04N 5/2351 |
| | | 348/223.1 |
| 2009/0027539 A1 | 1/2009 | Kunou |
| 2009/0040332 A1 | 2/2009 | Yoshino et al. |
| 2009/0046097 A1* | 2/2009 | Franklin ................ G06T 13/00 |
| | | 345/419 |
| 2009/0051783 A1* | 2/2009 | Kim ..................... H04N 5/23248 |
| | | 348/229.1 |
| 2009/0066817 A1 | 3/2009 | Sakamaki |
| 2009/0073285 A1 | 3/2009 | Terashima |
| 2009/0102918 A1* | 4/2009 | Sakamoto .......... G01N 21/6458 |
| | | 348/79 |
| 2009/0102933 A1 | 4/2009 | Harris et al. |
| 2009/0109316 A1* | 4/2009 | Matsui .............. H04N 5/232935 |
| | | 348/333.01 |
| 2009/0144639 A1 | 6/2009 | Nims et al. |
| 2009/0167671 A1* | 7/2009 | Kerofsky .............. G09G 3/3413 |
| | | 345/102 |
| 2009/0167672 A1* | 7/2009 | Kerofsky .............. G09G 3/3413 |
| | | 345/102 |
| 2009/0167890 A1 | 7/2009 | Nakagomi et al. |
| 2009/0175511 A1* | 7/2009 | Lee ....................... G06K 9/2027 |
| | | 382/118 |
| 2009/0244318 A1 | 10/2009 | Makii |
| 2009/0251484 A1 | 10/2009 | Zhao et al. |
| 2009/0315671 A1 | 12/2009 | Gocho et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039522 A1 | 2/2010 | Huang |
| 2010/0066853 A1* | 3/2010 | Aoki ................... H04N 5/232411 |
| | | 348/222.1 |
| 2010/0066889 A1* | 3/2010 | Ueda ................. H04N 5/232935 |
| | | 348/333.01 |
| 2010/0066890 A1* | 3/2010 | Ueda ....................... G02B 7/102 |
| | | 348/333.02 |
| 2010/0066895 A1* | 3/2010 | Ueda .................. H04N 5/23245 |
| | | 348/345 |
| 2010/0093400 A1 | 4/2010 | Ju et al. |
| 2010/0123737 A1 | 5/2010 | Williamson et al. |
| 2010/0124941 A1 | 5/2010 | Cho |
| 2010/0141786 A1 | 6/2010 | Bigioi et al. |
| 2010/0141787 A1 | 6/2010 | Bigioi et al. |
| 2010/0153847 A1 | 6/2010 | Fama |
| 2010/0162160 A1 | 6/2010 | Stallings et al. |
| 2010/0164893 A1 | 7/2010 | Shin et al. |
| 2010/0188426 A1 | 7/2010 | Ohmori et al. |
| 2010/0194931 A1 | 8/2010 | Kawaguchi et al. |
| 2010/0208122 A1 | 8/2010 | Yumiki |
| 2010/0231735 A1 | 9/2010 | Burian et al. |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0259645 A1* | 10/2010 | Kaplan ................ G11B 27/105 |
| | | 348/231.99 |
| 2010/0277470 A1 | 11/2010 | Margolis |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0302280 A1* | 12/2010 | Szeliski .................. G06T 13/80 |
| | | 345/660 |
| 2010/0317410 A1 | 12/2010 | Song et al. |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0058052 A1 | 3/2011 | Bolton et al. |
| 2011/0072394 A1 | 3/2011 | Victor et al. |
| 2011/0074710 A1 | 3/2011 | Weeldreyer et al. |
| 2011/0074830 A1 | 3/2011 | Rapp et al. |
| 2011/0090155 A1 | 4/2011 | Caskey et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0176039 A1* | 7/2011 | Lo ...................... H04N 5/232945 |
| | | 348/294 |
| 2011/0187879 A1 | 8/2011 | Ochiai |
| 2011/0199495 A1 | 8/2011 | Laberge et al. |
| 2011/0221755 A1 | 9/2011 | Geisner et al. |
| 2011/0242369 A1 | 10/2011 | Misawa et al. |
| 2011/0249073 A1 | 10/2011 | Cranfill et al. |
| 2011/0249078 A1* | 10/2011 | Abuan ................. G06F 3/04842 |
| | | 348/14.02 |
| 2011/0258537 A1 | 10/2011 | Rives et al. |
| 2011/0296163 A1 | 12/2011 | Abernethy et al. |
| 2011/0304632 A1 | 12/2011 | Evertt et al. |
| 2012/0002898 A1 | 1/2012 | Côté et al. |
| 2012/0011456 A1 | 1/2012 | Noda et al. |
| 2012/0026378 A1 | 2/2012 | Pang et al. |
| 2012/0056997 A1 | 3/2012 | Jang |
| 2012/0057064 A1 | 3/2012 | Gardiner et al. |
| 2012/0069028 A1 | 3/2012 | Bouguerra |
| 2012/0069206 A1 | 3/2012 | Hsieh |
| 2012/0106790 A1 | 5/2012 | Sultana et al. |
| 2012/0120277 A1 | 5/2012 | Tsai et al. |
| 2012/0127346 A1* | 5/2012 | Sato ......................... H04N 5/272 |
| | | 348/231.99 |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206452 A1 | 8/2012 | Geisner et al. |
| 2012/0206621 A1* | 8/2012 | Chen .................... H04N 5/2352 |
| | | 348/229.1 |
| 2012/0235990 A1* | 9/2012 | Yamaji .................. H04N 13/111 |
| | | 345/419 |
| 2012/0243802 A1 | 9/2012 | Fintel et al. |
| 2012/0274830 A1* | 11/2012 | Kameyama ...... H04N 5/232935 |
| | | 348/333.02 |
| 2012/0293611 A1* | 11/2012 | Lee ..................... H04N 5/23238 |
| | | 348/36 |
| 2012/0309520 A1 | 12/2012 | Evertt et al. |
| 2012/0320141 A1 | 12/2012 | Bowen et al. |
| 2013/0009858 A1 | 1/2013 | Lacey |
| 2013/0010170 A1* | 1/2013 | Matsuzawa .......... G06F 3/04845 |
| | | 348/333.01 |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |

(56) References Cited

U.S. PATENT DOCUMENTS

| | | |
|---|---|---|
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1 | 4/2013 | Ozzie et al. |
| 2013/0093904 A1 | 4/2013 | Wagner et al. |
| 2013/0101164 A1 | 4/2013 | Leclerc et al. |
| 2013/0135315 A1* | 5/2013 | Bares ................ G11B 27/031 345/473 |
| 2013/0141362 A1* | 6/2013 | Asanuma .............. G06F 3/041 345/173 |
| 2013/0141513 A1 | 6/2013 | Setton et al. |
| 2013/0147933 A1 | 6/2013 | Kulas et al. |
| 2013/0155308 A1 | 6/2013 | Wu et al. |
| 2013/0159900 A1 | 6/2013 | Pendharkar |
| 2013/0165186 A1 | 6/2013 | Choi |
| 2013/0179831 A1 | 7/2013 | Izaki |
| 2013/0194378 A1* | 8/2013 | Brown .................. H04N 7/152 348/14.09 |
| 2013/0201104 A1 | 8/2013 | Ptucha et al. |
| 2013/0201307 A1* | 8/2013 | Schloter ........... H04N 5/232935 348/61 |
| 2013/0210563 A1* | 8/2013 | Hollinger ............ H04N 5/2259 473/570 |
| 2013/0222663 A1 | 8/2013 | Rydenhag et al. |
| 2013/0239057 A1* | 9/2013 | Ubillos .............. G06F 3/04847 715/833 |
| 2013/0246948 A1 | 9/2013 | Chen et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0290905 A1 | 10/2013 | Luvogt et al. |
| 2013/0329074 A1 | 12/2013 | Zhang et al. |
| 2013/0346916 A1 | 12/2013 | Williamson et al. |
| 2014/0007021 A1 | 1/2014 | Akiyama et al. |
| 2014/0009639 A1* | 1/2014 | Lee ...................... H04N 5/232 348/229.1 |
| 2014/0022399 A1* | 1/2014 | Rashid ............... H04N 5/23206 348/207.11 |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1* | 1/2014 | Noda ................ H04N 5/23216 715/769 |
| 2014/0037178 A1 | 2/2014 | Park |
| 2014/0043368 A1 | 2/2014 | Yu |
| 2014/0043517 A1* | 2/2014 | Yim ................ H04N 5/232935 348/333.02 |
| 2014/0047389 A1 | 2/2014 | Aarabi |
| 2014/0049536 A1* | 2/2014 | Neuman ............... H04N 13/239 345/419 |
| 2014/0055554 A1 | 2/2014 | Du et al. |
| 2014/0063175 A1 | 3/2014 | Jafry et al. |
| 2014/0063313 A1 | 3/2014 | Choi et al. |
| 2014/0071061 A1 | 3/2014 | Lin et al. |
| 2014/0071325 A1 | 3/2014 | Kawahara et al. |
| 2014/0078371 A1 | 3/2014 | Kinoshita |
| 2014/0092272 A1* | 4/2014 | Choi ................ H04N 5/232127 348/222.1 |
| 2014/0095122 A1 | 4/2014 | Appleman et al. |
| 2014/0099994 A1 | 4/2014 | Bishop et al. |
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0132735 A1* | 5/2014 | Lee .................... H04N 5/2258 348/47 |
| 2014/0143678 A1 | 5/2014 | Mistry et al. |
| 2014/0152886 A1 | 6/2014 | Morgan-mar et al. |
| 2014/0160304 A1 | 6/2014 | Galor et al. |
| 2014/0176469 A1* | 6/2014 | Lim ................... G06F 3/04847 345/173 |
| 2014/0176565 A1 | 6/2014 | Adeyoola et al. |
| 2014/0184524 A1 | 7/2014 | Schiefer et al. |
| 2014/0192233 A1 | 7/2014 | Kakkori et al. |
| 2014/0204229 A1 | 7/2014 | Leung et al. |
| 2014/0218371 A1 | 8/2014 | Du et al. |
| 2014/0218599 A1 | 8/2014 | Nakamura et al. |
| 2014/0232838 A1 | 8/2014 | Jorgensen et al. |
| 2014/0240471 A1* | 8/2014 | Srinivasa ......... H04N 5/232945 348/50 |
| 2014/0240531 A1* | 8/2014 | Nakai .............. H04N 5/232945 348/222.1 |
| 2014/0240577 A1 | 8/2014 | Masugi |
| 2014/0267126 A1 | 9/2014 | Åberg et al. |
| 2014/0267867 A1* | 9/2014 | Lee ...................... H04N 5/2621 348/333.01 |
| 2014/0282223 A1 | 9/2014 | Bastien et al. |
| 2014/0285698 A1* | 9/2014 | Geiss .............. H04N 5/232935 348/333.05 |
| 2014/0300635 A1 | 10/2014 | Suzuki |
| 2014/0300779 A1* | 10/2014 | Yeo ................. H04N 5/232939 348/234 |
| 2014/0310598 A1 | 10/2014 | Sprague et al. |
| 2014/0327639 A1* | 11/2014 | Papakipos .......... G06F 3/04883 345/173 |
| 2014/0333671 A1* | 11/2014 | Phang .................. G06F 3/017 345/659 |
| 2014/0333824 A1* | 11/2014 | Xiu ...................... H04N 5/2353 348/353 |
| 2014/0351753 A1 | 11/2014 | Shin et al. |
| 2014/0359438 A1 | 12/2014 | Matsuki |
| 2014/0362091 A1 | 12/2014 | Bouaziz et al. |
| 2014/0362274 A1* | 12/2014 | Christie .......... H04N 5/232935 348/333.11 |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2015/0022674 A1 | 1/2015 | Koss et al. |
| 2015/0033192 A1 | 1/2015 | Bohannon et al. |
| 2015/0035825 A1 | 2/2015 | Zhou et al. |
| 2015/0042852 A1 | 2/2015 | Lee et al. |
| 2015/0043806 A1 | 2/2015 | Sunkavalli et al. |
| 2015/0049233 A1 | 2/2015 | Choi |
| 2015/0058754 A1 | 2/2015 | Rauh |
| 2015/0067513 A1 | 3/2015 | Zambetti et al. |
| 2015/0070362 A1* | 3/2015 | Hirai .................... G06F 3/0482 345/475 |
| 2015/0078621 A1 | 3/2015 | Choi et al. |
| 2015/0085174 A1 | 3/2015 | Shabtay et al. |
| 2015/0092077 A1 | 4/2015 | Feder et al. |
| 2015/0109417 A1 | 4/2015 | Zirnheld |
| 2015/0116353 A1 | 4/2015 | Miura et al. |
| 2015/0116448 A1 | 4/2015 | Gottlieb |
| 2015/0135109 A1* | 5/2015 | Zambetti ............. G06F 3/0482 715/767 |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1* | 5/2015 | Kim ................. H04N 5/232123 348/345 |
| 2015/0149927 A1 | 5/2015 | Walkin et al. |
| 2015/0150141 A1 | 5/2015 | Szymanski et al. |
| 2015/0154448 A1 | 6/2015 | Murayama et al. |
| 2015/0172534 A1* | 6/2015 | Miyakawa ......... H04N 5/23229 348/222.1 |
| 2015/0181135 A1 | 6/2015 | Shimosato |
| 2015/0189138 A1 | 7/2015 | Xie et al. |
| 2015/0189162 A1 | 7/2015 | Kuo et al. |
| 2015/0194186 A1* | 7/2015 | Lee ....................... G11B 27/34 386/224 |
| 2015/0208001 A1 | 7/2015 | Nonaka et al. |
| 2015/0212723 A1 | 7/2015 | Lim et al. |
| 2015/0220249 A1 | 8/2015 | Snibbe et al. |
| 2015/0248198 A1* | 9/2015 | Somlai-Fisher ...... G06F 1/1694 715/716 |
| 2015/0248583 A1 | 9/2015 | Sekine et al. |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0277686 A1 | 10/2015 | Laforge et al. |

(56) References Cited

U.S. PATENT DOCUMENTS

| | | |
|---|---|---|
| 2015/0286724 A1 | 10/2015 | Knaapen et al. |
| 2015/0289104 A1 | 10/2015 | Jung et al. |
| 2015/0297185 A1 | 10/2015 | Mccormack et al. |
| 2015/0301731 A1* | 10/2015 | Okamoto ............ G06F 3/04842 715/771 |
| 2015/0310583 A1* | 10/2015 | Hume .................... G06T 13/80 345/672 |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0334075 A1 | 11/2015 | Wang et al. |
| 2015/0334291 A1* | 11/2015 | Cho ................. H04N 5/232945 348/222.1 |
| 2015/0341536 A1 | 11/2015 | Huang et al. |
| 2015/0350141 A1 | 12/2015 | Yang et al. |
| 2015/0350533 A1 | 12/2015 | Harris et al. |
| 2015/0350535 A1 | 12/2015 | Voss |
| 2015/0362998 A1 | 12/2015 | Park et al. |
| 2015/0370458 A1 | 12/2015 | Chen |
| 2016/0012567 A1 | 1/2016 | Siddiqui et al. |
| 2016/0026371 A1* | 1/2016 | Lu ..................... G06F 3/04886 715/765 |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050169 A1 | 2/2016 | Ben Atar et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0065861 A1 | 3/2016 | Steinberg et al. |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0092035 A1 | 3/2016 | Crocker et al. |
| 2016/0117829 A1* | 4/2016 | Yoon ...................... G06T 7/50 348/222.1 |
| 2016/0127636 A1 | 5/2016 | Ito et al. |
| 2016/0132200 A1 | 5/2016 | Walkin et al. |
| 2016/0132201 A1 | 5/2016 | Shaw et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0163084 A1 | 6/2016 | Corazza et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0217601 A1 | 7/2016 | Tsuda et al. |
| 2016/0219217 A1 | 7/2016 | Williams et al. |
| 2016/0225175 A1* | 8/2016 | Kim ..................... H04B 1/3833 |
| 2016/0226926 A1 | 8/2016 | Singh et al. |
| 2016/0227016 A1* | 8/2016 | Kim ................. H04N 5/232933 |
| 2016/0241777 A1 | 8/2016 | Rav-Acha et al. |
| 2016/0247309 A1 | 8/2016 | Li et al. |
| 2016/0255268 A1* | 9/2016 | Kang ................. G06F 3/04883 348/333.11 |
| 2016/0259413 A1* | 9/2016 | Anzures .................. H04L 67/32 |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0283097 A1 | 9/2016 | Voss et al. |
| 2016/0284123 A1 | 9/2016 | Hare et al. |
| 2016/0307324 A1 | 10/2016 | Higuchi et al. |
| 2016/0337570 A1 | 11/2016 | Tan et al. |
| 2016/0337582 A1 | 11/2016 | Shimauchi et al. |
| 2016/0353030 A1 | 12/2016 | Tang et al. |
| 2016/0357353 A1 | 12/2016 | Miura et al. |
| 2016/0357387 A1 | 12/2016 | Bovet et al. |
| 2016/0360097 A1* | 12/2016 | Penha ................. H04N 5/23216 |
| 2016/0360116 A1* | 12/2016 | Penha ................. H04N 1/00204 |
| 2016/0366323 A1 | 12/2016 | Chen et al. |
| 2016/0366344 A1* | 12/2016 | Pan .......................... G06T 5/20 |
| 2016/0370974 A1 | 12/2016 | Stenneth |
| 2016/0373631 A1 | 12/2016 | Titi et al. |
| 2016/0373650 A1* | 12/2016 | Kim ................. H04N 5/232945 |
| 2017/0006210 A1 | 1/2017 | Dye et al. |
| 2017/0011773 A1* | 1/2017 | Lee ..................... H04N 21/8153 |
| 2017/0013179 A1 | 1/2017 | Kang et al. |
| 2017/0018289 A1 | 1/2017 | Morgenstern |
| 2017/0019604 A1* | 1/2017 | Kim ................... H04N 5/23238 |
| 2017/0024872 A1 | 1/2017 | Olsson et al. |
| 2017/0026565 A1* | 1/2017 | Hong ................. G06K 9/00362 |
| 2017/0034449 A1 | 2/2017 | Eum et al. |
| 2017/0039686 A1 | 2/2017 | Miura et al. |
| 2017/0041549 A1 | 2/2017 | Kim et al. |
| 2017/0041677 A1 | 2/2017 | Anderson et al. |
| 2017/0046065 A1 | 2/2017 | Zeng et al. |
| 2017/0048450 A1* | 2/2017 | Lee ....................... G06F 3/0488 |
| 2017/0048461 A1* | 2/2017 | Lee ................... H04N 5/23216 |
| 2017/0048494 A1 | 2/2017 | Boyle et al. |
| 2017/0054960 A1* | 2/2017 | Chien .................... G03B 15/02 |
| 2017/0061635 A1 | 3/2017 | Petrovich et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0111616 A1 | 4/2017 | Li et al. |
| 2017/0178287 A1 | 6/2017 | Anderson |
| 2017/0186162 A1 | 6/2017 | Mihic et al. |
| 2017/0220212 A1 | 8/2017 | Yang et al. |
| 2017/0230576 A1* | 8/2017 | Sparks ............... H04N 5/23222 |
| 2017/0230585 A1 | 8/2017 | Nash et al. |
| 2017/0237888 A1 | 8/2017 | Harris et al. |
| 2017/0243389 A1* | 8/2017 | Wild ....................... B60K 37/06 |
| 2017/0244896 A1 | 8/2017 | Chien et al. |
| 2017/0244897 A1* | 8/2017 | Jung ..................... H04N 19/426 |
| 2017/0257559 A1 | 9/2017 | Stricker |
| 2017/0257596 A1 | 9/2017 | Murata et al. |
| 2017/0264817 A1 | 9/2017 | Yan et al. |
| 2017/0272654 A1 | 9/2017 | Poindexter, Jr. |
| 2017/0285764 A1* | 10/2017 | Kim ....................... G03B 17/02 |
| 2017/0287220 A1* | 10/2017 | Khalid ............... H04N 21/6131 |
| 2017/0302840 A1 | 10/2017 | Hasinoff et al. |
| 2017/0315772 A1* | 11/2017 | Lee ........................... G06T 7/74 |
| 2017/0324784 A1 | 11/2017 | Taine et al. |
| 2017/0336926 A1 | 11/2017 | Chaudhri et al. |
| 2017/0336928 A1 | 11/2017 | Chaudhri et al. |
| 2017/0336961 A1* | 11/2017 | Heo ................. H04N 21/47217 |
| 2017/0352379 A1 | 12/2017 | Oh et al. |
| 2017/0354888 A1* | 12/2017 | Benedetto ............... A63F 13/63 |
| 2017/0358071 A1 | 12/2017 | Yamaoka ................. G06K 9/46 |
| 2017/0359504 A1* | 12/2017 | Manzari ............. H04N 5/232945 |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0007315 A1* | 1/2018 | Kim .................... H04N 5/23287 |
| 2018/0021684 A1* | 1/2018 | Benedetto .......... H04N 21/4781 463/24 |
| 2018/0047200 A1 | 2/2018 | O'hara et al. |
| 2018/0077332 A1 | 3/2018 | Shimura et al. |
| 2018/0091728 A1* | 3/2018 | Brown ................. G06F 3/0488 |
| 2018/0091732 A1 | 3/2018 | Wilson et al. |
| 2018/0095649 A1 | 4/2018 | Valdivia et al. |
| 2018/0096487 A1 | 4/2018 | Nash et al. |
| 2018/0109722 A1 | 4/2018 | Laroia et al. |
| 2018/0113577 A1 | 4/2018 | Burns et al. |
| 2018/0114543 A1* | 4/2018 | Novikoff ............... G11B 27/038 |
| 2018/0120661 A1 | 5/2018 | Kilgore et al. |
| 2018/0124299 A1 | 5/2018 | Brook |
| 2018/0129224 A1 | 5/2018 | Hur |
| 2018/0131878 A1 | 5/2018 | Charlton et al. |
| 2018/0146132 A1 | 5/2018 | Manzari et al. |
| 2018/0152611 A1 | 5/2018 | Li et al. |
| 2018/0184061 A1 | 6/2018 | Kitsunai et al. |
| 2018/0191944 A1 | 7/2018 | Carbonell et al. |
| 2018/0198985 A1* | 7/2018 | Ishitsuka .......... H04N 5/232935 |
| 2018/0199025 A1* | 7/2018 | Holzer ................... G06T 15/205 |
| 2018/0227479 A1 | 8/2018 | Parameswaran et al. |

(56) References Cited

U.S. PATENT DOCUMENTS

| | | | |
|---|---|---|---|
| 2018/0227482 A1 | 8/2018 | Holzer et al. | |
| 2018/0227505 A1 | 8/2018 | Baltz et al. | |
| 2018/0234608 A1 | 8/2018 | Sudo et al. | |
| 2018/0262677 A1 | 9/2018 | Dye et al. | |
| 2018/0267703 A1 | 9/2018 | Kamimaru et al. | |
| 2018/0270420 A1 | 9/2018 | Lee et al. | |
| 2018/0278823 A1 | 9/2018 | Horesh | |
| 2018/0284979 A1 | 10/2018 | Choi et al. | |
| 2018/0288310 A1 | 10/2018 | Goldenberg | |
| 2018/0302551 A1 | 10/2018 | Yamajo et al. | |
| 2018/0302568 A1 | 10/2018 | Kim et al. | |
| 2018/0308282 A1 | 10/2018 | Yokoi | |
| 2018/0335927 A1 | 11/2018 | Anzures et al. | |
| 2018/0335929 A1 | 11/2018 | Scapel et al. | |
| 2018/0335930 A1 | 11/2018 | Scapel et al. | |
| 2018/0336715 A1 | 11/2018 | Rickwald et al. | |
| 2018/0349008 A1* | 12/2018 | Manzari | H04N 5/247 |
| 2018/0352165 A1 | 12/2018 | Zhen et al. | |
| 2018/0376122 A1* | 12/2018 | Park | H04N 13/239 |
| 2019/0007589 A1* | 1/2019 | Kadambala | H04N 5/23241 |
| 2019/0028650 A1* | 1/2019 | Bernstein | H04N 13/25 |
| 2019/0029513 A1 | 1/2019 | Gunnerson et al. | |
| 2019/0051032 A1* | 2/2019 | Chu | A63F 13/655 |
| 2019/0082097 A1 | 3/2019 | Manzari et al. | |
| 2019/0089873 A1* | 3/2019 | Misawa | H04N 5/2252 |
| 2019/0114740 A1* | 4/2019 | Ogino | G06T 3/4038 |
| 2019/0121216 A1 | 4/2019 | Shabtay et al. | |
| 2019/0138259 A1* | 5/2019 | Bagaria | H04N 5/23248 |
| 2019/0149706 A1 | 5/2019 | Rivard et al. | |
| 2019/0174054 A1 | 6/2019 | Srivastava et al. | |
| 2019/0199926 A1 | 6/2019 | An et al. | |
| 2019/0205861 A1 | 7/2019 | Bace | |
| 2019/0206031 A1 | 7/2019 | Kim et al. | |
| 2019/0222769 A1* | 7/2019 | Srivastava | H04N 5/232945 |
| 2019/0235743 A1 | 8/2019 | Ono | |
| 2019/0250812 A1 | 8/2019 | Davydov et al. | |
| 2019/0253619 A1 | 8/2019 | Davydov et al. | |
| 2019/0289201 A1 | 9/2019 | Nishimura et al. | |
| 2019/0318538 A1* | 10/2019 | Li | G06T 13/80 |
| 2019/0342507 A1 | 11/2019 | Dye et al. | |
| 2019/0379837 A1* | 12/2019 | Kim | H04N 5/23216 |
| 2020/0045245 A1 | 2/2020 | Van Os et al. | |
| 2020/0053288 A1* | 2/2020 | Kim | G06K 9/00684 |
| 2020/0059605 A1 | 2/2020 | Liu et al. | |
| 2020/0068121 A1 | 2/2020 | Wang | |
| 2020/0082599 A1 | 3/2020 | Manzari | |
| 2020/0105003 A1* | 4/2020 | Stauber | G06T 11/60 |
| 2020/0106952 A1 | 4/2020 | Missig et al. | |
| 2020/0128191 A1 | 4/2020 | Sun et al. | |
| 2020/0142577 A1 | 5/2020 | Manzari et al. | |
| 2020/0204725 A1* | 6/2020 | Li | H04N 5/232 |
| 2020/0221020 A1 | 7/2020 | Manzari et al. | |
| 2020/0234508 A1 | 7/2020 | Shaburov et al. | |
| 2020/0236278 A1* | 7/2020 | Yeung | H04N 5/268 |
| 2020/0244879 A1* | 7/2020 | Hohjoh | H04N 5/23293 |
| 2020/0285806 A1 | 9/2020 | Radakovitz et al. | |
| 2020/0285851 A1 | 9/2020 | Lin et al. | |
| 2020/0336660 A1* | 10/2020 | Dong | G06K 9/00248 |
| 2020/0358963 A1* | 11/2020 | Manzari | H04N 5/23245 |
| 2020/0380768 A1 | 12/2020 | Harris et al. | |
| 2020/0380781 A1 | 12/2020 | Barlier et al. | |
| 2020/0410763 A1 | 12/2020 | Hare et al. | |
| 2020/0412975 A1 | 12/2020 | Al Majid et al. | |
| 2021/0005003 A1 | 1/2021 | Chong et al. | |
| 2021/0058351 A1 | 2/2021 | Viklund et al. | |
| 2021/0065448 A1 | 3/2021 | Goodrich et al. | |
| 2021/0065454 A1 | 3/2021 | Goodrich et al. | |
| 2021/0096703 A1 | 4/2021 | Anzures et al. | |
| 2021/0099568 A1 | 4/2021 | DePue et al. | |
| 2021/0099761 A1 | 4/2021 | Zhang | |
| 2021/0146838 A1* | 5/2021 | Goseberg | H04N 5/23238 |
| 2021/0152505 A1 | 5/2021 | Baldwin et al. | |
| 2021/0168108 A1 | 6/2021 | Antmen et al. | |
| 2021/0195093 A1 | 6/2021 | Manzari et al. | |
| 2021/0264656 A1 | 8/2021 | Barlier et al. | |

FOREIGN PATENT DOCUMENTS

| | | |
|---|---|---|
| AU | 2015297035 B2 | 6/2018 |
| CA | 2729392 A1 | 8/2011 |
| CA | 2965700 A1 | 5/2016 |
| CA | 2729392 C | 5/2017 |
| CN | 1437365 A | 8/2003 |
| CN | 1705346 A | 12/2005 |
| CN | 101068311 A | 11/2007 |
| CN | 101243383 A | 8/2008 |
| CN | 101282422 A | 10/2008 |
| CN | 101310519 A | 11/2008 |
| CN | 101364031 A | 2/2009 |
| CN | 101388965 A | 3/2009 |
| CN | 101427574 A | 5/2009 |
| CN | 101576996 A | 11/2009 |
| CN | 101778220 A | 7/2010 |
| CN | 101883213 A | 11/2010 |
| CN | 102075727 A | 5/2011 |
| CN | 102084327 A | 6/2011 |
| CN | 102088554 A | 6/2011 |
| CN | 102272700 A | 12/2011 |
| CN | 102428655 A | 4/2012 |
| CN | 102457661 A | 5/2012 |
| CN | 102474560 A | 5/2012 |
| CN | 102567953 A | 7/2012 |
| CN | 202309894 U | 7/2012 |
| CN | 202330968 U | 7/2012 |
| CN | 103051837 A | 4/2013 |
| CN | 103051841 A | 4/2013 |
| CN | 103297719 A | 9/2013 |
| CN | 103309602 A | 9/2013 |
| CN | 103324329 A | 9/2013 |
| CN | 103685925 A | 3/2014 |
| CN | 103702039 A | 4/2014 |
| CN | 103777742 A | 5/2014 |
| CN | 103947190 A | 7/2014 |
| CN | 103970472 A | 8/2014 |
| CN | 104270597 A | 1/2015 |
| CN | 104346080 A | 2/2015 |
| CN | 104423946 A | 3/2015 |
| CN | 104461288 A | 3/2015 |
| CN | 104754203 A | 7/2015 |
| CN | 104813322 A | 7/2015 |
| CN | 104836947 A | 8/2015 |
| CN | 104952063 A | 9/2015 |
| CN | 105138259 A | 12/2015 |
| CN | 105190511 A | 12/2015 |
| CN | 105229571 A | 1/2016 |
| CN | 105474163 A | 4/2016 |
| CN | 105493138 A | 4/2016 |
| CN | 105589637 A | 5/2016 |
| CN | 105611215 A | 5/2016 |
| CN | 105620393 A | 6/2016 |
| CN | 105630290 A | 6/2016 |
| CN | 105653031 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106303690 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791377 A | 5/2017 |
| CN | 106921829 A | 7/2017 |
| CN | 107077274 A | 8/2017 |
| CN | 107079141 A | 8/2017 |
| CN | 107533356 A | 1/2018 |
| CN | 107566721 A | 1/2018 |
| CN | 107580693 A | 1/2018 |

(56) References Cited

FOREIGN PATENT DOCUMENTS

| | | |
|---|---|---|
| CN | 107770448 A | 3/2018 |
| CN | 107800945 A | 3/2018 |
| CN | 107820011 A | 3/2018 |
| CN | 107924113 A | 4/2018 |
| CN | 108353126 A | 7/2018 |
| CN | 108391053 A | 8/2018 |
| CN | 108513070 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109496425 A | 3/2019 |
| CN | 109639970 A | 4/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1592212 A1 | 11/2005 |
| EP | 1953663 A1 | 8/2008 |
| EP | 0651543 B1 | 9/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2640060 A1 | 9/2013 |
| EP | 2682855 A2 | 1/2014 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3026636 A1 | 6/2016 |
| EP | 3033837 A1 | 6/2016 |
| EP | 3051525 A1 | 8/2016 |
| EP | 3107065 | 12/2016 |
| EP | 3033837 A4 | 3/2017 |
| EP | 3209012 A1 | 8/2017 |
| EP | 3211587 A1 | 8/2017 |
| EP | 2194508 B1 | 12/2017 |
| EP | 3333544 A1 | 6/2018 |
| EP | 2556665 B1 | 8/2018 |
| EP | 3033837 B1 | 10/2018 |
| EP | 3393119 A1 | 10/2018 |
| EP | 3135028 B1 | 1/2019 |
| EP | 3457680 A1 | 3/2019 |
| EP | 3008575 B1 | 7/2019 |
| EP | 3633975 A1 | 4/2020 |
| GB | 2515797 A | 1/2015 |
| GB | 2519363 | 4/2015 |
| GB | 2523670 A | 9/2015 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 3872041 B2 | 1/2007 |
| JP | 2007-28211 A | 2/2007 |
| JP | 2007-124398 A | 5/2007 |
| JP | 2008-66978 A | 3/2008 |
| JP | 2008-236534 A | 10/2008 |
| JP | 2009-105919 A | 5/2009 |
| JP | 2009-212899 A | 9/2009 |
| JP | 2009-545256 A | 12/2009 |
| JP | 2010-119147 A | 5/2010 |
| JP | 2010-160581 A | 7/2010 |
| JP | 2010-182023 A | 8/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2012-79302 A | 4/2012 |
| JP | 2012-89973 A | 5/2012 |
| JP | 2012-124608 A | 6/2012 |
| JP | 2012-147379 A | 8/2012 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-60501 A | 4/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-50713 A | 3/2015 |
| JP | 2015-76717 A | 4/2015 |
| JP | 2015-146619 A | 8/2015 |
| JP | 2015-149095 A | 8/2015 |
| JP | 2015-180987 A | 10/2015 |
| JP | 2016-66978 A | 4/2016 |
| JP | 2016-72965 A | 5/2016 |
| JP | 2016-129315 A | 7/2016 |
| JP | 2017-34474 A | 2/2017 |
| JP | 2019-62556 A | 4/2019 |
| JP | 2019-145108 A | 8/2019 |
| KR | 10-2012-0004928 A | 1/2012 |
| KR | 10-2012-0025872 A | 3/2012 |
| KR | 10-2012-0048397 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-1343591 B1 | 12/2013 |
| KR | 10-2014-0049850 A | 4/2014 |
| KR | 10-2014-0062801 A | 5/2014 |
| KR | 10-2015-0014290 A | 2/2015 |
| KR | 10-2015-0024899 A | 3/2015 |
| KR | 10-2016-0016910 A | 2/2016 |
| KR | 10-2016-0019145 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 10-2017-0135975 A | 12/2017 |
| KR | 10-2018-0017227 A | 2/2018 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 1999/039307 A1 | 8/1999 |
| WO | 2005/043892 A1 | 5/2005 |
| WO | 2007/126707 A1 | 11/2007 |
| WO | 2008/014301 A2 | 1/2008 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/051720 A2 | 4/2012 |

(56) References Cited

FOREIGN PATENT DOCUMENTS

| | | |
|---|---|---|
| WO | 2013/082325 A1 | 6/2013 |
| WO | 2013/152453 A1 | 10/2013 |
| WO | 2013/152454 A1 | 10/2013 |
| WO | 2013/189058 A1 | 12/2013 |
| WO | 2014/066115 A1 | 5/2014 |
| WO | 2014/105276 A1 | 7/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/037211 A1 | 3/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/144209 A1 | 10/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/064435 A1 | 4/2016 |
| WO | 2016/073804 A2 | 5/2016 |
| WO | 2016/073804 A3 | 7/2016 |
| WO | 2016/145129 A1 | 9/2016 |
| WO | 2016/172619 A1 | 10/2016 |
| WO | 2016/204936 A1 | 12/2016 |
| WO | 2017/058834 A1 | 4/2017 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/048838 A1 | 3/2018 |
| WO | 2018/049430 A2 | 3/2018 |
| WO | 2018/057268 A1 | 3/2018 |
| WO | 2018/099037 A1 | 6/2018 |
| WO | 2018/159864 A1 | 9/2018 |
| WO | 2018/212802 A1 | 11/2018 |

OTHER PUBLICATIONS

European Search Report received for European Patent Application No. 20210373.5, dated Apr. 13, 2021, 4 pages.
European Search Report received for European Patent Application No. 21157252.4, dated Apr. 16, 2021, 4 pages.
Intention to Grant received for Danish Patent Application No. PA201970593, dated Apr. 13, 2021, 2 pages.
Notice of Acceptance received for Australian Patent Application No. 2020201969, dated Mar. 26, 2021, 3 pages.
Notice of Acceptance received for Australian Patent Application No. 2020277216, dated Mar. 15, 2021, 3 pages.
Notice of Allowance received for U.S. Appl. No. 16/271,583, dated Apr. 14, 2021, 6 pages.
Office Action received for European Patent Application No. 20168009.7, dated Apr. 20, 2021, 6 pages.
Office Action received for European Patent Application No. 21157252.4, dated Apr. 23, 2021, 8 pages.
Office Action received for Japanese Patent Application No. 2020-193703, dated Apr. 19, 2021,4 pages (2 pages of English Translation and 2 pages of Official Copy).
[B612] Addition of facial recognition bear/cat stamps and AR background function having moving sparkles or hearts, Available Online at: <URL, htpps://apptopi.jp/2017/0I/22/b612>, Jan. 22, 2017, 11 pages (Official Copy Only) (See Communication under 37 CFR §198(a) (3)).
Advisory Action received for U.S. Appl. No. 16/144,629, dated Dec. 13, 2019, 9 pages.

Advisory Action received for U.S. Appl. No. 16/144,629, dated Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Applicant-Initiated Interview Summary received for U.S. Appl. No. 16/271,583 dated Mar. 2, 2020, 3 pages.
Applicant-Initiated Interview Summary received for U.S. Appl. No. 16/271,583, dated Jul. 14, 2020, 4 pages.
Applicant-Initiated Interview Summary received for U.S. Appl. No. 15/995,040, dated Dec. 23, 2019, 5 pages.
Applicant-Initiated Interview Summary received for U.S. Appl. No. 15/995,040, dated Jul. 27, 2020, 4 pages.
Applicant-Initiated Interview Summary received for U.S. Appl. No. 15/995,040, dated Nov. 24, 2020, 4 pages.
Applicant-Initiated Interview Summary received for U.S. Appl. No. 16/144,629, dated Jul. 2, 2020, 5 pages.
Applicant-Initiated Interview Summary received for U.S. Appl. No. 16/144,629, dated Nov. 23, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/528,941, dated Nov. 10, 2020, 2 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Applicant-Initiated Interview Summary received for U.S. Appl. No. 16/733,718, dated Nov. 2, 2020, 4 pages.
Astrovideo, "AstroVideo enables you to use a low-cost, low-light video camera to capture astronomical images.", Available online at: https://www.coaa.co.uk/astrovideo.htm, Retrieved on: Nov. 18, 2019, 5 pages.
Brief Communication regarding Oral Proceedings received for European Patent Application No. 17184710.6, dated Feb. 19, 2020, 2 pages.
Brief Communication regarding Oral Proceedings received for European Patent Application No. 17184710.6, dated Mar. 9, 2020, 2 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Certificate of Examination received for Australian Patent Application No. 2019100794, dated Dec. 19, 2019, 2 pages.
Certificate of Examination received for Australian Patent Application No. 2020100189, dated May 12, 2020, 2 pages.
Certificate of Examination received for Australian Patent Application No. 2020100720, dated Nov. 11, 2020, 2 pages.
Certificate of Examination received for Australian Patent Application No. 2020101043, dated Dec. 22, 2020, 2 pages.
Certificate of Examination received for Australian Patent Application No. 2020104220, dated Apr. 1, 2021, 2 pages.
Channel Highway, "Virtual Makeover in Real-time and in full 3D", Available online at: -https://www.youtube.com/watch?v=NgUbBzb5qZg, Feb. 16, 2016, 1 page.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018,11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.

(56) References Cited

OTHER PUBLICATIONS

Corrected Notice of Allowance received for U.S. Appl. No. 15/858,175, mailed on Sep. 21, 2018, 2 pages.
Corrected Notice of Allowance received for U.S. Appl. No. 16/143,097, mailed on Nov. 8, 2019, 3 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Decision of Refusal received for Japanese Patent Application No. 2018-243463, dated Feb. 25, 2019, 8 pages (5 pages of English Translation and 3 pages of Official Copy).
Decision of Refusal received for Japanese Patent Application No. 2018-545502, dated Feb. 25, 2019, 11 pages (7 pages of English Translation and 4 pages of Official Copy).
Decision on Appeal received for Japanese Patent Application No. 2018-225131, dated Mar. 11, 2021, 5 pages (4 pages of English Translation and 1 page of Official Copy).
Decision on Appeal received for Japanese Patent Application No. 2018-545502, dated Mar. 25, 2021, 3 pages (1 page of English Translation and 2 pages of Official Copy).
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for Danish Patent Application No. PA201970601, dated Feb. 3, 2021, 2 pages.
Decision to Grant received for European Patent Application No. 15712218.5, dated Jun. 7, 2018, 2 pages.
Decision to Grant received for European Patent Application No. 18176890.4, dated Jul. 9, 2020, 3 pages.
Decision to Grant received for European Patent Application No. 18183054.8, dated Jan. 21, 2021, 3 pages.
Decision to Grant received for European Patent Application No. 18209460.7, dated Apr. 9, 2021, 2 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages (1 page of English Translation and 1 page of Official Copy).
Decision to Grant received for Japanese Patent Application No. 2020-070418, dated Feb. 8, 2021, 3 pages (1 page of English Translation and 2 pages of Official Copy).
Decision to Refuse received for European Patent Application No. 17184710.6, dated Jun. 16, 2020, 9 pages.
Decision to Refuse received for Japanese Patent Application No. 2018-225131, dated Jul. 8, 2019, 6 pages (4 pages of English Translation and 2 pages of Official Copy).
Decision to Refuse received for Japanese Patent Application No. 2018-243463, dated Jul. 8, 2019, 5 pages (3 pages of English Translation and 2 pages of Official Copy).
Decision to Refuse received for Japanese Patent Application No. 2018-545502, dated Jul. 8, 2019, 5 pages (3 pages of English Translation and 2 pages of Official Copy).
Digital Trends, "ModiFace Partners with Samsung To Bring AR Makeup to The Galaxy S9", Available online at:—https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.
European Search Report received for European Patent Application No. 18214698.5, dated Mar. 21, 2019, 5 pages.
European Search Report received for European Patent Application No. 20206196.6, dated Dec. 8, 2020, 4 pages.
European Search Report received for European Patent Application No. 20206197.4, dated Nov. 30, 2020, 4 pages.
Examiner Initiated-Interview Summary received for U.S. Appl. No. 16/528,941, dated Dec. 1, 2020, 2 pages.
Extended European Search Report received for European Patent Application No. 19204230.7, dated Feb. 21, 2020, 7 pages.
Extended European Search Report received for European Patent Application No. 20168009.7, dated Sep. 11, 2020, 12 pages.
Extended Search Report received for European Patent Application 17809168.2, dated Jun. 28, 2018, 9 pages.
Fedko Daria, "AR Hair Styles", Online Available at <https://www.youtube.com/watch?v=FrS6tHRbFE0>, Jan. 24, 2017, 2 pages.
Final Office Action received for U.S. Appl. No. 15/268,115, dated Oct. 11, 2017, 48 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 15/995,040, dated Oct. 17, 2019, 20 pages.
Final Office Action received for U.S. Appl. No. 15/995,040, dated Sep. 2, 2020, 21 pages.
Final Office Action received for U.S. Appl. No. 16/144,629, dated Sep. 11, 2020, 22 pages.
Final Office Action received for U.S. Appl. No. 16/144,629, dated Sep. 18, 2019, 22 pages.
Final Office Action received for U.S. Appl. No. 16/271,583, dated Aug. 26, 2020, 18 pages.
Final Office Action received for U.S. Appl. No. 16/528,941, dated Jul. 13, 2020, 15 pages.
Franks Tech Help, "DSLR Camera Remote Control on Android Tablet, DSLR Dashboard, Nexus 10, Canon Camera, OTG Host Cable", Available online at https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4K", Available Online at:—https://www.youtube.com/watch?v=Rf2Gy8QmDqc, Oct. 24, 2016, 3 pages.

(56) References Cited

OTHER PUBLICATIONS

Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews., "Aspect Ratio: What it is and Why It Matters", Retrieved from <https://web.archive.org/web/20190331225429/https://digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-Yeview-1771p5.php>, Aug. 23, 2018, 11 pages.
Hall Brent, "Samsung Galaxy Phones Pro Mode (S7/S8/S9/Note 8/Note 9): When, why, & Howto Use It", See Especially 3:18-5:57, Available Online at <https://www.youtube.com/watch?v=KwPxGUDRkTg>, Jun. 19, 2018, 3 pages.
HELPVIDEOSTV, "Howto Use Snap Filters on Snapchat", Retrieved from <https://www.youtube.com/watch?v=oR-7clWPszU&feature=youtu.be>, Mar. 22, 2017, pp. 1-2.
Hernández Carlos, "Lens Blur in the New Google Camera App", Available online at https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Huawei Mobile PH, "Huawei P10 Tips & Tricks: Compose Portraits with Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/Howto/Explained)", Online Available at: https://www.youtube.com/watch?v=d4r3PWioY4Y, Apr. 26, 2019, 4 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201970601, dated Sep. 21, 2020, 2 pages.
Intention to Grant received for Danish Patent Application No. PA201970603, dated Jan. 13, 2021, 2 pages.
Intention to Grant received for European Patent Application No. 15712218.5, dated Jan. 24, 2018, 7 pages.
Intention to Grant received for European Patent Application No. 18176890.4, dated Feb. 28, 2020, 8 pages.
Intention to Grant received for European Patent Application No. 18183054.8, dated Nov. 5, 2020, 6 pages.
Intention to Grant received for European Patent Application No. 18209460.7, dated Jan. 15, 2021, 8 pages.
Intention to Grant received for European Patent Application No. 18214698.5, dated Apr. 21, 2020, 8 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 Pages.
International Preliminary Report on Patentability received for PCT Patent Application No. PCT/US2018/015591, dated Dec. 19, 2019, 10 pages.
International Preliminary Report on Patentability received for PCT Patent Application No. PCT/US2019/017363, dated Aug. 20, 2020, 9 pages.
International Preliminary Report on Patentability received for PCT Patent Application No. PCT/US2019/024067, dated Nov. 19, 2020, 12 pages.
International Preliminary Report on Patentability received for PCT Patent Application No. PCT/US2019/049101, dated Mar. 25, 2021, 17 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report and Written Opinion received for PCT Patent Application No. PCT/US2019/017363, dated Aug. 12, 2019, 12 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2019/049101, dated Dec. 16, 2019, 26 pages.
International Search Report and Written Opinion received for PCT Patent Application No. PCT/US2020/031643, dated Dec. 2, 2020, 33 pages.
International Search Report and Written Opinion received for PCT Patent Application No. PCT/US2020/031643, dated Nov. 2, 2020, 34 pages.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/049101, dated Oct. 24, 2019, 17 pages.
Invitation to Pay Additional Fees received for PCT Patent Application No. PCT/US2019/017363, dated Jun. 17, 2019, 8 pages.
Invitation to Pay Additional Fees received for PCT Patent Application No. PCT/US2019/024067, dated Jul. 16, 2019, 13 pages.
Invitation to Pay Additional Fees received for PCT Patent Application No. PCT/US2020/031643, dated Sep. 9, 2020, 30 pages.
Invitation to Pay Search Fees received for European Patent Application No. 19724959.2, dated Feb. 25, 2020, 3 pages.
IPhone User Guide For iOS 4.2 and 4.3 Software, Available at https://manuals.info.apple.com/MANUALS/1000/MA1539/en_US/iPhone_iOS4_User_Guide.pdf, 2011, 274 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Mobiscrub, "Galaxy S4 mini camera review", Available Online at:—https://www.youtube.com/watch?v=KYKOydw8QT8, Aug. 10, 2013, 3 pages.
Mobiscrub, "Samsung Galaxy S5 Camera Review—HD Video", Available Online on:—https://www.youtube.com/watch?v=BFgwDtNKMjg, Mar. 27, 2014, 3 pages.
Modifacechannel, "Sephora 3D Augmented Reality Mirror", Available Online at https://www.youtube.com/watch?v=wwBO4PU9EXI, May 15, 2014, 1 page.
Neurotechnology, "Sentimask SDK", Available at https://www.neurotechnology.com/sentimask.html, Apr. 22, 2018, 5 pages.

(56) References Cited

OTHER PUBLICATIONS

Non-Final Office Action received for U.S. Appl. No. 12/764,360, dated May 3, 2012, 19 pages.
Non-Final Office Action received for U.S. Appl. No. 14/869,807, dated Dec. 2, 2016, 23 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Non-Final Office Action received for U.S. Appl. No. 15/728,147, dated Jan. 31, 2019, 41 pages.
Non-Final Office Action received for U.S. Appl. No. 15/995,040, dated Apr. 15, 2020, 19 pages.
Non-Final Office Action received for U.S. Appl. No. 15/995,040, dated May 16, 2019, 24 pages.
Non-Final Office Action received for U.S. Appl. No. 16/143,097, dated Feb. 28, 2019, 17 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/271,583, dated May 6, 2020, 24 pages.
Non-Final Office Action received for U.S. Appl. No. 16/271,583, dated Nov. 29, 2019, 18 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/599,433, dated Jan. 28, 2021, 16 pages.
Non-Final Office Action received for U.S. Appl. No. 16/733,718, dated Sep. 16, 2020, 25 pages.
Notice of Acceptance received for Australian Patent Application No. 2017286130, dated Apr. 26, 2019, 3 pages.
Notice of Acceptance received for Australian Patent Application No. 2018279787, dated Dec. 10, 2019, 3 pages.
Notice of Acceptance received for Australian Patent Application No. 2019213341, dated Aug. 25, 2020, 3 pages.
Notice of Acceptance received for Australian Patent Application No. 2019266049, dated Nov. 24, 2020, 3 pages.
Notice of Acceptance received for Australian Patent Application No. 2020267151, dated Dec. 9, 2020, 3 pages.
Notice of Acceptance received for Australian Patent Application No. 2021201167, dated Mar. 15, 2021, 3 pages.
Notice of Allowance received for Brazilian Patent Application No. 112018074765-3, dated Oct. 8, 2019, 2 pages (1 page of English Translation and 1 page of Official Copy).
Notice of Allowance received for Chinese Patent Application No. 201580046237.6, dated Aug. 29, 2018, 4 pages (1 page of English Translation and 3 pages of Official copy).
Notice of Allowance received for Chinese Patent Application No. 201710657424.9, dated May 8, 2020, 2 pages (1 page of English Translation and 1 page of Official Copy).
Notice of Allowance received for Chinese Patent Application No. 201780002533.5, dated Apr. 14, 2020, 2 pages (1 page of English Translation and 1 page of Official Copy).
Notice of Allowance received for Chinese Patent Application No. 201810566134.8, dated Apr. 7, 2020, 3 pages (1 page of English Translation and 2 pages of Official Copy).
Notice of Allowance received for Chinese Patent Application No. 201810664927.3, dated Jul. 19, 2019, 2 pages (1 page of English Translation and 1 page of Official Copy).
Notice of Allowance received for Chinese Patent Application No. 201811512767.7, dated Jul. 27, 2020, 4 pages (1 page of English Translation and 3 pages of Official Copy).
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Notice of Allowance received for Chinese Patent Application No. 201911219525.3, dated Sep. 29, 2020, 2 pages (1 page of English Translation and 1 page of Official Copy).
Notice of Allowance received for Chinese Patent Application No. 202010287953.6, dated Mar. 18, 2021, 7 pages (3 pages of English Translation and 4 pages of Official Copy).
Notice of Allowance received for Chinese Patent Application No. 202010287961.0, dated Mar. 9, 2021, 8 pages (4 pages of English Translation and 4 pages of Official Copy).
Notice of Allowance received for Chinese Patent Application No. 202010287975.2, dated Mar. 1, 2021, 7 pages (3 pages of English Translation and 4 pages of Official Copy).
Notice of Allowance received for Japanese Patent Application No. 2018-171188, dated Jul. 16, 2019, 3 pages (1 page of English Translation and 2 pages of Official Copy).
Notice of Allowance received for Korean Patent Application No. 10-2018-7026743, dated Mar. 20, 2019, 7 pages (1 page of English Translation and 6 pages of Official Copy).
Notice of Allowance received for Korean Patent Application No. 10-2018-7028849, dated Feb. 1, 2019, 4 pages (1 page of English Translation and 3 pages of Official Copy).
Notice of Allowance received for Korean Patent Application No. 10-2018-7034780, dated Jun. 19, 2019, 4 pages (1 page of English Translation and 3 pages of Official Copy).
Notice of Allowance received for Korean Patent Application No. 10-2018-7036893, dated Jun. 12, 2019, 4 pages (1 page of English Translation and 3 pages of Official Copy).
Notice of Allowance received for Korean Patent Application No. 10-2019-7027042, dated Nov. 26, 2020, 4 pages (1 page of English Translation and 3 pages of Official Copy).
Notice of Allowance received for Korean Patent Application No. 10-2019-7035478, dated Apr. 24, 2020, 4 pages (1 page of English Translation and 3 pages of Official Copy).
Notice of Allowance received for Korean Patent Application No. 10-2020-0052618, dated Mar. 23, 2021, 5 pages (2 page of English Translation and 3 pages of Official Copy).
Notice of Allowance received for Korean Patent Application No. 10-2020-0143726, dated Nov. 10, 2020, 5 pages (2 pages of English Translation and 3 pages of Official Copy).
Notice of Allowance received for Korean Patent Application No. 10-2020-0155924, dated Nov. 23, 2020, 7 pages (2 pages of English Translation and 5 pages of Official Copy).
Notice of Allowance received for Korean Patent Application No. 10-2020-7031855, dated Mar. 22, 2021, 5 pages (1 page of English Translation and 4 pages of Official Copy).
Notice of Allowance received for Taiwanese Patent Application No. 104107328, dated Jun. 12, 2017, 3 pages (Official Copy Only) (See Communication under 37 CFR § 1.98(a)(3)).
Notice of Allowance received for U.S. Appl. No. 12/764,360, dated Oct. 1, 2012, 13 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 Pages.
Notice of Allowance received for U.S. Appl. No. 14/869,807, dated Oct. 10, 2017, 9 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.

(56) References Cited

OTHER PUBLICATIONS

Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 Pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/975,581, dated Oct. 3, 2018, 25 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/191,117, dated Oct. 29, 2019, 9 pages.
Notice of Allowance received for U.S. Appl. No. 16/271,583, dated Dec. 9, 2020, 6 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Notice of Allowance received for U.S. Appl. No. 16/733,718, dated Feb. 5, 2021, 14 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Australian Patent Application No. 2019100794, dated Oct. 3, 2019, 4 pages.
Office Action received for Australian Patent Application No. 2019213341, dated Jun. 30, 2020, 6 pages.
Office Action received for Australian Patent Application No. 2019218241, dated Apr. 1, 2021, 3 pages.
Office Action received for Australian Patent Application No. 2020100189, dated Apr. 1, 2020, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020101043, dated Aug. 14, 2020, 5 pages.
Office Action received for Australian Patent Application No. 2020101043, dated Oct. 30, 2020, 4 pages.
Office Action received for Australian Patent Application No. 2020201969, dated Sep. 25, 2020, 5 pages.
Office Action received for Australian Patent Application No. 2020277216, dated Dec. 17, 2020, 5 pages.
Office Action received for Chinese Patent Application No. 201580046237.6, dated Feb. 6, 2018, 10 pages (5 pages of English Translation and 5 pages of Official Copy).
Office Action received for Chinese Patent Application No. 201710657424.9, dated Sep. 17, 2019, 23 pages (11 pages of English Translation and 12 pages of Official Copy).
Office Action received for Chinese Patent Application No. 201780002533.5, dated Apr. 25, 2019, 17 pages (7 pages of English Translation and 10 pages of Official Copy).
Office Action received for Chinese Patent Application No. 201780002533.5, dated Feb. 3, 2020, 6 pages (3 pages of English Translation and 3 pages of Official Copy).
Office Action received for Chinese Patent Application No. 201780002533.5, dated Sep. 26, 2019, 21 pages (9 pages of English Translation and 12 pages of Official Copy).
Office Action received for Chinese Patent Application No. 201810566134.8, dated Aug. 13, 2019, 14 pages (8 pages of English Translation and 6 pages of Official Copy).
Office Action received for Chinese Patent Application No. 201810664927.3, dated Mar. 28, 2019, 11 pages (5 pages of English Translation and 6 pages of Official Copy).
Office Action received for Chinese Patent Application No. 201811446867.4, dated Dec. 31, 2019, 12 pages (5 pages of English Translation and 7 pages of Official Copy).
Office Action received for Chinese Patent Application No. 201811446867.4, dated May 6, 2020, 10 pages (5 pages of English Translation and 5 pages of Official Copy).
Office Action received for Chinese Patent Application No. 201811446867.4, dated Sep. 8, 2020, 9 pages (4 pages of English Translation and 5 pages of Official Copy).
Office Action received for Chinese Patent Application No. 201811512767.7, dated Dec. 20, 2019, 14 pages (7 pages of English Translation and 7 pages of Official Copy).
Office Action received for Chinese Patent Application No. 201811512767.7, dated Jun. 4, 2020, 6 pages (3 pages of English Translation and 3 pages of Official Copy).
Office Action received for Chinese Patent Application No. 201910692978.1, dated Apr. 3, 2020, 19 pages (8 pages of English Translation and 11 pages of Official Copy).
Office Action received for Chinese Patent Application No. 201910692978.1, dated Nov. 4, 2020, 4 pages (1 page of English Translation and 3 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).

(56) References Cited

OTHER PUBLICATIONS

Office Action received for Chinese Patent Application No. 202010218168.5, dated Feb. 9, 2021,21 pages (9 pages of English Translation and 12 pages of Official Copy).
Office Action received for Chinese Patent Application No. 202010287950.2, dated Feb. 20, 2021, 22 pages (10 pages of English Translation and 12 pages of Official Copy).
Office Action received for Chinese Patent Application No. 202010287953.6, dated Jan. 14, 2021, 14 pages (7 pages of English Translation and 7 pages of Official Copy).
Office Action received for Chinese Patent Application No. 202010287958.9, dated Jan. 5, 2021, 16 pages (8 pages of English Translation and 8 pages of Official Copy).
Office Action received for Chinese Patent Application No. 202010287961.0, dated Dec. 30, 2020, 16 pages (8 pages of English Translation and 8 pages of Official Copy).
Office Action received for Chinese Patent Application No. 202010287975.2, dated Dec. 30, 2020, 17 pages (9 pages of English Translation and 8 pages of Official Copy).
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jan. 28, 2020, 3 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201770719, dated Jan. 17, 2020, 4 pages.
Office Action received for Danish Patent Application No. PA201770719, dated Nov. 16, 2020, 5 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 Pages.
Office Action received for Danish Patent Application No. PA201870368, dated Oct. 1, 2019, 6 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970592, dated Oct. 26, 2020, 5 pages.
Office Action received for Danish Patent Application No. PA201970593, dated Apr. 16, 2020, 2 pages.
Office Action received for Danish Patent Application No. PA201970593, dated Feb. 2, 2021,2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970603, dated Nov. 4, 2020, 3 pages.
Office Action received for Danish Patent Application No. PA201970605, dated Mar. 10, 2020, 5 pages.
Office Action received for European Patent Application 17809168.2, dated Jan. 7, 2020, 5 pages.
Office Action received for European Patent Application 17809168.2, dated Oct. 8, 2020, 4 pages.
Office Action received for European Patent Application No. 15712218.5, dated Aug. 3, 2017, 4 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 Pages.
Office Action received for European Patent Application No. 18209460.7, dated Apr. 10, 2019, 7 pages.
Office Action received for European Patent Application No. 18209460.7, dated Apr. 21, 2020, 5 pages.
Office Action received for European Patent Application No. 18214698.5, dated Apr. 2, 2019, 8 pages.
Office Action received for European Patent Application No. 19204230.7, dated Sep. 28, 2020, 6 pages.
Office Action received for European Patent Application No. 19724959.2, dated Apr. 23, 2020, 10 pages.
Office Action received for European Patent Application No. 20206196.6, dated Jan. 13, 2021, 10 pages.
Office Action received for European Patent Application No. 20206197.4, dated Jan. 12, 2021, 9 pages.
Office Action received for Indian Patent Application No. 201814036470, dated Feb. 26, 2021, 7 pages.
Office Action received for Indian Patent Application No. 201917053025, dated Mar. 19, 2021, 7 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-182607, dated Jul. 20, 2020, 5 pages (2 pages of English Translation and 3 pages of Official Copy).
Office Action received for Japanese Patent Application No. 2018-225131, dated Aug. 17, 2020, 21 pages (6 pages of English Translation and 15 pages of Official Copy).

(56) References Cited

OTHER PUBLICATIONS

Office Action received for Japanese Patent Application No. 2018-225131, dated Mar. 4, 2019, 10 pages (6 pages of English Translation and 4 pages of Official Copy).
Office Action received for Japanese Patent Application No. 2018-545502, dated Aug. 17, 2020, 14 pages (6 pages of English Translation and 8 pages of Official Copy).
Office Action received for Japanese Patent Application No. 2020-070418, dated Aug. 3, 2020, 22 pages (14 pages of English Translation and 8 pages of Official Copy).
Office Action received for Korean Patent Application No. 10-2018-7026743, dated Jan. 17, 2019, 5 pages (2 pages of English Translation and 3 pages of Official Copy).
Office Action received for Korean Patent Application No. 10-2018-7034780, dated Apr. 4, 2019, 11 pages (5 pages of English Translation and 6 pages of Official Copy).
Office Action received for Korean Patent Application No. 10-2018-7036893, dated Apr. 9, 2019, 6 pages (2 pages of English Translation and 4 pages of Official Copy).
Office Action received for Korean Patent Application No. 10-2019-7027042, dated May 13, 2020, 6 pages (2 pages of English Translation and 4 pages of Official Copy).
Office Action received for Korean Patent Application No. 10-2019-7035478, dated Jan. 17, 2020, 17 pages (9 pages of English Translation and 8 pages of Official Copy).
Office Action received for Korean Patent Application No. 10-2020-0052618, dated Aug. 18, 2020, 11 pages (5 pages of English Translation and 6 pages of Official Copy).
Office Action received for Korean Patent Application No. 10-2020-7021870, dated Nov. 11, 2020, 11 pages (5 pages of English Translation and 6 pages of Official Copy).
Office Action received for Korean Patent Application No. 10-2020-7031855, dated Nov. 24, 2020, 6 pages (2 pages of English Translation and 4 pages of Official Copy).
Office Action received for Korean Patent Application No. 10-2021-0022053, dated Mar. 1, 2021, 11 pages (5 pages of English Translation and 6 pages of Official Copy).
Office Action received for Korean Patent Application No. 10-2021-7000954, vJan. 28, 2021,5 pages (2 pages of English Translation and 3 pages of Official Copy).
Office Action received for Taiwanese Patent Application No. 104107328, dated Dec. 28, 2016, 4 pages (1 page of Search Report and 3 pages of Official Copy).
Osxdaily, "Howto Zoom the Camera on iPhone", Available Online at https://osxdaily.com/2012/04/18/zoom-camera-iphone/, Apr. 18, 2012, 6 pages.
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQICfulkz0, Feb. 25, 2018, 2 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Pre-Appeal Review Report received for Japanese Patent Application No. 2018-182607, dated Jan. 21, 2021, 4 pages (2 pages of English Translation and 2 pages of Official Copy).
PreAppeal Review Report received for Japanese Patent Application No. 2018-225131, dated Jan. 24, 2020, 8 pages (4 pages of English Translation and 4 pages of Official Copy).
PreAppeal Review Report received for Japanese Patent Application No. 2018-545502, dated Jan. 24, 2020, 8 pages ( 3 pages of English Translation and 5 pages of Official Copy).

Remote Shot for Smartwatch 2, Available online at:—https://play.google.com/store/apps/details?id=net.watea.sw2.rshot&h1=en, Nov. 21, 2017, 3 pages.
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Result of Consultation received for European Patent Application No. 19204230.7, dated Nov. 16, 2020, 3 pages.
Result of Consultation received for European Patent Application No. 19204230.7, dated Sep. 24, 2020, 5 pages.
Result of Consultation received for European Patent Application No. 19724959.2, dated Sep. 4, 2020, 3 pages.
Schiffhauer Alexander, "See the Light with Night Sight", Available online at https://www.blog.google/products/pixel/see-light-night-sight, Nov. 14, 2018, 6 pages.
Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Search Report received for Danish Patent Application No. PA201770719, dated Oct. 17, 2017, 9 pages.
Shaw et al., ""Skills for Closeups Photography"", Watson-Guptill Publications, Nov. 1999, 5 pages (Official Copy Only) (See Communication under 37 CFR § 1.98(a) (3)).
Shiftdelete.Net, "Oppo Reno 10x Zoom On Inceleme—Huawei P30 Pro'ya rakip mi geliyor?", Available online at <https://www.youtube.com/watch?v=ev2wlUztdrg>, See especially 5:34-6:05., Apr. 24, 2019, 2 pages.
Smart Reviews, "Honor10 AI Camera's In-Depth Review", See Especially 2:37-2:48 6:39-6:49, Available Online at <https://www.youtube.com/watch?v=oKFqRvxeDBQ>, May 31, 2018, 2 pages.
Snapchat Lenses, "Howto Get All Snapchat Lenses Face Effect Filter on Android", Retrieved from: <https://www.youtube.com/watch?v=0PfnF1 RInfw&feature=youtu.be>, Sep. 21, 2015, pp. 1-2.
Sony Xperia XZ3 Camera Review—The Colors, Duke, The Colors!, Android Headlines -Android News & Tech News, Available online at <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 17184710.6, dated Sep. 17, 2019, 7 pages.
Summons to Attend Oral Proceedings received for European Patent Application No. 19724959.2, dated Feb. 1, 2021, 9 pages.
Summons to Attend Oral Proceedings received for European Patent Application No. 19724959.2, dated Mar. 31, 2021, 3 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.

(56) References Cited

OTHER PUBLICATIONS

Supplemental Notice of Allowance received for U.S. Appl. No. 16/143,201, dated Jan. 10, 2019, 2 pages.
Supplemental Notice of Allowance received for U.S. Appl. No. 16/733,718, dated Mar. 9, 2021, 21 pages.
Supplemental Notice of Allowance received for U.S. Appl. No. 16/733,718, dated Mar. 29, 2021, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech Smith, "Snagit 11 Snagit 11.4 Help", Available at: http://assets.techsmith.com/Downloads/ua-tutorials-snagit-11/Snagit_11.pdf, Jan. 2014, 2 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techsmith, "Snagit® 11 Snagit 11.4 Help", available at: <http://assets.techsmith.com/Downloads/ua-tutorials-snagit-11/Snagit_11.pdf>, Jan. 2014, 146 pages.
Techtag, "Samsung J5 Prime Camera Review | True Review", Available online at :—https://www.youtube.com/watch?v=a_p906ai6PQ, Oct. 26, 2016, 3 pages.
Techtag, "Samsung J7 Prime Camera Review (Technical Camera)", Available Online at:—https://www.youtube.com/watch?v=AJPcLP8GpFQ, Oct. 4, 2016, 3 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Travel Tech Sports Channel, "New Whatsapp update-voice message recording made easy-Wantto record long voice messages", Available Online at: https://www.youtube.com/watch?v=SEviqgsAdUk, Nov. 30, 2017, 13 pages.
Vickgeek, "Canon 80D Live View Tutorial | Enhance your image quality", Available online at:—https://www.youtube.com/watch?v=JGNCiy6Wt9c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wong Richard, "Huawei Smartphone (P20/P10/P9 ,Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
X-TECH, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
European Search Report received for European Patent Application No. 21163791.3, dated May 6, 2021, 5 pages.
Non-Final Office Action received for U.S. Appl. No. 16/825,879, dated May 5, 2021, 12 pages.
Notice of Allowance received for Korean Patent Application No. 10-2020-7021870, dated Apr. 26, 2021, 4 pages (1 page of English Translation and 3 pages of Official Copy).
Notice of Allowance received for U.S. Appl. No. 16/528,941, dated May 19, 2021, 5 pages.
Notice of Allowance received for U.S. Appl. No. 16/271,583, dated May 10, 2021, 3 pages.
Office Action received for European Patent Application No. 20210373.5, dated May 10, 2021, 9 pages.
Office Action received for Indian Patent Application No. 202018006172, dated May 5, 2021, 6 pages.
Notice of Allowance received for Chinese Patent Application No. 202010218168.5, dated Aug. 25, 2021, 6 pages (3 pages of English Translation and 3 pages of Official Copy).
Notice of Allowance received for Chinese Patent Application No. 202010287958.9, dated Aug. 27, 2021, 6 pages (3 pages of English Translation and 3 pages of Official Copy).
Notice of Allowance received for Chinese Patent Application No. 202010600151.6, dated Aug. 13, 2021, 2 pages (1 page of English Translation and 1 page of Official Copy).
Notice of Allowance received for Korean Patent Application No. 10-2021-7000954, dated Aug. 18, 2021, 5 pages (2 pages of English Translation and 3 pages of Official Copy).
Office Action received for Chinese Patent Application No. 202010287950.2, dated Aug. 10, 2021, 12 pages (6 pages of English Translation and 6 pages of Official Copy).
Office Action received for Chinese Patent Application No. 202011480411.7, dated Aug. 2, 2021, 12 pages (6 pages of English Translation and 6 pages of Official Copy).
Office Action received for European Patent Application No. 20206197.4, dated Aug. 27, 2021, 6 pages.
Office Action received for Korean Patent Application No. 10-2020-7022663, dated Aug. 17, 2021, 11 pages (5 pages of English Translation and 6 pages of Official Copy).
Corrected Notice of Allowance received for U.S. Appl. No. 16/835,651, dated Aug. 10, 2021, 4 pages.
Non-Final Office Action received for U.S. Appl. No. 16/528,257, dated Jul. 30, 2021, 12 pages.
Notice of Allowance received for U.S. Appl. No. 16/528,941, dated Aug. 10, 2021, 5 pages.
Notice of Allowance received for U.S. Appl. No. 16/733,718, dated Jul. 29, 2021, 26 pages.
Office Action received for Chinese Patent Application No. 202010600197.8, dated Jul. 2, 2021, 14 pages (6 pages of English Translation and 8 pages of Official Copy).
Office Action received for Korean Patent Application No. 10-2021-7020693, dated Jul. 14, 2021, 7 pages (3 pages of English Translation and 4 pages of Official Copy).
Decision to Grant received for Japanese Patent Application No. 2020-184470, dated Jul. 1, 2021, 3 pages (1 page of English Translation and 2 pages of Official Copy).
Decision to Grant received for Japanese Patent Application No. 2020-184471, dated Jul. 1, 2021, 3 pages (1 page of English Translation and 2 pages of Official Copy).
Decision to Grant received for Japanese Patent Application No. 2021-051385, dated Jul. 8, 2021, 3 pages (1 page of English Translation and 2 pages of Official Copy).
Notice of Allowance received for U.S. Appl. No. 16/825,879, dated Jul. 13, 2021, 9 pages.
Office Action received for Australian Patent Application No. 2020239717, dated Jun. 23, 2021, 7 pages.
Office Action received for Australian Patent Application No. 2020260413, dated Jun. 24, 2021, 2 pages.
Office Action received for Danish Patent Application No. PA201770719, dated Jun. 30, 2021, 3 pages.
"Procamera Capture the Moment", Apr. 21, 2016, 63 pages.
Clover Juli, "Moment Pro Camera App for iOS Gains Zebra Striping for Displaying Over and Underexposed Areas", Online Available at <https://web.archive.org/web/20190502081353/https://www.macrumors.com/2019/05/01/momentcamera-app-zebra-striping-and-more/>, May 1, 2019, 8 pages.
Imagespacetv, "Olympus OM-D E-M1 Mark II—Highlights & Shadows with Gavin Hoey", Online available at: <https://www.youtube.com/watch?v=goEhh1n--hQ>, Aug. 3, 2018, 3 pages.
Certificate of Examination received for Australian Patent Application No. 2021103004, dated Sep. 13, 2021, 2 pages.

(56) References Cited

OTHER PUBLICATIONS

Corrected Notice of Allowance received for U.S. Appl. No. 16/825,879, dated Sep. 15, 2021, 2 pages.
Decision to Grant received for Danish Patent Application No. PA201970593, dated Sep. 7, 2021, 2 pages.
Office Action received for European Patent Application No. 18704732.9, dated Sep. 7, 2021, 10 pages.
Office Action received for European Patent Application No. 20168009.7, dated Sep. 13, 2021, 8 pages.
Office Action received for Japanese Patent Application No. 2018-182607, vSep. 8, 2021, 7 pages (4 pages of English Translation and 3 pages of Official Copy).
Corrected Notice of Allowance received for U.S. Appl. No. 16/825,879, dated Jul. 23, 2021, 2 pages.
Corrected Notice of Allowance received for U.S. Appl. No. 16/835,651, dated Jul. 28, 2021, 4 pages.
Examiner's Answer to Appeal Brief received for U.S. Appl. No. 16/144,629, dated Jul. 21, 2021, 21 pages.
Feng et al., "3D Direct Human-Computer Interface Paradigm Based on Free Hand Tracking", Chinese Journal of Computers, vol. 37, No. 6, Jun. 30, 2014, 15 pages (Official copy only). {See Communication under 37 CFR § 1.98(a) (3)}.
Notice of Acceptance received for Australian Patent Application No. 2021203210, dated Jul. 9, 2021, 3 pages.
Notice of Allowance received for Korean Patent Application No. 10-2021-7019525, dated Jul. 13, 2021, 5 pages (1 page of English Translation and 4 pages of Official Copy).
Notice of Allowance received for U.S. Appl. No. 16/271,583, dated Jul. 23, 2021, 6 pages.
Notice of Allowance received for U.S. Appl. No. 16/835,651, dated Jul. 23, 2021, 8 pages.
Office Action received for Chinese Patent Application No. 202010601484.0, dated Jun. 3, 2021, 13 pages (6 pages of English Translation and 7 pages of Official Copy).
Decision to Grant received for Danish Patent Application No. PA201970603, dated May 21, 2021, 2 pages.
Notice of Allowance received for U.S. Appl. No. 16/599,433, dated May 14, 2021, 11 pages.
Notice of Allowance received for U.S. Appl. No. 16/835,651, dated Jun. 1, 2021, 10 pages.
Office Action received for Japanese Patent Application No. 2020-184471, dated May 10, 2021, 3 pages (1 page of English Translation and 2 pages of Official Copy).
Summons to Attend Oral Proceedings received for European Patent Application No. 19204230.7, mailed on May 25, 2021, 10 pages.
Decision to Refuse received for European Patent Application No. 19724959.2, dated Jun. 22, 2021, 13 pages.
Examiner's Answer to Appeal Brief received for U.S. Appl. No. 15/995,040, dated Jun. 23, 2021, 31 pages.
Intention to Grant received for European Patent Application No. 17809168.2, dated Jun. 25, 2021, 8 pages.
Minutes of the Oral Proceedings received for European Patent Application No. 19724959.2, dated Jun. 14, 2021, 6 pages.
Office Action received for Japanese Patent Application No. 2020-184470, dated May 10, 2021, 3 pages (1 page of English Translation and 2 pages of Official Copy).
Applicant-Initiated Interview Summary received for U.S. Appl. No. 17/027,317, dated Dec. 21, 2020, 4 pages.
Corrected Notice of Allowance received for U.S. Appl. No. 16/835,651, dated Jun. 14, 2021, 2 pages.
Corrected Notice of Allowance received for U.S. Appl. No. 17/027,484, dated May 14, 2021, 5 pages.
Corrected Notice of Allowance received for U.S. Appl. No. 17/027,484, dated May 28, 2021, 5 pages.
Intention to Grant received for Danish Patent Application No. PA202070611, dated May 5, 2021, 2 pages.
Invitation to Pay Search Fees received for European Patent Application No. 18704732.9, dated Jun. 2, 2021, 3 pages.
Non-Final Office Action received for U.S. Appl. No. 17/027,317, dated Nov. 17, 2020, 17 pages.
Notice of Allowance received for U.S. Appl. No. 17/027,317, dated Apr. 12, 2021, 7 pages.
Notice of Allowance received for U.S. Appl. No. 17/027,317, dated Jan. 13, 2021, 10 pages.
Notice of Allowance received for U.S. Appl. No. 17/027,484, dated May 3, 2021, 11 pages.
Office Action received for Chinese Patent Application No. 202010600151.6, dated Apr. 29, 2021, 11 pages (5 pages of English Translation and 6 pages of Official copy).
Office Action received for Danish Patent Application No. PA202070611, dated Dec. 22, 2020, 7 pages.
Office Action received for European Patent Application No. 21163791.3, dated Jun. 2, 2021, 8 pages.
Corrected Notice of Allowance received for U.S. Appl. No. 16/599,433, dated Aug. 13, 2021, 5 pages.
Corrected Notice of Allowance received for U.S. Appl. No. 16/733,718, dated Aug. 18, 2021, 2 pages.
Corrected Notice of Allowance received for U.S. Appl. No. 16/825,879, dated Aug. 13, 2021, 2 pages.
Corrected Notice of Allowance received for U.S. Appl. No. 16/835,651, dated Aug. 13, 2021, 2 pages.
Decision to Grant received for Japanese Patent Application No. 2020-193703, dated Aug. 10, 2021, 3 pages (1 page of English Translation and 2 pages of Official Copy).
Invitation to Pay Additional Fees received for PCT Patent Application No. PCT/US2021/034304, dated Aug. 20, 2021, 16 pages.
Office Action received for Australian Patent Application No. 2021103004, dated Aug. 12, 2021, 5 pages.
Office Action received for Japanese Patent Application No. 2019-203399, dated Aug. 10, 2021, 4 pages (2 pages of English Translation and 2 pages of Official Copy).
"Nikon Digital Camera D7200 User's Manual", Online available at: https://download.nikonimglib.com/archive3/dbHI400jWws903mGr6q98a4k8F90/D7200UM_SG(En)05.pdf, 2005, 416 pages.
Non-Final Office Action received for U.S. Appl. No. 17/190,879, dated Oct. 13, 2021, 10 pages.
Notice of Allowance received for U.S. Appl. No. 16/599,433, dated Oct. 4, 2021, 13 pages.
Notice of Allowance received for U.S. Appl. No. 16/825,879, dated Sep. 28, 2021, 8 pages.
Office Action received for Australian Patent Application No. 2020239717, dated Sep. 28, 2021, 6 pages.
Office Action received for Indian Patent Application No. 201817024430, dated Sep. 27, 2021, 8 pages.
Office Action received for Japanese Patent Application No. 2020-542592, dated Sep. 21, 2021, 5 pages (3 pages of English Translation and 2 pages of Official Copy).

* cited by examiner

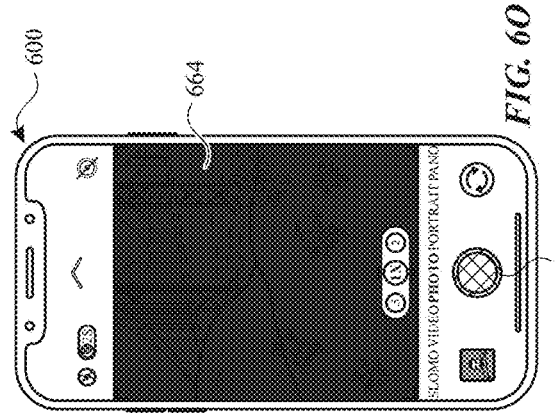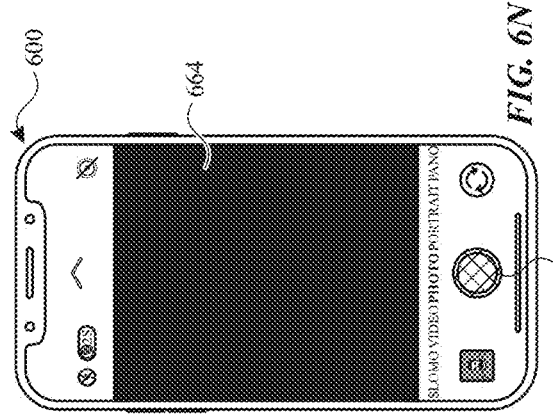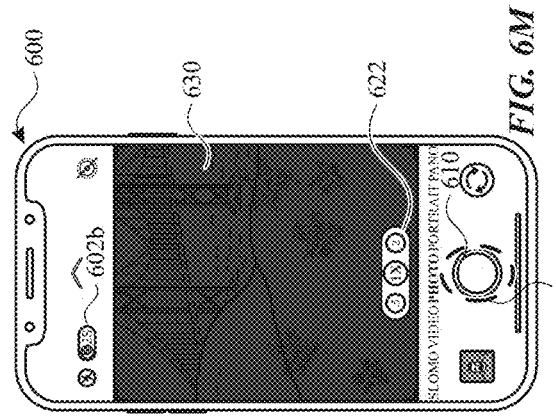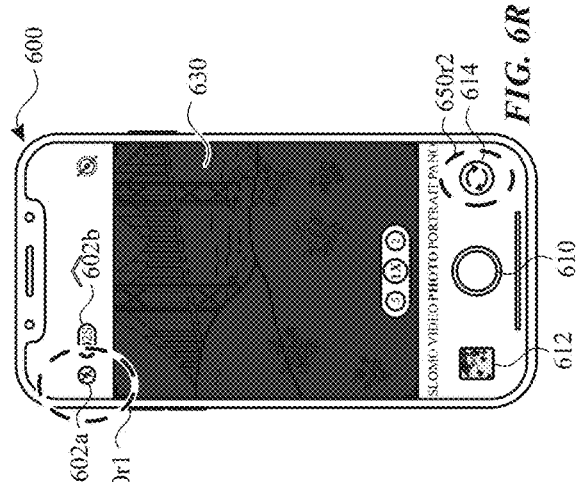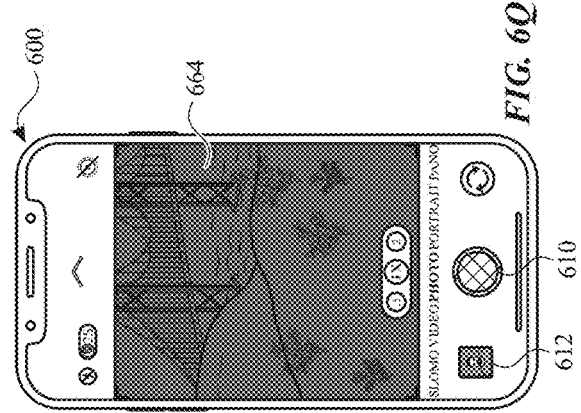

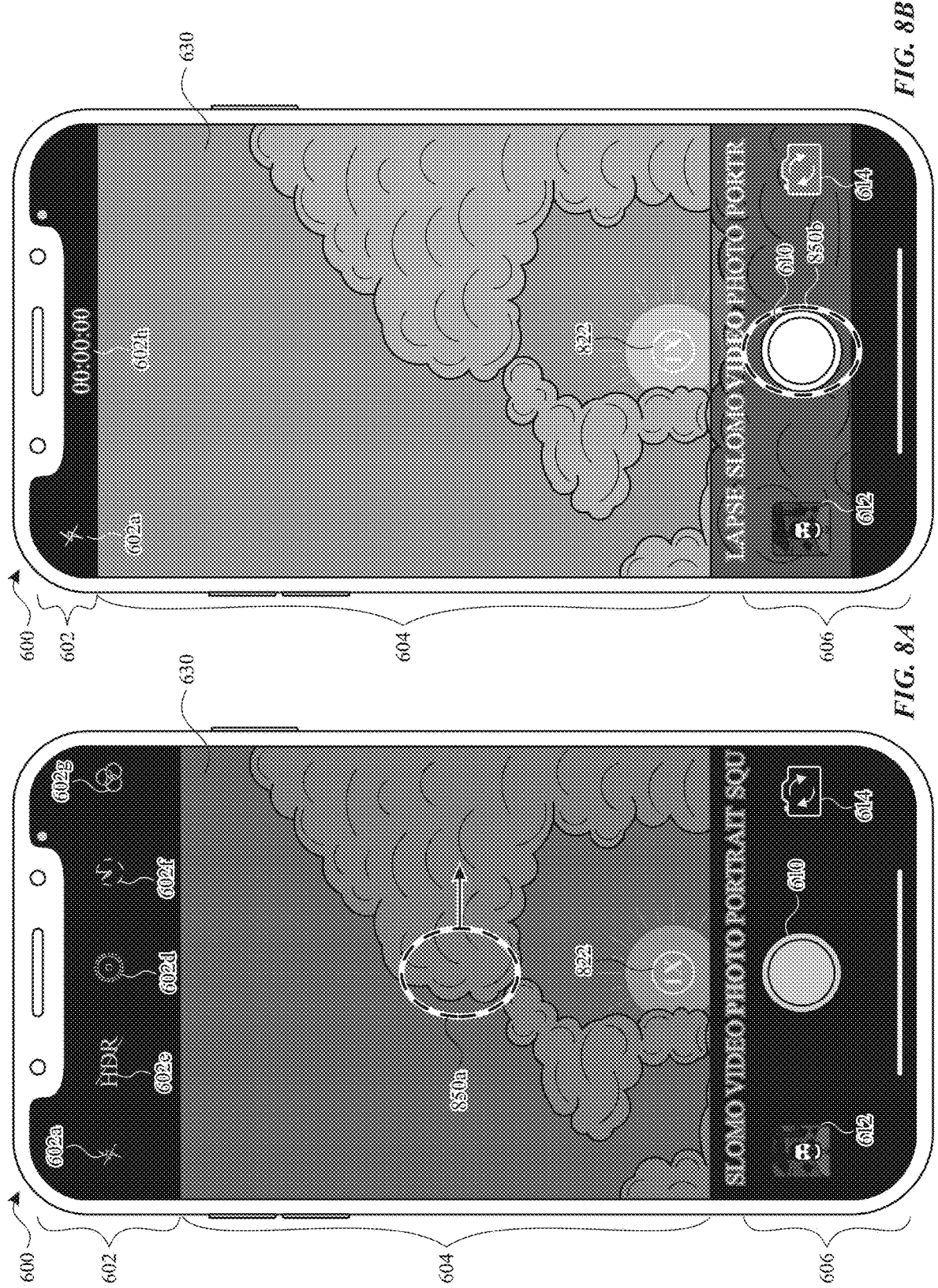

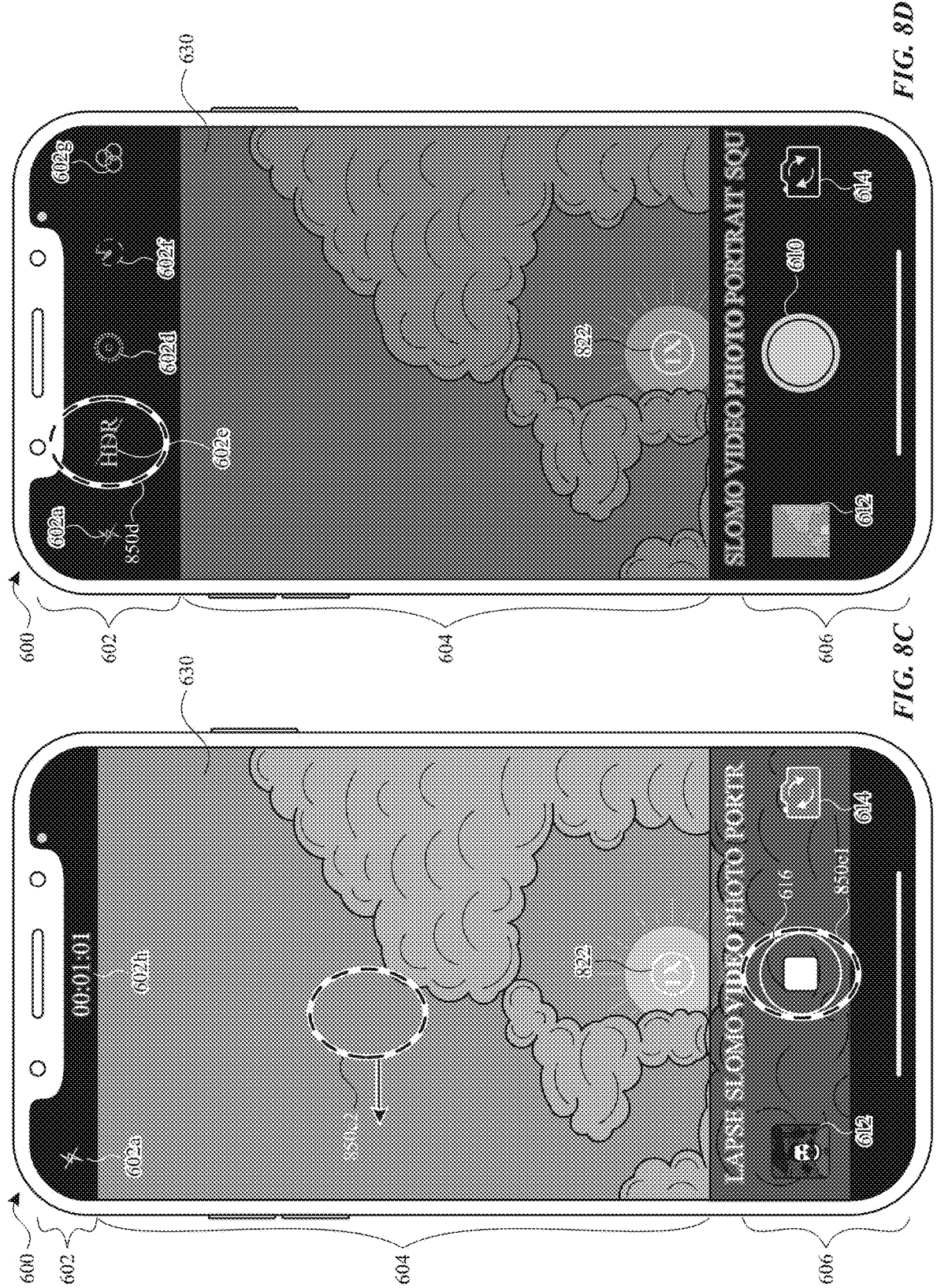

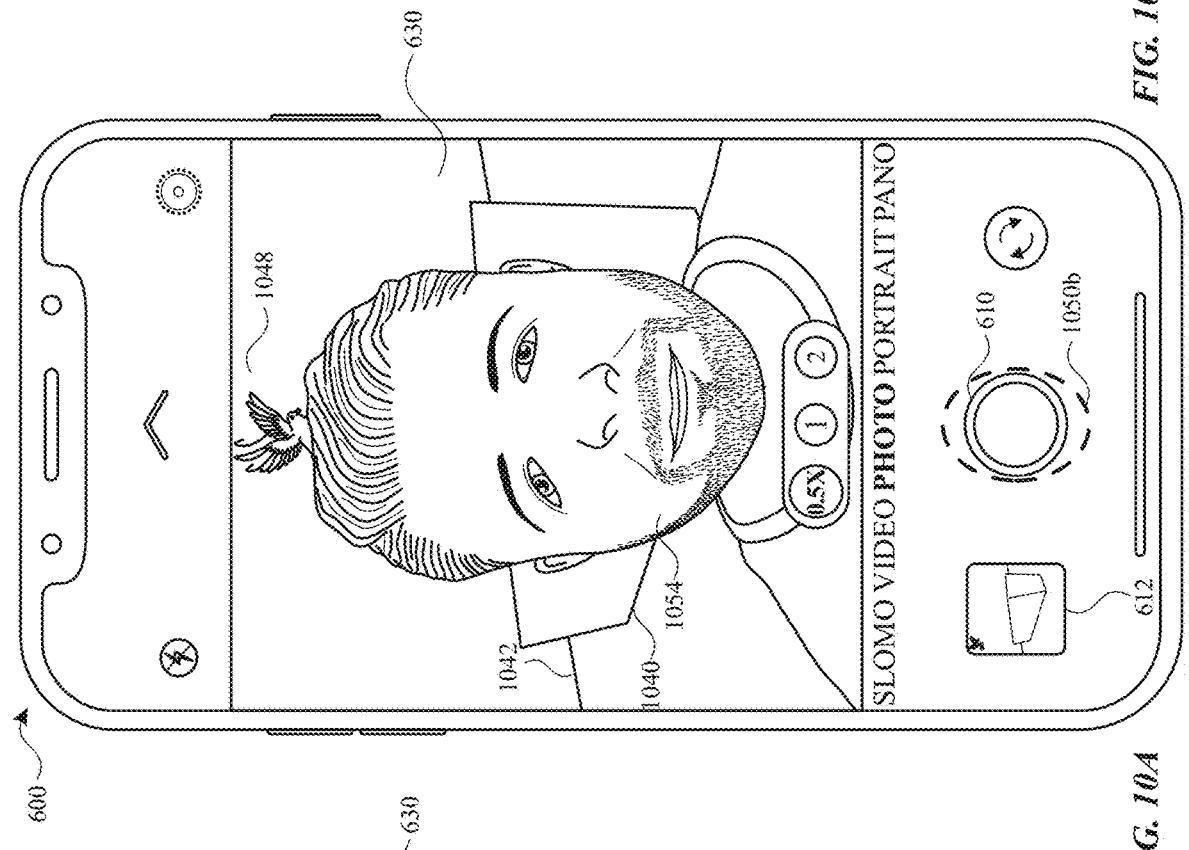
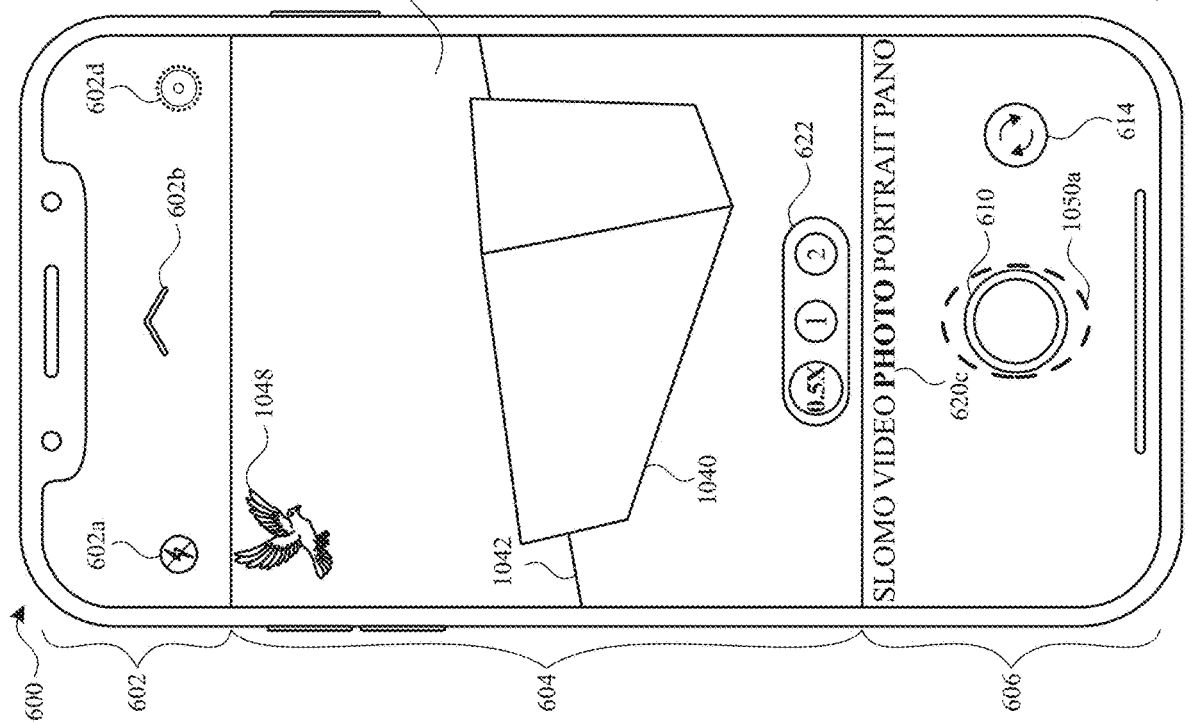
FIG. 10A
FIG. 10B

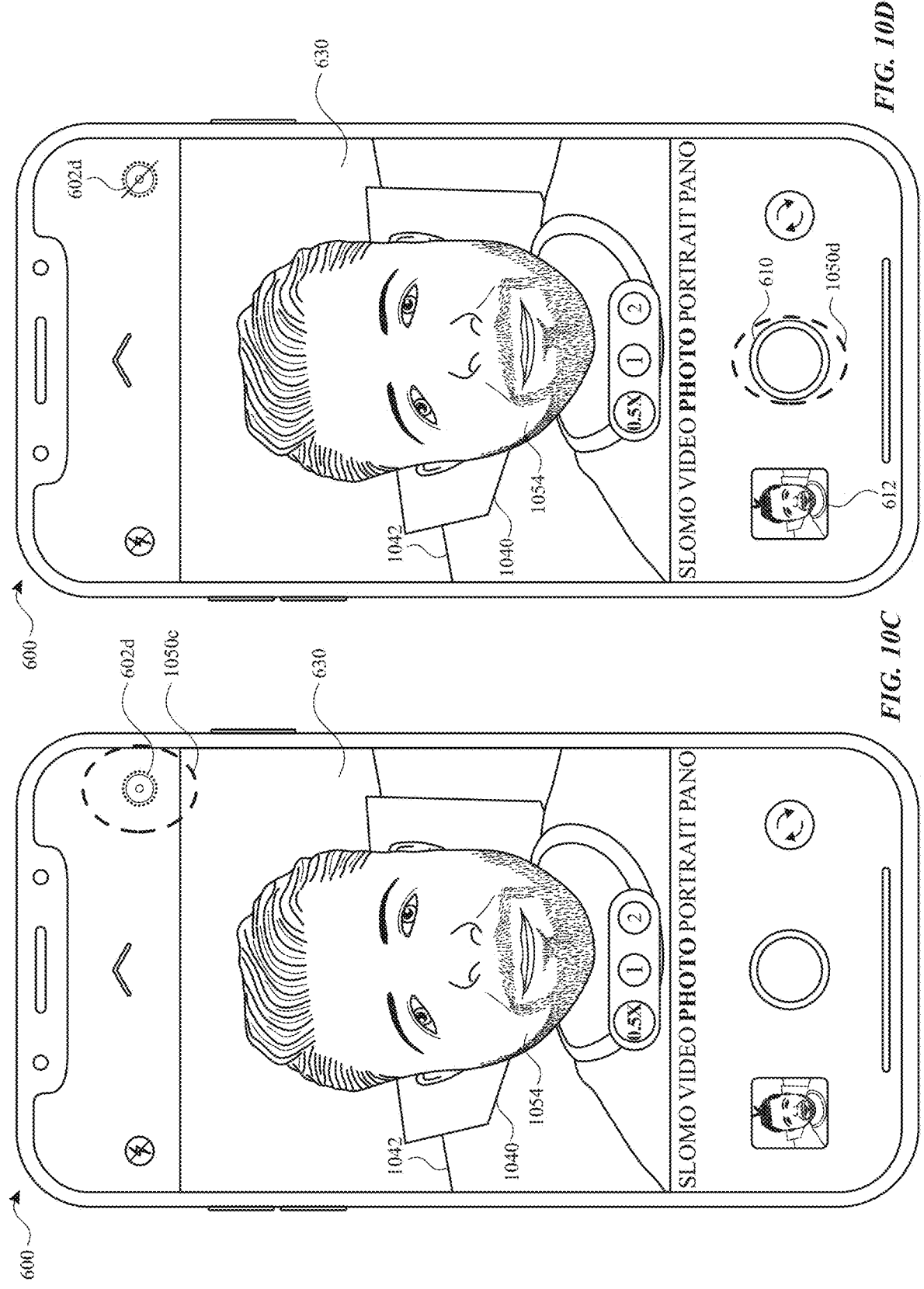

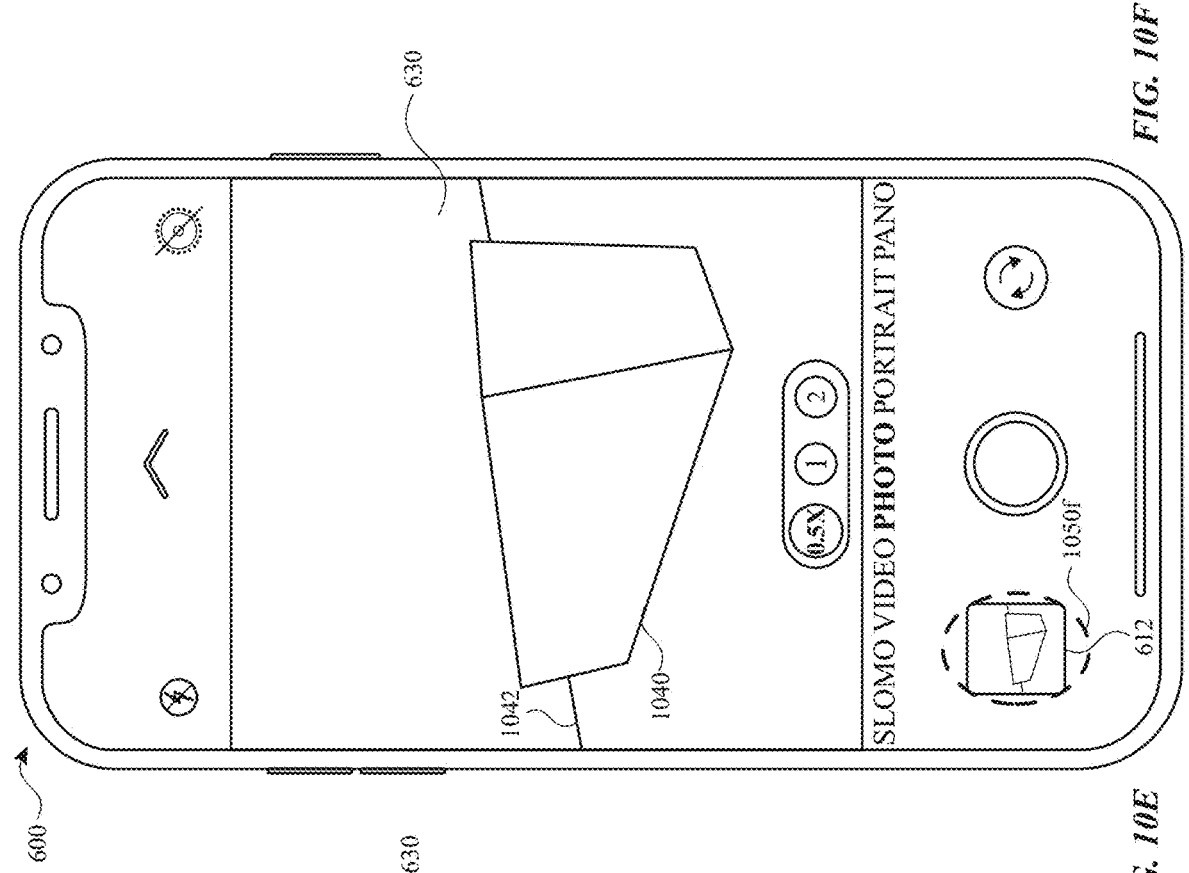
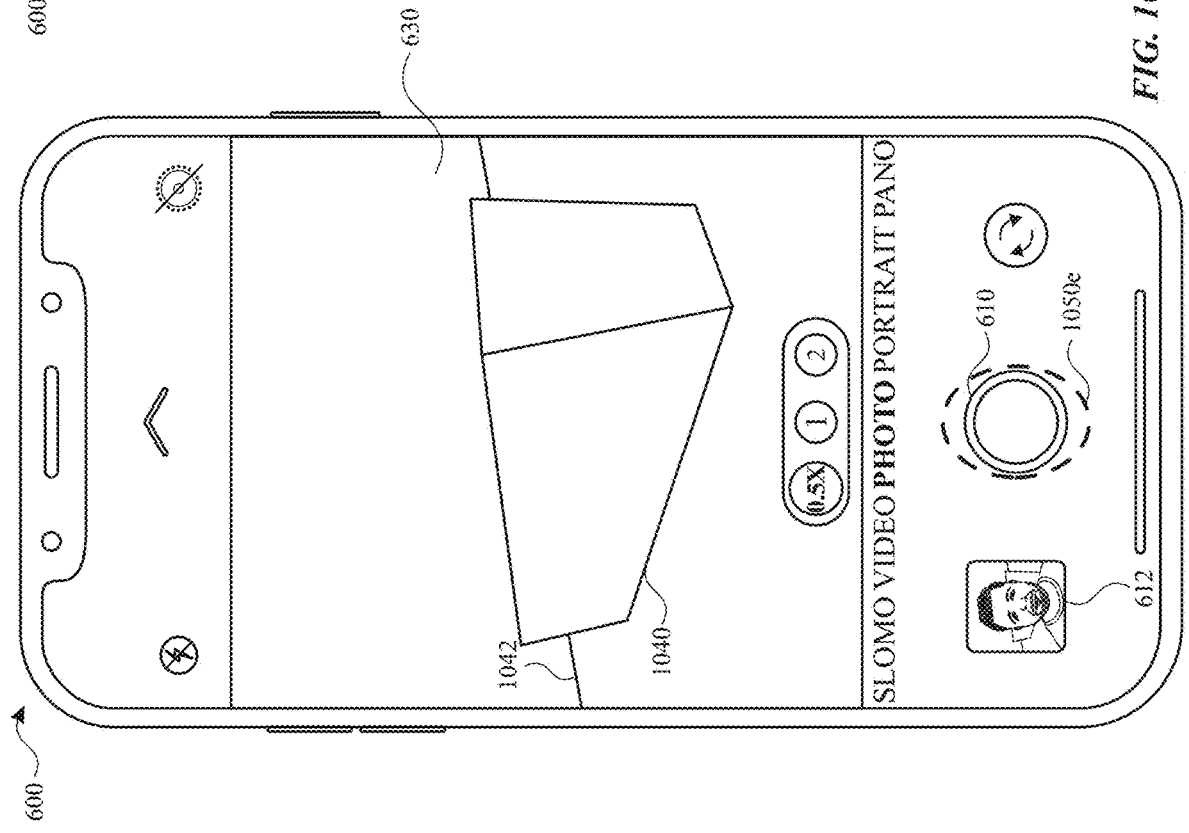

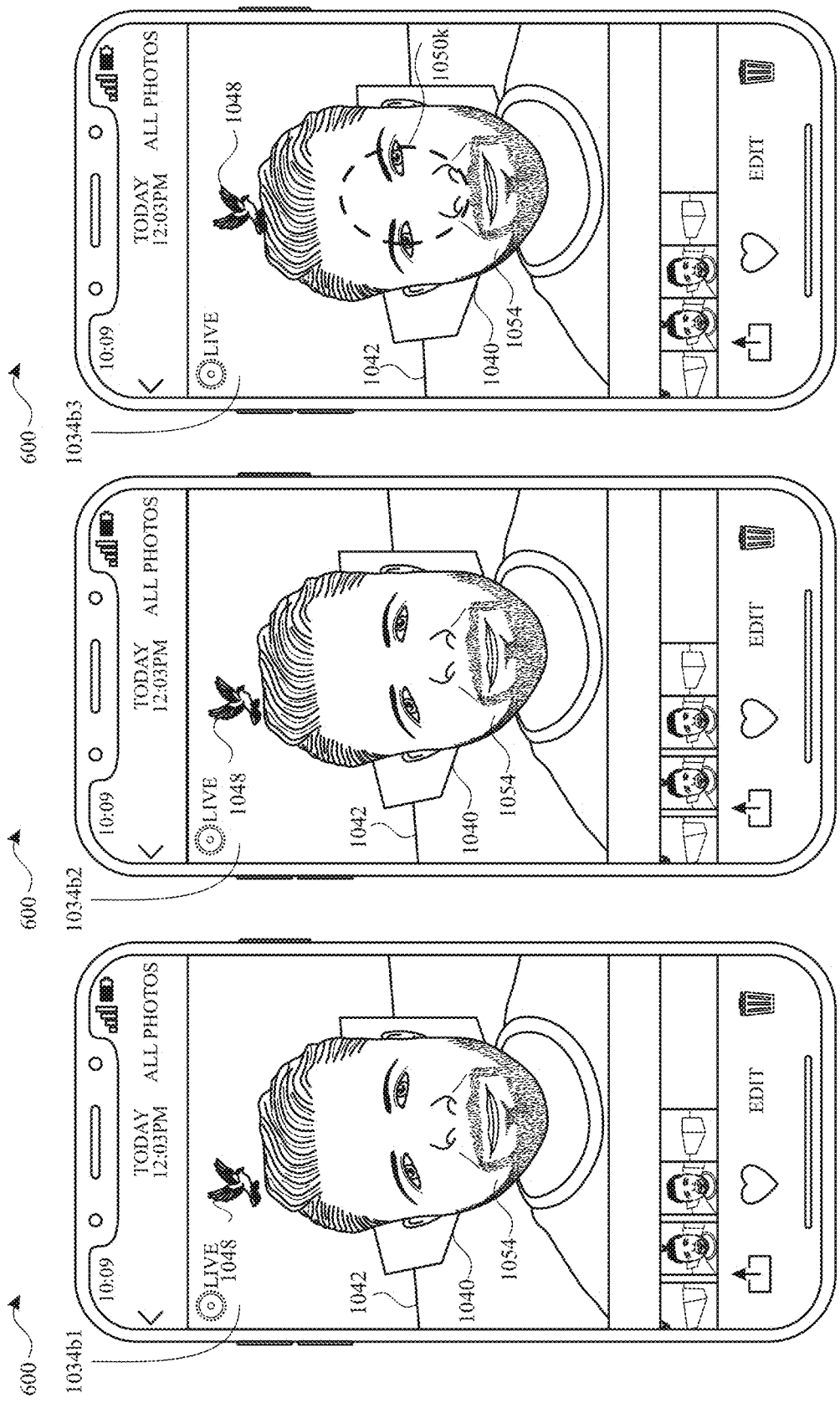

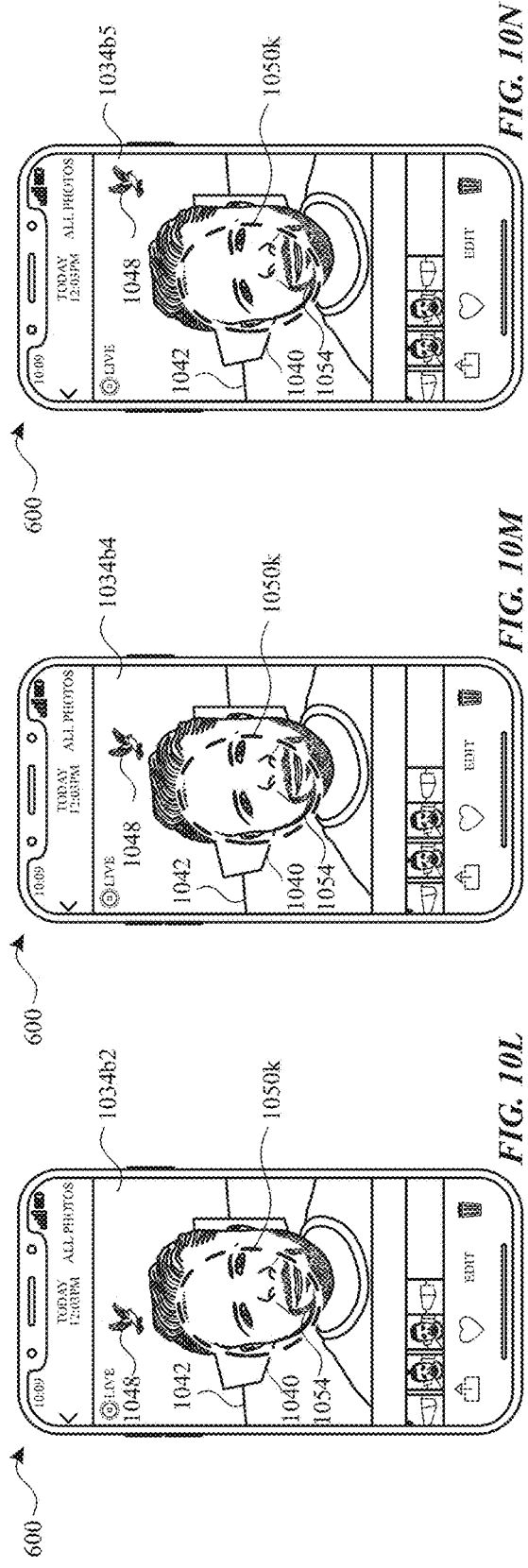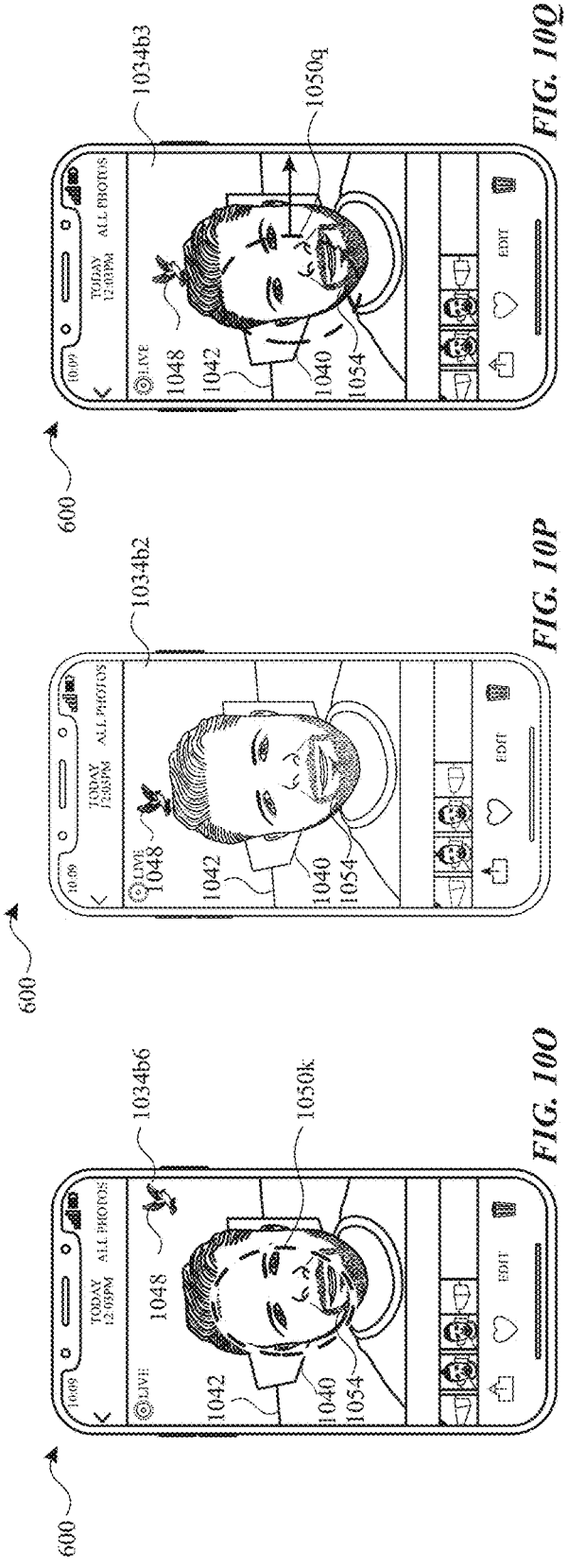

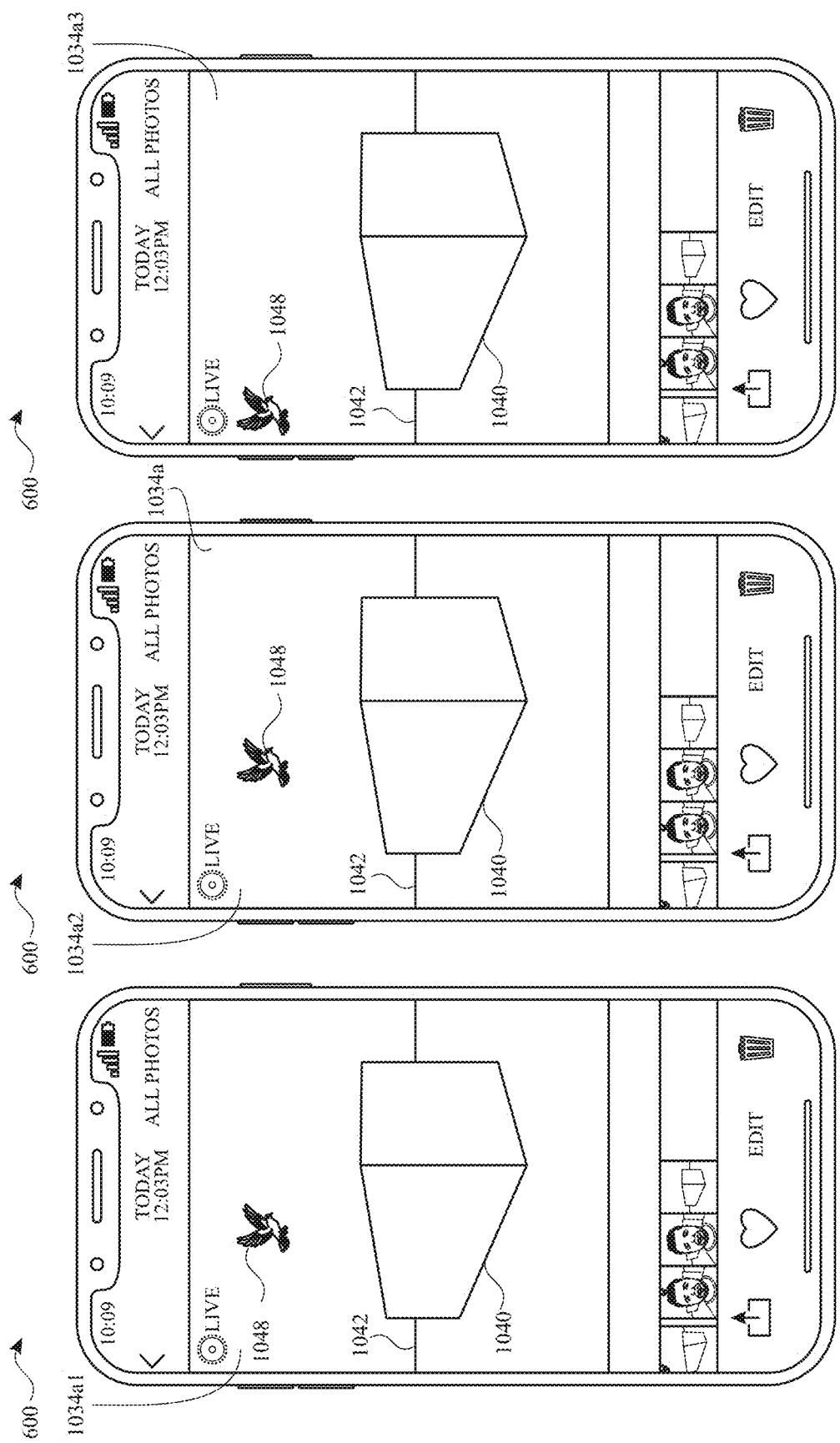

1330
After displaying the camera user interface, receive a request to display a representation of previously captured media.

1332
In response to receiving the request ot display the representation of the previously captured media item:

1334
In accordance with a determination that the media item was stored in the second file format, concurrently display a representation of the previously captured media item with a media format indicator.

1336
In accordance with a determination that the media item was not stored in the second file format, display the representation of the previously captured media item without displaying the media format indicator.

USER INTERFACES FOR MEDIA CAPTURE AND MANAGEMENT

CROSS-REFERENCE TO RELATED APPLICATIONS

This application claims priority to U.S. Provisional Patent Application Ser. No. 63/083,853, titled "USER INTERFACES FOR MEDIA CAPTURE AND MANAGEMENT," filed on Sep. 25, 2020 and to U.S. Provisional Patent Application Ser. No. 63/090,622, titled "USER INTERFACES FOR MEDIA CAPTURE AND MANAGEMENT," filed on Oct. 12, 2020, the contents of which are hereby incorporated by reference in their entireties.

FIELD

The present disclosure generally relates to computer user interfaces, and more specifically to techniques for managing media.

BACKGROUND

Users of smartphones and other personal electronic devices frequently capture, store, and edit media for safekeeping memories and sharing with friends. Some existing techniques allowed users to capture media, such as images, audio, and/or videos. Users can manage such media by, for example, capturing, storing, and editing the media.

BRIEF SUMMARY

Some techniques for managing media using electronic devices, however, are generally cumbersome and inefficient. For example, some existing techniques use a complex and time-consuming user interface, which may include multiple key presses, keystrokes, gestures or other inputs. Existing techniques require more time than necessary, wasting user time and device energy. This latter consideration is particularly important in battery-operated devices.

Accordingly, the present technique provides electronic devices with faster, more efficient methods and interfaces for managing media. Such methods and interfaces optionally complement or replace other methods for managing media. Such methods and interfaces reduce the cognitive burden on a user and produce a more efficient human-machine interface. For battery-operated computing devices, such methods and interfaces conserve power and increase the time between battery charges.

In some examples, the present technique enables users of computer systems to capture and display media in a time-efficient and input-efficient manner, thereby reducing the amount of processing the device needs to do. In some examples, the present technique manages the brightness of regions of the user interface, thereby saving battery life. In some examples, the present technique optimizes the correction media, thereby saving computer resources.

In accordance with some embodiments, a method is described. The method is performed at a computer system having one or more cameras, wherein the computer system is in communication with a display generation component and one or more input devices. The method comprises: displaying, via the display generation component, a media capture user interface that includes a representation of a field-of-view of a first camera of the one or more cameras, wherein the representation of the field-of-view of the first camera of the one or more cameras has a first brightness level; while displaying the media capture user interface that includes the representation of the first camera of the field-of-view of the one or more cameras at the first brightness level, receiving, via the one or more input devices, a request to capture media; and in response to receiving the request to capture media: initiating capture, via the one or more cameras, of media over a capture duration; and in accordance with a determination that a first set of criteria is satisfied, displaying, via the display generation component, an animation that includes a sequence of images, the sequence of images including a first image and a second image that is different from the first image, wherein the first image has a second brightness level that is greater than the first brightness level, and wherein the first and second images are displayed before capture of the media has ended.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a media capture user interface that includes a representation of a field-of-view of a first camera of the one or more cameras, wherein the representation of the field-of-view of the first camera of the one or more cameras has a first brightness level; while displaying the media capture user interface that includes the representation of the first camera of the field-of-view of the one or more cameras at the first brightness level, receiving, via the one or more input devices, a request to capture media; and in response to receiving the request to capture media: initiating capture, via the one or more cameras, of media over a capture duration; and in accordance with a determination that a first set of criteria is satisfied, displaying, via the display generation component, an animation that includes a sequence of images, the sequence of images including a first image and a second image that is different from the first image, wherein the first image has a second brightness level that is greater than the first brightness level, and wherein the first and second images are displayed before capture of the media has ended.

In accordance with some embodiments, a transitory computer-readable storage medium is described. The transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a media capture user interface that includes a representation of a field-of-view of a first camera of the one or more cameras, wherein the representation of the field-of-view of the first camera of the one or more cameras has a first brightness level, while displaying the media capture user interface that includes the representation of the first camera of the field-of-view of the one or more cameras at the first brightness level, receiving, via the one or more input devices, a request to capture media; and in response to receiving the request to capture media: initiating capture, via the one or more cameras, of media over a capture duration; and in accordance with a determination that a first set of criteria is satisfied, displaying, via the display generation component, an animation that includes a sequence of images, the sequence of images including a first image and a second image that is different from the first image, wherein the first image has a second brightness level that is greater than the first brightness level, and wherein the first and second images are displayed before capture of the media has ended.

In accordance with some embodiments, a computer system is described. The computer system comprises: one or more processors, wherein the computer system is in communication with a display generation component and one or more input devices; one or more cameras; and memory storing one or more programs configured to be executed by the one or more processors, the one or more programs including instructions for: displaying, via the display generation component, a media capture user interface that includes a representation of a field-of-view of a first camera of the one or more cameras, wherein the representation of the field-of-view of the first camera of the one or more cameras has a first brightness level; while displaying the media capture user interface that includes the representation of the first camera of the field-of-view of the one or more cameras at the first brightness level, receiving, via the one or more input devices a request to capture media; and in response to receiving the request to capture media: initiating capture, via the one or more cameras, of media over a capture duration; and in accordance with a determination that a first set of criteria is satisfied, displaying, via the display generation component, an animation that includes a sequence of images, the sequence of images including a first image and a second image that is different from the first image, wherein the first image has a second brightness level that is greater than the first brightness level, and wherein the first and second images are displayed before capture of the media has ended.

In accordance with some embodiments, a computer system is described. The computer system comprises: one or more cameras; one or more processors, wherein the computer system is in communication with a display generation component and one or more input devices; memory storing one or more programs configured to be executed by the one or more processors; means for displaying, via a display generation component, a media capture user interface that includes a representation of a field-of-view of a first camera of the one or more cameras, wherein the representation of the field-of-view of the first camera of the one or more cameras has a first brightness level; means, while displaying the media capture user interface that includes the representation of the first camera of the field-of-view of the one or more cameras at the first brightness level, for receiving, via the one or more input devices, a request to capture media; and means, responsive to receiving the request to capture media, for: initiating capture, via the one or more cameras, of media over a capture duration; and in accordance with a determination that a first set of criteria is satisfied, displaying, via the display generation component, an animation that includes a sequence of images, the sequence of images including a first image and a second image that is different from the first image, wherein the first image has a second brightness level that is greater than the first brightness level, and wherein the first and second images are displayed before capture of the media has ended.

In accordance with some embodiments, a method is described. The method is performed at a computer system having one or more cameras, wherein the computer system is in communication with a display generation component and one or more input devices. The method comprises: detecting, via the one or more input devices, a request to display a camera user interface; and in response to the request to display the camera user interface, displaying, via the display generation component, the camera user interface, where displaying the camera user interface includes concurrently displaying: a camera preview that includes a representation of a field of one or more objects in a field-of-view of a first camera of the one or more cameras; and a respective set of one or more user interface objects for controlling the camera and/or displaying status information about the camera or media captured by the camera, wherein concurrently displaying the camera preview and the respective set of one or more user interface objects includes: in accordance with a determination that the camera is in a first capture mode, displaying the camera preview based on the first capture mode and displaying the respective set of one or more user interface objects with a first value for a respective visual characteristic; and in accordance with a determination that the camera is in a second capture mode, displaying the camera based on the second capture mode and displaying the respective set of the one or more user interface objects with a second value for the respective visual characteristic that is different from the first value for the respective visual characteristic.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: detecting, via the one or more input devices, a request to display a camera user interface; and in response to the request to display the camera user interface, displaying, via the display generation component, the camera user interface, where displaying the camera user interface includes concurrently displaying: a camera preview that includes a representation of a field of one or more objects in a field-of-view of a first camera of the one or more cameras; and a respective set of one or more user interface objects for controlling the camera and/or displaying status information about the camera or media captured by the camera, wherein concurrently displaying the camera preview and the respective set of one or more user interface objects includes: in accordance with a determination that the camera is in a first capture mode, displaying the camera preview based on the first capture mode and displaying the respective set of one or more user interface objects with a first value for a respective visual characteristic; and in accordance with a determination that the camera is in a second capture mode, displaying the camera based on the second capture mode and displaying the respective set of the one or more user interface objects with a second value for the respective visual characteristic that is different from the first value for the respective visual characteristic.

In accordance with some embodiments, a transitory computer-readable storage medium is described. The transitory computer-readable storage medium stores one or more programs configured to be executed by one or more processors of a computer system having one or more cameras, wherein the computer system is in communication with a display generation component and one or more input devices, the one or more programs including instructions for: detecting, via the one or more input devices, a request to display a camera user interface; and in response to the request to display the camera user interface, displaying, via the display generation component, the camera user interface, where displaying the camera user interface includes concurrently displaying: a camera preview that includes a representation of a field of one or more objects in a field-of-view of a first camera of the one or more cameras; and a respective set of one or more user interface objects for controlling the camera and/or displaying status information about the camera or media captured by the camera, wherein concurrently displaying the camera preview and the respective set of one or more user interface objects includes: in accordance with a determination that the camera is in a first capture mode, displaying the camera preview based on the first capture mode and displaying the respective set of one or more user interface objects with a first value for a respective visual characteristic; and in accordance with a determination that the camera is in a second capture mode, displaying the camera based on the second capture mode and displaying the respective set of the one or more user interface objects with a second value for the respective visual characteristic that is different from the first value for the respective visual characteristic.

In accordance with some embodiments, a computer system is described. The computer system comprises: one or more cameras; one or more processors, wherein the computer system is in communication with a display generation component and one or more input devices; and memory storing one or more programs configured to be executed by the one or more processors, the one or more programs including instructions for: detecting, via the one or more input devices, a request to display a camera user interface: and in response to the request to display the camera user interface, displaying, via the display generation component, the camera user interface, where displaying the camera user interface includes concurrently displaying: a camera preview that includes a representation of a field of one or more objects in a field-of-view of a first camera of the one or more cameras; and a respective set of one or more user interface objects for controlling the camera and/or displaying status information about the camera or media captured by the camera, wherein concurrently displaying the camera preview and the respective set of one or more user interface objects includes: in accordance with a determination that the camera is in a first capture mode, displaying the camera preview based on the first capture mode and displaying the respective set of one or more user interface objects with a first value for a respective visual characteristic; and in accordance with a determination that the camera is in a second capture mode, displaying the camera based on the second capture mode and displaying the respective set of the one or more user interface objects with a second value for the respective visual characteristic that is different from the first value for the respective visual characteristic.

In accordance with some embodiments, a computer system is described. The computer system comprises: one or more cameras; one or more processors, wherein the computer system is in communication with a display generation component and one or more input devices; memory storing one or more programs configured to be executed by the one or more processors; means for detecting, via the one or more input devices, a request to display a camera user interface; means, responsive to the request to display the camera user interface, for displaying, via the display generation component, the camera user interface, where displaying the camera user interface includes concurrently displaying: and a camera preview that includes a representation of a field of one or more objects in a field-of-view of a first camera of the one or more cameras; and a respective set of one or more user interface objects for controlling the camera and/or displaying status information about the camera or media captured by the camera, wherein concurrently displaying the camera preview and the respective set of one or more user interface objects includes: in accordance with a determination that the camera is in a first capture mode, for displaying the camera preview based on the first capture mode and displaying the respective set of one or more user interface objects with a first value for a respective visual characteristic; in accordance with a determination that the camera is in a second capture mode, for displaying the camera based on the second capture mode and displaying the respective set of the one or more user interface objects with a second value for the respective visual characteristic that is different from the first value for the respective visual characteristic.

In accordance with some embodiments, a method is described. The method is performed at a computer system having one or more cameras, wherein the computer system is in communication with a display generation component and one or more input devices. The method comprises: receiving a request, via the one or more input devices, to display a representation of a previously captured media item; and in response to receiving the request to display the representation of the previously captured media item, displaying, via the display generation component, the representation of the previously captured media item with distortion correction that was automatically selected based on an automatic determination of content in the previously captured media item, wherein displaying the representation of the previously captured media item, includes: in accordance with a determination that the previously captured media item includes, in the first portion of the previously captured media item, a representation of a face, displaying the representation of the previously captured media item with the representation of the face in which a first distortion correction has been automatically applied to at least the first portion of the previously captured media item; and in accordance with a determination that the previously captured media item does not include the representation of the face, displaying the representation of the previously captured media item in which the first distortion correction is not applied to the first portion of the previously captured media item.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: receiving a request, via the one or more input devices, to display a representation of a previously captured media item; and in response to receiving the request to display the representation of the previously captured media item, displaying, via the display generation component, the representation of the previously captured media item with distortion correction that was automatically selected based on an automatic determination of content in the previously captured media item, wherein displaying the representation of the previously captured media item, includes: in accordance with a determination that the previously captured media item includes, in the first portion of the previously captured media item, a representation of a face, displaying the representation of the previously captured media item with the representation of the face in which a first distortion correction has been automatically applied to at least the first portion of the previously captured media item; and in accordance with a determination that the previously captured media item does not include the representation of the face, displaying the representation of the previously captured media item in which the first distortion correction is not applied to the first portion of the previously captured media item.

In accordance with some embodiments, a transitory computer-readable storage medium is described. The transitory computer-readable storage medium stores one or more programs configured to be executed by one or more processors of a computer system having one or more cameras, wherein the computer system is in communication with a display generation component and one or more input devices, the one or more programs including instructions for: receiving a request, via the one or more input devices, to display a representation of a previously captured media item; and in response to receiving the request to display the representation of the previously captured media item, displaying, via the display generation component, the representation of the previously captured media item with distortion correction that was automatically selected based on an automatic determination of content in the previously captured media item, wherein displaying the representation of the previously captured media item, includes: in accordance with a determination that the previously captured media item includes, in the first portion of the previously captured media item, a representation of a face, displaying the representation of the previously captured media item with the representation of the face in which a first distortion correction has been automatically applied to at least the first portion of the previously captured media item; and in accordance with a determination that the previously captured media item does not include the representation of the face, displaying the representation of the previously captured media item in which the first distortion correction is not applied to the first portion of the previously captured media item.

In accordance with some embodiments, a computer system is described. The computer system comprises: one or more processors, wherein the computer system is in communication with a display generation component and one or more input devices; one or more cameras; and memory storing one or more programs configured to be executed by the one or more processors, the one or more programs including instructions for: receiving a request, via the one or more input devices, to display a representation of a previously captured media item; and in response to receiving the request to display the representation of the previously captured media item, displaying, via the display generation component, the representation of the previously captured media item with distortion correction that was automatically selected based on an automatic determination of content in the previously captured media item, wherein displaying the representation of the previously captured media item, includes: in accordance with a determination that the previously captured media item includes, in the first portion of the previously captured media item, a representation of a face, displaying the representation of the previously captured media item with the representation of the face in which a first distortion correction has been automatically applied to at least the first portion of the previously captured media item, and in accordance with a determination that the previously captured media item does not include the representation of the face, displaying the representation of the previously captured media item in which the first distortion correction is not applied to the first portion of the previously captured media item.

In accordance with some embodiments, a computer system is described. The computer system comprises: one or more cameras; one or more processors, wherein the computer system is in communication with a display generation component and one or more input devices; memory storing one or more programs configured to be executed by the one or more processors; means for, receiving a request, via the one or more input devices, to display a representation of a previously captured media item; and means, responsive to receiving the request to display the representation of the previously captured media item, for displaying, via the display generation component, the representation of the previously captured media item with distortion correction that was automatically selected based on an automatic determination of content in the previously captured media item, wherein displaying the representation of the previously captured media item, includes: in accordance with a determination that the previously captured media item includes, in the first portion of the previously captured media item, a representation of a face, displaying the representation of the previously captured media item with the representation of the face in which a first distortion correction has been automatically applied to at least the first portion of the previously captured media item; and in accordance with a determination that the previously captured media item does not include the representation of the face, displaying the representation of the previously captured media item in which the first distortion correction is not applied to the first portion of the previously captured media item.

In accordance with some embodiments, a method is described. The method is performed at a computer system having one or more cameras, wherein the computer system is in communication with a display generation component and one or more input devices. The method comprises: displaying, via the display generation component, a camera user interface, wherein displaying the camera user interface includes concurrently displaying: a camera preview that includes a representation of one or more objects in a field-of-view of a first camera of the one or more cameras; and a first selectable user interface object for controlling a file format for storing media with the one or more cameras, wherein the first selectable user interface object is in a first state that corresponds to a first file format; while displaying the camera user interface and while the first selectable user interface object is in the first state, detecting a first input that corresponds to activation of the first selectable user interface object; in response to detecting the first input that corresponds to activation of the first selectable user interface object, transitioning the first selectable user interface object from the first state to a second state that is different from the first state, wherein the second state corresponds to a second file format that is different from the first file format; after transitioning the first selectable user interface object from the first state to the second state: displaying the first selectable user interface object includes: in accordance with a determination that a set of reversion criteria are met, wherein the set of reversion criteria includes a criterion that is met when a predetermined period of time has elapsed, re-displaying the first selectable user interface object in the first state; and in accordance with a determination that the set of reversion criteria are not met, displaying the first selectable user interface object in the second state; receiving, via the one or more input devices, a second input corresponding to a request to capture media with the one or more cameras; and in response to receiving the second input corresponding to the request to capture media with the one or more cameras: in accordance with a determination that the first selectable user interface object was in the first state when the second input was received, capturing first media and storing the first media in the first file format; and in accordance with a determination that the first selectable user interface object was in the second state when the second input was received, capturing second media and storing the second media in the second file format that is different from the first file format.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a camera user interface, wherein displaying the camera user interface includes concurrently displaying: a camera preview that includes a representation of one or more objects in a field-of-view of a first camera of the one or more cameras; and a first selectable user interface object for controlling a file format for storing media with the one or more cameras, wherein the first selectable user interface object is in a first state that corresponds to a first file format; while displaying the camera user interface and while the first selectable user interface object is in the first state, detecting a first input that corresponds to activation of the first selectable user interface object; in response to detecting the first input that corresponds to activation of the first selectable user interface object, transitioning the first selectable user interface object from the first state to a second state that is different from the first state, wherein the second state corresponds to a second file format that is different from the first file format; after transitioning the first selectable user interface object from the first state to the second state: displaying the first selectable user interface object includes: in accordance with a determination that a set of reversion criteria are met, wherein the set of reversion criteria includes a criterion that is met when a predetermined period of time has elapsed, re-displaying the first selectable user interface object in the first state; and in accordance with a determination that the set of reversion criteria are not met, displaying the first selectable user interface object in the second state; receiving, via the one or more input devices, a second input corresponding to a request to capture media with the one or more cameras; and in response to receiving the second input corresponding to the request to capture media with the one or more cameras: in accordance with a determination that the first selectable user interface object was in the first state when the second input was received, capturing first media and storing the first media in the first file format; and in accordance with a determination that the first selectable user interface object was in the second state when the second input was received, capturing second media and storing the second media in the second file format that is different from the first file format.

In accordance with some embodiments, transitory computer-readable storage medium is described. The transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a camera user interface, wherein displaying the camera user interface includes concurrently displaying: a camera preview that includes a representation of one or more objects in a field-of-view of a first camera of the one or more cameras; and a first selectable user interface object for controlling a file format for storing media with the one or more cameras, wherein the first selectable user interface object is in a first state that corresponds to a first file format; while displaying the camera user interface and while the first selectable user interface object is in the first state, detecting a first input that corresponds to activation of the first selectable user interface object; in response to detecting the first input that corresponds to activation of the first selectable user interface object, transitioning the first selectable user interface object from the first state to a second state that is different from the first state, wherein the second state corresponds to a second file format that is different from the first file format; after transitioning the first selectable user interface object from the first state to the second state: displaying the first selectable user interface object includes: in accordance with a determination that a set of reversion criteria are met, wherein the set of reversion criteria includes a criterion that is met when a predetermined period of time has elapsed, re-displaying the first selectable user interface object in the first state; and in accordance with a determination that the set of reversion criteria are not met, displaying the first selectable user interface object in the second state; receiving, via the one or more input devices, a second input corresponding to a request to capture media with the one or more cameras; and in response to receiving the second input corresponding to the request to capture media with the one or more cameras: in accordance with a determination that the first selectable user interface object was in the first state when the second input was received, capturing first media and storing the first media in the first file format; and in accordance with a determination that the first selectable user interface object was in the second state when the second input was received, capturing second media and storing the second media in the second file format that is different from the first file format.

In accordance with some embodiments, a computer system is described. The computer system comprises: one or more processors, wherein the computer system is in communication with a display generation component and one or more input devices; one or more cameras; and memory storing one or more programs configured to be executed by the one or more processors, the one or more programs including instructions for: displaying, via the display generation component, a camera user interface, wherein displaying the camera user interface includes concurrently displaying: a camera preview that includes a representation of one or more objects in a field-of-view of a first camera of the one or more cameras; and a first selectable user interface object for controlling a file format for storing media with the one or more cameras, wherein the first selectable user interface object is in a first state that corresponds to a first file format; while displaying the camera user interface and while the first selectable user interface object is in the first state, detecting a first input that corresponds to activation of the first selectable user interface object; in response to detecting the first input that corresponds to activation of the first selectable user interface object, transitioning the first selectable user interface object from the first state to a second state that is different from the first state, wherein the second state corresponds to a second file format that is different from the first file format; after transitioning the first selectable user interface object from the first state to the second state: displaying the first selectable user interface object includes: in accordance with a determination that a set of reversion criteria are met, wherein the set of reversion criteria includes a criterion that is met when a predetermined period of time has elapsed, re-displaying the first selectable user interface object in the first state; and in accordance with a determination that the set of reversion criteria are not met, displaying the first selectable user interface object in the second state; receiving, via the one or more input devices, a second input corresponding to a request to capture media with the one or more cameras; and in response to receiving the second input corresponding to the request to capture media with the one or more cameras: in accordance with a determination that the first selectable user interface object was in the first state when the second input was received, capturing first media and storing the first media in the first file format; and in accordance with a determination that the first selectable user interface object was in the second state when the second input was received, capturing second media and storing the second media in the second file format that is different from the first file format.

In accordance with some embodiments, a computer system is described. The computer system comprises: one or more cameras; one or more processors, wherein the computer system is in communication with a display generation component and one or more input devices; memory storing one or more programs configured to be executed by the one or more processors; means for displaying, via the display generation component, a camera user interface, wherein displaying the camera user interface includes concurrently displaying: a camera preview that includes a representation of one or more objects in a field-of-view of a first camera of the one or more cameras; and a first selectable user interface object for controlling a file format for storing media with the one or more cameras, wherein the first selectable user interface object is in a first state that corresponds to a first file format; means, while displaying the camera user interface and while the first selectable user interface object is in the first state, for detecting a first input that corresponds to activation of the first selectable user interface object; means, responsive to detecting the first input that corresponds to activation of the first selectable user interface object, for transitioning the first selectable user interface object from the first state to a second state that is different from the first state, wherein the second state corresponds to a second file format that is different from the first file format; means, after transitioning the first selectable user interface object from the first state to the second state, for: displaying the first selectable user interface object includes: in accordance with a determination that a set of reversion criteria are met, wherein the set of reversion criteria includes a criterion that is met when a predetermined period of time has elapsed, re-displaying the first selectable user interface object in the first state; and in accordance with a determination that the set of reversion criteria are not met, displaying the first selectable user interface object in the second state; means for receiving, via the one or more input devices, a second input corresponding to a request to capture media with the one or more cameras; and means, responsive to receiving the second input corresponding to the request to capture media with the one or more cameras, for: in accordance with a determination that the first selectable user interface object was in the first state when the second input was received, capturing first media and storing the first media in the first file format; and in accordance with a determination that the first selectable user interface object was in the second state when the second input was received, capturing second media and storing the second media in the second file format that is different from the first file format.

In accordance with some embodiments, a method is described. The method is performed at a computer system having one or more cameras, wherein the computer system is in communication with a display generation component and one or more input devices. The method comprises: displaying, via the display generation component, a camera user interface; while displaying the camera user interface, detecting a request to capture media with the one or more cameras; and in response to detecting the request to capture media with the one or more cameras: in accordance with a determination that the computer system is configured to store media in a first file format, storing a sequence of images in the first file format, wherein the sequence of images can be played back in temporal order in response to a user input detected after the sequence of images has been captured; and in accordance with a determination that the computer system is configured to store media in a second file format, storing a single image in the second file format, wherein the second file format is a reduced compression file format relative to the first file format.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a camera user interface; while displaying the camera user interface, detecting a request to capture media with the one or more cameras; and in response to detecting the request to capture media with the one or more cameras: in accordance with a determination that the computer system is configured to store media in a first file format, storing a sequence of images in the first file format, wherein the sequence of images can be played back in temporal order in response to a user input detected after the sequence of images has been captured; and in accordance with a determination that the computer system is configured to store media in a second file format, storing a single image in the second file format, wherein the second file format is a reduced compression file format relative to the first file format.

In accordance with some embodiments, a transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: displaying, via the display generation component, a camera user interface; while displaying the camera user interface, detecting a request to capture media with the one or more cameras; and in response to detecting the request to capture media with the one or more cameras: in accordance with a determination that the computer system is configured to store media in a first file format, storing a sequence of images in the first file format, wherein the sequence of images can be played back in temporal order in response to a user input detected after the sequence of images has been captured; and in accordance with a determination that the computer system is configured to store media in a second file format, storing a single image in the second file format, wherein the second file format is a reduced compression file format relative to the first file format.

In accordance with some embodiments, a computer system is described. The computer system comprises: one or more processors, wherein the computer system is in communication with a display generation component and one or more input devices; one or more cameras; and memory storing one or more programs configured to be executed by the one or more processors, the one or more programs including instructions for: displaying, via the display generation component, a camera user interface; while displaying the camera user interface, detecting a request to capture media with the one or more cameras; and in response to detecting the request to capture media with the one or more cameras: in accordance with a determination that the computer system is configured to store media in a first file format, storing a sequence of images in the first file format, wherein the sequence of images can be played back in temporal order in response to a user input detected after the sequence of images has been captured; and in accordance with a determination that the computer system is configured to store media in a second file format, storing a single image in the second file format, wherein the second file format is a reduced compression file format relative to the first file format.

In accordance with some embodiments, a computer system is described. The computer system comprises: one or more cameras; one or more processors, wherein the computer system is in communication with a display generation component and one or more input devices; memory storing one or more programs configured to be executed by the one or more processors; means for displaying, via the display generation component, a camera user interface; means, while displaying the camera user interface, for detecting a request to capture media with the one or more cameras; and means, responsive to detecting the request to capture media with the one or more cameras, for: in accordance with a determination that the computer system is configured to store media in a first file format, storing a sequence of images in the first file format, wherein the sequence of images can be played back in temporal order in response to a user input detected after the sequence of images has been captured; and in accordance with a determination that the computer system is configured to store media in a second file format, storing a single image in the second file format, wherein the second file format is a reduced compression file format relative to the first file format.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing media, thereby increasing the effectiveness, efficiency, and user satisfaction with such devices. Such methods and interfaces may complement or replace other methods for managing media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8E illustrate exemplary user interfaces for displaying camera controls and indicators using an electronic device in accordance with some embodiments.

FIGS. 13A-13C are a flow diagram illustrating exemplary methods for storing media using an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media, such as the methods described herein to capture media, display camera controls and indicators, and adjusting media. Such techniques can reduce the cognitive burden on a user who manages media, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for capturing media.

Figure 6A:
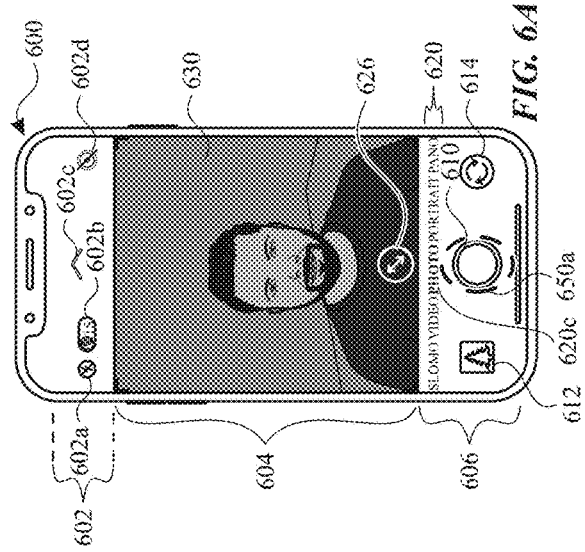
FIGS. 6A-6U illustrate exemplary user interfaces for capturing media using an electronic device in accordance with some embodiments.
Figure 6B:
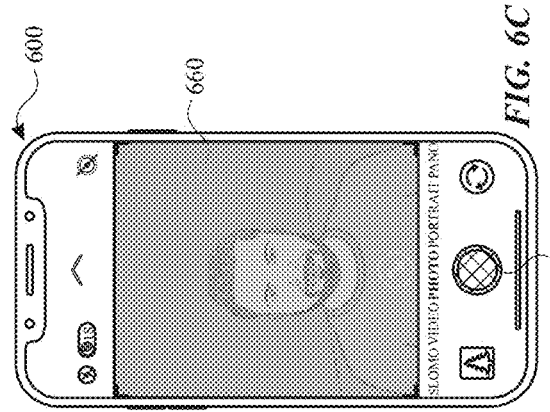
Figure 6C:
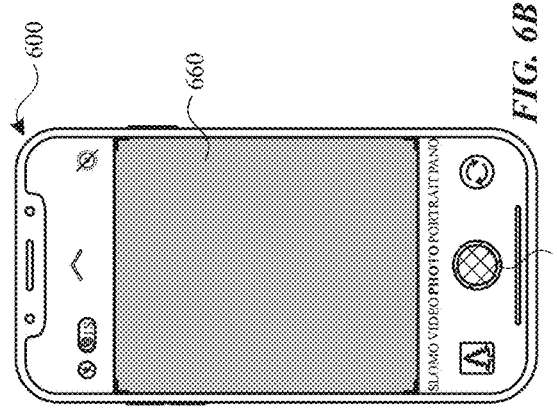
Figure 6D:
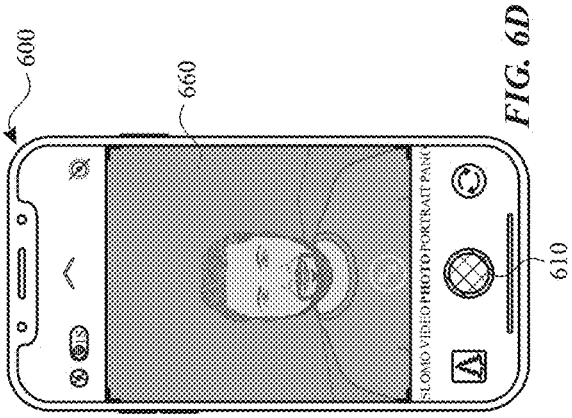
Figure 6E:
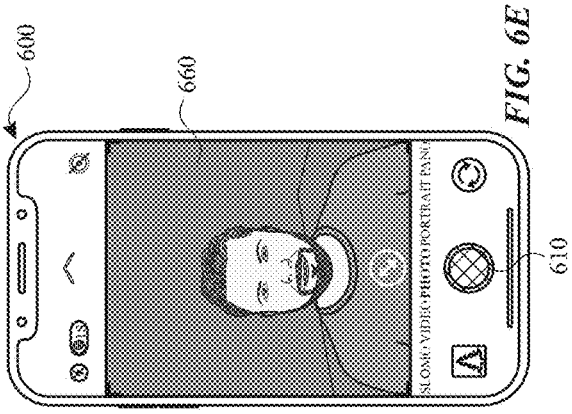
Figure 6F:
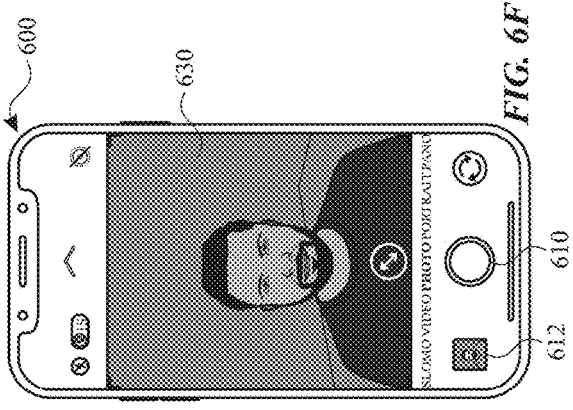
Figure 6G:
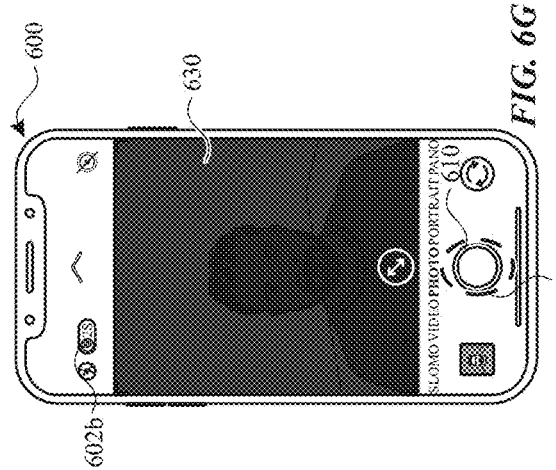
Figure 6H:
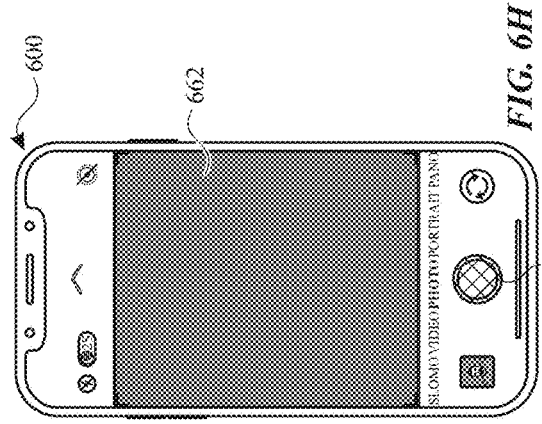
Figure 6I:
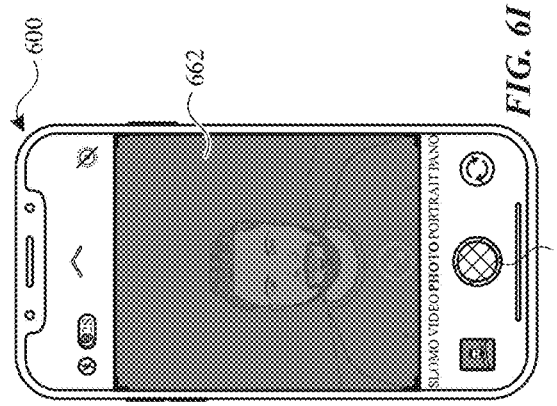
Figure 6J:
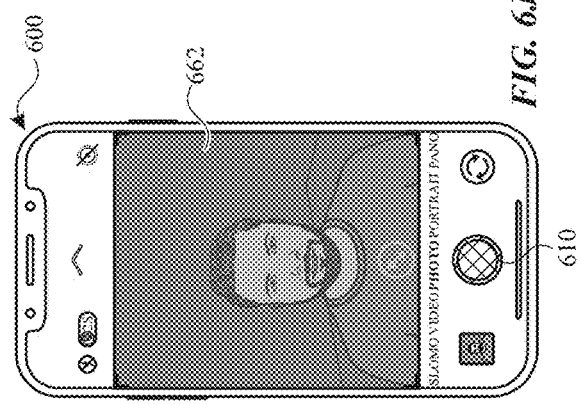
Figure 6K:
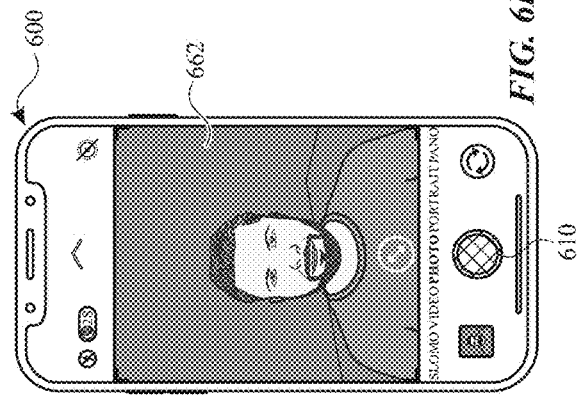
Figure 6L:
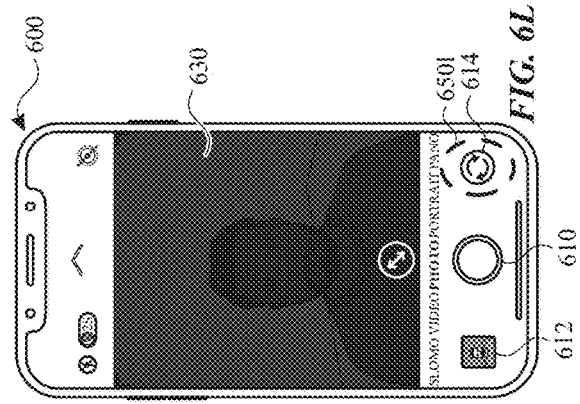
Figure 6U:
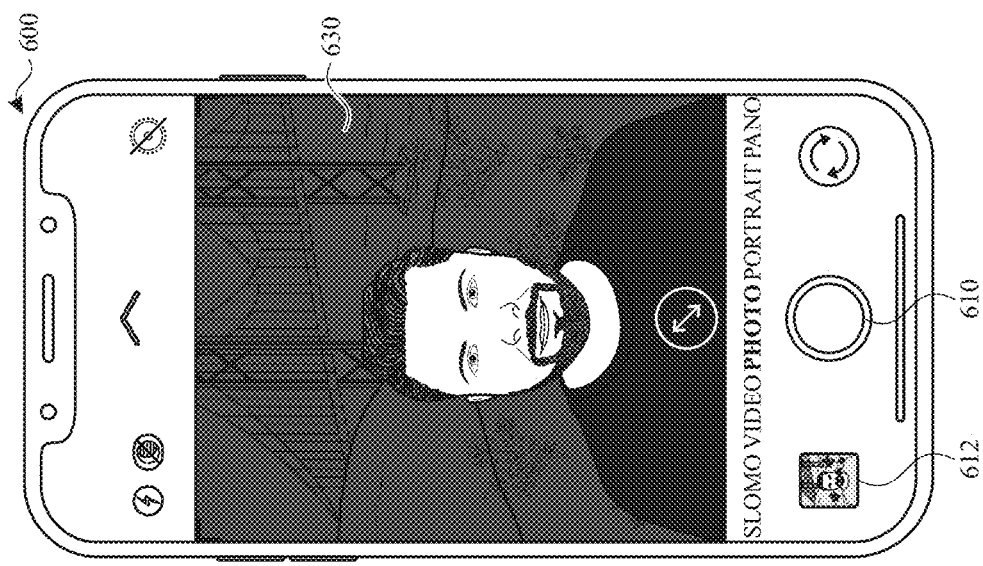
Figure 7:
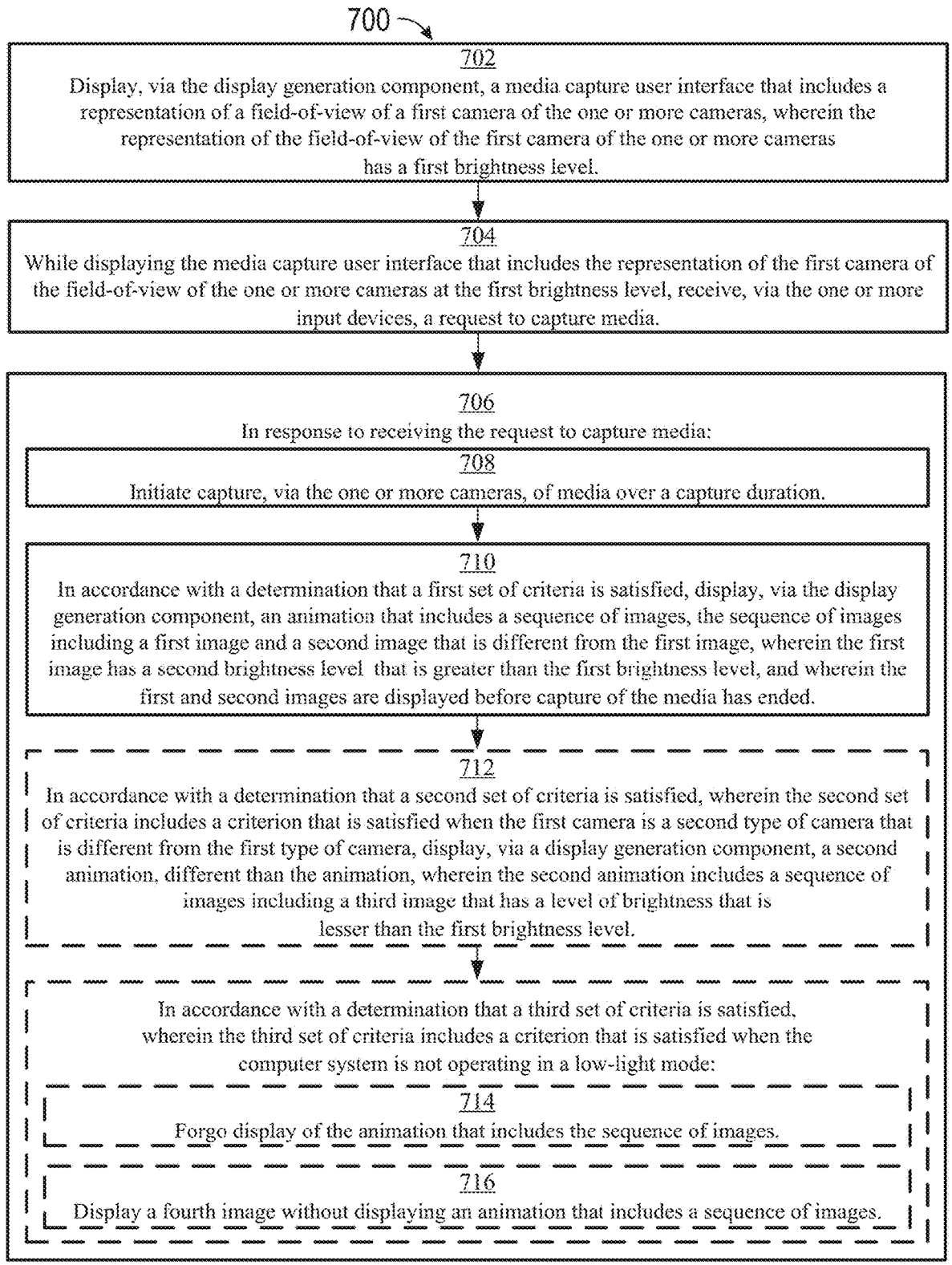
FIG. 7 is a flow diagram illustrating exemplary methods for capturing media using an electronic device in accordance with some embodiments.

FIGS. 6A-6U illustrate exemplary user interfaces for capturing media using an electronic device in accordance with some embodiments. FIG. 7 is a flow diagram illustrating exemplary methods for capturing media using an electronic device in accordance with some embodiments. The user interfaces of FIGS. 6A-6U are used to illustrate the processes described below, including the processes described in relation to FIG. 7.

FIGS. 8A-8E illustrate exemplary user interfaces for displaying camera controls and indicators using an electronic device in accordance with some embodiments. FIG. 9 is a flow diagram illustrating exemplary methods for displaying camera controls and indicators using an electronic device in accordance with some embodiments. The user interfaces of FIGS. 8A-8E are used to illustrate the processes described below, including the processes described in relation to FIG. 9.

FIGS. 10A-10T illustrate exemplary user interfaces for adjusting media using an electronic device in accordance with some embodiments. FIG. 11 is a flow diagram illustrating exemplary methods for adjusting media using an electronic device in accordance with some embodiments. The user interfaces of FIGS. 10A-10T are used to illustrate the processes described below, including the processes described in relation to FIG. 11.

Figure 12A:
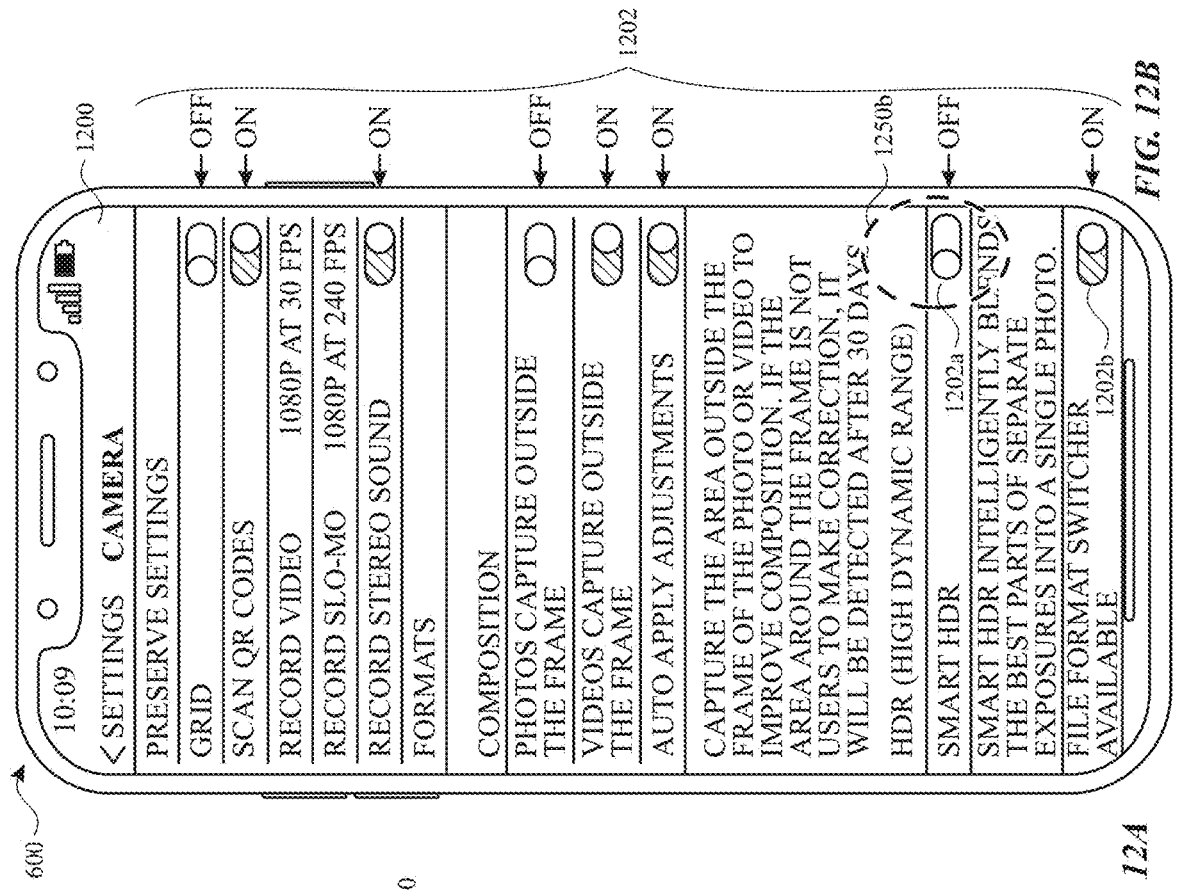
FIGS. 12A-12N illustrate exemplary user interfaces for adjusting media using an electronic device in accordance with some embodiments.
Figure 12B:
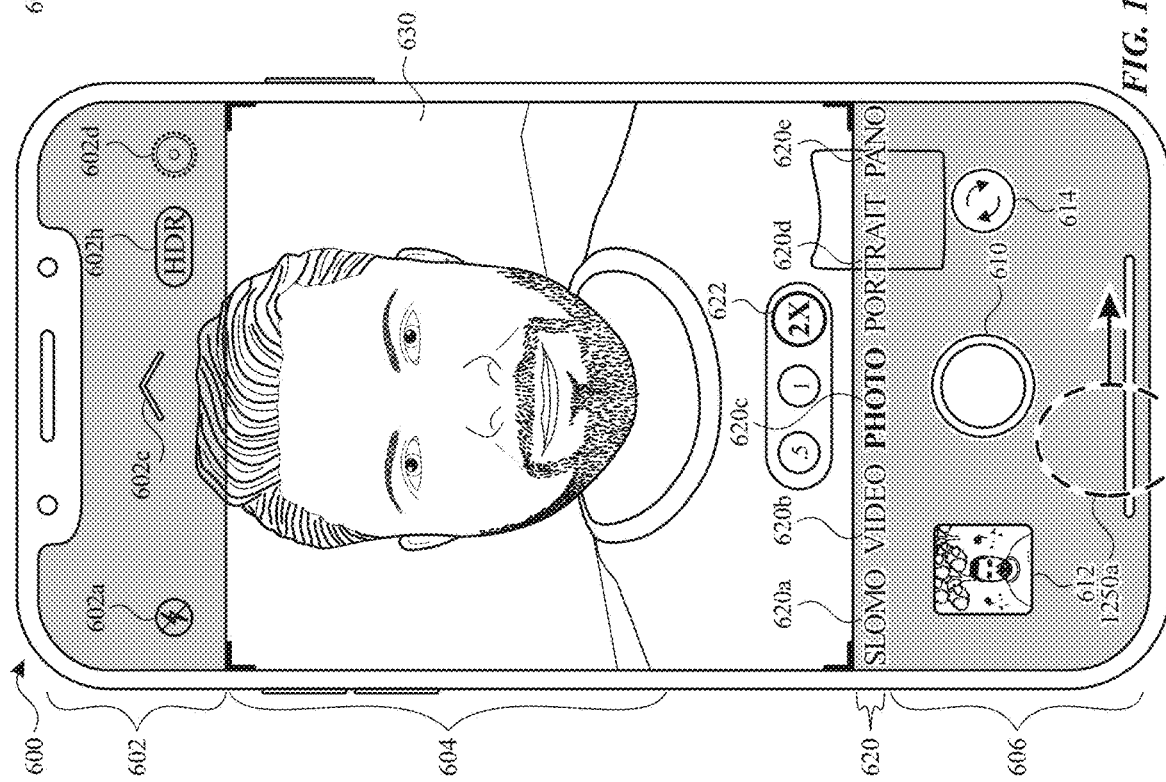
Figures 12C, 12D:
Figure 12E:
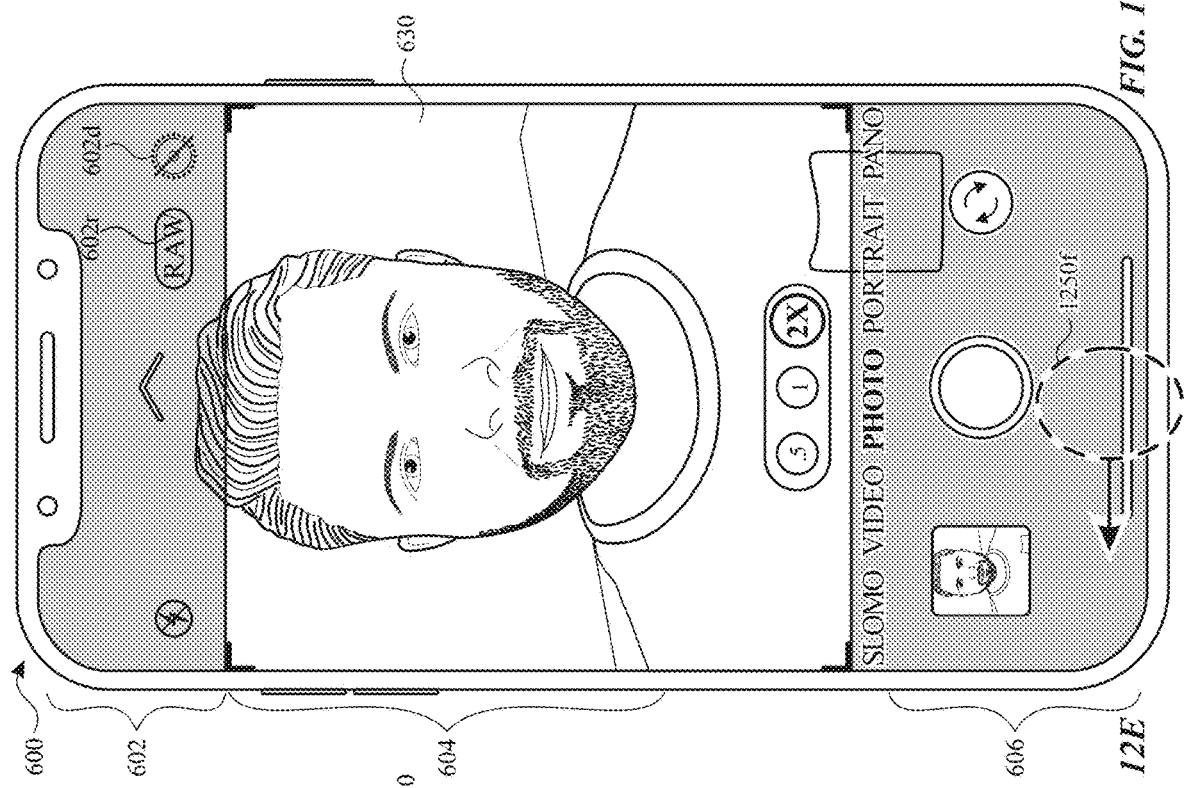
Figure 12F:
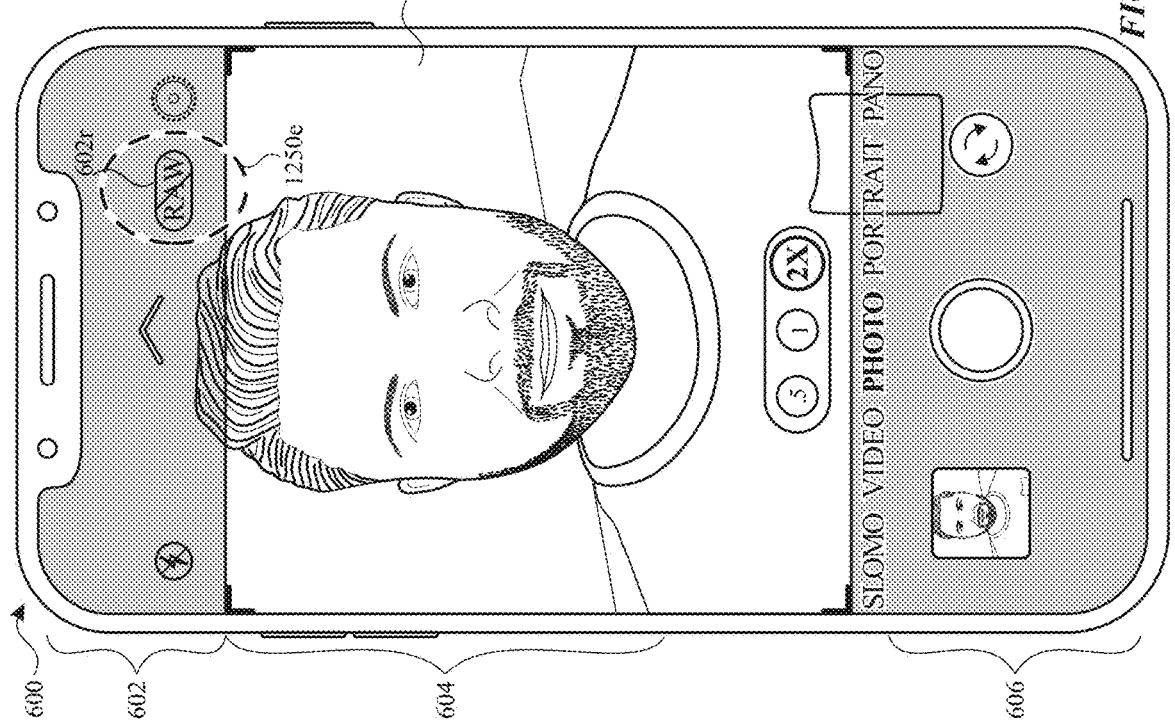
Figure 12H:
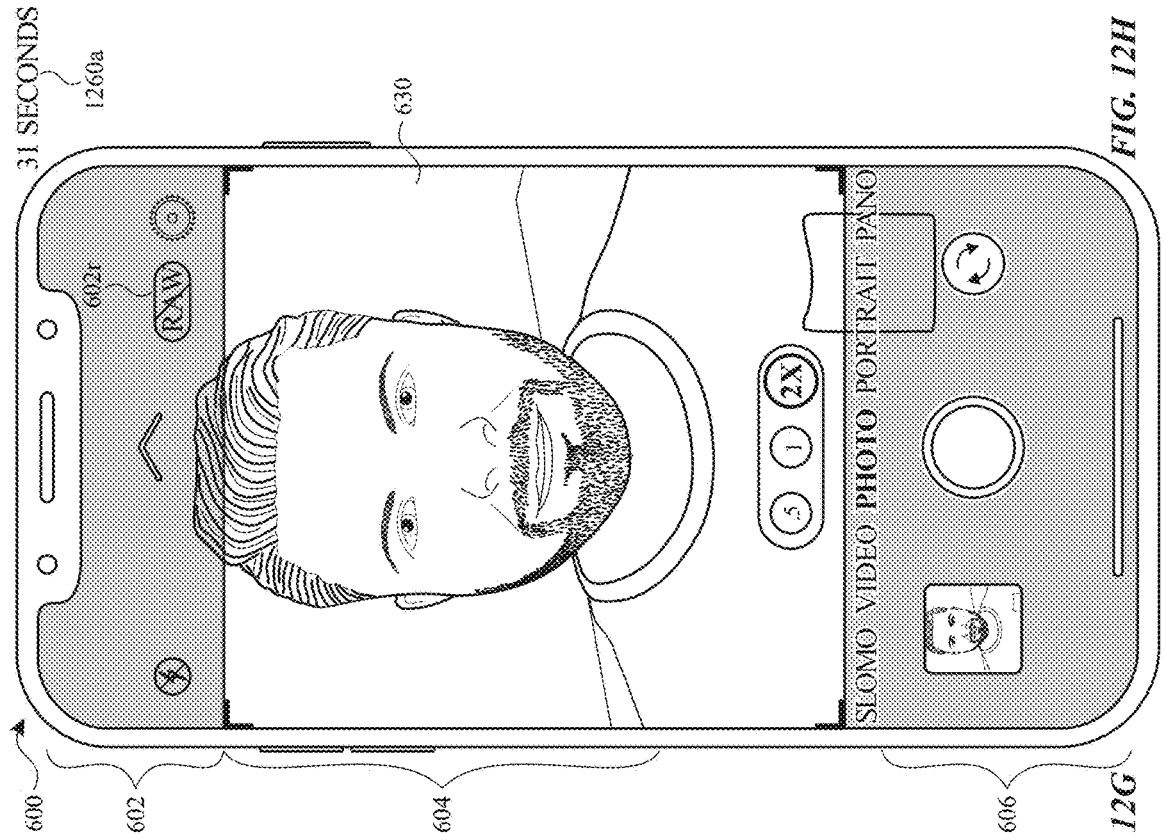
Figure 12G:
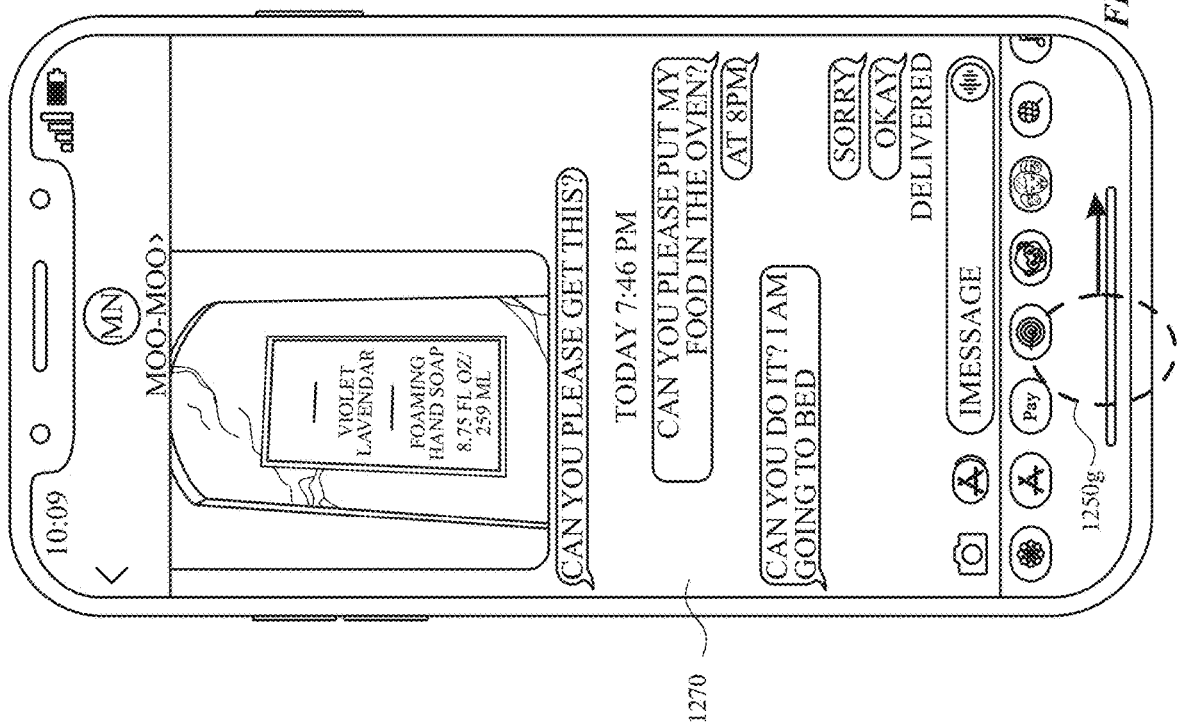
Figure 12I:
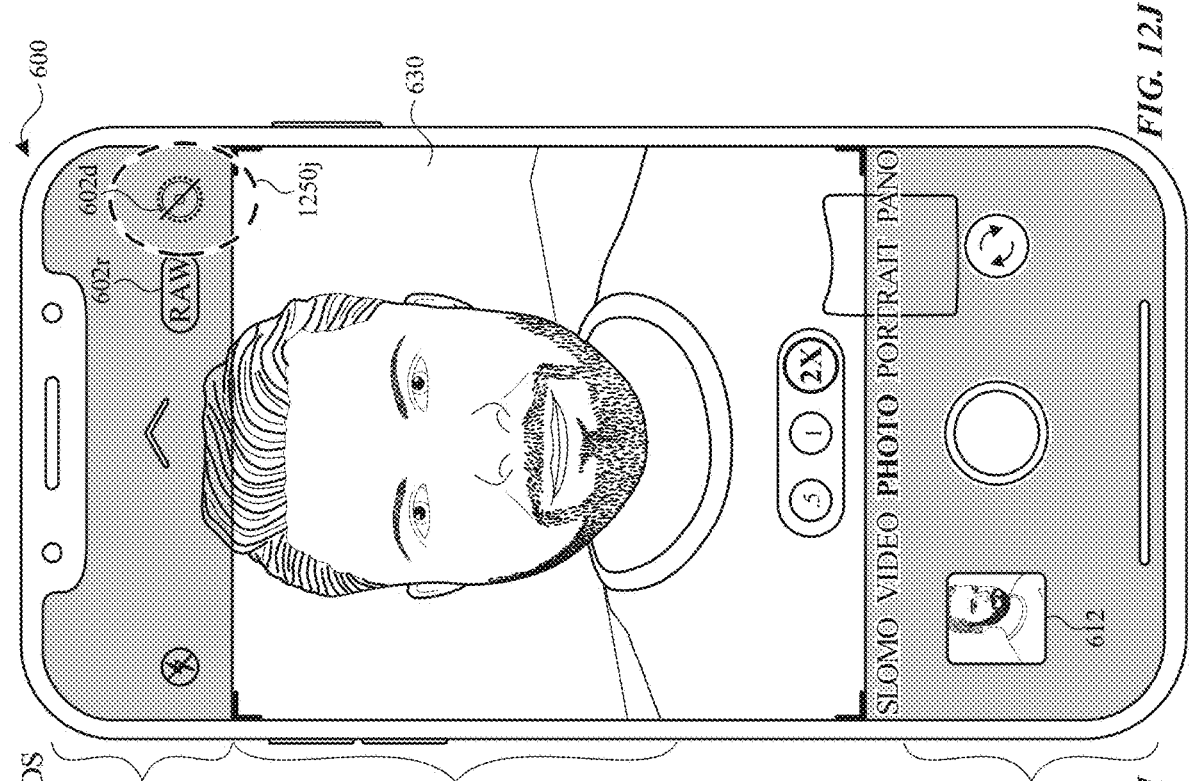
Figure 12J:
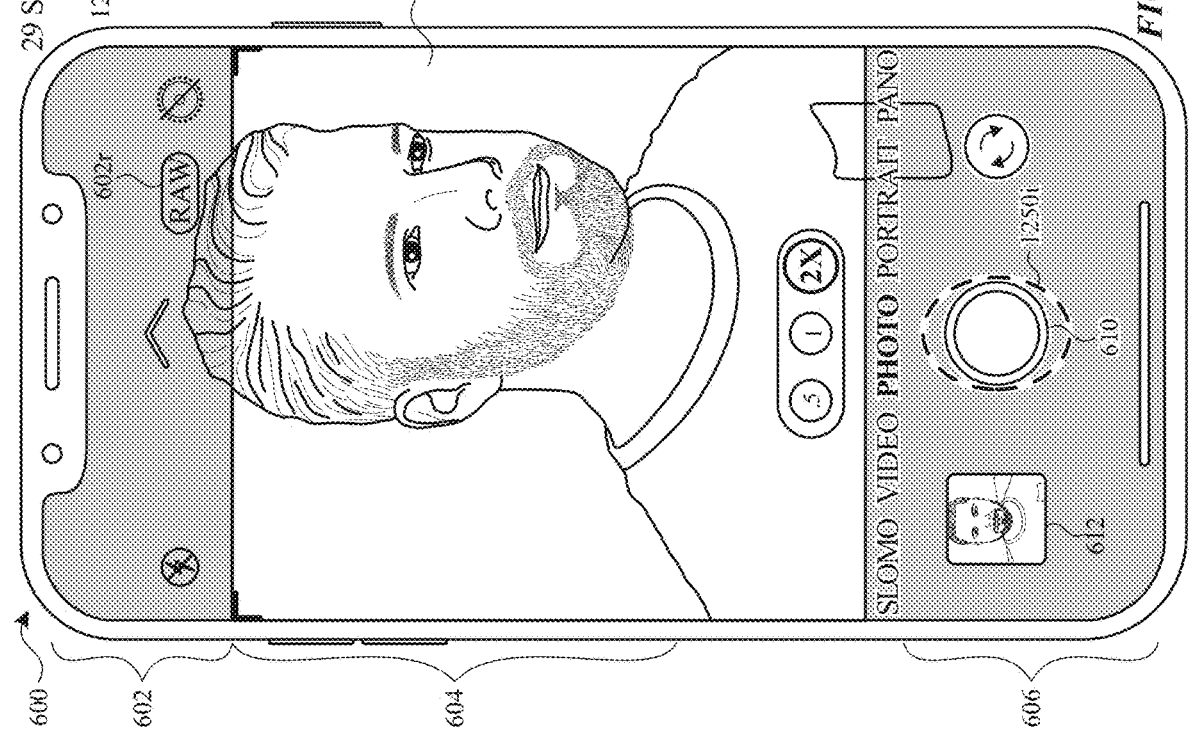
Figure 12K:
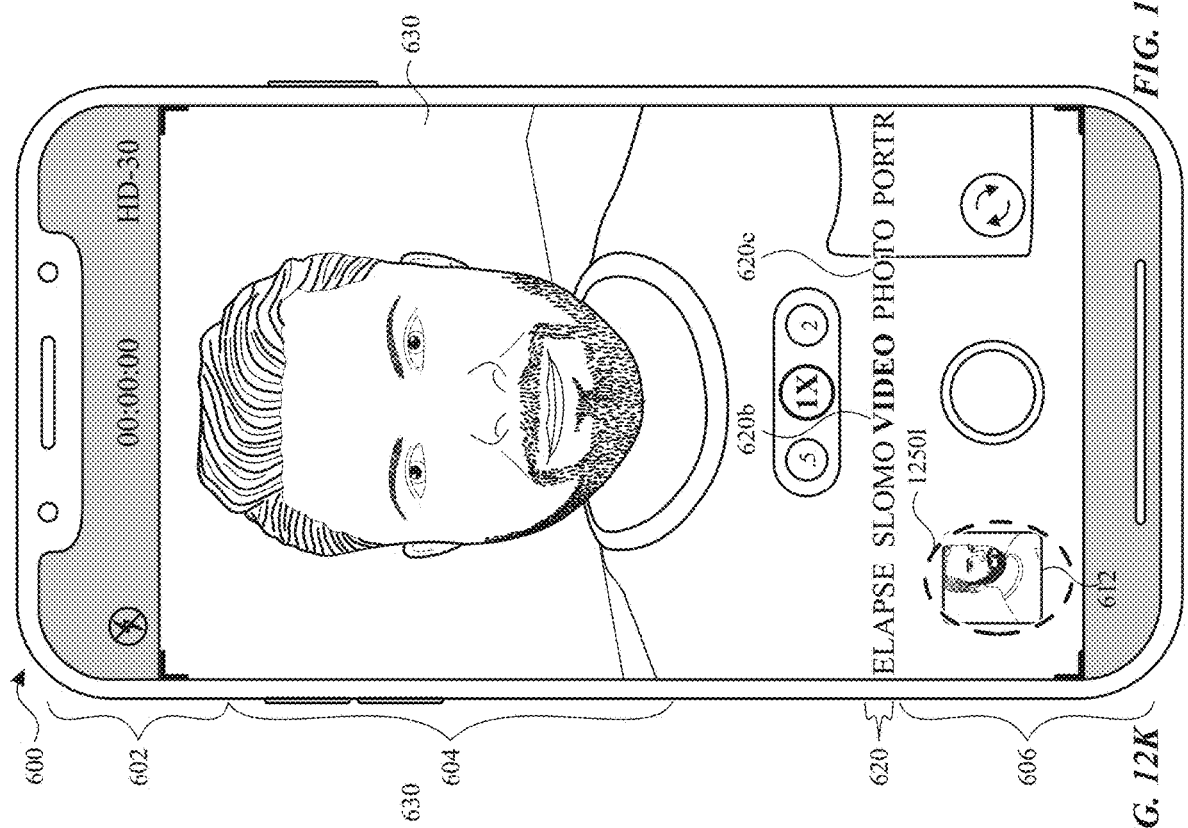
Figure 12L:
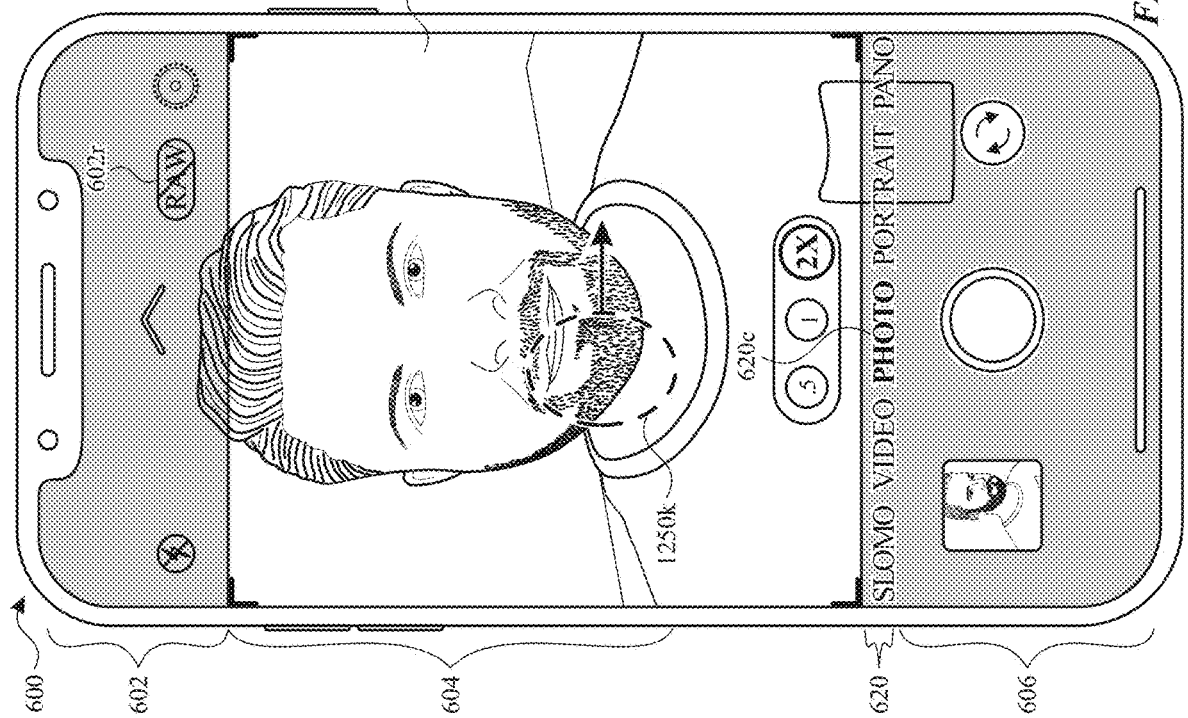
Figure 12M:
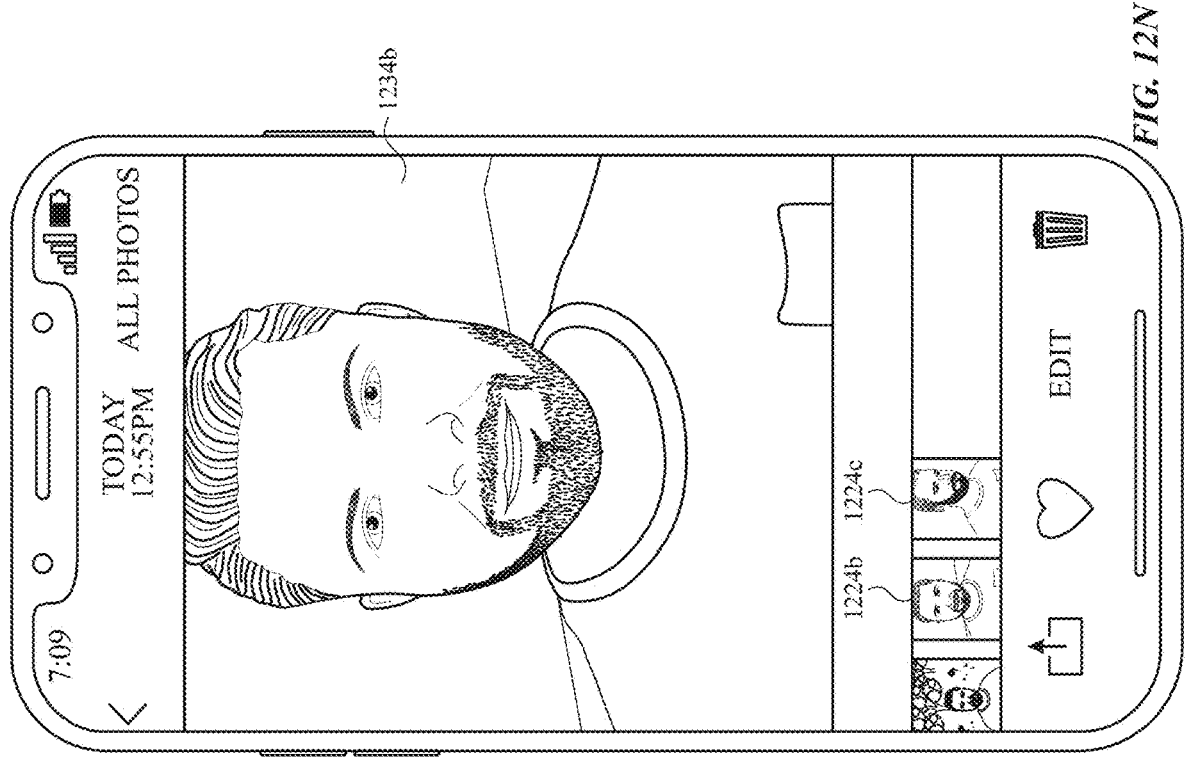
Figure 12N:
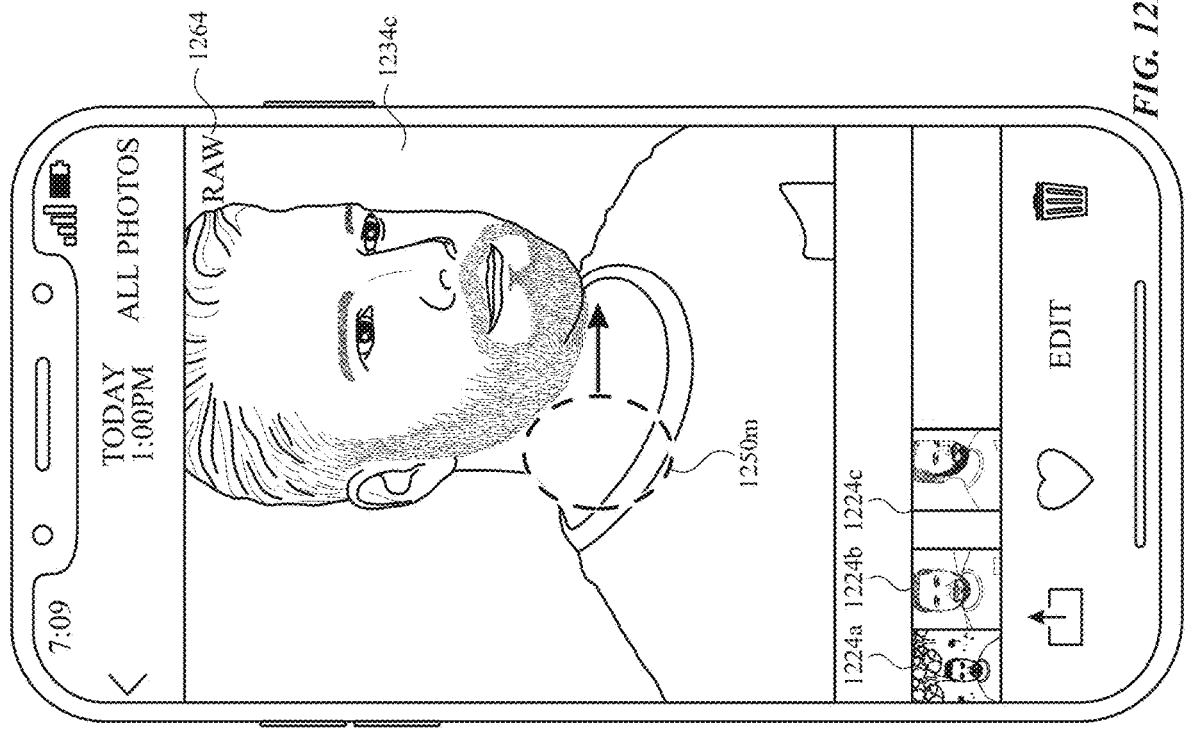
Figure 13A:
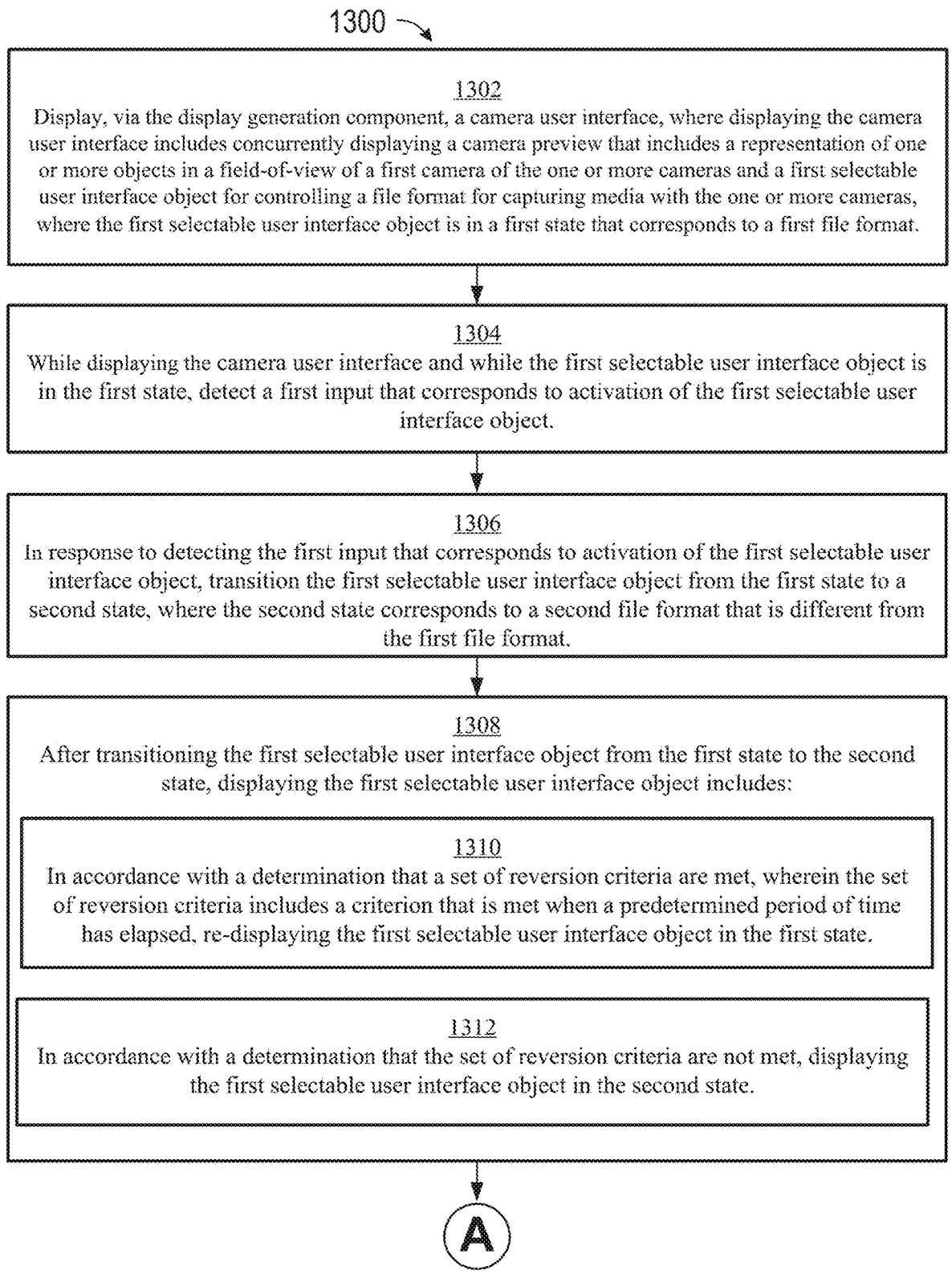
Figure 13B:
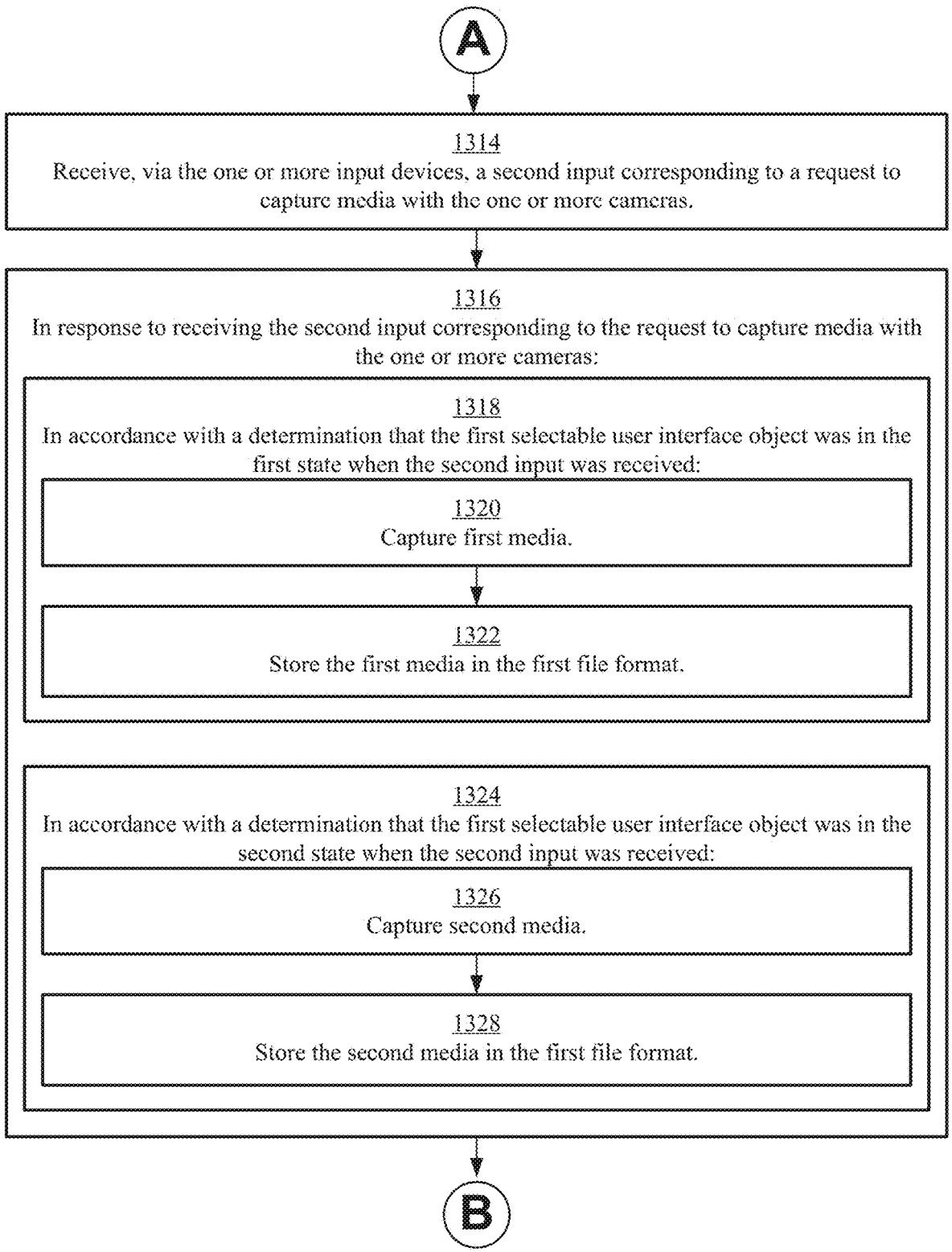
Figure 14A:
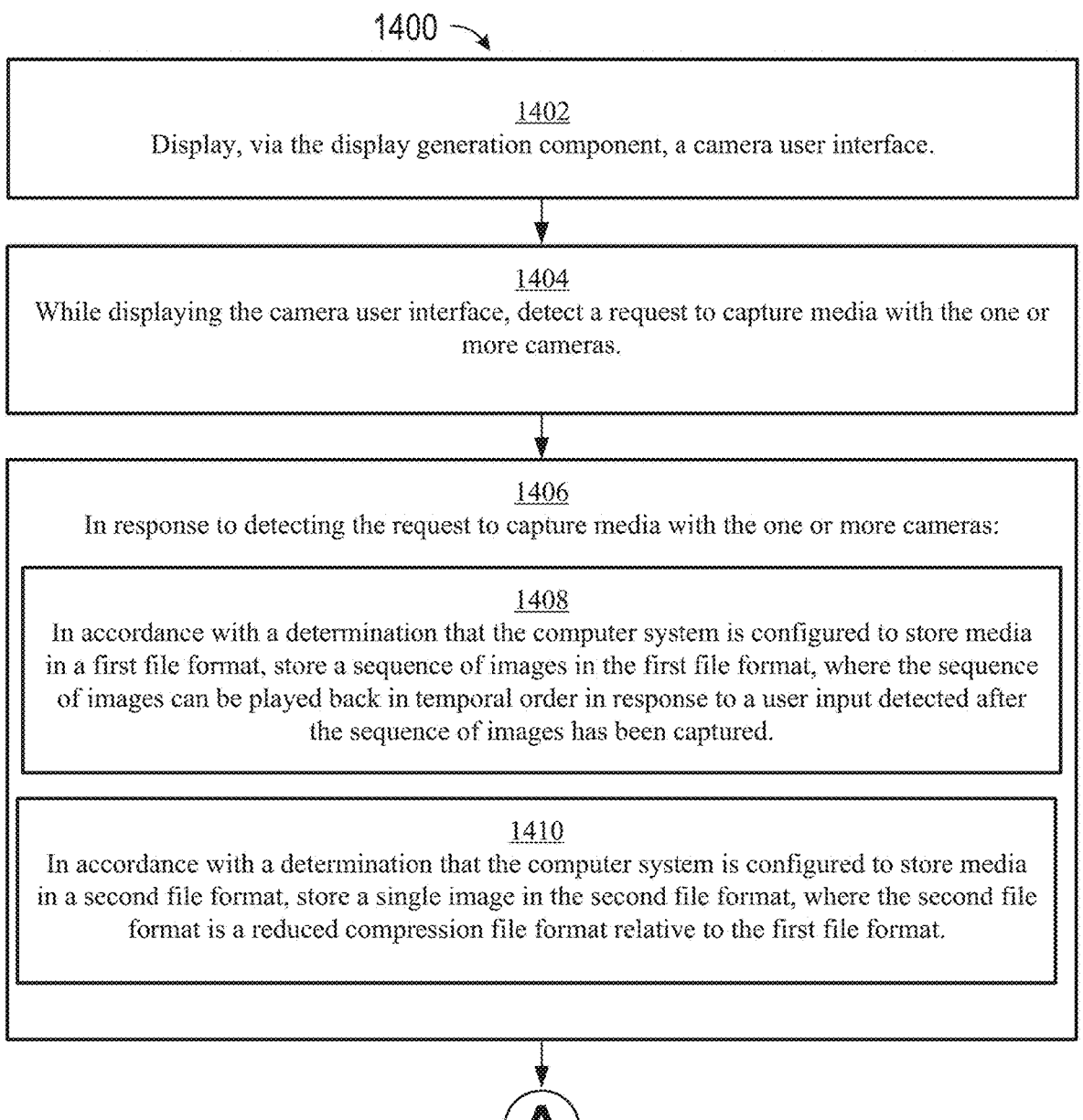
FIGS. 14A-14B are a flow diagram illustrating exemplary method for storing media using an electronic device in accordance with some embodiments.
Figure 14B:
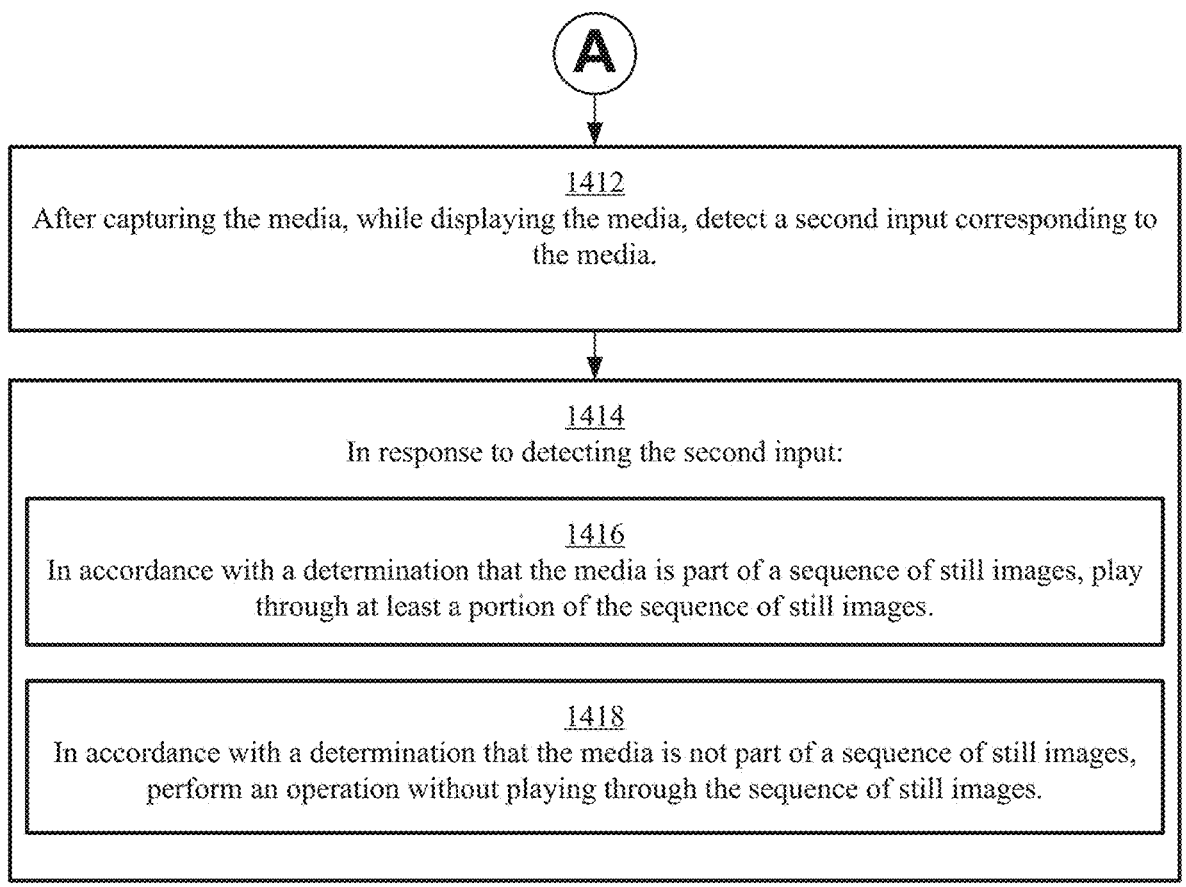

FIGS. 12A-12N illustrate exemplary user interfaces for adjusting media using an electronic device in accordance with some embodiments. FIGS. 13A-13C are a flow diagram illustrating exemplary methods for managing the file format of media using an electronic device in accordance with some embodiments. FIGS. 14A-14B are a flow diagram illustrating exemplary methods for storing media using an electronic device in accordance with some embodiments. The user interfaces of FIGS. 12A-12N are used to illustrate the processes described below, including the processes described in relation to FIGS. 13A-13C and FIGS. 14A-14B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
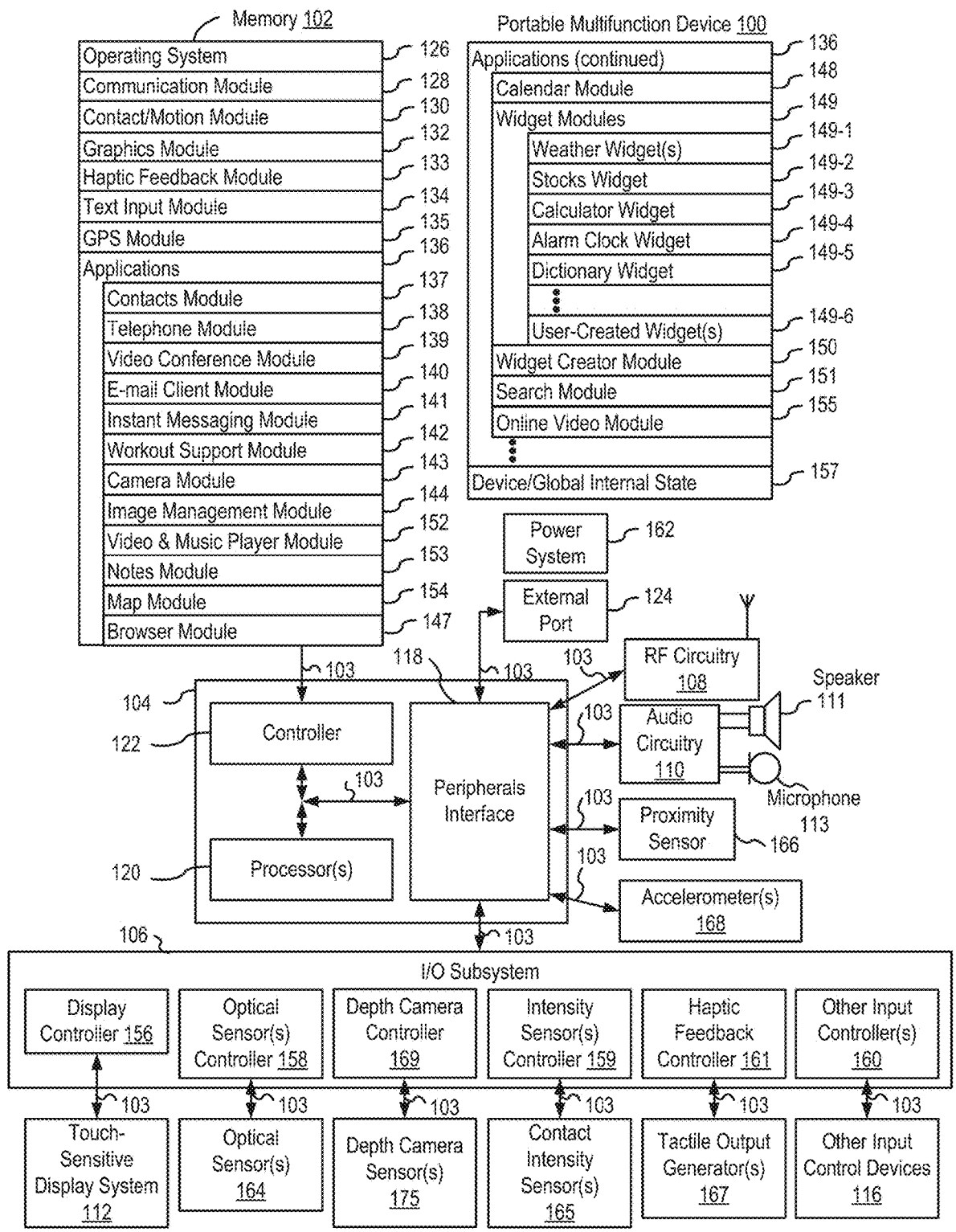
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying controls (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.1 lac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"—Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
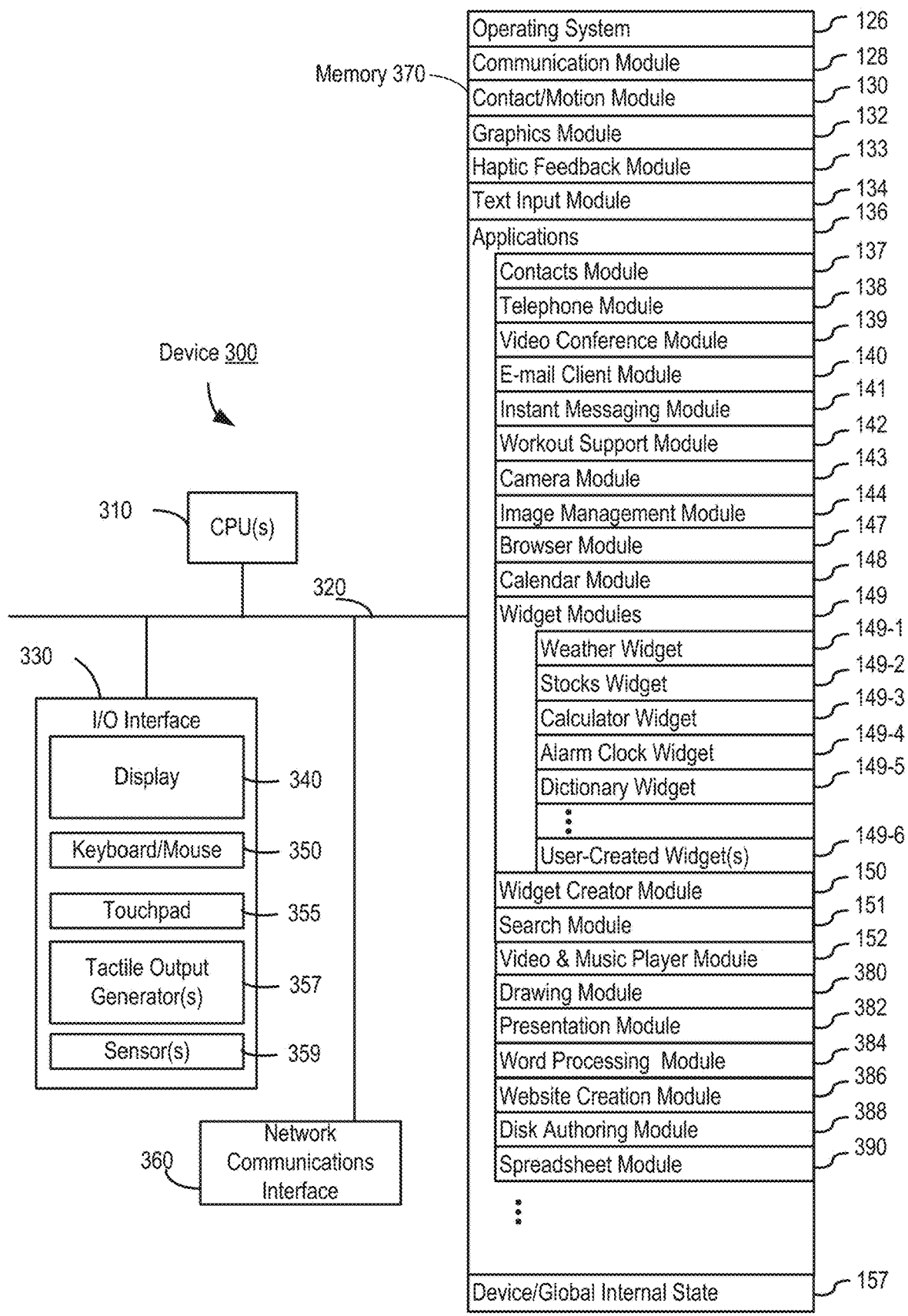
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116, and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module,
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
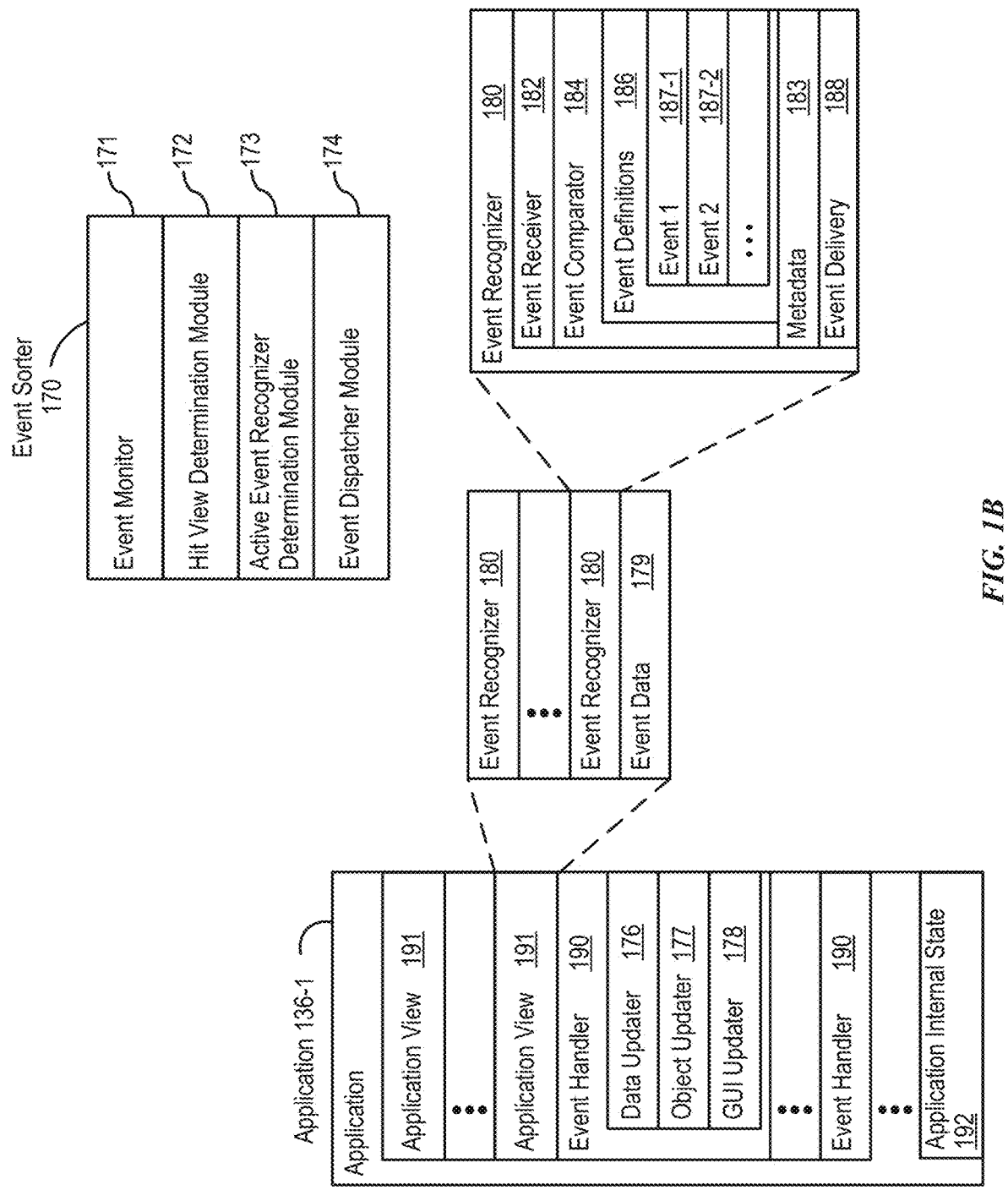
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
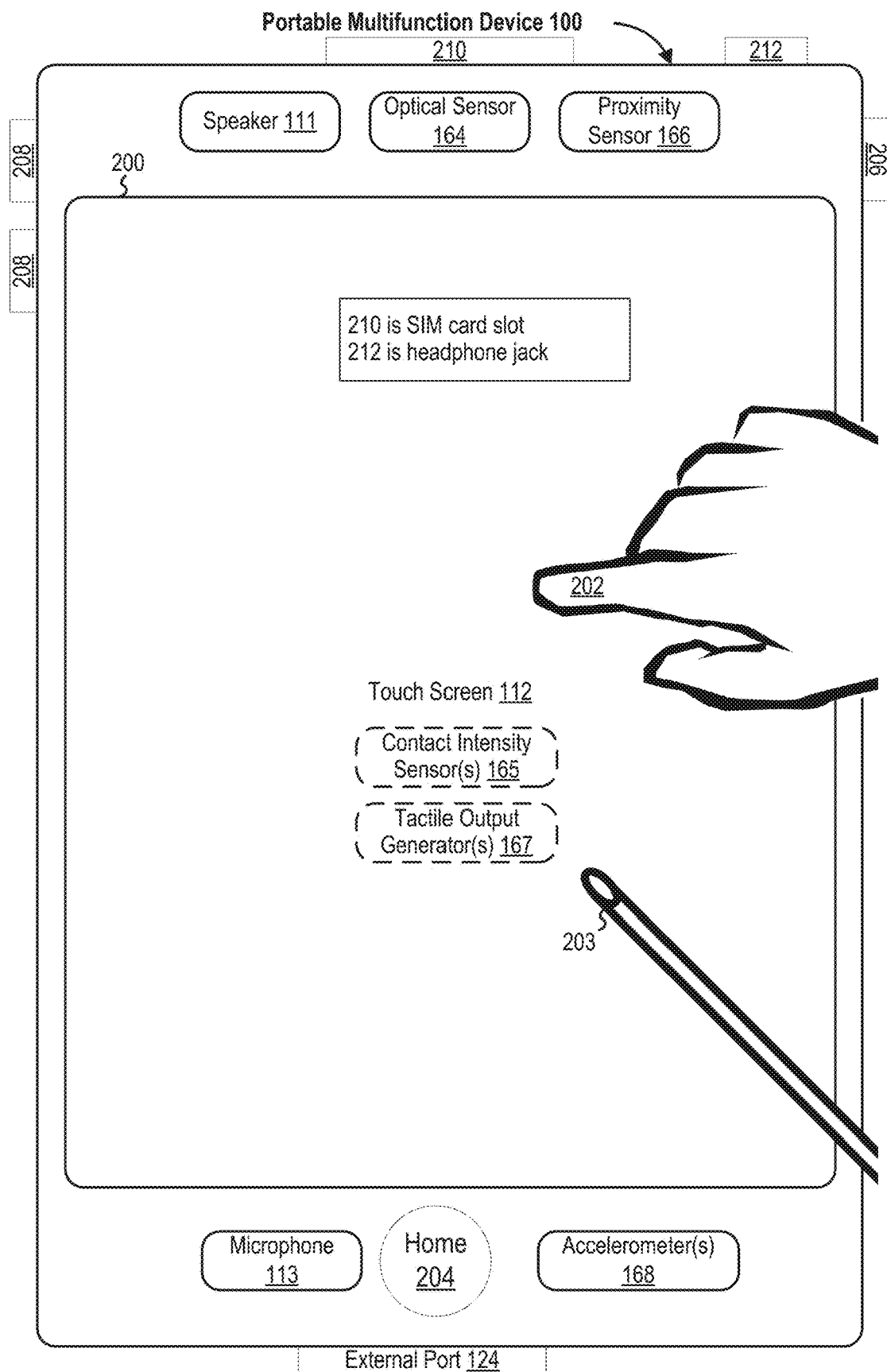
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
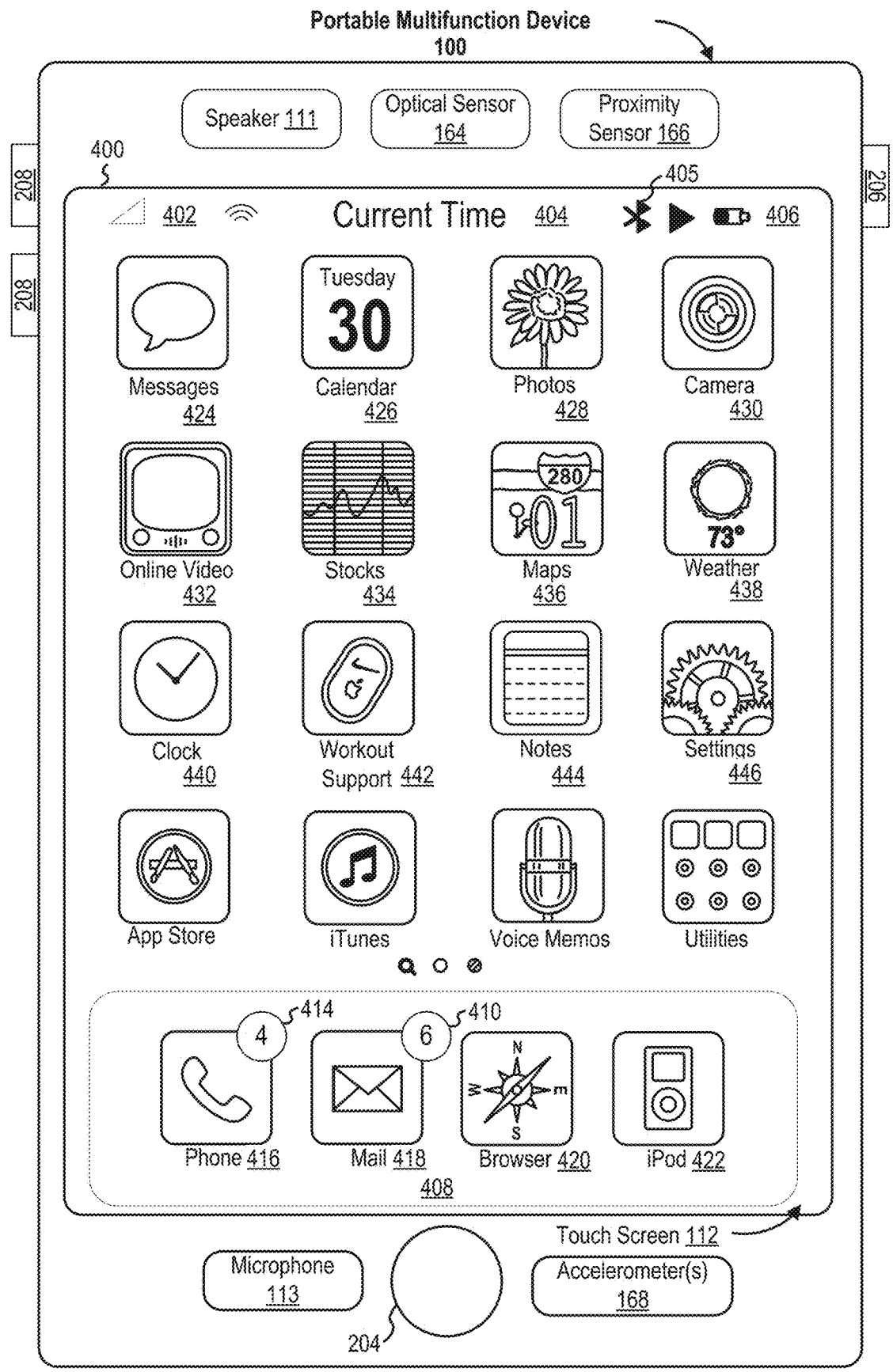
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
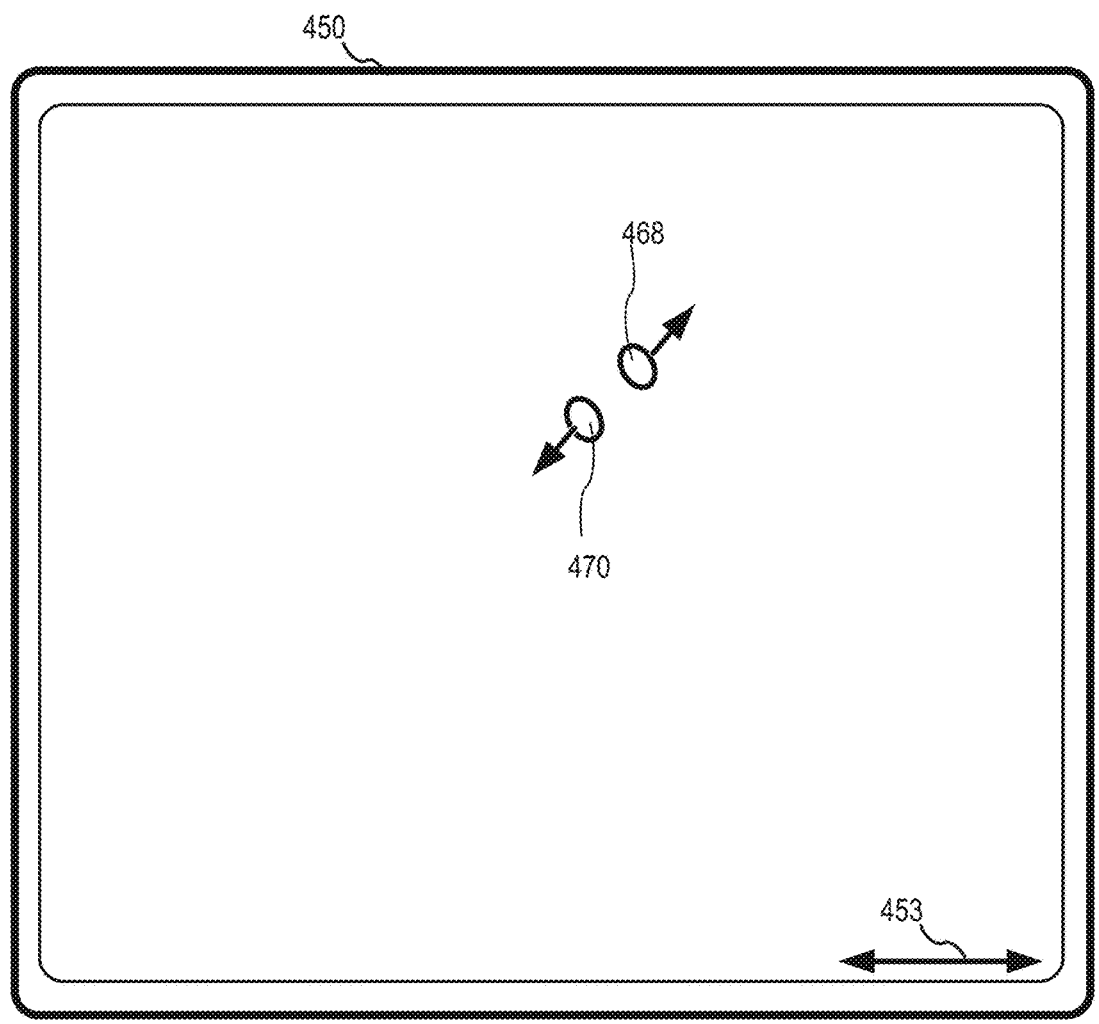
FIG. 4B illustrates an exemplary user interface for a multifunction device with a touch-sensitive surface that is separate from the display in accordance with some embodiments.
Figure 4B:
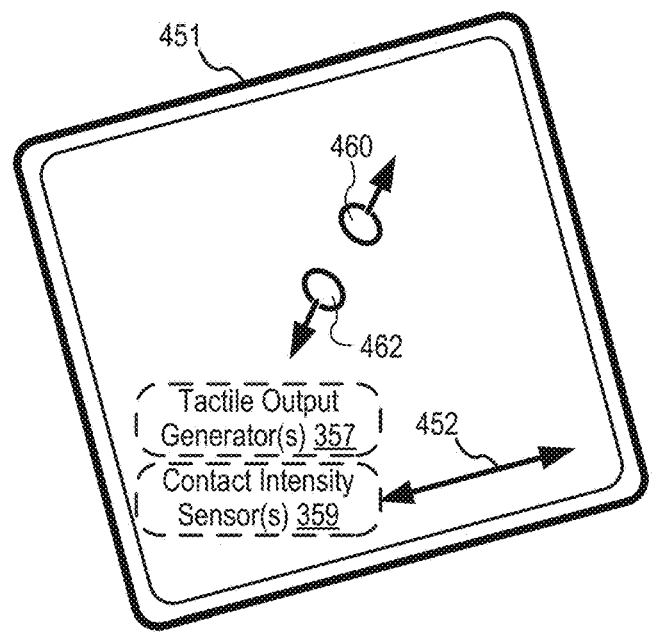

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
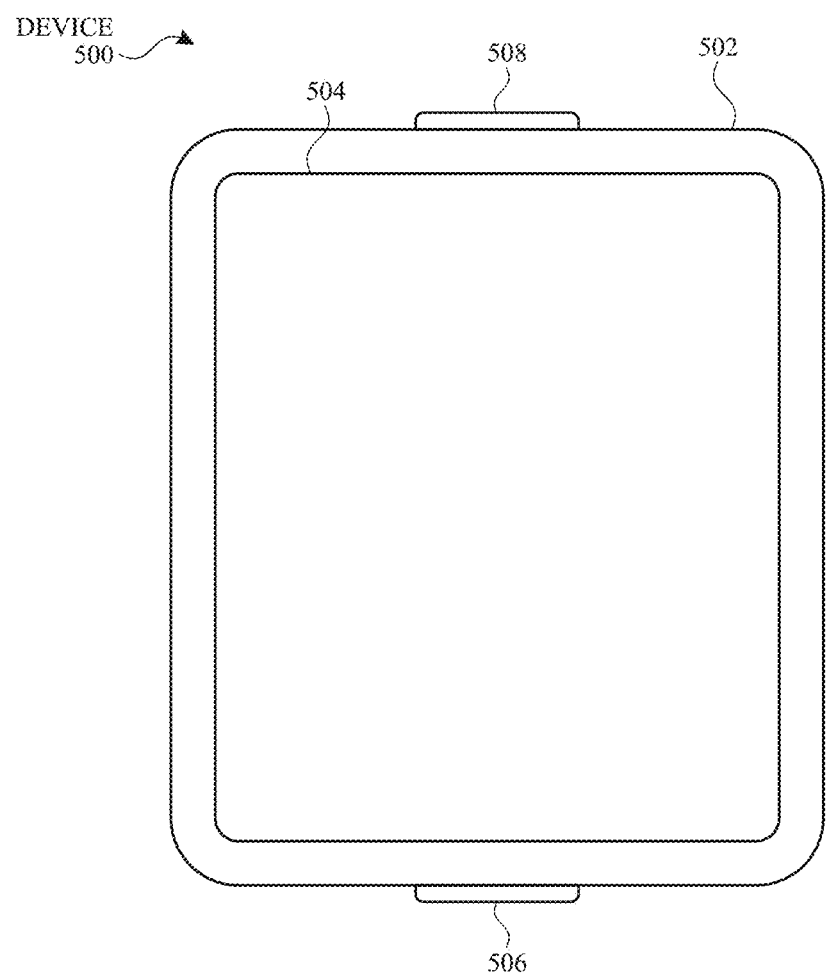
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
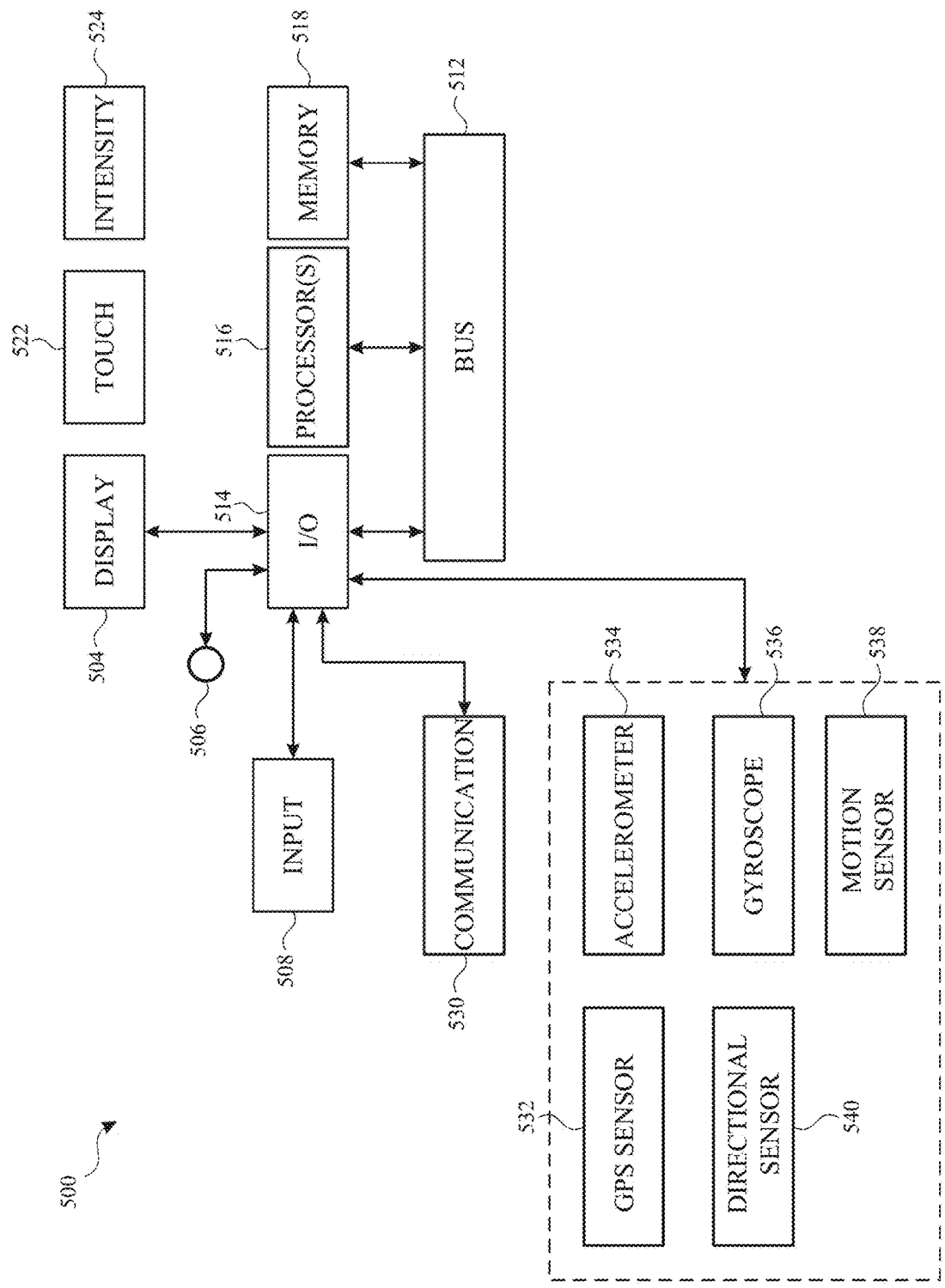
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7), 900 (FIG. 9), 1100 (FIG. 11), 1300 (FIGS. 13A-13C), and 1400 (FIGS. 14A-14B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for capturing media using an electronic device (e.g., a computer system) in accordance with some embodiments. The user interfaces in these figures are used to illustrate the processes described below, including the processes in FIG. 7.

FIG. 6A illustrates electronic device 600 displaying a camera user interface, which includes a live preview 630. Live preview 630 shows a particular environment (e.g., the face of a person in FIG. 6A) that is in the field-of-view of one or more front-facing cameras (e.g., a camera positioned on the display side of the device and directed in the general direction of a user viewing the display) of device 600 (e.g., and/or a portion of an environment that surrounds device 600). Live preview 630 is a representation of a (e.g., partial) field-of-view of the one or more front-facing cameras. Live preview 630 is based on images detected in the field-of-view of the one or more front-facing cameras of device 600. In some embodiments, device 600 captures images using a plurality of camera sensors and combines them to display live preview 630. In some embodiments, device 600 captures images using a single camera sensor to display live preview 630. In some embodiments, device 600 is device 100, 300, and/or 500 or includes one or more features of devices 100, 300, and/or 500.

The camera user interface of FIG. 6A includes indicator region 602 and control region 606. Indicator region 602 and control region 606 are concurrently displayed on live preview 630 such that indicators and controls displayed in indicator region 602 and control region 606 can be displayed concurrently with live preview 630. Camera display region 604 is between indicator region 602 and control region 606 and is substantially not overlaid with indicators or controls. In FIG. 6A, indicator region 602 and control region 606 include a solid overlay, and a portion of live preview 630 is not shown behind the solid overlay. In some embodiments, indicator region 602 and control region 606 include a translucent overlay, and a portion of live preview 630 is shown behind the translucent overlay (and/or behind the indicators and controls of indicator region 602 and control region 606).

As illustrated in FIG. 6A, indicator region 602 includes indicators, such as flash indicator 602a, low-light mode indicator 602b, modes-to-settings indicator 602c, and animated image capture indicator 602d. Flash indicator 602a indicates the state of a flash operation in which device 600 is currently configured to operate when a request to capture media is received. At FIG. 6A, flash indicator 602a indicates that the flash operation is set to inactive. However, in some embodiments, flash indicator 602a can indicate that the flash operation is active or in another mode (e.g., automatic mode). In response to detecting a selection of flash indicator 602a, device 600 switches the state of the flash operation.

Low-light mode indicator 602b indicates a state of a low-light mode. When the low-light mode is active, device 600 is configured to capture one or more images over a capture duration and combine those images to generate a single composite image (e.g., "low-light media"; a photo) that is visually brighter than one or more of the images that were over the predetermined period of time. As illustrated in FIG. 6A, low-light mode indicator 602b is displayed in an active state with a one-second capture duration (e.g., "1S" displayed in low-light mode indicator 602b). Low-light mode indicator 602b is displayed as being in an active state because a determination has been made that light (e.g., ambient light) in the field-of-view of one or more cameras of device 600 (e.g., the field-of-view of the front-facing camera of device 600 in FIG. 6A) is below a predetermined threshold (e.g., 20-30 lux). Low-light mode indicator 602b is displayed with the one-second capture duration based on the light in the field-of-view of the one or more cameras of device 600. In some embodiments, when the ambient light in the field-of-view of the one or more camera of device 600 is lower, low-light mode indicator 602b is displayed with a capture duration that is higher than the one-second capture duration. In some embodiments, when the ambient light in the field-of-view of the one or more camera of device 600 is higher, low-light mode indicator 602b is displayed with a capture duration that is lower than the one-second capture duration. In some embodiments, low-light mode indicator 602b is displayed as being in an inactive state or not displayed at all when a determination has been made that the light in the field-of-view of one or more cameras of device 600 is above a predetermined threshold (e.g., 20-30 lux).

In some embodiments, while low-light mode indicator 602*b* is displayed, device 600 can detect selection of (e.g., via a tap gesture on) low-light mode indicator 602*b*. In some embodiments, in response to detecting the selection low-light mode indicator 602*b*, device 600 displays an adjustable slider that, when selected (e.g., via a dragging gesture), changes the capture duration of the low-light mode. For example, in response to a dragging gesture on the adjustable slider, device 600 replaces the one-second capture duration shown in low-light mode indicator 602*b* with a three-second capture duration. In some embodiments, after changing the one-second capture duration to the three-second capture duration, device 600 is configured to capture low-light media over the three-second capture duration instead of the three-second capture duration.

Modes-to-settings indicator 602*c* indicates whether camera mode controls 620 are displayed or whether one or more camera settings are displayed in control region 606. In response to detecting a selection of modes-to-settings indicator 602*c*, device 600 replaces camera mode controls 620 with a plurality of camera setting controls for controlling different aspects of the selected camera mode in control region 606.

Animated image capture indicator 602*d* indicates whether the camera is configured to capture media that includes a single image or a composite image (e.g., such as the media captured in FIG. 10D-10E) or a plurality of images (e.g., such as the media captured and described above in relation to FIGS. 10A-10B) in response to detecting a request to capture media.

As illustrated in FIG. 6A, camera display region 604 includes live preview 630 and zoom control 626 for changing the zoom level of live preview 630 using one or more front-facing cameras of device 600.

As illustrated in FIG. 6A, control region 606 includes shutter control 610, a representation of media collection 612, camera switcher control 614, and camera mode controls 620. Shutter control 610, when activated, causes device 600 to capture media (e.g., a photo), using the one or more camera sensors, based on the current state of live preview 630 and the current state of the camera application. The captured media is stored locally at electronic device 600 and/or transmitted to a remote server for storage. The representation of media collection 612 illustrated in FIG. 6A is a representation of media (an image, a video) that was most recently captured by device 600. Camera switcher control 614, when activated, causes device 600 to switch to showing the field-of-view of a different camera(s) in live preview 630, such as by switching between a rear-facing camera sensor and a front-facing camera sensor. As illustrated in FIG. 6A, camera mode controls 620 indicates which camera mode is currently selected and enables the user to change the camera mode. In FIG. 6A, camera mode controls 620 are displayed, and photo camera mode 620*c* is indicated as being the current mode (e.g., a photo camera mode) in which the camera is operating by the bolding of the text. In response to detecting a request to capture media (e.g., detecting a selection of and/or activating shutter control 610), device 600 captures media of a type (e.g., photo media, video media) that is consistent with the current mode in which device 600 is operating (e.g., photo camera mode, video camera mode).

FIGS. 6A-6G illustrate an exemplary scenario where a user of device 600 is taking a selfie photo while in a low-light environment. As discussed below, the scenario illustrated in FIGS. 6A-6E involves device 600 displaying an evolving animation that aids in capturing improved media while using the front-facing camera in low-light environments. At FIG. 6A, device 600 detects a tap gesture 650*a* on (e.g., at a location corresponding to) shutter control 610.

At FIG. 6B, in response to detecting tap gesture 650*a*, a determination is made that device 600 is currently configured to use the front-facing camera to capture media (e.g., device 600 is using the front-facing camera to capture live preview 630) and device 600 is currently configured to operate in low-light mode (e.g., represented by low-light mode indicator 602*b* being displayed in the active state). Based on this determination, device 600 initiates display of animation 660, where portions of the animations are displayed in FIGS. 6B-6E.

FIG. 6B illustrates a first portion of animation 660, which is a frame of animation 660 that is a solid color. The portion of animation 660 has a color temperature that is based on the environment depicted in FIG. 6A (e.g., at least the portion of the environment within the field-of-view of the front-facing camera of device 600). Thus, device 600 determines the color temperature of the first portion of animation 660 based on the environment surrounding device 600. The portion of animation 660 is based on the environment depicted in FIG. 6A, such that the first portion of the animation 660 would be darker in an environment with less light (or lighter in an environment with more light or an environment with a first color temperature) (e.g., FIG. 6H described below). In some embodiments, first portion of animation 660 would have a cooler color temperature in an environment that has a cooler color temperature or have a warmer color temperature in an environment that has a warmer color temperature. In some embodiments, the first portion of the animation matches (e.g., is the same color as the predominant color in) the environment depicted in FIG. 6A. In some embodiments, the color temperature is determined based on the minimum, average, and/or maximum brightness, lighting conditions, and/or color temperature of the environment in which device 600 is positioned (e.g., when tap gesture 650*a* was detected). In some embodiments, device 600 uses one or more camera sensors includes and/or does not use the camera sensor of the front-facing camera that is currently configured to capture media to determine the color temperature of the first portion of animation 660.

Looking at FIGS. 6A-6B, the first portion of animation 660 is visually brighter (e.g., total brightness, minimum brightness (e.g., or a pixel or area of the animation)) is brighter than the corresponding brightness live preview 630 of FIG. 6A (e.g., when the tap gesture 650*a* was detected). As a result, displaying the first portion of animation 660 illuminates subjects (e.g., objects, people) in the environment (e.g., at least the portion of the environment in the field-of-view of the front-facing camera of device 600) and allows device 600 to produce media (e.g., photo) with improved visual balance than device 600 would have produced when the first portion of animation 660 is not displayed. In some embodiments, the maximum brightness (e.g., the brightness of pixel and/or area) of the first portion of the animation is visually brighter than the maximum brightness of live preview 630. In some embodiments, the first portion of animation 660 is displayed on a larger area of the display of device 600, such that indicator region 602 and control 606 also are the same color as the first portion of animation 660 shown in FIG. 6B. In some embodiments, one or more indicators and/or controls in indicator region 606 and control region 606 cease to be displayed when the first portion of animation 660 is displayed on a larger area of the display of device 600. In some embodiments, none (or less) of the indicators and/or controls of FIG. 6A are displayed when the first portion of animation 660 is displayed on a larger area of the display of device 600. In some embodiments, the first portion includes one or more other frames (e.g., or images) that are based on the color temperature of the environment illustrated in FIG. 6A. In some embodiments, the embodiments, the one or more other frames are different from the frame of the first portion of animation 660 that is shown in FIG. 6B.

At FIG. 6B, in response to detecting tap gesture 650*a*, device 600 also initiates capture of low-light media over the capture duration (e.g., one-second) as shown in low-light mode indicator 602*b*). At FIG. 6B, the first portion of animation 660 is displayed before (e.g., just immediately before) capture of the media is initiated so that a first set of images captured by device 600 during the capture duration are captured while the environment illustrated in FIG. 6A is illuminated. In some embodiments, the first portion of animation 660 is displayed only after or while capture of the media is initiated. In some embodiments, when device 600 initiates capture of low-light media, an animated slider (e.g., a slider that moves across the display from 1 second to 0 seconds) or another user interface element is displayed that shows the time that has elapsed since or the remaining time until capture of the media has completed. In some embodiments, when device 600 initiates capture of low-light media, one or more visual guidance indicators are displayed that allow a user to detect movement of device 600 since the capture of the media was initiated (e.g., and/or since tap gesture 650*a* was detected).

As illustrated in FIG. 6B, in response to detecting tap gesture 650*a*, device 600 also updates shutter control 610 from being displayed in an active state (e.g., as illustrated in FIG. 6A) to being displayed in an inactive state (e.g., as illustrated in 6A). Here, device 600 dims shutter control 610 to display the control in the inactive state. In some embodiments, device 600 replaces shutter control 610 with a stop control, where a selection of the stop control causes device 600 to stop the capture of media.

As illustrated in FIG. 6C, device 600 displays a second portion of animation 660 at a time during the capture duration that occurs after the first portion of animation 660 of FIG. 6B was displayed and while device 600 is capturing multiple images. The second portion of animation 660 includes visual information (e.g., the shirt, hair, beard, skin of the person) that was shown in live preview 630. However, the visual content shown in FIG. 6C is lighter than the visual information shown in FIG. 6A. In some embodiments, at FIG. 6C, device 600 generates the second portion of animation by combining one or more images that device 600 has captured since capture of the media was initiated (e.g., for the current duration of the capture duration). Here, the second portion of animation 660 is not as visually bright as the first portion of animation 660 illustrated in FIG. 6B. Also, while the second portion of animation 660 includes discrete visual information of the environment, the first portion of animation 660 (e.g., illustrated in FIG. 6B) did not, though, as described above, the color temperature of the first portion of the animation 660 can be based on the visual information of the environment. In some embodiments, the first portion of animation 660 is not generated by combining multiple images (e.g., is not a composite image and/or an image that is generated by merging one or more images) while the second portion of the animation 660 is generated by combining multiple images.

As illustrated in FIG. 6D, device 600 displays a third portion of animation 660 at a time during the capture duration that occurs after the second portion of animation 660 of FIG. 6C was displayed and while device 600 is continuing to capture multiple images. The third portion of animation 660 includes visual information that is darker than the visual information included in the second portion of animated 660 illustrated in FIG. 6C. The third portion of animation 660 includes visual information that is darker than the visual information included in the second portion of animation 660 illustrated in FIG. 6C because more images have been captured and combined to generate the third portion of animation 660. Notably, in embodiments where the first portion of animation 660 (e.g., illustrated in FIG. 6B), the second portion of animation 660 (e.g., illustrated in FIG. 6C), and the third portion of animation 660 (e.g., illustrated in FIG. 6D) are displayed immediately after each other in animation 660, the first portion of animation 660 is closer in brightness to the second portion of animation 660 than the second portion of animation 660 is in brightness to the third portion of animation 660. In other words, earlier frames of animation 660 have less variable brightness (and/or have a more consistent brightness) (e.g., total brightness, average brightness) and/or less of a variable color temperature than later frames of animation 660. Moreover, the first portion of animation 660 is also more uniformly brighter and/or has a more uniformed color temperature than the second and third portions of animation 660. In this way, animation 660 has the visual effect of revealing additional details in the field-of-view of the front-facing camera of device 600 as the animation progresses.

As illustrated in FIG. 6E, device 600 displays a fourth portion of animation 660 at a time during the capture duration that occurs after the second portion of animation 660 of FIG. 6C was displayed and while device 600 is continuing to capture multiple images. The fourth portion of animation 660 includes visual information that is darker than the visual information included in the third portion of animated 660 illustrated in FIG. 6D because more images have been captured and combined to generate the fourth portion of animation 660. Sometime after the fourth portion of animation 660 is displayed in FIG. 6E, the end of the capture duration occurs (e.g., one-second capture duration).

As illustrated in FIG. 6F, when the end of the capture duration occurs (e.g., one-second capture duration), device 600 stops capture of the low-light media and re-displays live preview 630 (e.g., which is the same as preview 630 of FIG. 6A because device 600 is positioned at the same position in the environment). Device 600 also re-displays shutter control 610 as active. As illustrated in FIG. 6D, when the end of the capture duration occurs, device 600 updates media collection 612 with a new representation of media that is visually brighter than live preview 630 of FIG. 6A (e.g., before capture of the media was initiated). The new representation of media in FIG. 6F is a composite image that was generated using one or more of the images captured during the capture duration that was initiated in response to detecting tap gesture 650*a*.

FIGS. 6G-6L illustrate an exemplary scenario where a user of device 600 is taking a selfie photo while in a low-light environment that has less light than the environment represented by live preview 630 in FIG. 6A. As discussed below, the scenario illustrated in FIGS. 6F-6L involves device 600 displaying an evolving animation that aids in capturing improved media while using the front-facing camera in low-light environments. At FIG. 6F, device 600 detects a change in light in the field-of-view of the front-facing camera.

As illustrated in FIG. 6G, in response to detecting the change in light in the field-of-view of the front-facing camera, device 600 updates low-light mode indicator 602*b* to include a two-second capture duration (e.g., 2 seconds) instead of the one-second capture duration (e.g., one-second) because the environment shown by live preview 630 of FIG. 6G has less light than the light in the environment shown by live preview 630 of FIG. 6A. At FIG. 6G, device 600 detects a tap gesture 650*g* on shutter control 610.

As illustrated in FIG. 6H, in response to detecting tap gesture 650*g*, device 600 displays a first portion of animation 662, initiates the capture of media, and updates the camera user interface using one or more techniques as described above in relation to FIG. 6B. Notably, in FIG. 6H, the color temperature (or tone or color) of the first portion of animation 662 is visually darker (e.g., colder) than the color temperature (or tone or color) of the first portion of animation 660 in FIG. 6A. In FIG. 6H, the color of the first portion of animation 662 is different (e.g., darker) because the environment represented by live preview 630 of FIG. 6G is a colder color temperature, a darker tone, and/or is darker than the environment represented by live preview 630 of FIG. 6A.

As illustrated in FIGS. 6I-6K, device 600 displays a second portion of animation 662 (e.g., illustrated in FIG. 6H), a third portion of animation 662 (e.g., as illustrated in FIG. 6I), a fourth portion of animation 662 (e.g., as illustrated in FIG. 6K), using one or more techniques described above in relation to displaying the second portion of animation 660 illustrated in FIG. 6C, the third portion of animation 660 illustrated in FIG. 6D, and the fourth portion of animation 660 illustrated in FIG. 6E. Sometime after the fourth portion of animation 662 is displayed in FIG. 6K, the end of the capture duration (e.g., two-second capture duration) occurs.

As illustrated in FIG. 6L, when the end of the capture duration occurs (e.g., two-second capture duration), device 600 stops capture of the low-light media and re-displays live preview 630 (e.g., which is the same as preview 630 of FIG. 6G because device 600 is positioned at the same position in the environment). Device 600 also re-displays shutter control 610 as active. As illustrated in FIG. 6L, when the end of the capture duration occurs, device 600 updates media collection 612 with a new representation of media that is visually brighter than live preview 630 of FIG. 6G (e.g., before capture of the media was initiated). The new representation of media in FIG. 6L is a composite image that was generated using one or more of the images captured during the capture duration that was initiated in response to detecting tap gesture 650*a*. Notably, the new representation of media in FIG. 6L is similar to the new representation of the media of FIG. 6E, although the new representation of media in FIG. 6L was captured in an environment with a colder color temperature and/or a darker environment. Thus, the technique described in FIGS. 6A-6F and FIGS. 6G-6L generated substantially similar representations, although device 600 was operating in environments with different levels light. In some embodiments, animation 662 is longer than animation 660 because the device 600 captures media over a longer capture duration (e.g., 2 seconds as shown in low-light mode indicator 602*b*) in FIGS. 6H-6K than the capture duration that device 600 capture media over in FIGS. 6B-6D. Thus, in some embodiments, the duration of the animation is dependent on one or more environment conditions (e.g., light) surrounding device 600. In some such embodiments, the media captured in 6G-6K is composited (e.g., generated) from a greater number of captured images than the media captured in 6B-6E.

FIGS. 6M-6R illustrate an exemplary scenario where a user of device 600 is taking a photo while in a low-light environment. As discussed below, the scenario illustrated in FIGS. 6M-6R involves device 600 displaying an evolving animation that aids in capturing improved media while using a rear-facing camera of device 600 in low-light environments. In some embodiments, device 600 captures a low-light image using one or more techniques described in U.S. Provisional Patent Application Ser. No. 63/020,462, filed on May 5, 2020, and titled "USER INTERFACES FOR CAPTURING AND MANAGING VISUAL MEDIA," which is incorporated by reference herein, in its entirety and especially for the disclosure relating to FIGS. 18A-18X, 19A-19B, 20A-20C, 21A-21C, 26A-26Q, 27A-27C, 28A-28B, 39A-39Q, 40A-40B, 41A-41F, and 42A-42B of that application. At FIG. 6L, device 600 detects tap gesture 650*l* on camera switcher control 614.

As illustrated in FIG. 6M, in response to detecting tap gesture 650*l*, device 600 is configured to capture media using one or more rear-facing cameras (e.g., one or more cameras on a side opposite of the display) instead of one or more front-facing cameras of device 600. As illustrated in FIG. 6M, device 600 displays zoom controls 622 for controlling the zoom level of live preview 630 with respect to the one or more rear-facing camera and ceases to display zoom control 626. At FIG. 6M, device 600 detects tap gesture 650*k* on shutter control 610.

At FIG. 6M, in response to detecting tap gesture 650*k*, a determination is made that device 600 is currently configured to use one or more of the rear-facing cameras to capture media (e.g., device 600 is using the rear-facing camera to capture live preview 630 in FIG. 6M) and device 600 is currently configured to operate in low-light mode (e.g., represented by low-light mode indicator 602*b* being displayed in the active state). Based on this determination, device 600 initiates display of animation 664, where portions of the animation are displayed in FIGS. 6N-6Q.

FIG. 6N illustrates a first portion of animation 664, which is a frame of animation 664 that is black and darker than live preview 630 of FIG. 6M. At FIG. 6N, the first portion of animation 664 does not match and is not based on the color temperature (or color or tone) of the environment represented in live preview 630 of FIG. 6M (e.g., the live preview 630 that was displayed when detecting tap gesture 650*k* was detected). Thus, at FIG. 6N, when device 600 is configured to capture low-light media using the rear-facing camera, device 600 does not display the first portion of animation 664 with a color temperature that is based on the color temperature of the environment (e.g., as opposed to the first portion of animation 660 illustrated in FIG. 6B and the first portion of animation 662 illustrated in FIG. 6G). In addition, when device 600 is configured to capture low-light media using the rear-facing camera, device 600 displays an animation that has a frame (and/or a first portion of the animation) that is darker than the environment represented by the live preview when capture of media was initiated as opposed to being brighter than the environment represented by the live preview when capture of media was initiated (e.g., as described above in relation to FIGS. 6A-6F).

As illustrated in FIGS. 6O-6Q, device 600 displays a second portion of animation 664 (e.g., illustrated in FIG. 6O), a third portion of animation 664 (e.g., as illustrated in FIG. 6N), and a fourth portion of animation 664 by brightening the animation (e.g., using one or more techniques described above in relation to displaying the second portion of animation 660 illustrated in FIG. 6C, third portion of animation 660 in FIG. 6D, and the fourth portion of animation 660 illustrated in FIG. 6D. However, in FIGS. 6O-6Q, visual information that is displayed in the second, third, and fourth portions of animation 664 gets visually lighter as opposed to getting visually darker, as shown in the second portion of animation 660 illustrated in FIG. 6C, the third portion of animation 660 illustrated in FIG. 6D, and the fourth portion of animation 660 illustrated in FIG. 6E. Sometime after the portion of animation 664 is displayed in FIG. 6N, the end of the capture duration (e.g., two-second capture duration, as shown by low-light mode indicator 602b in FIG. 6G) occurs.

As illustrated in FIG. 6R, when the end of the capture duration occurs (e.g., two-second capture duration), device 600 stops capture of the low-light media and re-displays live preview 630 (e.g., which is the same as preview 630 of FIG. 6M because device 600 is position at the same position in the environment). Device 600 also re-displays shutter control 610 as active. As illustrated in FIG. 6R, when the end of the capture duration occurs, device 600 updates media collection 612 with a new representation of media that is visually brighter than live preview 630 of FIG. 6M (e.g., before capture of the media was initiated). The new representation of media in FIG. 6R is a composite image that was generated using one or more of the images captured during the capture duration that was initiated in response to detecting tap gesture 650m.

Figure 6T:
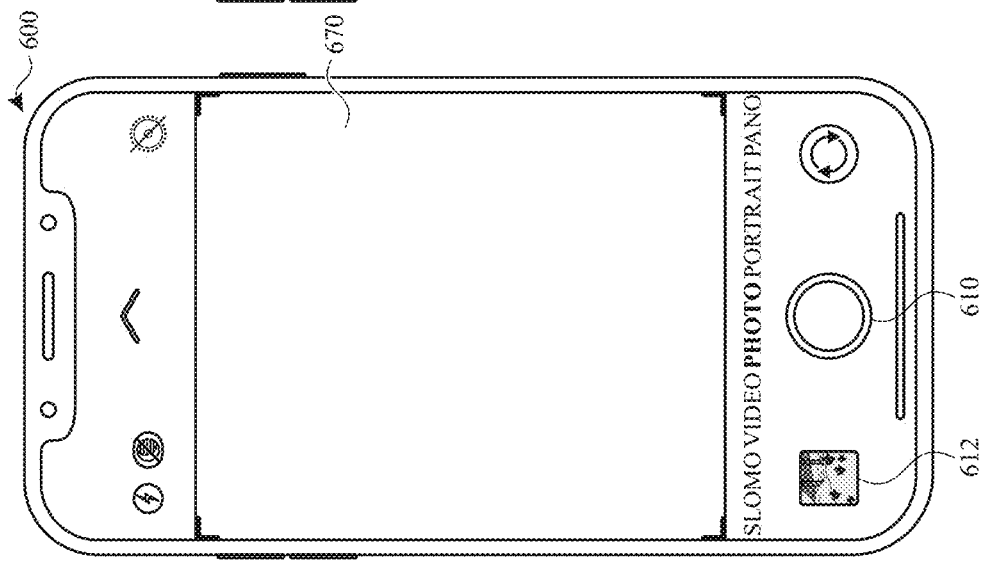
Figure 6S:
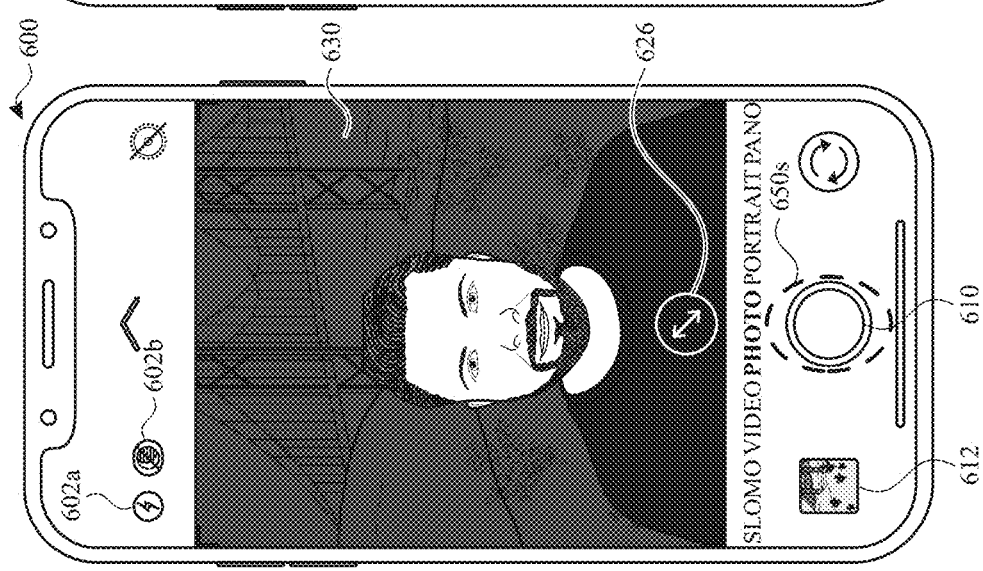

FIGS. 6S-6U illustrate an exemplary scenario where a user of device 600 is taking a selfie using a flash operation. As discussed below, the scenario illustrated in FIGS. 6S-6U involves device 600 displaying an image (e.g., non-evolving animation) that aids in capturing improved media while using a front-facing camera. At FIG. 6R, device 600 detects tap gesture 650r1 on flash indicator 602a and a tap gesture 650r2 on camera switcher control 614.

As illustrated in FIG. 6S, in response to detecting tap gesture 650r1 on flash indicator 602a, device 600 changes flash indicator 602a from being displayed in an inactive state (e.g., in 6P) to being displayed in an active state (e.g., in FIG. 6S). When changing the state of flash indicator 602a, device 600 also changes the state of low-light mode indication 602b, such that low-light indicator 602b is changed from being displayed in an active state to being displayed in an inactive state in response to detecting tap gesture 650r1 on flash indicator 602a. Device 600 changes flash indicator 602a to be displayed in an active state and low-light mode indicator 602b to being displayed in an inactive state in FIG. 6S because the flash indicator 602a and low-light mode indicator 602b are mutually exclusive. For example, the flash indicator 602a and low-light mode indicator 602b cannot be on at the same time on device 600. In other words, device 600 cannot be configured to capture low-light media while performing a flash operation in response to detecting a request to capture media (e.g., such as detecting gesture 650a). As illustrated in FIG. 6S, in response to detecting tap gesture 650r2 on camera switcher control 614, device 600 is configured to capture media using one or more front-facing cameras instead of one or more rear-facing cameras of device 600. At FIG. 6S, device 600 detects tap gesture 650s on shutter control 610.

As illustrated in FIG. 6T, in response to detecting tap gesture 650s, device 600 displays image 670 that is white to illuminate the environment and initiates capture of media. As illustrated in FIG. 6U, device 600 updates media collection 612 to include the media that was captured after capture was initiated in FIG. 6U. In some embodiments, the media captured in FIGS. 6S-6U is not a composite image like the various media captured in FIGS. 6A-6R. In some embodiments, image 670 is not displayed based on the color temperature of the environment in the field-of-view of the front-facing camera. In some embodiments, image 670 does not have the same tone as the surrounding environment (or a tone that varies with the surrounding environment (e.g., a consistent tone is used for image 670)). In some embodiments, one or more animations (e.g., that are described above in response to detecting tap gesture 650a, 650g, and/or 650m) are not displayed in response to detecting tap gesture 650s. In some embodiments, device 600 does not display an image that is a composite image while capturing the media in FIGS. 6S-6U (e.g., as opposed to the second portion of animation 660 described in relation to FIG. 6C). In some embodiments, image 670 does not change (or device 600 does not display) another image after tap gesture 650s is received and before the capture of media has ended. In some embodiments, image 670 is not displayed based on a capture duration, where the capture duration is based on the environment in which device 600 is positioned.

FIG. 7 is a flow diagram illustrating exemplary methods for capturing media using an electronic device (e.g., a computer system) in accordance with some embodiments. Method 700 is performed at a computer system (e.g., 100, 300, 500, 600). The computer system has one or more cameras (e.g., one or more cameras (e.g., dual cameras, triple camera, quad cameras, etc.) on the same side or different sides of the computer system (e.g., a front camera, a back camera))), where the computer system (e.g., 600) is in communication with a display generation component (e.g., a display controller, a touch-sensitive display system) and one or more input devices (e.g., a touch-sensitive surface).

Some operations in method 700 are, optionally, combined, the orders of some operations are, optionally, changed, and some operations are, optionally, omitted.

As described below, method 700 provides an intuitive way for capturing media. The method reduces the cognitive burden on a user for capturing media, thereby creating a more efficient human-machine interface. For battery-operated computing systems, enabling a user to capture improved media in low-light conditions faster and more efficiently conserves power and increases the time between battery charges.

The computer system displays (702), via the display generation component, a media capture user interface that includes a representation (e.g., 630 of FIGS. 6A, 6G) (e.g., a representation that updates over-time, a live preview feed of data from the camera) of a field-of-view of a first camera of the one or more cameras (e.g., an area that is visible to a camera (e.g., based on the size of a camera sensor, the shape of a camera lens, and/or a distance between the camera lens and the camera sensor)), where the representation (e.g., 630 of FIGS. 6A, 6G) of the field-of-view of the first camera of the one or more cameras has a first brightness level.

While displaying the media capture user interface that includes the representation of the first camera of the field-of-view of the one or more cameras at the first brightness level, the computer system receives (704), via the one or more input devices a request to capture media (e.g., via 650a, 650g) (e.g., a user input on a selectable user interface object that corresponds to a shutter button (e.g., 610) (e.g., a selectable user interface object that is displayed or physically connected to the computer system).

In response to (706) receiving the request to capture media the computer system initiates (708) capture, via the one or more cameras (e.g., via at least the first camera of the one or more cameras), of media (e.g., a composite image that is created from a plurality of images that are captured over a capture duration) over a capture duration (e.g., as indicated in 602b of FIG. 6A, 6G) (e.g., measured in time (e.g., total capture time; exposure time), number of pictures/frames). In some embodiments, the capture duration is set based on the amount of light in the field-of-view of the one or more cameras, where the capture duration is longer when the amount of light in the field-of-view of the one or more cameras is lower.

In response to (706) receiving the request to capture media and in accordance with a determination that a first set of criteria (e.g., criteria includes criterion that is satisfied when the computer system is configured to capture media, criterion that is satisfied when the computer system is configured to capture media while operating in a certain mode (e.g., a low-light mode), criteria is satisfied when the computer system is configured to capture media using a particular type of camera) is satisfied, the computer system displays (710), via the display generation component, an animation (e.g., 660, 662) that includes a sequence of images, the sequence of images including a first image (e.g., 660 of FIG. 6B, 662 of FIG. 6H) and a second image (e.g., 660 of FIGS. 6C-6E; 662 of FIGS. 6I-6K) that is different from the first image, where the first image (e.g., 660 of FIG. 6B, 662 of FIG. 6H) has a second brightness level (e.g., average brightness and/or the maximum brightness level of an image) that is greater than the first brightness level (e.g., the maximum brightness level of the representation of the field-of-view of the one or more cameras), and where the first (e.g., 660 of FIG. 6B, 662 of FIG. 6H) and second (e.g., 660 of FIGS. 6C-6E; 662 of FIGS. 6I-6K) images are displayed before capture of the media has ended. In some embodiments, displaying the first image occurs during a beginning portion of the animation. In some embodiments, a portion of the animation (e.g., first image) is displayed before capture of media is initiated and a second portion of the animation (e.g., second image) is displayed after capture of media is initiated. In some embodiments, the first image and the second image displayed after the capture duration has ended. In some embodiments, the animation evolves over time. In some embodiments, the animation is displayed at a first time after initiating (e.g., starting the capture of media, initializing one or more cameras, displaying or updating the media capture interface in response to receiving the request to capture media) capture, via the one or more cameras, of media over the capture duration. In some embodiments, the animation replaces the representation of the field-of-view of the first camera of the one or more cameras. In some embodiments, the animation is displayed at the same location that the representation of the field-of-view of the first camera of the one or more cameras was previously displayed. In some embodiments, the first image (and, in some embodiments, the second image) is modified to be brighter than the environment in and/or the representation of the field-of-view of the first camera of the one or more cameras and one or more objects (e.g., that are also included in the representation of the field-of-view of the first camera of the one or more cameras before the request to capture was received) in the field-of-view of the first camera of the one or more cameras is included in the first image (and, in some embodiments, the second image). In some embodiments, the first image (and, in some embodiments, the second image) does not include one or more objects that was included in the representation of the field-of-view of the first camera of the one or more cameras. In some embodiments, the first image (and, in some embodiments, the second image) is one or more solid colors and/or one or more gradients. In some embodiments, the first mode is a low-light camera mode. In some embodiments, the low-light camera mode is active when low-light conditions are met. In some embodiments, low-light conditions are met when the low-light conditions include a condition that is satisfied when ambient light in the field-of-view of the first camera of the one or more cameras is below a respective threshold (e.g., 20 lux) and/or is a between a respective range (e.g., between 20 lux-0 lux), when the user selects (e.g., turn on) a low-light status indicator (e.g., an indicator that indicates whether or not the computer system is operating in a low-light camera mode), when the user turns on and/or activates a setting that activates the low-light camera mode. Displaying an animation that includes a sequence of images where a first image has a brightness that is greater than the representation that was displayed before receiving the request to capture media provides the user with feedback about the current state of the capturing of media (e.g., including that the capture of media is ongoing, the amount of light being projected by the system to aid the capture of media, and/or the current state (e.g., brightness) of the media being captured), which enables a user to optimize the capture of media. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an animation that includes a sequence of images, where some of the images are brighter than the representation of the media before receiving the request to capture media, when prescribed conditions are met allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the second image (e.g., 660 of FIG. 6C-6E; 662 of FIG. 6I-6K) (or another image (e.g., a third image) in the sequence of images) (e.g., a composite image) is displayed while capturing the media. In some embodiments, the second image (e.g., 660 of FIG. 6C-6E; 662 of FIG. 6I-6K) (and/or the brightness of the second image) is generated based on combining a plurality of images that are captured after capture of media was initiated over the capture duration. In some embodiments, the first image (e.g., 660 of FIG. 6B, 662 of FIG. 6H) (and/or the brightness of the first image) is not based on combining images that are captured after capture of media was initiated over the capture duration. In some embodiments, the second image (e.g., or another image (e.g., a third image) in the sequences of images) is a composite image and the first image is not a composite image. In some embodiments, the second image (or another image in the sequence of images) is based on data recorded in the field-of-view of the one of more cameras after capture of media was initiated and the first image is based on data recorded in the field-of-view of the one or more cameras before capture of media was initiated. Displaying a second image that is generated based on combining images and a first image that is not based on combining images provides the user with feedback about the current state of the capture of media and allows the user to quickly identify an image (e.g., first image) that represents the amount of light beginning projected by the system to aid the capture of media and an image (e.g., second image) that represents the current state (e.g., brightness) of the media being captured at a particular instance in time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first image (e.g., 660 of FIG. 6B, 662 of FIG. 6H) has a first degree of variance in brightness of the image (e.g., variance measured as an average variation of brightness of sub-portions (e.g., quadrants, per pixel) of the image from a mean brightness of the image as a whole). In some embodiments, the second image (e.g., 660 of FIGS. 6C-6E; 662 of FIG. 6I-6K) has a second degree of variance in brightness of the image that is greater than the first degree of variance in brightness of the image. In some embodiments, the first image has a more consistent level of brightness (e.g., more homogenous brightness), across the image, than the second image. In some embodiments, the brightness of portions of the second image has a greater degree of correlation to the content in the field of view of the first camera than the brightness of portions of the first image, which is less correlated to the content of in the field of view of the first camera. In some embodiments, the brightness of the first image is substantially uniform (e.g., does not have a variation in brightness that is substantially correlated to content in the field of view of the first camera) whereas the brightness of the second image is not substantially uniform in brightness if the content in the field of view of the first camera is not uniformly luminous.

In some embodiments, the sequence of images includes a first set of one or more images (e.g., 660 of FIGS. 6B-6D; 662 of FIG. 6H-6J) that includes the first image (e.g., 660 of FIG. 6B, 662 of FIG. 6H) and a second set of one or more images (e.g., 660 of FIGS. 6C-6E; 662 of FIG. 6I-6K) that includes the second image (e.g., 660 of FIGS. 6C-6E; 662 of FIG. 6I-6K) and that are displayed after the first set of images. In some embodiments, the first set of one or more images (e.g., 660 of FIGS. 6B-6D; 662 of FIG. 6H-6J) have a third degree of variance in brightness of the image. In some embodiments, the second set of one or more images (e.g., 660 of FIGS. 6C-6E; 662 of FIG. 6I-6K) have a fourth degree of variance in brightness of the image that is greater than the third degree of variance in brightness of the image (e.g., the first set of images are closer in brightness than the second set of images are closer in brightness, the first set of images have less variable brightness (e.g., less of a change in brightness) than the second set of images). In some embodiments, the first set of images has a more consistent level of brightness (e.g., more homogenous brightness), across the image, than the second set of images. In some embodiments, the brightness of portions of the second set of images has a greater degree of correlation to the content in the field of view of the first camera than the brightness of portions of the first set of images, which is less correlated to the content of in the field of view of the first camera. In some embodiments, the brightness of the first set of images is substantially uniform (e.g., does not have a variation in brightness that is substantially correlated to content in the field of view of the first camera) whereas the brightness of the second set of images is not substantially uniform in brightness if the content in the field of view of the first camera is not uniformly luminous.

In some embodiments, the sequence of images includes a third set of one or more images (e.g., 660 of FIGS. 6C-6E; 662 of FIG. 6I-6K) (e.g., the second image and one or more images displayed after the second image is displayed). In some embodiments, the third set of one or more images includes visual information (e.g., 660 of FIGS. 6C-6E; 662 of FIG. 6I-6K) (e.g., a rough approximation of visual content (e.g., image data that has been captured) that has been captured, such as an appearance of an object/person that is in the field-of-view of the one or more cameras) that is representative of visual content (e.g., image data that has been captured) that has been captured by the one or more cameras (e.g., after capture of the media has been initiated) (e.g., in response to receiving the request to capture media). In some embodiments, the first image (and/or the second image) does not include visual information that is representative of visual content that has been captured by the one or more cameras. In some embodiments, the third set of images does not include the first image. In some embodiments, the third set of images include the second image. In some embodiments, the visual information has an appearance that has a variation based on the visual content in the field-of-view of the one or more cameras. In some embodiments, the third set of images does not include an image that has a consistent tone set by the visual content in the field-of-view of the one or more cameras. Displaying an animation that includes a set of images that have visual information that is representative of visual content that has been captured by the one or more cameras provides visual feedback about the current state of the capture of media and allows the user to quickly identify an image (e.g., second image) that represents the current state (e.g., brightness) of the media being captured at a particular instance in time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first image (e.g., 660 of FIG. 6B, 662 of FIG. 6H) has value (e.g., amount; specific value in a range of values) of a visual characteristic (e.g., a color, a color temperature) that is determined based on one or more environmental conditions (e.g., lighting conditions (e.g., the amount of light in an environment)) around a portion of the computer system (and/or in the field-of-view of one or more cameras of the computer system). Displaying a first image that is based on the one or more environmental conditions around the portion of the computer system improves the quality of the captured media and reduces the number of inputs that are needed to cause the computer system to capture media with the improved quality or to create the equivalent via post-capture editing. Reducing the number of inputs that are needed to complete an operation enhances the operability of the system and makes the user-system interface more efficient (e.g., by helping the user to provide proper inputs and reducing user mistakes when operating/ interacting with the system) which, additionally, reduces power usage and improves battery life of the system by enabling the user to use the system more quickly and efficiently. Displaying an animation that includes a first image that has an amount of a visual characteristic that is determined based on environmental characteristic provides visual feedback about the current state of the capture of media and allows the user to quickly identify an image (e.g., first image) that represents the characteristic of the light that is being projected by the system to aid the capture of media at a particular instance in time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first image (e.g., 660 of FIG. 6B, 662 of FIG. 6H) has a first amount (e.g., an amount of one or more colors (e.g., grey, black white), an amount of tint and/or shade) of a visual characteristic (e.g., tone (e.g., of a color)). In some embodiments, the second image (e.g., 660 of FIGS. 6C-6E; 662 of FIG. 6I-6K) has a second amount (e.g., an amount of one or more colors (e.g., grey, black, white), an amount of tint and/or shade) of the visual characteristic (e.g., a tone (e.g., of a color) that is different from the first amount of the visual characteristic. In some embodiments, the first image has a different color tone than the second image. In some embodiments, the first image is a different color than the second image. In some embodiments, the first image is brighter than the second image. In some embodiments, the second image is tinted more than the first image. Displaying an animation that includes a first image that has an amount of a visual characteristic and a second image that has a different amount of a visual characteristic improves the quality of the captured media and reduces the number of inputs that are needed to cause the computer system to capture media with the improved quality or to create the equivalent via post-capture editing. Reducing the number of inputs that are needed to complete an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an animation that includes a first image that has an amount of a visual characteristic and a second image that has a different amount of a visual characteristic provides visual feedback about the current state of the capture of media and allows the user to quickly identify an image (e.g., first image) that represents the characteristic of the light that is being projected by the system to aid the capture of media at a particular instance in time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments a duration (e.g., as indicated in 602b of FIGS. 6A, 6G) of the animation (e.g., 660, 662) is based on one or more environmental conditions (e.g., lighting conditions (e.g., the amount of light in an environment)) around a portion of the computer system (e.g., 600) (and/or in the field-of-view of one or more cameras of the computer system). In some embodiments, the capture duration is based on the one or more environmental conditions (e.g., lighting conditions (e.g., the amount of light in an environment)) around the portion of the computer system (and/or in the field-of-view of one or more cameras of the computer system). In some embodiments, the duration of animation is longer than the capture duration. In some embodiments, when capture of the media happens over a longer capture duration (or a longer duration of the animation), more images are captured. In some embodiments, the images are combined into a composite image, where the composite image is the media. In some embodiments, when the light detected in the field-of-view of one or more cameras of the computer system is lower, the duration of the animation (and the capture duration) is higher. Displaying an animation that has a duration that is set based on one or more environmental conditions improves the quality of the captured media and reduces the number of inputs that are needed to cause the computer system to capture media with the improved quality or to create the equivalent via post-capture editing. Reducing the number of inputs that are needed to complete an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an animation that has a duration that is set based on one or more environmental conditions allows a user to quickly recognize state of a media capture without requiring additional user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the capture duration is set to a first capture duration (e.g., as indicated in 602b of FIGS. 6A, 6G). In some embodiments, a duration of the animation is based on receiving user input (e.g., a swipe input on a control for setting the capture duration) to change the capture duration from being set to a first capture duration (e.g., a duration in the range of 1-10 seconds; 5 seconds) to being set to the second capture duration, different than the first capture duration (e.g., a duration in the range of 1-10 seconds; 7 seconds). Displaying an animation that is based on receiving user input to change the captured duration of the capture of media improves the quality of the captured media and reduces the number of inputs that are needed to cause the computer system to capture media with the improved quality or to create the equivalent via post-capture editing. Reducing the number of inputs that are needed to complete an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an animation that is based on receiving user input to change the captured duration of the capture of media provides the user with a control for adjusting how the animation is displayed and how media is captured. Providing the user additional control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of criteria includes a criterion that is satisfied when a determination is made that the computer system (e.g., 600) is operating in a low-light mode (e.g., as indicated in 602*b* of FIGS. 6A-6L) (e.g., a mode that can be activated when the ambient light in the field-of-view of one or more cameras of the computer system is below a threshold (e.g., 20 lux), a mode that can be activated when a flash mode is not activated). Displaying an animation that includes a sequence of images, where some of the images are brighter than the representation of the media before receiving the request to capture media, when a determination is made that the computer system is operating in a low-light mode improves the quality of the captured media that is taken in low-light conditions and reduces the number of inputs that are needed to cause the computer system to capture media with the improved quality when taken in low-light conditions. Reducing the number of inputs that are needed to complete an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an animation that includes a sequence of images, where some of the images are brighter than the representation of the media before receiving the request to capture media, when a determination is made that the computer system is operating in a low-light mode allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the first set of criteria includes a criterion that is satisfied when the first camera is a first type (e.g., a front-facing camera) of camera (and the computer system is configured to capture media using the first camera in response to detecting a request (e.g., tap on a user interface for capturing media (e.g., a shutter button) to capture media). In some embodiments, the animation (e.g., that includes the sequence of images including a first image and a second image that is different from the first image, where the first image has a second brightness level that is greater than the first brightness level) does not occur when a second camera (e.g., a back-facing camera), different than the first camera, is used. Displaying an animation that includes a sequence of images, where some of the images are brighter than the representation of the media before receiving the request to capture media, when the first camera is a first type of camera allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in response to (706) receiving the request to capture media and in accordance with a determination that a second set of criteria is satisfied the computer system displays (712), via a display generation component, a second animation, different than the animation (e.g., 664). In some embodiments, the second set of criteria includes a criterion that is satisfied when the first camera is a second type of camera (e.g., a rear-facing camera) that is different from the first type of camera (e.g., a front-facing camera) (and the computer system is configured to capture media using the first camera in response to detecting a request (e.g., tap on a user interface for capturing media (e.g., a shutter button) to capture media). In some embodiments, the second animation (e.g., 664) includes a sequence of images including a third image (e.g., 664 of FIG. 6N) (e.g., an initial image of the animation) that has a level of brightness that is lesser than (e.g., darker than) the first brightness level. In some embodiments, the second set of criteria includes a criterion that is satisfied when the computer system is operating in a low-light mode. Displaying a second animation that includes a sequence of images, where some of the images are darker than the representation of the media before receiving the request to capture media, when prescribed conditions are met allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in response to (706) receiving the request to capture media and in accordance with a determination that a third set of criteria is satisfied the computer system foregoes display of the animation (e.g., 660, 662) that includes the sequence of images. In some embodiments, the third set of criteria includes a criterion that is satisfied when the computer system (e.g., 600) is not operating in a low-light mode. In some embodiments, in accordance with a determination that a third set of criteria is satisfied, the computer system forgoes to display an evolving animation (e.g., an animation that includes a sequence of images). In some embodiments, the third set of criteria includes a criterion that is satisfied when the first set of criteria is not satisfied. In some embodiments, the third set of criterion that is satisfied when a determination is made that the computer system is configured to capture media with a first camera (e.g., a front-facing camera). Forgoing display of the animation that includes the sequence of images when prescribed conditions are met allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in response to receiving the request to capture media and in accordance with the determination that the third set of criteria is satisfied (and the computer system is configured to capture media using the first camera in response to detecting a request (e.g., tap on a user interface for capturing media (e.g., a shutter button)) to capture media), the computer system displays (716) a fourth image (e.g., 670) (e.g., a non-animated, non-evolving single image that is replaced with a representation of the captured media) without displaying an animation (e.g., 660, 662, 664) that includes a sequence of images. In some embodiments, in accordance with the determination that the third set of criteria is satisfied, forgoing display of an evolving animation. Displaying an image without displaying an animation that includes a sequence of images when prescribed conditions are met allows a user to quickly recognize the type of media being captured without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to receiving the request to capture media, the first image (e.g., 6B, 6H) is displayed before initiating capture of media over the capture duration (e.g., an image that is brighter than the representation of the first camera of the field-of-view of the one or more cameras is displayed before the capture of media is initiated (e.g., before image data from the first camera is captured for storage as media)). Displaying an animation that includes the first image before initiating capture of media provides visual feedback about the current state of the capture of media and allows the user to quickly identify an image (e.g., first image) that represents the characteristic of the light that is being projected by the system to aid the capture of media at a particular instance in time. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

Note that details of the processes described above with respect to method 700 (e.g., FIG. 7) are also applicable in an analogous manner to the methods described below. For example, methods 900, 1100, 1300, and 1400 optionally include one or more of the characteristics of the various methods described above with reference to method 700. For example, method 700 described above may be used to capture low-light media that can be adjusted using the methods described below with respect to method 1100. For brevity, these details are not repeated below.

FIGS. 8A-8E illustrate exemplary user interfaces for displaying camera controls and indicators using an electronic device (e.g., a computer system) in accordance with some embodiments. The user interfaces in these figures are used to illustrate the processes described below, including the processes in FIG. 9.

FIG. 8A illustrates electronic device 600 display a camera user interface, which includes live preview 630. Live preview 630 shows a particular scene (e.g., the sky with clouds) that is in the field-of-view of one or more cameras 600. Live preview 630 is a representation of a (e.g., partial) field-of-view of one or more cameras of device 600 ("the FOV"). Live preview 630 is based on images detected in the FOV. In some embodiments, device 600 captures images using a plurality of camera sensors and combines them to display live preview 630. In some embodiments, device 600 captures images using a single camera sensor to display live preview 630.

The camera user interface of FIG. 8A includes indicator region 602 and control region 606. Indicator region 602 and control 606 are displayed above and below, respectively, live preview 630, such that indicators and controls can be displayed concurrently with live preview 630. Camera display region 604 is between indicator region 602 and control region 606 and is substantially not overlaid with indicators or controls.

As illustrated in FIG. 8A, indicator region 602 includes indicators, such as flash indicator 602a, high-dynamic-range ("HDR") indicator 602e, animated image capture indicator 602d, timer indicator 602f, and filter indicator 602g.

Flash indicator 602a indicates the state of a flash operation in which device 600 is currently configured to operate in when a request to capture media is received. At FIG. 8A, flash indicator 602a indicates that the flash operation is set to inactive. However, in some embodiments, flash indicator 602a can indicate that the flash operation is active or in another mode (e.g., automatic mode). In response to detecting a selection of flash indicator 602a, device 600 switches the state of the flash operation. HDR indicator 602e indicates whether an HDR (high dynamic range) media capture mode is active or inactive. At FIG. 8A, HDR indicator 602e indicates that the HDR media capture mode is inactive, which indicates that device 600 is not configured to capture HDR media (e.g., or is configured to capture non-HDR media). In some embodiments, when HDR indicator 602e indicates that the HDR mode is active, device 600 is configured to capture HDR media. In response to detecting selection of HDR indicator 602e, device 600 changes the state (e.g., inactive or active state) of the HDR capture mode. Animated image capture indicator 602d indicates whether the camera is configured to capture media that includes a single image or a composite image (e.g., such as the media captured in FIG. 10D-10E) or a plurality of images (e.g., such as the media captured and described above in relation to FIGS. 10A-10B) in response to detecting a request to capture media. Timer indicator 602f, when selected, causes device 600 to display one or more controls for setting a time delay before device 600 captures media in response to receiving a request to capture media is received (e.g., detecting an input on a shutter control). Filter indicator 602g, when selected, causes device 600 to displays one or more controls for setting and/or changing a filter (e.g., black and white filter) that is applied to captured media.

As illustrated in FIG. 8A, camera display region 604 includes a portion of live preview 630 and zoom control 822, which indicates that live preview 630 is being displayed at a 1× zoom level.

As illustrated in FIG. 8A, control region 606 includes shutter control 610, camera switcher control 614, a representation of media collection 612, and camera mode controls 620. Shutter control 610, when activated, causes device 600 to capture media, using the one or more camera sensors, based on the current state of live preview 630 and the current state (e.g., current mode in which the camera application is configured in) of the camera application. The captured media is stored locally at electronic device 600 and/or transmitted to a remote server for storage. Camera switcher control 614, when activated, causes device 600 to switch to showing the FOV of a different camera(s) in live preview 630, such as by switching between a rear-facing camera sensor and a front-facing camera sensor. The representation of media collection 612 illustrated in FIG. 8A is a representation of media (an image, a video) that was most recently captured by device 600. As illustrated in FIG. 8A, camera mode controls 620 indicates which camera mode is currently selected and enables the user to change the camera mode. In FIG. 8A, camera mode controls 620 are displayed, and photo camera mode 620c is indicated as being the current mode (e.g., a photo camera mode) in which the camera is operating by the bolding of the text and being in the center of control region 606. In response to detecting a request to capture media (e.g., detecting a selection of and/or activating shutter control 610), device 600 captures media of a type (e.g., photo media, video media) that is consistent with the current mode in which device 600 is operating (e.g., photo camera mode, video camera mode).

In FIG. 8A, the scene in live preview 630 is a bright scene (e.g., daytime sky) and has various level of white that appear in the objects of the scene. The scene is comprised of a sky with a sun and clouds. Device 600 displays the sun in live preview 630 brighter (e.g., has a higher level of luminance) than the clouds in live preview 630 and displays the clouds in live preview 630 brighter than the sky in live preview 630. Thus, the sun is displayed using a higher amount of white than the clouds and the sky, respectively. While device 600 displays the sun in live preview 630 with a higher amount of white than the other elements of the scene in live preview 630, device 600 displays the indicators (e.g., 602a, 602e, 602d, 602f, 602g) and controls (e.g., 822, 612, 610, 614) displayed in the user interface with a higher amount of white than the amount of white in which the sun is displayed. Thus, as illustrated in FIG. 8A, the indicators and controls of FIG. 8A are visually brighter than (and therefore distinguishable from) the brightness element (e.g., the sun) of live preview 630. For example, in FIG. 8A, zoom control 822 is bright enough to be distinguished from the sun (e.g., the brightness element of live preview 630) although both the zoom control 822 and the sun includes high levels of white.

As illustrated in FIG. 8A, device 600 is not configured to capture HDR media (e.g., as indicated by HDR indicator 602e). When device 600 is not configured to capture HDR media, device 600 captures non-HDR media via the one or more cameras (and/or camera sensors) of device 600, which has a lower maximum luminance or maximum intensity of one or more pixels and a narrower color gamut than HDR media. In some embodiments, the color for non-HDR media is expressed using 8-bits of data while the color for HDR media is expressed using 10-bits and/or 12-bits of data. Thus, device 600 displays the camera user interface based on the narrower color gamut (e.g., color represented by 8-bits of data) and lower maximum luminance of the non-HDR content (e.g., data) being detected by the one or more cameras of device 600. In other words, device 600 generates live preview 630 based on the narrower color gamut of the non-HDR media and displays the indicator and controls of the camera user interface with the maximum level of white represented in the narrower color gamut of the non-HDR media, such that the indicators and controls are visually brighter (or have a higher level of white) than the elements displayed in live preview 630. In some embodiments, the indicator and controls of the camera user interface are displayed at a white level that is near the maximum level of white represented in the narrower color gamut of the non-HDR media. At FIG. 8B, device 600 detects rightward swipe gesture 850a on camera display region 604.

As illustrated in FIG. 8B, in response to detecting rightward swipe gesture 850a, device 600 is configured to operate in a video capturing mode instead of operating in a photo capturing mode. As illustrated in FIG. 8B, in response to detecting rightward swipe gesture, device 600 indicates that it is operating in the video capture mode by shifting camera mode controls to the right, such that the video mode control is displayed in the center of control region 606 and "Video" is bolded to show that video mode control is selected. In FIG. 8B, photo capture mode control 602c is not bolded to indicate that device 600 is not operating in the photo capture mode. As illustrated in FIG. 8B, in rightward swipe gesture 850a, device 600 ceases to display some of the indicators and controls of FIG. 8A (e.g., 602e, 60d, 602f, 602g), displays one or more new indicators and controls that were not displayed in FIG. 8A (e.g., video time indicator 602h), and continues to display some of the indicators and controls of FIG. 8A in FIG. 8B (e.g., flash indicator 602a, shutter control 610, camera switcher control 614, camera mode controls 620).

At FIG. 8B, in response to detecting rightward swipe gesture 850a, device 600 changes from being configured to capture non-HDR media to being configured to capture HDR media. In other words, device 600 automatically is configured to capture HDR media when it is switched to video mode in the embodiment illustrated in FIG. 8B. Because device 600 is configured to capture HDR instead of non-HDR, one or more cameras (sensors) of device 600 detects HDR media and generates live preview 630 based on the wider color gamut (e.g., 10-bits, 12-bits of data) of the HDR media. Thus, in FIG. 8B, the elements (e.g., sky, sun, clouds) of live preview are visually brighter than each were in FIG. 8A because the level of white of each element can more accurately be represented using the wider color gamut than when the narrower color gamut is used.

Moreover, device 600 also displays the indicators and controls of the camera user interface of FIG. 8B at the maximum level of the wider color gamut, so the indicators and controls of the camera user interface are displayed with one or more higher levels of white in FIG. 8B than the one or more white levels that each of the indicators and controls were displayed in FIG. 8A. In other words, when looking at FIGS. 8A-8B, device 600 displays the indicators and controls of the camera user interface at the same level (e.g., maximum level) of each respective color gamut (e.g., narrower color gamut of non-HDR media, wider color gamut of HDR media). However, the indicators and controls of the camera user interface have an increased level of white when displayed at the respective level on the wider color gamut (e.g., in FIG. 8B) than when displayed at the respective level on the narrow color gamut because more values of white can be represented by the wider color gamut.

Notably, when looking at FIGS. 8A-8B, the level of white of the indicators and controls of the camera user interface of FIG. 8A is less than the level of white of the brightness element (e.g., "the sun") (or the element with the highest level of white) that is represented in live preview 630 of FIG. 8B. Thus, if the level of white of the indicators and controls did not change when switching from the capture of non-HDR media to the capture of HDR media (e.g., switching from photo mode to video mode), the indicators and controls of the camera user interface would be less white than the brightness element (e.g., the sun) or some of the brighter elements of live preview 630 and not appear to be displayed on the camera user interface. At FIG. 8B, device 600 detects tap gesture 850b on (e.g., at a location corresponding to) shutter control 610.

As illustrated in FIG. 8C, in response to detecting tap gesture 850b, device 600 initiates the capture of video media while maintaining the white level of the indicators and controls of the camera user interface. As illustrated in FIG. 8C, device 600 dynamically changes time remaining indicator 602h from "00:00:00" to "00:01:01" while maintaining the white level of time remaining indicator 602h. Thus, some of the indicators and controls can change when it is displayed in the wider color gamut. As illustrated in FIG. 8C, device 600 also replaces shutter control 610 with stop control 616, where stop control 616 is displayed with the same white level as shutter control 610 was displayed in FIG. 8B. Thus, some newly displayed indicators are displayed with the same white level as previously displayed indicators (e.g., when the new displayed indicators are displayed at the same location in which the previously displayed indicators were displayed in). At FIG. 8C, device detects tap gesture 850c1 on stop control 616 and detects swipe gesture 850c2 on camera display region 604.

At FIG. 8D, in response to detecting tap gesture 850c1 on stop control 616, device 600 stops the capture of media (e.g., video media). As illustrated in FIG. 8D, in response to detecting swipe gesture 850c2 on camera display region 604, device 600 moves camera modes 620 to the left and re-displays photo mode control 620b as being selected (e.g., bolded and centered). As illustrated in FIG. 8D, device 600 re-displays live preview 630 and the indicators and controls of the camera user interface based on the narrower color gamut (e.g., because device 600 is detecting non-HDR media while being configured to capture media in the photo capture mode), using one or more techniques as described above in relation to display of live preview 630 and the indicators and controls of the camera user interface of FIG. 8A. At FIG. 8D, device 600 detects a tap gesture 850d on HDR controls 602e.

Figure 8E:
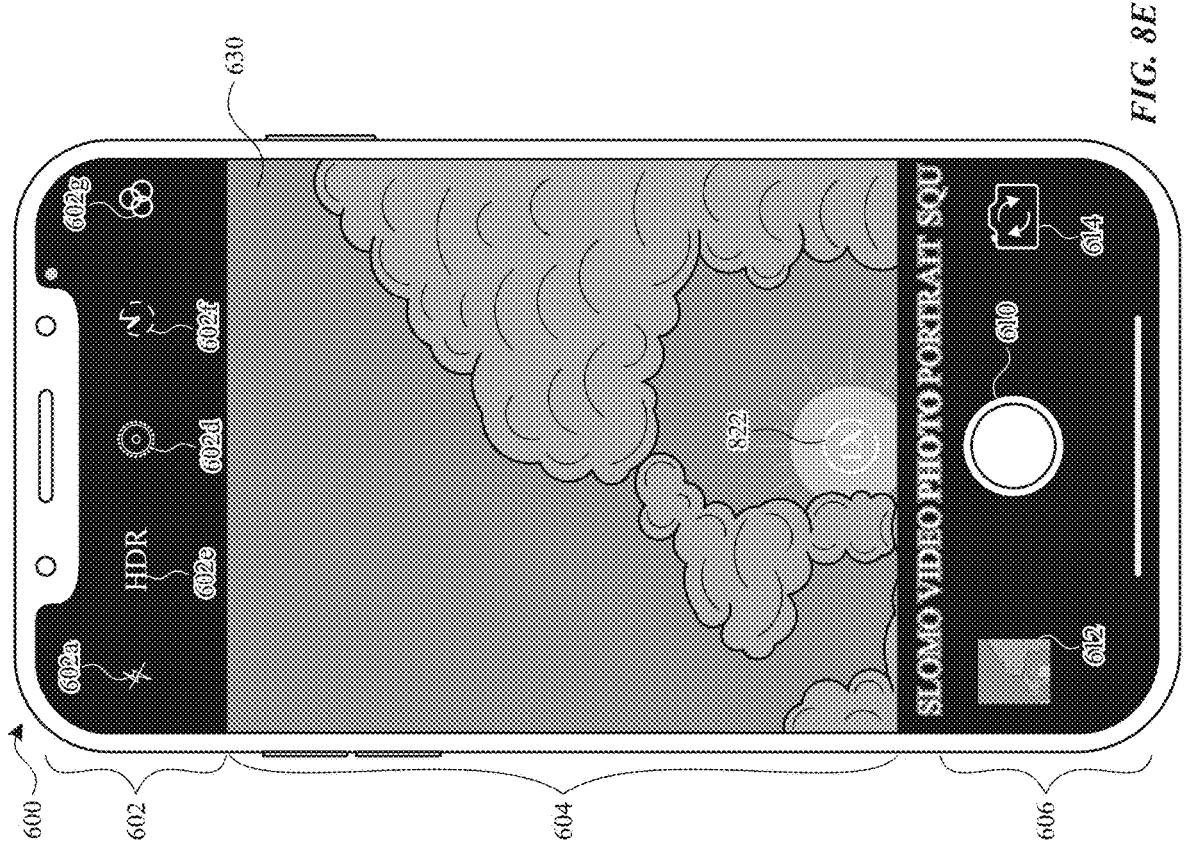
Figure 9:
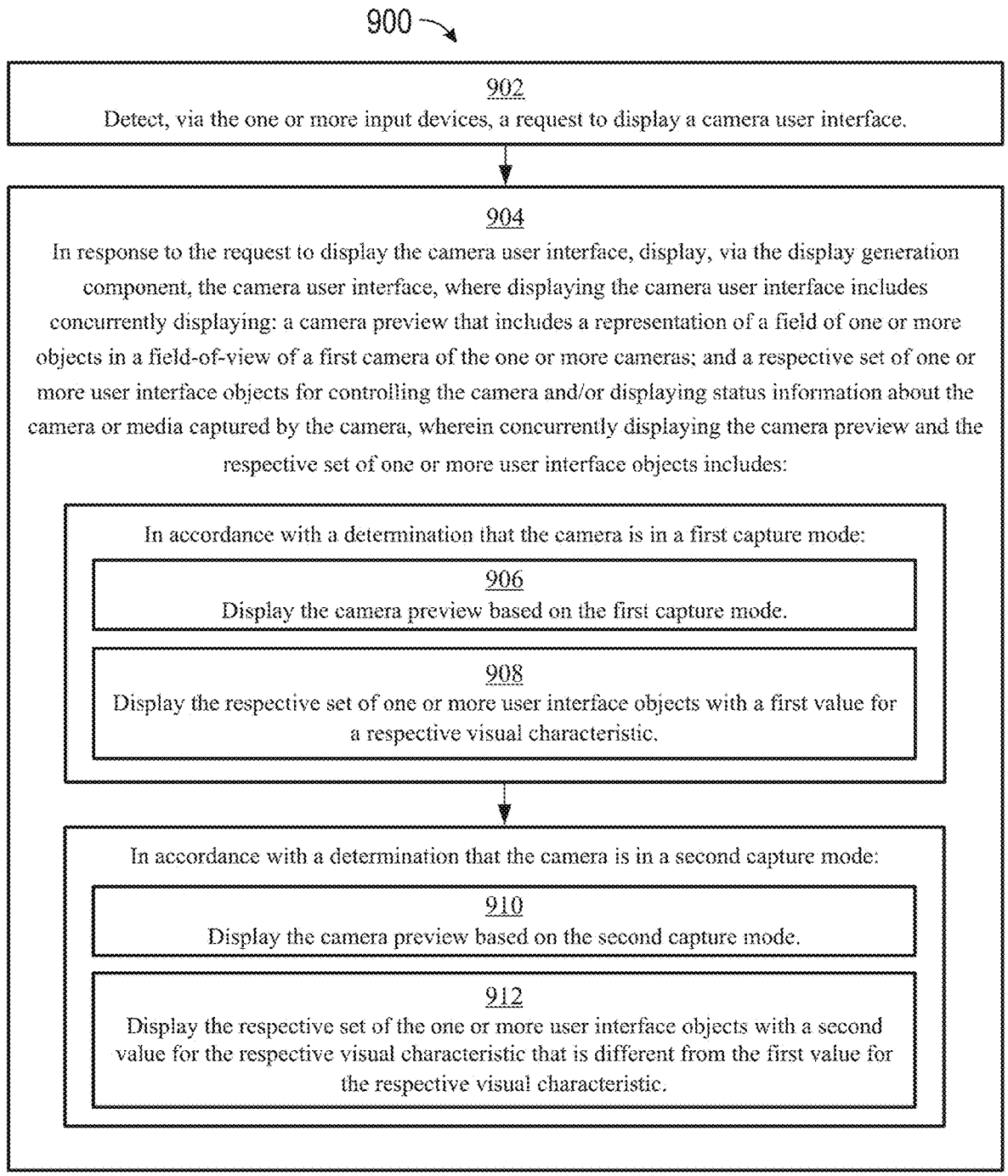
FIG. 9 is a flow diagram illustrating exemplary methods for displaying camera controls and indicators using an electronic device in accordance with some embodiments.

At FIG. 8E, in response to detecting tap gesture 850d, device 600 is configured to capture HDR media. Thus, because device 600 is configured to capture HDR media, device 600 displays live preview 630 and the indicators and controls of the camera user interface of FIG. 8E based on the wider color gamut, using one or more techniques as described above in relation to display of live preview 630 and the indicators and controls of the camera user interface of FIG. 8B. Thus, when device 600 is configured to capture HDR media in a different mode than the video capture mode, device 600 updates the display of live preview 630 and the indicators and controls of the camera user interface based on the wider color gamut.

FIG. 9 is a flow diagram illustrating exemplary methods for displaying camera controls and indicators in accordance with some embodiments. Method 900 is performed at a computer system (e.g., 100, 300, 500, 600). The computer has one or more cameras (e.g., one or more cameras (e.g., dual cameras, triple camera, quad cameras, etc.) on the same side or different sides of the computer system (e.g., a front camera, a back camera))), where the computer system (e.g., 600) is in communication with a display generation component (e.g., a display controller, a touch-sensitive display system) and one or more input devices (e.g., a touch-sensitive surface).

Some operations in method 900 are, optionally, combined, the orders of some operations are, optionally, changed, and some operations are, optionally, omitted.

As described below, method 900 provides an intuitive way for displaying camera controls and indicators. The method reduces the cognitive burden on a user for displaying camera controls and indicators, thereby creating a more efficient human-machine interface. For battery-operated computing systems, enabling a user to distinguish between user interface elements faster and more efficiently conserves power and increases the time between battery charges.

The computer system detects, via the one or more input devices, a request (e.g., 850a, 850d) to display a camera user interface (e.g., a request to open a camera application or a request, while already displaying the camera user interface, to switch from one camera capture mode to another camera capture mode, such as from a still capture mode to a video capture mode or a panorama capture mode, or a request to change a camera capture mode from an HDR capture mode to a non-HDR capture mode or switch from a non-HDR capture mode to an HDR capture mode).

In response to the request (e.g., 850a, 850d) (and/or in response to detecting the request) to display the camera user interface, the computer system displays (904), via the display generation component, the camera user interface.

As a part of displaying the camera user interface, the computer system displays a camera preview (e.g., 630) that includes a representation (e.g., a representation that updates over-time, a live preview feed of data from the camera) of a field of one or more objects in a field-of-view of a first camera of the one or more cameras (e.g., an area that is visible to a camera (e.g., based on the size of a camera sensor, the shape of a camera lens, and/or a distance between the camera lens and the camera sensor)).

As a part of displaying the camera user interface, the computer system displays a respective set of one or more user interface objects (e.g., 602a-602h, 610, 614, 822) for controlling the camera and/or displaying status information about the camera or media captured by the camera (e.g., one or more selectable user interface objects) (e.g., user interface objects that, when selected, causes the electronic device to perform one or more functions (e.g., a shutter button (e.g., a media capture selectable user interface object) and/or portion of a shutter button (e.g., ring around shutter button)), a user interface object for controlling the zoom level of the representation of the field-of-view of the one or more cameras (and/or that causes one or more cameras to initiate capture of (or stop capturing) media that makes up the representation of the field-of-view of the one or more cameras), a timestamp (e.g., a timestamp that animates over a duration of time).

As a part of displaying the camera preview and the respective set of one or more user interface objects and in accordance with a determination that the camera is in a first capture mode (e.g., a mode that captures media according to a first type of a format (e.g., media that is not high-dynamic-range (HDR) media)), the computer system displays (904) the camera preview (e.g., 630 in FIG. 8A) (e.g., with one or more visual properties) based on the first capture mode (e.g., displaying an indication (e.g., textual indication) that corresponds to the camera being in the first mode) and the computer system displays (906) the respective set of one or more user interface objects (e.g., 602a, 602c, 602f, 602g, 610, 614, 822 in FIG. 8A) with a first value for a respective visual characteristic (e.g., a color (e.g., white amount), a brightness, a luminance and/or a luminosity value). In some embodiments, when the camera is in the first capture mode the computer system is configured to capture media using (and/or operate in) the first capture mode. In some embodiments, the computer system is configured to capture media using the first capture mode when the computer system is not in an HDR media capture mode (e.g., a mode where the one or more cameras of the computer system will not capture an HDR media item in response to receiving a request to capture media (e.g., a tap on a shutter control (e.g., 610))).

As a part of concurrently displaying the camera preview and the respective set of one or more user interface objects and in accordance with a determination that the camera is in a second capture mode (e.g., a mode that captures media according to a second type of a format (e.g., media that is HDR media)) (e.g., a second capture mode that is different from the first capture mode), the computer system displays (908) the camera preview (e.g., 630 in FIG. 8B) (e.g., with one or more visual properties) based on the second capture mode (e.g., the computer system displays d an indication (e.g., textual indication) that corresponds to the camera being in the second mode, where the indication that corresponds to the camera being in the second mode is different from the indication that corresponds to the camera being in the first camera mode) and the computer system displays (910) the respective set of the one or more user interface objects (e.g., 602a, 602h, 610, 614, 822 in FIG. 8B) with a second value for the respective visual characteristic (e.g., a color (e.g., white amount), a brightness, a luminance and/or a luminosity value) that is different from (e.g., greater than) the first value for the respective visual characteristic. In some embodiments, when the camera is in the second capture mode the computer system is configured to capture media using (and/or operate in) the second capture mode. In some embodiments, the computer system is configured to capture media using the second capture mode when the computer system is configured to operate in a second media capture mode (e.g., a high-dynamic-range (HDR) mode, a mode where the computer system will capture an HDR media item in response to receiving a request to capture media (e.g., a tap on a shutter control (e.g., 610))). In some embodiments, the media captured using the first capture mode is a non-HDR image while the media captured (or configured to be captured) using the second capture mode is an HDR image. In some embodiments, the media captured (or configured to be captured) using the first capture mode is a non-HDR video image and the media captured (or configured to be captured) using the second capture mode is an HDR video. In some embodiments, the respective visual characteristic displayed with the first value is mapped to the same ordinal amount (e.g., first, second, third, or fourth most white (or brightness) color) or ordinal range (e.g., first, second, third, or fourth range of a color (e.g., white)) on a first color spectrum (e.g., a color spectrum used when the computer system is not operating in the HDR mode) as the respective visual characteristic displayed with the second value is mapped to on a second color spectrum (a color spectrum used when the computer system is operating in the HDR mode). In some embodiments, the second color spectrum has more values (e.g., 10 bits of value) than the values (8-bits of values) of the first color spectrum such that the one or more user interfaces objects displayed using the first color spectrum is visually different (e.g., has an increased amount of the respective visual characteristic) from the one or more user interface objects displayed using the second color spectrum. Displaying one or more user interface objects with different values of a visual characteristic in accordance with a determination that the camera is in a particular camera mode (e.g., a first capture mode or a second mode) allows a user to quickly recognize the one or more user interface objects while the camera preview is displayed based on the respective camera mode without requiring additional user input. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the camera preview (e.g., 630 in FIG. 8A) based on the first capture mode (e.g., indicated by 620a) and displaying the respective set of the one or more user interface objects (e.g., 602a, 602c, 602f, 602g, 610, 614, 822 in FIG. 8A) with the first value for the respective visual characteristic, the computer system detects (912) a request (e.g., 850a) (and while the computer system is configured to capture media (e.g., audio, video, still images, animated images) using a first capture mode) (e.g., a single input (e.g., a swipe input that is received via one or more inputs devices of the computer system) to change from a photo mode to video mode, a request (e.g., a tap on a zoom control or a swipe on a zoom wheel for changing the zoom level at which media will be captured by the computer system) that causes the device from being currently configured to capture media via a certain type of camera) to configure the camera to be in the second camera mode (e.g., indicated by 620b) (and/or configures the computer system to capture media using the second capture mode (e.g., a mode that captures media according to a second type of a format (e.g., media that is HDR media)). In some embodiments, in response to the request to configure the camera to be in the second camera mode (e.g., indicated by 620b), the computer system displays (914) the camera preview (e.g., 630 in FIG. 8B) based on the second capture mode (e.g., indicated by 620b) and the computer system displays (916) the respective set of the one or more user interface objects (e.g., 602a, 602h, 610, 614, 822 in FIG. 8B) with the second value for the respective visual characteristic. In some embodiments, in response to the request to configure the camera to be in the second camera mode, the computer system configures the camera to be in the second mode and/or the computer system is configured to capture media using the second capture mode (e.g., transitioned from a first media capture mode to a second media capture mode, transitioning from capturing media in one format (e.g., non-HDR) to another format (e.g., HDR)). In some embodiments, while the computer system displays the camera preview based on the second capture mode and the computer system displays the respective set of the one or more user interface objects with the second value for the respective visual characteristic, the computer system detects a request (and while the computer system is configured to capture media (e.g., audio, video, still images, animated images) using a first capture mode) (e.g., a single input (e.g., a swipe input that is received via one or more inputs devices of the computer system) to change from a photo mode to video mode, a request (e.g., a tap on a zoom control (e.g., 822, 622) or a swipe on a zoom wheel for changing the zoom level at which media will be captured by the computer system) that causes the device from being currently configured to capture media via a certain type of camera to configure the camera to be in the first camera mode (and/or configured the computer system to capture media using the second capture mode (e.g., a mode that captures media according to a second type of a format (e.g., media that is HDR media)). In some embodiments, in response to the request to configure the camera to be in the first camera mode, the computer system displays the camera preview based on the first capture mode and the computer system displays the respective set of the one or more user interface objects with the first value for the respective visual characteristic. In some embodiments, in response to the request to configure the camera to be in the first camera mode, the computer system configures the camera to be in the first mode and/or the computer system is configured to capture media using the first capture mode (e.g., transitioned from a second media capture mode to a first media capture mode, transitioning from capturing media in one format (e.g., HDR) to another format (e.g., HDR)). Displaying one or more user interface objects with a different value of a visual characteristic in response to the request to configure the camera to be in the second camera mode provides the user with visual feedback while the user interface is in the second mode and allows a user to quickly recognize the user interface objects and the camera mode in which the camera is operating while the camera preview is displayed. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to the request to configure the camera to be in the second camera mode (e.g., a response to a request to switch the camera from being configured to be in the first camera mode to being configured to be in the second camera mode) and as a part of displaying the respective set of the one or more user interface objects (e.g., 602*a*, 602*c*, 602*f*, 602*g*, 610, 614, 822 in FIG. 8A) with the second value for the respective visual characteristic (e.g., a color (e.g., white amount), a brightness, a luminance and/or a luminosity value) the computer system displays an animation that gradually changes the or more user interface objects from a second set of values for the respective visual characteristic to the second value for the respective visual characteristic. In some embodiments, the second set of values for the respective visual characteristic includes the first value for the respective visual characteristic. In some embodiments, the animation that gradually changes the one or more user interface objects from the second set of values for the respective visual characteristic to the second value for the respective visual characteristic is a fade-in animation, where the one or more user interface objects are less visible when displayed at one or more of the second set of values than when the one or more user interface objects are displayed at the second value for the respective visual characteristic. In some embodiments, in response to the request to configure the camera to be in the first camera mode (e.g., a response to a request to switch the camera from being configured to being configured to be in the second camera mode to be in the first camera mode), the computer system displays the respective set of the one or more user interface objects with the first value for the respective visual characteristic (e.g., a color (e.g., white amount), a brightness, a luminance and/or a luminosity value) includes displaying an animation that gradually changes the or more user interface objects from a first set of values for the respective visual characteristic to the second value for the respective visual characteristic. In some embodiments, the first set of values for the respective visual characteristic includes the second value for the respective visual characteristic. Displaying an animation that gradually changes a set of values for a respective visual characteristic of the one or more user interface objects in response to the request to configured the camera to be in a respective camera mode provides the user with visual feedback that the one or more camera mode has changed while minimizing visual distractions. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the respective set of one or more user interface objects includes a first user interface object (e.g., 602*a*, 602*h*, 610, 614, 822 in FIG. 8B) that is displayed on (e.g., overlaid on) a first object (e.g., 822) of the one or more objects (e.g., the sun in FIGS. 8A-8B) in the field-of-view of the first camera. In some embodiments, in accordance with a determination that the camera is in the first capture mode (e.g., 620*c*), the first object (e.g., 822) is displayed with a first appearance (e.g., a first amount of brightness and/or the visual characteristic). In some embodiments, in accordance with a determination that the camera is in a second capture mode the first object (e.g., 822) is displayed with a second appearance (e.g., a second amount of brightness and/or a particular value of the visual characteristic (e.g., a value for the visual characteristic that is greater than the first value for the respective visual characteristic but less than the second value for the respective visual characteristic)) that is different from the first appearance, where the second visual appearance has a first level (e.g., an amount) of contrast (e.g., a difference) relative to the first user interface object that is displayed with the first value for the respective visual characteristic and has a second level (e.g., an amount) of contrast (e.g., a difference) relative to the first user interface object that is displayed with the second value for the respective visual characteristic, where the second level of contrast is greater than the first level of contrast.

In some embodiments, the first value for the respective visual characteristic is a first amount of white level (e.g., a first color value (e.g., a color value that is represented by a first number of bits (e.g., 8-bits)) at which the set of one or more user interface objects are displayed. In some embodiments, the second value for the respective visual characteristic is a second amount of white level at which the set of one or more user interface objects are displayed. In some embodiments, the second amount of white level is greater than the first amount of white level. Displaying one or more user interface objects with a second amount of while level that is greater than the first amount of while level in response to the request to configure the camera to be in the second camera mode provides the user with visual feedback while the user interface is in the second mode and allows a user to quickly recognize the user interface objects and the camera mode in which the camera is operating while the camera preview is displayed. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of detecting the request to display the camera user interface (e.g., while the camera user interface is displayed) the computer system detects a request (e.g., 850*a*) (e.g., detecting a swipe user interface on a camera preview) to transition the camera between configured to capture photo media and video media in response to receiving a request to capture media. In some embodiments, the camera is in the first capture mode when the camera is configured to capture photo media (e.g., when the camera is in a photo mode) or display a user interface (e.g., a user interface without a video duration or time lapse user interface element) for capturing photo media in response to receiving a request to capture media. In some embodiments, the camera is in the second capture mode when the camera is configured to capture video media (e.g., when the camera is in a video mode) or display a user interface (e.g., a user interface with a video duration or time lapse user interface element) for capturing video media in response to receiving a request to capture media. In some embodiments, the user interface for capturing photo media is different from the user interface for capturing video media. In some embodiments, a request to configure the camera to be in the second camera mode includes detecting a request to transition the camera from being in a photo capture mode to being in a video capture mode. In some embodiments, a request to configure the camera to be in the first camera mode includes detecting a request to transition the camera from being in a video capture mode to being in a photo capture mode. Displaying one or more user interface objects with a different value of a visual characteristic in response to the request to transition the camera between configure to capture photo media and video media provides the user with visual feedback while the user interface is in a different camera mode and allows a user to quickly recognize the user interface objects and the camera mode in which the camera is currently operating. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera is in the first capture mode when a selectable user interface object for controlling an high-dynamic-range (HDR) media capture mode (e.g., a selectable user interface object for turning on/off the capture of HDR media) is displayed in a first state (e.g., 602*e* in FIG. 8D) (e.g., an inactive state (e.g., displayed with an appearance that corresponds to the computer system being configured to capture non-HDR media)). In some embodiments, the camera is in the second capture mode when the selectable user interface object for controlling the HDR capture mode is displayed in a second state (e.g., 602*e* in FIG. 8E) (e.g., an active state (e.g., displayed with an appearance that corresponds to the computer system being configured to capture HDR media) that is different from the first state. In some embodiments, in response to receiving a gesture (e.g., a tap) on the selectable user interface object for controlling the HDR capture mode while the selectable user interface object for controlling the HDR capture mode is in the first state, the computer system transitions the camera to be configured in the second state. In some embodiments, in response to receiving a gesture (e.g., a tap) on the selectable user interface object for controlling the HDR capture mode while the selectable user interface object for controlling the HDR capture mode is in the second state, the computer system transitions the camera to be configured in the second state. In some embodiments, the camera is in the first capture mode when the camera is configured to capture non-HDR media (e.g., when the camera is in a non-HDR mode). In some embodiments, the camera is in the second capture mode when the camera is configured to capture HDR media (e.g., when the camera is in an HDR mode). In some embodiments, the camera is in the second capture mode when the camera is configured to capture HDR media while the camera is configured to capture photo media (e.g., in a photo mode). In some embodiments, the camera is in the first capture mode when the camera is configured to capture non-HDR media while the camera is configured to capture video media (e.g., in a video mode). Displaying one or more user interface objects with a different value of a visual characteristic in response to the request to transition the camera between being configured to capture high-dynamic-range media and non-high-dynamic-range media provides the user with visual feedback while the user interface is capturing a different type of media that it was previously and allows a user to quickly recognize the user interface objects and the type of media that the camera is currently configured to capture. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at least one of the one or more user interface objects (e.g., 822) is displayed on (e.g., overlaid on) the camera preview (e.g., 630). In some embodiments, at least one of the one or more user interface objects is displayed on a portion of the display that does not overlay the camera preview (e.g., is at a top portion of the user interface, above the camera preview). Displaying one or more user interface objects that are on the camera preview with a different value of a visual characteristic in accordance with a determination that the camera is in a particular camera mode (e.g., a first capture mode or a second mode) allows a user to quickly recognize the user interface objects allows a user to quickly recognize the user interface objects while maintaining a visual gaze on the camera preview that is displayed. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera is in the second capture mode (e.g., 620*c* in FIG. 8B) (e.g., a mode that captures media according to a second type of a format (e.g., media that is HDR media)) (e.g., a second capture mode that is different from the first capture mode) when the camera (and/or the computer system) is configured to capture video media. In some embodiments, a determination that the camera is configured to capture video media includes a determination that the camera is configured to capture video media without capturing another type of media (e.g., photo (e.g., still images) media) that is different from video media. In some embodiments, the camera is not in the second mode if the camera is not configured to capture video media. Displaying one or more user interface objects with a second value of a visual characteristic when the camera is capturing video content allows a user to quickly recognize the user interface objects while the camera preview is displayed based on the respective camera mode (e.g., capturing video media) without requiring additional user input. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, a first user interface object (e.g., 602h) (e.g., a duration indicator, a zoom level indicator) of the one or more user interface objects includes a first indication (e.g., 602h, 610 in FIG. 8B) (e.g., a time stamp, a zoom level indication). In some embodiments, while the camera is in the second capture mode, the computer system detects a request (e.g., 850b) (e.g., detecting a user input on a selectable user interface object for capture media (e.g., a shutter button)) to capture the media. In some embodiments, in response to the request to capture the media the computer system initiates capture of the media (e.g., video, animated image media). In some embodiments, in response to the request to capture the media, the computer system updates (e.g., 602h, 616) the second user interface object to include a second indication (e.g., a timestamp, a zoom level indication) that is different from the first indication. In some embodiments, the computer system updates the second user interface object to include the second indication that is different from the first indication while the computer system captures the media. In some embodiments, in response to the request to capture the media, the computer system ceases to display the first indication. In some embodiments, one or more portions of the second user interface object continues to be displayed with the second value for the respective visual characteristic while capturing the media. In some embodiments, in response to the request to capture the media, at least one of the one or more user interface objects that are displayed with the second value for the respective visual characteristic cease to be displayed. In some embodiments, in response to the request to capture media, the computer system initiates capture of photo media (e.g., when the computer system is configured to capture photo media). In some embodiments, in response to the request to capture media, the computer system initiates capture of video media (e.g., when the computer system is configured to capture video media). In some embodiments, in response the request to capture the media and while the camera is in the second capture mode, after initiating capture of the media, the computer system saves the captured media in a file format that is based on the second capture mode (e.g., HDR). In some embodiments, in response the request to capture the media and while the camera is in the first capture mode, after initiating capture of the media, the computer system saves the captured media in a file format that is based on the first capture mode (e.g., non-HDR media). In some embodiments, the file format that is based on the first capture mode is different from the file format that is based on the second capture mode. In some embodiments, media saved in the file format that is based on the first capture mode is a different size (e.g., a smaller size) than media saved in the file format that is based on the second capture mode. Updating the second user interface object to include a second indication that is different from the first indication when the second user interface object includes the second value of the respective visual characteristic provides the user with feedback of a user interface object being updated while the user interface is operating in the second camera mode. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the camera is in the second capture mode (e.g., a mode that captures media according to a second type of a format (e.g., media that is HDR media)) (e.g., a second capture mode that is different from the first capture mode) when the camera (and/or the computer system) is configured to capture photo media (e.g., 620c). In some embodiments, the determination that the camera is in the second capture mode is made when the camera (and/or the computer system) is configured to capture HDR photo media. In some embodiments, the determination that the camera is in the second capture mode is not made when the camera (and/or the computer system) is configured to capture non-HDR photo media. Displaying one or more user interface objects with a second value of a visual characteristic when the camera is capturing photo media allows a user to quickly recognize the user interface objects while the camera preview is displayed based on the respective camera mode (e.g., capturing photo media) without requiring additional user input. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

Note that details of the processes described above with respect to method 900 (e.g., FIG. 9) are also applicable in an analogous manner to the methods described above and below. For example, methods 700, 1100, 1300, and 1400 optionally include one or more of the characteristics of the various methods described above with reference to method 900. For example, method 900 described above may be used to capture media that can be adjusted using the methods described below with respect to method 1100. For brevity, these details are not repeated below.

FIGS. 10A-10T illustrate exemplary user interfaces for correcting media using an electronic device (e.g., a computer system) in accordance with some embodiments. The user interfaces in these figures are used to illustrate the processes described below, including the processes in FIG. 11.

FIG. 10A illustrates electronic device 600 displaying a camera user interface, which includes a live preview 630. Live preview 630 shows a particular environment (e.g., box in an area) that is in the field-of-view of an ultra-wide angle camera (and/or camera lens). At FIG. 10A, device 600 uses one or more ultra-wide angle cameras (and/or camera lens) to display live preview 630 and capture media (e.g., in response to receiving a request to capture media (e.g., detecting a tap gesture on shutter control 610) because the zoom level of live preview 630 is at a 0.5× zoom level, as indicated by zoom control 2622 (e.g., 0.5× being visually emphasized, for example with thicker lines). In some embodiments, live preview 630 is displayed using one or more fields-of-view of a telephoto camera and/or a wide-angle camera. In some embodiments, the ultra-wide angle camera has a field-of-view that is wider than the field-of-view of the wide-angle camera, and wide-angle camera has a field-of-view that is wider than the telephoto camera. In some embodiments, multiple cameras (e.g., wide-angle camera used with ultra-wide angle camera) display portions of live preview 630 and/or to capture media. In some embodiments, device 600 captures images using a plurality of camera sensors and combines them to display live preview 630. In some embodiments, device 600 captures images using a single camera sensor to display live preview 630.

The camera user interface of FIG. 10A includes indicator region 602 and control region 606. Indicator region 602 and control region 606 are concurrently displayed on live preview 630 such that indicators and controls displayed in indicator region 602 and control region 606 can be displayed concurrently with live preview 630. Camera display region 604 is between indicator region 602 and control region 606 and is substantially not overlaid with indicators or controls.

As illustrated in FIG. 10A, indicator region 602 includes indicators, such as flash indicator 602a, modes-to-settings indicator 602c, and animated image capture indicator 602d. Flash indicator 602a indicates the state of a flash operation in which device 600 is currently configured to operate in when a request to capture media is received. At FIG. 10A, flash indicator 602a indicates that the flash operation is set to inactive. However, in some embodiments, flash indicator 602a can indicate that the flash operation is active or in another mode (e.g., automatic mode). In response to detecting a selection of flash indicator 602a, device 600 switches the state of the flash operation. Modes-to-settings indicator 602c indicates whether camera mode controls 620 are displayed or whether one or more camera settings are displayed in control region 606. In response to detecting a selection of modes-to-settings indicator 602c, device 600 replaces camera mode control 620 with a plurality of camera setting controls for controlling different aspects of the selected camera mode in control region 606. Animated image capture indicator 602d indicates whether the camera is configured to capture media that includes a single image or a composite image or a plurality of images in response to detecting a request to capture media. As illustrated in FIG. 10A, animated image capture control 602d is displayed being in an active state, so device 600 is configured to capture animated image media that includes a plurality of images in response to detecting a request to capture media. In some embodiments, animated image media includes a series of images that are captured in response to a single activation of shutter control 610. In some embodiments, the series of images are available to view together in response to a swipe input (e.g., 1050h as described below) or a press-and-hold input (e.g., 1050k, 1050q as described below). The animated image mead, optionally, includes one or more frames taken before activation of shutter control 610. In some embodiments, when animated image capture control 602d is displayed being in an inactive state, device 600 is configured to capture media that includes a single or composite image.

As illustrated in FIG. 10A, camera display region 604 includes live preview 630 and zoom controls 622 for changing the zoom level of live preview 630. As discussed above, zoom controls 622 indicates that device 600 is configured to capture media and displaying live preview 630 at a 0.5× zoom level (e.g., 0.5× bolded in FIG. 10A).

As illustrated in FIG. 10A, control region 606 includes shutter control 610, camera switcher control 614, and camera mode controls 620. Shutter control 610, when activated, causes device 600 to capture media (e.g., a photo), using the one or more camera sensors, based on the current state of live preview 630 and the current state of the camera application. The captured media is stored locally at electronic device 600 and/or transmitted to a remote server for storage. Camera switcher control 614, when activated, causes device 600 to switch to showing the field-of-view of a different camera(s) in live preview 630, such as by switching between a rear-facing camera sensor and a front-facing camera sensor. As illustrated in FIG. 10A, camera mode controls 620 indicates which camera mode is currently selected and enables the user to change the camera mode. In FIG. 10A, camera mode controls 620 are displayed, and photo camera mode 620c is indicated as being the current mode (e.g., a photo camera mode) in which the camera is operating by the bolding of the word "Photo." In response to detecting a request to capture media (e.g., detecting a selection of and/or activating shutter control 610), device 600 captures media of a type (e.g., photo media, video media) that is consistent with the current mode in which device 600 is operating (e.g., photo camera mode, video camera mode).

FIGS. 10A-10T illustrate, in-part, exemplary scenario where device 600 displays previously captured media where one or more types of distortion correction is applied to the media. In particular, FIGS. 10A-10T illustrate a scenario where a facial distortion correction has been applied to some of the previously captured media items, where a line straightening correction (e.g., correcting vertical perspective distortion, horizontal perspective distortion, horizon lines) has been applied to some of the previously captured media items, and where a minimal distortion correction has been applied to some of the previously capture media items. In some embodiments, one or more other distortion corrections are automatically applied to a previously captured media than discussed in the scenarios below and the discussion of these three distortion correction are provided for exemplary purposed only.

Figure 10H:
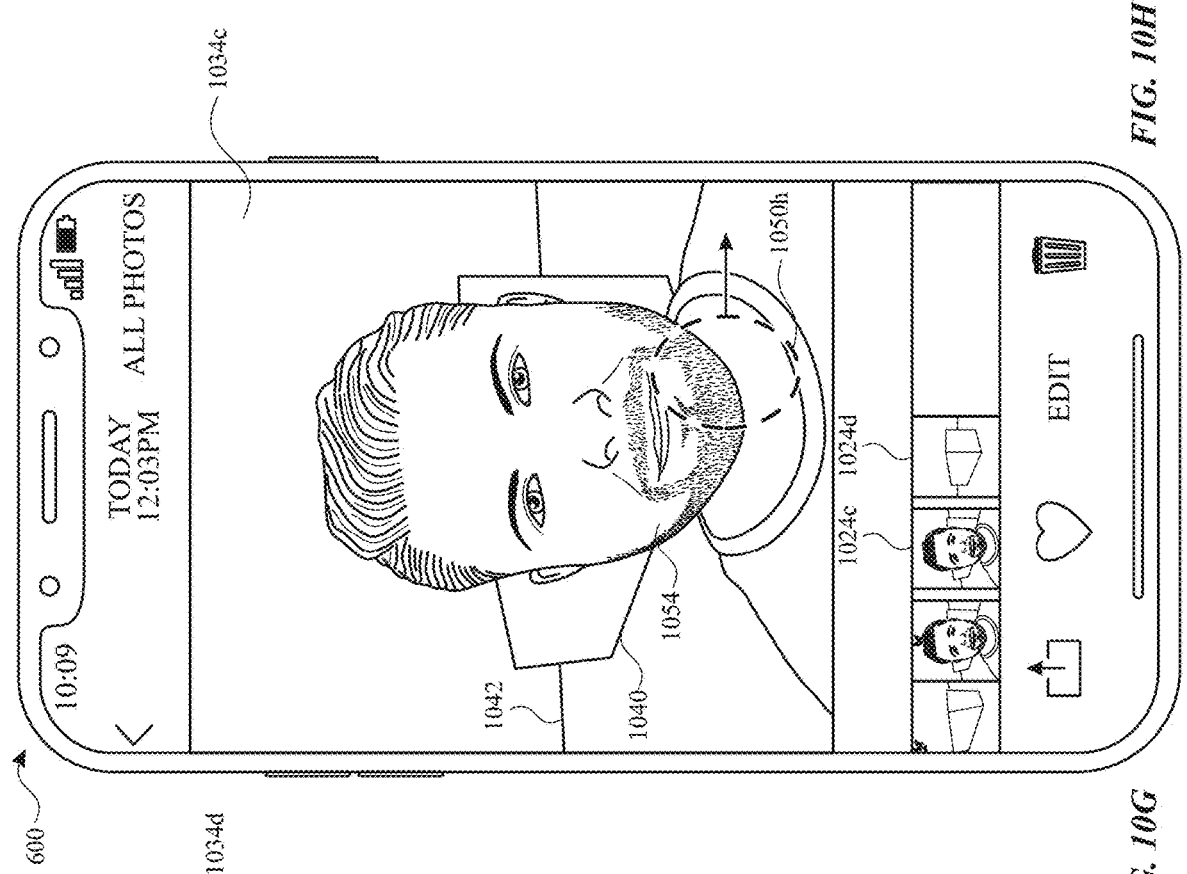
FIGS. 10A-10T illustrate exemplary user interfaces for adjusting media using an electronic device in accordance with some embodiments.
Figure 10G:
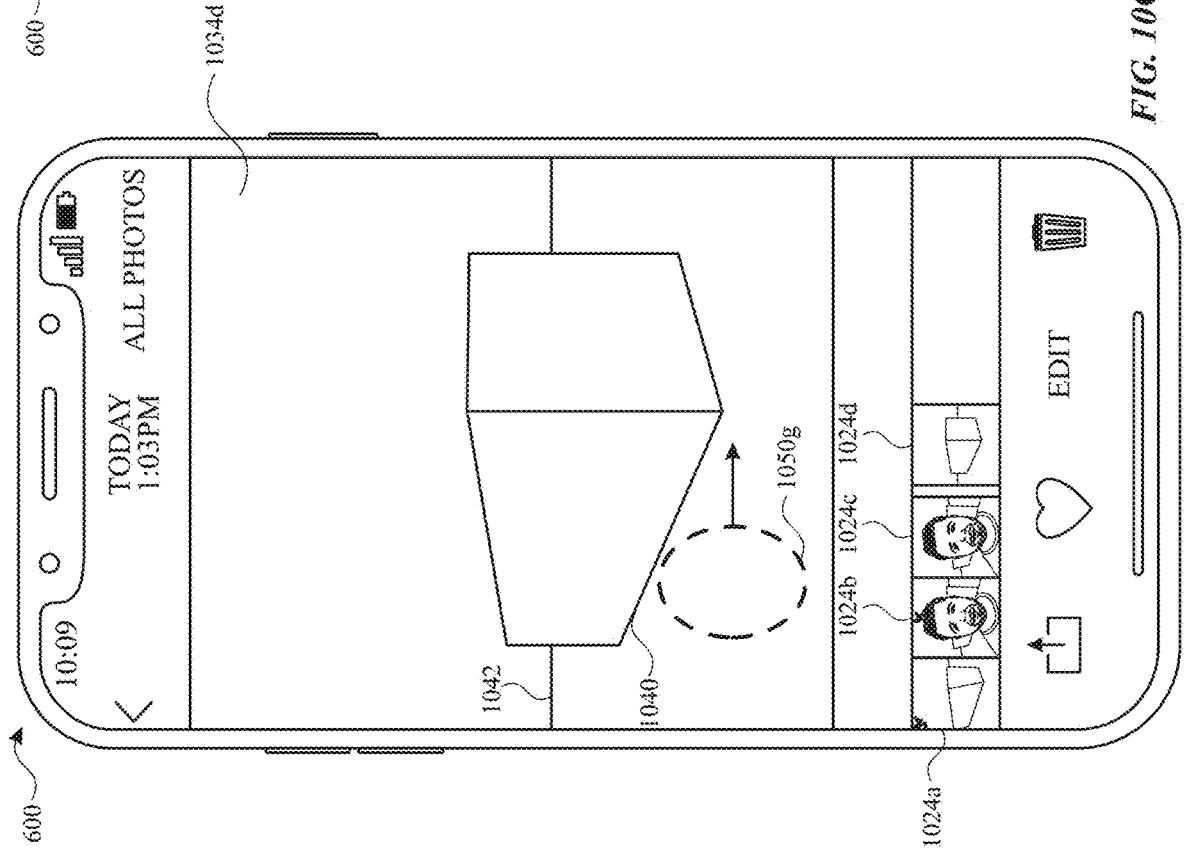
Figure 11:
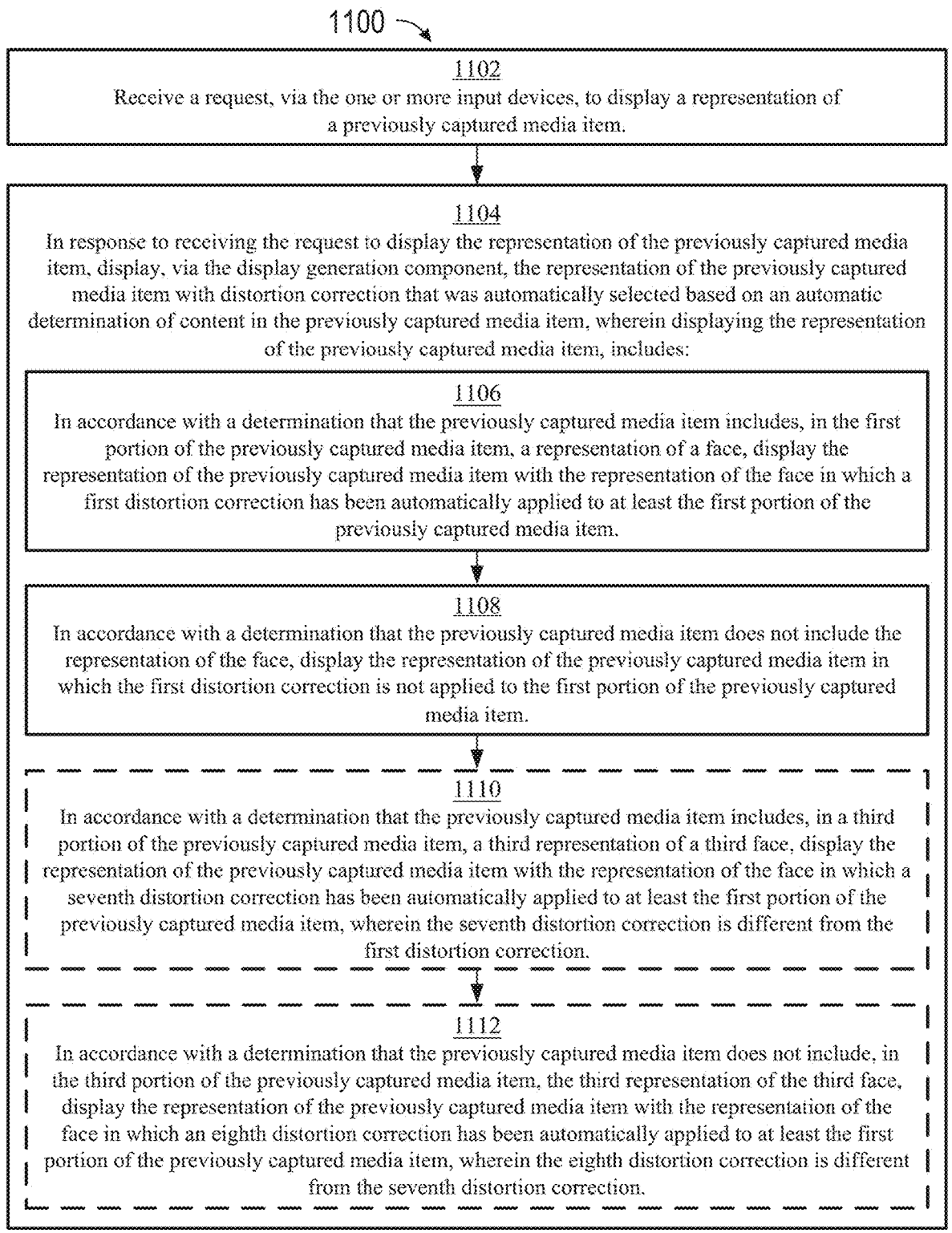
FIG. 11 is a flow diagram illustrating exemplary methods for adjusting media using an electronic device in accordance with some embodiments.

FIGS. 10A-10F illustrate exemplary scenarios where device 600 captures different media that is representative of the scene in the field-of-view of the ultra-wide angle camera of device 600, and FIGS. 10G-10T illustrate exemplary scenarios where device 600 displays one or more corrected versions of the media captured in some of FIG. 10A-10F. In some embodiments, device 600 captures images using one or more techniques described in U.S. Provisional Patent Application Ser. No. 63/020,462, filed on May 5, 2020, and titled "USER INTERFACES FOR CAPTURING AND MANAGING VISUAL MEDIA," which is incorporated by reference herein, in its entirety and especially for the disclosure relating to FIGS. 10A-10K and 11A-11C of that application.

Turning to FIG. 10A, live preview 630 shows that shows box 1040 in front of horizon line 1042 and bird 1048 flying in the background. Box 1040 has vertical perspective distortion (e.g., the vertical lines of box 1040 are not parallel and appear to converge moving from up to down live preview 630) and horizontal perspective distortion (e.g., the horizontal lines of box 1040 are not parallel and appear to converge moving from right to live of live preview 630). In addition, horizon line 1042 runs diagonally across live preview 630, where some points of horizon line 1042 have different y-values. At FIG. 10A, device 600 detects tap gesture 1050a on (e.g., at a location corresponding to) shutter control 610 while animated image capture control 602*d* is displayed in an active state. In some embodiments, the distortion is an optical aberration resulting from the physical properties of the lens (e.g., lens distortion). In some embodiments, the degree of optical aberration varies across the field-of-view of the lens/camera. In FIGS. 10A-10F, live preview 630 is displayed without distortion correction (or substantially no distortion correction) and therefore include any lens distortion effects that are present.

At FIG. 10B, in response to detecting tap gesture 1050*a*, device 600 captures and saves an animated image (e.g., a plurality of images) ("animated-image-without-face"). At FIG. 10B, the animated image includes some images that were captured before tap gesture 1050*a* was detected and some images that was captured after tap gesture 1050*a* was detected. As illustrated in FIG. 10B, in response to detecting tap gesture 1050*a*, device 600 displays the primary representation (e.g., a representation that representative of the animated image as a whole, a representation of one of the images included in the animated image) of the animation image (e.g., animated image captured in response to detecting tap gesture 1050*b*) in media collection 612. The representation of media shown in media collection 612 represents the media that was most recently captured by device 600.

As illustrated in FIG. 10B, face 1054 of a person is now position in front of box 1040 and bird 1048 has flown halfway across live preview 630. In FIG. 10B, face 1054 includes facial distortion (e.g., resulting from lens distortion). For example, the eyes/eyebrows of the person are far apart and the lips and nose of the person are slanted. At FIG. 10B, device 600 detects tap gesture 1050*b* on shutter control 610 while animated image capture control 602*d* is displayed as being in an active state.

At FIG. 10C, in response to detecting tap gesture 1050*b*, device 600 captures and saved an animated image ("animated-image-with-face"). As illustrated in FIG. 10C, in response to detecting tap gesture 1050*b*, device 600 displays the primary representation of the animated image captured (e.g., animated image captured in response to detecting tap gesture 1050*b*) in media collection 612. In some embodiments, an animated image can be changed by a user of device 600. At FIG. 10C, device 600 detects tap gesture 1050*c* on animated image capture control 602*d* (e.g., while animated image capture control 602*d* is displayed as being in the active state).

As illustrated in FIG. 10D, in response to detecting tap gesture 1050*c*, device 600 changes the display state of animated image capture control 602*d*, such that animated image capture control 602*d* is displayed in an inactive state. Moreover, in response to detecting tap gesture 1050*c*, device 600 is not configured to capture one or more animated images in response to receiving a request to capture media. As illustrated in FIG. 10D, live preview 630 includes the face 1054 of the user; however, bird 1044 has flown outside of the field-of-view of the ultra-wide camera of device 600, such that bird 1044 is not displayed in live preview 630. At FIG. 10D, device 600 detects tap gesture 1050*d* on shutter control 610.

At in FIG. 10E, in response to detecting tap gesture 1050*d*, device 600 captures and saves an image (e.g., a still image, a single image, not an animated image) ("non-animated-image-with-face"). As illustrated in FIG. 10E, in response to detecting tap gesture 1050*d*, device 600 displays the newly captured image in media collection 612, which indicates that the newly captured image is the most recent media captured by device 600. As illustrated in FIG. 10E, box 1040 is displayed without the face 1054 of the user. At FIG. 10E, device 600 detects tap gesture 1050*e* on shutter control 610.

As illustrated in FIG. 10F, in response to detecting tap gesture 1050*e*, device 600 captures and saves an image (e.g., a still image, a single image, not an animated image) ("non-animated-image-without-face"). As illustrated in FIG. 10F, in response to detecting tap gesture 1050*e*, device 600 displays the newly captured image in media collection 612, which indicates that the newly captured image is the most recent media captured by device 600.

As discussed above FIGS. 10G-10T illustrate exemplary scenarios where device 600 displays one or more representations of the media captured were distortion correction has been automatically applied to a portion of the media. FIGS. 10G-10T illustrate how device 600 can display one or more representations of the non-animated-image-without-face, non-animated-image-with-face, animated-image-without-face, animated-image-with-face with distortion correction, respectively. The distortion correction that is applied to the one or more representations is presented for illustrative purposes only and the drawings are not to exact scale of how each individual distortion correction would be applied. At FIG. 10F, device 600 detects tap gesture 1050*f* on media collection 612.

As illustrated in FIG. 10G, in response to detect tap gesture 1050*f*, device 600 displays a photo viewer user interface that includes thumbnail media representations 1024*a*, 1024*b*, 1024*c*, 1024*d* and enlarged representation 1034*d*. Thumbnail media representation 1024*a* is a representation of the animated image that was captured in response to detecting tap gesture 1050*a* in FIG. 10A (e.g., animated-image-without-face). Thumbnail media representation 1024*b* is a representation of the animated image that was captured in response to detecting tap gesture 1050*b* in FIG. 10B (e.g., animated-image-with-face). Thumbnail media representation 1024*c* is a representation of the non-animated image that was captured in response to detecting tap gesture 1050*d* in FIG. 10D (e.g., non-animated-image-with-face). Thumbnail media representation 1024*d* is a representation the non-animated image that was captured in response to detecting tap gesture 1050*e* in FIG. 10E (e.g., non-animated-image-without-face). Thumbnail media representations 1024*a*-1024*d* are displayed in chronological order from left to right with respect to when each thumbnail's respective media was captured (e.g., the thumbnail that represents the most recently captured media is displayed furthest right in the photo viewer user interface).

As illustrated in FIG. 10G, enlarged representation 1034*d* is a representation of the most recently captured media item (e.g., the media item captured in response to tap gesture 1050*e*). Moreover, enlarged representation 1034*d* is a representation of the non-animated image that was captured that did not include the face of the user. As illustrated in FIG. 10G, enlarged representation 1034*d* is displayed with a line straightening distortion correction that has been automatically applied to the non-animated image was captured. When compared to live preview 630 of FIG. 10E (e.g., was displayed when the non-animated image was captured (e.g., in response to detecting tap gesture 1050*e*), enlarged representation 1034*d* includes box 1040 that has less vertical perspective distortion and horizontal perspective distortion than box 1040 of FIG. 10E. In FIG. 10E, the vertical and horizontal lines of box 1040 are substantially parallel. In addition, horizon line 1042 of enlarged representation 1034*d* is substantially less diagonal than horizon 1042 of FIG. 10E. Thus, in FIG. 10G, device 600 automatically applies the line straightening correction to the non-animated image that was captured in response to detecting tap gesture 1050e. At FIG. 10G, device 600 detects rightward swipe gesture 1050g on enlarged representation 1034b.

At FIG. 10H, in response to detecting rightward swipe gesture 1050g, device 600 determines that the media represented by enlarged representation 1034c has a representation of a face (e.g., a face of a person). As a result of this determination that media represented by enlarged representation 1034c has a representation of a face, device 600 automatically displays enlarged representation 1034c that has a facial distortion correction applied. In some embodiments, the determination is made at the time the image is captured and the distortion correction is applied at that time, such that the media is stored in a corrected form. As illustrated in FIG. 10H, face 1054 that is represented in enlarged representation 1034c has less facial distortion than face 1054 when the non-animated image was captured in response to detecting tap gesture 1050d. As illustrated in FIG. 10H, the eyes, ears, nose, and lips of face 1054 are more geometrical and normalized (e.g., displayed with a normal shape, size) than the same part of face 1054 displayed in live preview 630 of FIG. 10D (e.g., when device 600 detected tap gesture 1050d).

In some embodiments, when face 1054 is at a position in the media that is different from the position that face 1054 is shown in enlarged representation 1034c (or is in the non-animated-image-with-face), device 600 displays an enlarged representation with a different amount of facial distortion correction that has been applied than the amount of facial distortion correction that has been applied to display enlarged representation 1034c. For example, device 600 applies more facial distortion correction as face 1054 gets further away from the center of the media (e.g., from the center of the representation of the media). Thus, if face 1054 was shown in the right corner of an enlarged representation, more distortion correction would automatically applied to face 1054 than the amount of distortion correction that is applied in FIG. 10H. In some embodiments, other factors can changes the amount of facial distortion correction that is applied to media, such as the size of the face, symmetry of a particular face, and/or the number of faces in the media. In some embodiments, two distinct amounts of distortion can be applied to two distinct faces (e.g., positioned at different positions in the FOV) in the underlying media.

The face distortion correction that is automatically applied to the non-animated-image-with-face (e.g., enlarged representation 1034c) is different from the line straightening distortion correction (e.g., enlarged representation 1034b) that was applied to the non-animated-image-without-face. The face distortion correction that is applied to the non-animated-image-with-face attempts to preserve a set of calculated geometrical characteristics (e.g., a prediction of how a face should appear) while the line straightening correction does not. Moreover, the line straightening correction attempts to reduce line distortion (e.g., vertical perspective distortion, horizontal perspective distortion, straighten horizon) while the face distortion correction does not (or does not prioritize such over preserving the facial geometry). Notably, in FIG. 10H, the face distortion correction that was applied caused the lines of box 1040 and horizon 1042 to have less line distortion in FIG. 10H than each of these elements of the media did as shown by live preview 630 of FIG. 10D. However, the lines of box 1040 and horizon 1042 in FIG. 10H have more line distortion than the lines of box 1040 and horizon 1042 have in FIG. 10G. Thus, while the face distortion correction can have an impact and/or lessen the line distortion in media, applying the line straightening correction to an image is optimal for correcting the lines of the image, and vice-versa (e.g., with respective to line distortion correction lessening facial distortion).

FIGS. 10I-10K illustrate device 600 displaying the animated-images-with-face in response to receiving a request to display the animated-images-with-face. At FIG. 10H, device 600 detects rightward swipe gesture 1050h on enlarged representation 1034c.

As illustrated in FIG. 10I-10K, device 600 displays an animation of a set of images from the animated image that was captured in response to detecting tap gesture 1050b (e.g., in FIG. 10B). As shown by bird 1048 in FIGS. 10I-10K, device 600 displays each frame of the animation in chronological order from when it was captured by device 600. In FIG. 10I, bird 1048 is at its left most position in FIGS. 10I-10K and bird 1048 of FIG. 10K is at it right most position in FIG. 10K. Enlarged representation 1034b1 is the primary representation (as discussed above), where bird 1048 is in the same positioned that it was displayed in when the primary representation was displayed in media collection 612 in FIG. 10C. The enlarged representations 1034b3 and 1034b2 represent the environment in the field-of-view of the ultra-wide camera of device 600 that was captured immediately before the environment shown by the primary representation (e.g., enlarged representation 1034b1) was displayed.

In response to detecting rightward swipe gesture 1050h, device 600 determines that the animated-images-with-face (e.g., represented by enlarged representations 1034i-1034k) have a representation of a face in at a least portion of one or more of the images included in the animated images. In some embodiments, the determination is made at the time the image is captured and the distortion correction is applied at that time, such that the media is stored in a corrected form. Because the determination is made that the animated-images-with-face have a representation of a face and because device 600 has determined that animated image media will be displayed, device 600 applies different types of distortion corrections to different sets of images of the animated-images-with-face. In particular, in FIGS. 10I-10J, device 600 displays a first portion of the animated-images-with-face (e.g., represented by enlarged representation 1034b3 of FIG. 10I and enlarged representation 1034b2 of FIG. 10J) that has a minimal (e.g., less resource-intensive) distortion correction to the first portion of the animated-images-with-face. The minimal distortion correction is not (and/or not as good as) the line straightening distortion correction discussed above or the facial distortion correction.

Notably, in FIGS. 10I-10J, device 600 displays enlarged representations 1034b2 and 1034b3 with the minimal distortion correction that has been automatically applied. In addition, device 600 displays the primary representation (e.g., enlarged representation 1034b1) with the facial distortion correction that has been automatically applied. In FIG. 10I-10J, device 600 displays enlarged representations 1034b2 and 1034b3 with the minimal distortion correction applied because the minimal distortion correction requires less computer resources, such as processing cycles, memory (e.g., RAM), and/or storage, to correct media than the computer resources that the facial distortion correction requires. In some embodiments, the minimal distortion correction also requires less computer resources to correct media than the computer resources that the line straightening distortion correction requires. Thus, in some embodiments, device 600 saves computational resources by only displaying the primary representation (e.g., enlarged representation 1034b1) with facial distortion correction.

When looking at FIG. 10I-10J, horizon line 1042, box 1040, and face 1054 of each figure have been minimally corrected from how each of these elements in the environment were displayed in response to detecting tap gesture 1050b. Thus, in some embodiments, the minimal distortion correction can provide a small amount of distortion correction. In some embodiments, the amount of distortion correction that the minimal distortion correction provides is based on the one or more frames of the animated image. On the other hand, with respect to FIG. 10K, device 600 displays enlarged representation 1034b1 (e.g., the primary representation) with face distortion correction, using similar techniques to those described above in relation to FIG. 10H. At FIG. 10K, device 600 detects press-and-hold gesture 1050k that is held in FIGS. 10K-10O and not related until FIG. 10P.

As illustrated in FIGS. 10K-10O, in response to detecting press-and-hold gesture 1050k, device displays enlarged representations 1034b2, 1034b4, 1034b5, and 1034b6. Each of enlarged representations 1034b2, 1034b4, 1034b5, and 1034b6 are displayed with minimal distortion correction that has been automatically applied because the animated-images-with-face is an animated image that has a representation of a face in a portion of at least one of the animated images. Device 600 displays enlarged representations 1034b2, 1034b4, 1034b5, and 1034b6 with minimal distortion correction instead of with facial distortion correction because applying facial distortion correction would use more computer reassures than applying the minimal distortion correction. As illustrated in FIGS. 10K-10O, in response to detecting press-and-hold gesture 1050k and while gesture 1050k continues to be held, device 600 does not display the primary representation (e.g., enlarged representation 1034b1) or any other representation that has facial distortion applied. For example, as illustrated in FIGS. 10L-10M, device 600 skips displaying the primary representation (e.g., 1034b3 of FIG. 10K-10Q) with facial correction applied (e.g., as evidence by bird 1048 of FIG. 10L being to the left of the position of bird 1048 in FIG. 10K and bird 1048 of FIG. 10M being to right of the position of bird 1048 in 10K (e.g., in the primary representation)) while the press-and-hold gesture continues to be detected in FIGS. 10L-10M. At FIG. 10O, device 600 detects an end of press-and-hold gesture 1050k. In some embodiments, device 600 does display media that corresponds to the same point in time as the primary representation that does not include the faction distortion correction.

As illustrated in FIGS. 10P-10Q, in response to detecting an end of press-and-hold gesture 1050k, device 600 re-displays enlarged representation 1034b2 with minimal distortion correction applied and displays enlarged representation 1034b3 (e.g., the primary representation) with facial distortion correction applied. In some embodiments, device 600 modifies (e.g., via user input) the image that corresponds to the primary representation to another image that is in the captured animated images. In some embodiments, device 600 display the primary representation with distortion correction when the image that corresponds to the primary representation has switch for another image that is in the captured animated images. At FIG. 10Q, device 600 detects rightward swipe gesture 1050q on enlarged representation 1034b3.

At FIGS. 10Q-10T, in response to detecting rightward swipe gesture 1050q, device 600 determines that the animated-images-without-face (e.g., represented by enlarged representations 1034a1-1034a3) do not have a representation of a face in at least portion of one or more of the images included in the animated images. Because the determination is made that the animated-images-without-face do not have a representation of a face and because device 600 has determined that animated image media will be displayed, device 600 applies the same type of distortion correction to each image included in the animated-images-without-face. In some embodiments, the determination is made at the time the image is captured and the distortion correction (e.g., the same distortion correction included in the animated-images-without-face) is made at that time, such that the media is stored in a corrected form. As illustrated in FIGS. 10Q-10T, device 600 displays each of enlarged representations 1034a1-1034a3 with line straitening distortion correction that has been automatically applied. In some embodiments, device 600 can display each of enlarged representations 1034a1-1034a3 with another type of distortion correction, such as the minimal distortion correction.

While FIGS. 10A-10T describes displaying media that has been captured by an ultra-wide-angle camera with distortion correction, representations of media that is captured by other types of cameras (e.g., wide-angle camera, telephone camera) can also be displayed with facial distortion correction that is automatically applied. In some embodiments, device 600 does not display representations with facial distortion correction and/or does not perform one or more of the above-identified techniques described in FIGS. 10A-10T for media that has not been captured via the wide-angled camera (or media that has been captured a particular camera). In addition, the automatic application of facial distortion correction, in some embodiments, is not applied immediately after capture of the media. In some embodiments, facial distortion correction is applied to media when the device is in a certain state (e.g., sleep mode, inactive), after a predetermined period of time (e.g., 1 day, 2 weeks), and/or immediately. Thus, the discussion above is not limiting as to when any of the distortion corrections are applied to media to generate the representation of the media.

FIG. 11 is a flow diagram illustrating exemplary methods for adjusting media using an electronic device (e.g., a computer system) in accordance with some embodiments. Method 1100 is performed at a computer system (e.g., 100, 300, 500, 600). The computer system has one or more cameras (e.g., one or more cameras (e.g., dual cameras, triple camera, quad cameras, etc.) on the same side or different sides of the computer system (e.g., a front camera, a back camera))), where the computer system (e.g., 600) is in communication with a display generation component (e.g., a display controller, a touch-sensitive display system) and one or more input devices (e.g., a touch-sensitive surface).

Some operations in method 1100 are, optionally, combined, the orders of some operations are, optionally, changed, and some operations are, optionally, omitted.

As described below, method 1100 provides an intuitive way for adjusting media. The method reduces the cognitive burden on a user for automatically adjusting media, thereby creating a more efficient human-machine interface. For battery-operated computing systems, enabling for adjustment of media faster and more efficiently conserves power and increases the time between battery charges.

The computer system receives (1102) a request (e.g., 1050f, 1050g, 1050h, 1050q), via the one or more input devices, (e.g., a selection of a thumbnail image, a selection of an image capture control (e.g., a selectable user interface object) (e.g., a shutter control (e.g., 610) that, when activated, captures an image of the content displayed in the first region)) to display a representation of a previously captured media item (e.g., still images, video).

In response to receiving the request to display the representation of the previously captured media item, the computer system displays (1104), via the display generation component, the representation (e.g., 1034$a$1-1034$a$1, 1034$b$1-1034$b$5, 1034$c$, 1034$d$) of the previously captured media item with distortion correction that was automatically selected (e.g., without user input) based on an automatic determination (e.g., without user input) of content in the previously captured media item.

As a part of displaying (1104) the representation (e.g., 1034$a$1-1034$a$1, 1034$b$1-1034$b$5, 1034$c$, 1034$d$) of the previously captured media item and in accordance with a determination (e.g., a determination made (e.g., previously made) at the time of capture of the media item; a determination made at the time the request to display the representation of the previously captured media item; a determination made using one or more image analysis and/or face detection algorithms, a determination that is made when the previously capture media was captured, a determination that is made after a predetermined period of time that the media was captured and/or during a predetermined period of time (e.g., at time), a determination that is made when the computer system is in a particular state (e.g., an inactive state (e.g., where a user is not actively using the device for a predetermined period of time (e.g., the device is in a sleep state) or the display generational component is inactive (e.g., not displaying user interface objects, turned off))) that the previously captured media item includes, in the first portion of the previously captured media item, includes a representation (e.g., 1054) of a face, the computer system displays (1106) the representation (e.g., 1034$c$) of the previously captured media item with the representation of the face (e.g., a portion of a face) in which a first distortion correction (an optical (lens) distortion correction that prioritizes preserving face geometry) has been automatically applied to at least the first portion of the previously captured media item (e.g., a portion of the previously captured media item).

As a part of displaying (1104) the representation (e.g., 1034$d$) of the previously captured media item and in accordance with a determination that the previously captured media item does not include the representation of the face, the computer system displays (1108) the representation (e.g., 1034$d$) of the previously captured media item in which the first distortion correction is not applied to the first portion of the previously captured media item. In some embodiments, the representation of the previously captured media item has the first distortion correction applied to first a portion (e.g., the face) of the image (e.g., without the first distortion correction being applied to a second portion of the image). In some embodiments, the computer system includes multiple cameras (e.g., and/or multiple camera lenses). In some embodiments, the first distortion correction is applied when a first type of the camera (e.g., and/or camera lenses) (e.g., an ultra-wide-angle camera) have been used to capture the previously captured image. In some embodiments, the first distortion correction is not applied when second type of the camera (e.g., a type of camera that is different from the first type of camera) (e.g., and/or camera lenses) (e.g., a wide-angle camera, a telephoto camera) has been used to capture the previously captured media (e.g., irrespective of whether the first portion of the previously captured media item includes a representation of a face (e.g., a portion of a face)), with a first distortion correction. In some embodiments, the first distortion correction is applied for all types of lenses. Displaying a first portion of the previously captured media item with/without a first distortion correction automatically applied when prescribed conditions are met (e.g., whether the previously captured media item includes a representation of a face in the first portion) allows the computer system to optimize when the first distortion is automatically applied without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the first distortion correction changes one or more representations (e.g., 1034$c$) of faces in previously captured media items (e.g., an optical (lens) distortion correction that prioritizes preserving face geometry). In some embodiments, a representation of a first face (e.g., 1034$c$) in the first portion of the previously captured media item that is displayed with the first distortion correction is different from a representation of the first face in the first portion of the previously captured media item before the first distortion correction was applied. Displaying a first portion of the previously captured media item with/without a first distortion correction, that changes representations of faces automatically applied, when prescribed conditions are met (e.g., whether the previously captured media item includes a representation of a face in the first portion) allows the computer system to optimize when the first distortion is automatically applied without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, while displaying the representation (e.g., 1034$c$) of the previously captured media item with distortion correction, the computer system receives an input (e.g., an input at a location that corresponds to a location on the representation of the previously captured media item with distortion correction) that corresponds to a request to display a representation of a second previously captured media item that is different from the first previously captured media item. In some embodiments, in response to receiving the input that corresponds to receiving the request to display the representation of the second previously captured media item, the computer system displays, via the display generation component, the representation of the second previously captured media item with distortion correction that was automatically selected (e.g., without user input) based on an automatic determination (e.g., without user input) of content in the second previously captured media item. As a part of displaying the representation of the second previously captured media item and in accordance with a determination (e.g., a determination made (e.g., previously made) at the time of capture of the media item; a determination made at the time the request to display the representation of the previously captured media item; a determination made using one or more image analysis and/or face detection algorithms) that the second previously captured media item includes, in a second portion of the second previously captured media item, a representation of a second face (e.g., a portion of a face) that is different from the first face, the computer system displays the representation of the second previously captured media item with the representation of the second face in which a second distortion correction (e.g., a second amount of the first distortion correction (an optical (lens) distortion correction that prioritizes preserving face geometry)) has been automatically applied (e.g., a portion of the previously captured media item) to at least the second portion of the second previously captured media item. In some embodiments, the second distortion correction is different from (e.g., different in degree and/or the amount of the same type of distortion correction as the first distortion correction) the first distortion correction. In some embodiments, the second distortion correction is based on the size of the face in the representation of the second previously captured media. In some embodiments, when the second portion is near an edge of the representation of the second previously captured media item, a greater amount of the second distortion correction is applied than when the second portion is not near the edge of the representation of the previously captured media. In some embodiments, the second distortion correction is the same type of distortion correction as the first distortion correction. In some embodiments, the first portion of the previously captured media item displayed with the first distortion correction includes a first amount of the first distortion correction that is different from the second amount of the first distortion correction. In some embodiments, in accordance with a determination that the second previously captured media item does not include, in the first portion of the second previously captured media item, a representation of a second face (e.g., a portion of a face), the first portion of the second previously captured media item is not displayed with the first distortion correction (an optical (lens) distortion correction that prioritizes preserving face geometry). In some embodiments, after automatically selecting distortion correction based on an automatic determination of content in the previously captured media item, the representation of the previously captured media item with distortion correction includes a second portion of the previously captured media item such that, in accordance with a determination the previously captured media item includes, in the second portion of the previously captured media item (e.g., that is different from the first portion of the previously captured media item), a second representation of a second face that is different from the representation of the face, the second portion of the previously captured media item is displayed with a second amount of the first distortion correction, wherein the first amount of the first distortion correction is different from the second amount of the first distortion correction. In some embodiments, the first distortion correction is automatically applied to the first second of the previously captured media item. In some embodiments, the first distortion correction changes the second representation of the face in the second portion differently than the first distortion correction changed the representation of the face in the first portion of the previously captured media item. In some embodiments, a representation of different media would have a different amount of the first distortion correction applied. Displaying a representation of a second previously captured media item with different distortion correction than the representation of the first previously captured media item when prescribed conditions are met allows the computer system to optimize how much of the first distortion is automatically applied to a particular media item without requiring further user input.

Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the previously captured media item includes, in the first portion of the previously captured media item, the representation (e.g., 1054) of the face. In some embodiments, in accordance with a determination that the previously captured media item includes a first number of faces, the first distortion correction is a third distortion correction. In some embodiments, in accordance with a determination that the previously captured media item includes a second number of faces different than the first number of faces, the first distortion correction is a fourth distortion correction. In some embodiments, when the faces in the previously captured media item change (e.g., arrangement of the faces change, the location of the faces change), the amount of the first distortion correction that is applied the representation of the previously captured media changes. In some embodiments, more distortion correction is applied when there are more faces in the previously captured media item. In some embodiments, the third distortion correction and the fourth distortion correction is the same type of distortion correction (e.g., applied using the same type of algorithm or the same algorithm (e.g., a facial distortion correction algorithm)). In some embodiments, the third distortion correction includes an amount of distortion correction that is different than the amount of the distortion correction of the fourth distortion correction. Displaying a first portion of the previously captured media item with different distortion correction, that is based on the number of faces in the first portion, when prescribed conditions are met allows the computer system to optimize how much of the first distortion is automatically applied without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in accordance with a determination that the first portion includes the representation (e.g., 1054) of the face and the representation of the face is at a first location in the previously captured media item, the first distortion correction is a fifth distortion correction (e.g., a fourth amount of the first distortion correction). In some embodiments, in accordance with a determination that the first portion includes the representation of the face and the representation of the face is at a second location of the previously captured media item that is different from the first location of the previously captured media item, the first distortion correction is a sixth distortion correction (e.g., a fifth amount of the first distortion correction). In some embodiments, the fifth distortion correction is different from the sixth distortion correction. In some embodiments, less of the first distortion correction is applied as the location of the face of the user in the previously captured media item gets closer to the center of the previously captured media item. In some embodiments, the fifth distortion correction and the sixth distortion correction is the same type of distortion correction (e.g., applied using the same type of algorithm or the same algorithm (e.g., a facial distortion correction algorithm)). In some embodiments, the fifth distortion correction includes an amount of distortion correction that is different than the amount of the distortion correction of the sixth distortion correction. Displaying a first portion of the previously captured media item with different distortion correction, that is based on the location of the representation of the face, when prescribed conditions are met allows the computer system to optimize how much of and where the first distortion is automatically applied without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the first distortion correction is based on a calculated (e.g., predicted) representation of one or more geometrical characteristics (e.g., distance between facial features (e.g., distance between eyes, ears), symmetry of face) of the representation (e.g., 1054) of the face (e.g., of a user). In some embodiments, a representation of a first face in the first portion of the previously captured media item that is displayed with the first distortion correction has one or more geometrical characteristics that are the same as the one or more geometrical characteristics of a representation of the first face in the first portion of the previously captured media item before the first distortion correction was applied.

In some embodiments, as a part of displaying (1104) the representation (e.g., 1034*c*) of the previously captured media item includes, in accordance with a determination that the previously captured media item includes, in a third portion of the previously captured media item, a third representation of a third face (e.g., a portion of a third face), the computer system displays (1110) the representation of the previously captured media item with the representation of the face in which a seventh distortion correction (e.g., a first amount of a type of distortion correction (e.g., an optical (lens) distortion correction that corrects one or more lines in the previously captured media item, such as correcting horizon lines (e.g., horizon correction (e.g., straightening a visible horizon in the visual content of the media item), vertical lines (e.g., vertical perspective distortion correction (e.g., correcting vertical perspective distortion (e.g., distortion of an image caused by camera angle and/or lens such that lines that are parallel in the real world are not parallel lines in the media item))), and/or horizontal lines (e.g., horizontal perspective distortion correction (e.g., correcting horizontal perspective distortion (e.g., distortion of an image caused by camera angle and/or lens such that lines that are parallel in the real world are not parallel lines in the media item))) in the previously captured media item)) has been automatically applied to at least the first portion of the previously captured media item. In some embodiments, the seventh distortion correction is different from (e.g., a different type of distortion correction than the first distortion correction) the first distortion correction. In some embodiments, in accordance with a determination that the previously captured media item does not include, in the third portion of the previously captured media item, the third representation of the third face (e.g., a portion of a face), the computer system displays (1116) the representation (e.g., 1034*d*) of the previously captured media item with the representation of the face in which an eighth distortion correction (e.g., a first amount of a type of distortion correction (e.g., an optical (lens) distortion correction that corrects one or more lines in the previously captured media item, such as correcting horizon lines (e.g., horizon correction (e.g., straightening a visible horizon in the visual content of the media item), vertical lines (e.g., vertical perspective distortion correction (e.g., correcting vertical perspective distortion (e.g., distortion of an image caused by camera angle and/or lens such that lines that are parallel in the real world are not parallel lines in the media item))), and/or horizontal lines (e.g., horizontal perspective distortion correction (e.g., correcting horizontal perspective distortion (e.g., distortion of an image caused by camera angle and/or lens such that lines that are parallel in the real world are not parallel lines in the media item))) in the previously captured media item)) has been automatically applied to at least the first portion of the previously captured media item. In some embodiments, the eighth distortion correction is different from the seventh distortion correction (e.g., and is a different type of distortion correction than the first distortion correction). In some embodiments, the seventh distortion correction is the same type of distortion correction (e.g., line distortion correction) as the eighth distortion correction. Displaying a third portion of the previously captured media item with different distortion correction when prescribed conditions are met (e.g., the third portion does/doesn't include a representation of a face) allows the computer system to optimize how much of second distortion correction is automatically applied without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, as a part of displaying the previously captured media item and in accordance with a determination that the previously captured media item does not include, in the first portion of the previously captured media item, a detected representation (e.g., 1050) of a face, displaying the representation (e.g., 1034*d*) of the previously captured media item in which a ninth distortion correction (e.g., an optical (lens) distortion correction that corrects one or more lines in the previously captured media item, such as correcting horizon lines (e.g., horizon correction (e.g., straightening a visible horizon in the visual content of the media item), vertical lines (e.g., vertical perspective distortion correction (e.g., correcting vertical perspective distortion (e.g., distortion of an image caused by camera angle and/or lens such that lines that are parallel in the real world are not parallel lines in the media item))), and/or horizontal lines (e.g., horizontal perspective distortion correction (e.g., correcting horizontal perspective distortion (e.g., distortion of an image caused by camera angle and/or lens such that lines that are parallel in the real world are not parallel lines in the media item))) in the previously captured media item) has been automatically applied to the first portion of the previously captured media item, wherein the ninth distortion correction is different from (e.g., is a different type of distortion correction than) the first distortion correction and provides a greater degree of correction of distortion of geometric shapes (e.g., lines, circles, squares, angles, corners, etc.) than the first distortion correction. In some embodiments, the computer system perform more operations when applying the first distortion correction than when applying the third distortion correction to content in the previously captured media item. In some embodiments, displaying a representation of the previously captured media item with the first distortion correction is less computationally expensive than displaying a representation of the previously captured media item with the third distortion correction. Displaying the first portion of the previously captured media item with a third distortion correction that is different from the first distortion correction when prescribed conditions are met (e.g., the face is not in view) allows the computer system to apply a different distortion correction than the first distortion correction without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the displayed representation (e.g., 1034*d*) of the previously captured media item with distortion correction includes a fourth portion of the previously captured media item such that the fourth portion of the previously captured media item is displayed with a tenth distortion correction (e.g., an optical (lens) distortion correction that corrects one or more lines in the previously captured media item, such as correcting horizon lines (e.g., horizon correction (e.g., straightening a visible horizon in the visual content of the media item), vertical lines (e.g., vertical perspective distortion correction (e.g., correcting vertical perspective distortion (e.g., distortion of an image caused by camera angle and/or lens such that lines that are parallel in the real world are not parallel lines in the media item))), and/or horizontal lines (e.g., horizontal perspective distortion correction (e.g., correcting horizontal perspective distortion (e.g., distortion of an image caused by camera angle and/or lens such that lines that are parallel in the real world are not parallel lines in the media item))) in the previously captured media item) that has been automatically applied, wherein the tenth distortion correction is different from (e.g., a different type of distortion correction than) the first distortion correction. In some embodiments, in accordance with a determination that the previously captured media item does not include, in the second portion of the previously captured media item, a third representation of a face, the fourth portion of the previously captured media item is displayed with a tenth distortion correction.

In some embodiments, the previously captured media item includes a first set of media items (e.g., 1034*b*1-1034*b*2) that are different from a second set of media items (e.g., 1034*b*3). In some embodiments, the second set of medias includes the representation of the previously captured media item with distortion correction that was automatically selected based on the automatic determination of content in the previously captured media item. In some embodiments, the first set of media items includes a plurality of representations of the previously captured media item with an eleventh distortion correction that is different from the first distortion correction (e.g., the eleventh distortion correction is applied to each of the plurality of representations of the previously captured media item). In some embodiments, the eleventh distortion correction is not a facial distortion correction or a line straightening distortion correction. Having a previously captured media item that includes a plurality of representations of the previously captured media item with eleventh distortion correction and the representation of the previously captured media item with distortion correction, where the eleventh distortion correction is different from the first distortion correction, provides the user with feedback about the content of other frames of the previously captured media item. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, a first amount of computer processing resources (e.g., storage, memory (e.g., RAM)) are required to apply the first distortion correction to content in the previously captured media item (e.g., represented by 1034*b*3). In some embodiments, a second amount of computer processing resources (e.g., storage, memory (e.g., RAM)) are required to apply the eleventh distortion correction to content in the previously captured media item (e.g., represented by 1034*b*1). In some embodiments, second amount of computer processing resources is less than the first amount of computer processing resources. In some embodiments, the eleventh distortion correction (e.g., a minimal distortion correction is a type of distortion correction that is less computationally expensive than the type of distortion correction of the first type of distortion correction (e.g., facial distortion correction) or a second type of distortion correction (e.g., line straitening distortion correction). Having a previously captured media item that includes a plurality of representations of the previously captured media item with eleventh distortion correction and the representation of the previously captured media item with distortion correction, where applying the eleventh distortion correction uses less operations than applying the first distortion correction, provides the user with feedback about the content of other frames of the previously captured media while minimizing system resources to display most of the representations of previously captured media item. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the eleventh distortion correction is applied, irrespective of there being a representation of a face (e.g., 1054) in the plurality of representations (e.g., 1034*b*1-1034*b*2) of the previously captured media. In some embodiments, the eleventh distortion correction does not correct one or more lines in the previously captured media item as well as the line straightening distortion correction and does not correct one or more faces as well as the facial distortion correction. Having a previously captured media item that includes a plurality of representations of the previously captured media item with eleventh distortion correction applied, irrespective of there being a representation of a face in the plurality of representations of the previously captured media, provides the user with feedback about the content of other frames of the previously captured media while minimizing system resources to display most of the representations of previously captured media item, irrespective of whether the other frames include a face. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments as a part of displaying, via the display generation component, the representation of the previously captured media item with distortion correction that was automatically selected based on the automatic determination of content in the previously captured media item, the computer system displays an animation (e.g., FIGS. 10I-10K) that includes displaying (e.g., sequentially displaying each of the representations one at a time and followed by each other) the first set of media items (e.g., 1034$b$1-1034$b$2) of the previously captured media items (e.g., the eleventh distortion correction is applied to each of the plurality of representations of the previously captured media item) before displaying the second set of medias items (e.g., 1034$b$3) of the previously captured media item. In some embodiments, the computer system displays the animation in accordance with a determination that the previously captured media item is a first type of media item. In some embodiments, the computer system forgoes displaying the animation in accordance with a determination that the previously captured media item is a second type of media item that is different from the first type of media item (or in accordance with a determination that the previously capture media item is not the first type of media item) (e.g., displays the representation of the previously captured media item with distortion correction without displaying the plurality of representations of the previously captured media item. Displaying an animation that includes displaying the first set of media items of the previously captured media (e.g., that includes a plurality of representations of the previously captured media item with eleventh distortion correction applied) that is displayed before a second set of media items of the media (e.g., that includes the representation of the previously captured media with distortion correction) provides the user with feedback about the content of other frames of the previously captured media while minimizing system resources to display most of the representations of previously captured media item, irrespective of whether the other frames include a face. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation of the previously captured media item with distortion correction (e.g., 1034$b$3) is displayed with a high resolution than the plurality of representations (e.g., 1034$b$1-1034$b$2) of the previously captured media item with the eleventh distortion correction. Displaying a plurality of representations of the previously captured media item at a lower resolution and displaying the representation of the previously captured media item with distortion correction at a higher resolution provides the user with feedback about the content of other frames of the previously captured media item while minimizing system resources to display most of the representations of previously captured media item. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displaying the animation (e.g., FIGS. 10I-10K) further includes fading (e.g., a cross-fading) (e.g., gradually fading a first representation into another representation) at least one of the plurality of representations (e.g., 1034$b$2) of the previously captured media item with the eleventh distortion correction fading into the representation (e.g., 1034$b$1) of the previously captured media item (e.g., the representation of the previously captured media item with distortion correction that was automatically selected based on an automatic determination of content in the previously captured media item). Fading at least one of the plurality of representations of the previously captured media item with the eleventh distortion correction into the representation of the previously captured media item provides the user with feedback about the content of other frames of the previously captured media item while minimizing visual distraction to the user between representations that have a different type of distortion correction applied. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at least one of the plurality of representations of the previously captured media item has less of the eleventh distortion correction applied to a location that is a first distance from the center of the respective representation than at a location that is a second distance from the center of the respective representation. In some embodiments, the first distance is less than the second distance.

In some embodiments, while displaying the representation of the previously captured media item with distortion correction, the computer system receives one or more inputs to re-display the representation of the previously captured media item. In some embodiments, in response to receiving the one or more inputs (e.g., 1050$k$) to re-display the representation of the previously captured media item and in accordance with a determination that the representation of the previously captured media item is set as a key frame for the previously captured media item, displaying the representation of the previously captured media item with distortion correction (e.g., displaying the animation that includes displaying (e.g., sequentially displaying each of the representations one at a time and followed by each other) the plurality of representations of the previously captured media item with a eleventh distortion correction (e.g., the eleventh distortion correction is applied to each of the plurality of representations of the previously captured media item) before displaying the representation of the previously captured media item with distortion correction).

In some embodiments, in response to receiving the one or more inputs to re-display the representation of the previously captured media item and in accordance with a determination that the representation of the previously captured media item is not set as a key frame for the previously captured media item, forgoing display of the representation of the previously captured media item with distortion correction (e.g., as a part of displaying the animation, the computer system displaying (e.g., sequentially displaying each of the representations one at a time and followed by each other) the plurality of representations of the previously captured media item with the eleventh distortion correction (e.g., the eleventh distortion correction is applied to each of the plurality of representations of the previously captured media item) without displaying the representation of the previously captured media item with distortion correction). Forgoing display of the representation of the previously captured media item with distortion correction when prescribed conditions are met (e.g., in accordance with a determination that the representation of the captured media item is not set as a key frame for the previously captured media item) allows the computer system to minimize the resources used to display the representation of the previously captured media. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently. Forgoing display of the representation of the previously captured media item with distortion correction in accordance with a determination that the representation of the captured media item is not set as a key frame for the previously captured media item provides the user with improved feedback that improves the display of the animation to the user by displaying the animation with consistent distortion correction that is applied to each image of the animation. Providing improved visual feedback enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in accordance with the determination that the previously captured media item does not include the representation of the face, the representation (e.g., 1034a1-1034a3) of the previously captured media item with distortion correction is displayed with the eleventh distortion correction (e.g., a line straightening distortion correction). In some embodiments, in accordance with the determination that the previously captured media item includes the representation of the face, the computer system does not apply the same distortion correction to the representations (e.g., 1034a1-1034a3) of the previously captured media item (e.g., the plurality of representations of the previously captured media item and the representation of the previously captured media item with distortion correct). In some embodiments, in accordance with the determination that the previously captured media item includes the representation of the face, the computer system does not apply the same distortion correction to all of the representations of the previously captured media item. Displaying the representation of the previously captured media item with distortion correction with the eleventh distortion correction (e.g., the same distortion correction that is applied to the plurality of representations of the previously captured media item) when prescribed conditions are met (e.g., when the media item does not include a representation of a face) allows the computer system to apply a consistent distortion correction to the frames of the media and reduces the number operations needed to display the representations of the previously captured media item. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, each of the plurality of representations (e.g., 1034a1-1034a3) of the previously captured media item is not displayed with the first distortion correction. Having a plurality of representations of the previously captured media item with an eleventh distortion correction and without the first distortion correction provides the user with feedback about the content of other frames of the previously captured media item while minimizing the computations needed to display the plurality of representations of the media. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation of the previously captured media item with distortion correction, the computer receives an input (e.g., 1050k) (e.g., an input at a location that corresponds to a location on the representation of the previously captured media item with distortion correction) that corresponds to a request to display an animation of the previously captured media item. In some embodiments, in response to receiving the input that corresponds to the request to display the animation of the previously captured media item (and/or while continuing to detect the input that corresponds to the request to display the animation of the previously captured media item), the computer system displays (e.g., sequentially displaying an animation of each of the representations one at a time and followed by each other) the plurality of representations of the previously captured media item with the eleventh distortion correction (e.g., the eleventh distortion correction is applied to each of the plurality of representations of the previously captured media item) without displaying the previously captured media item with distortion correction. In some embodiments, distortion correction that is applied to the frames of the animation of the images is applied more to the edge of the image (e.g., edges of the images appear as though they are bending) than the center of the image. In some embodiments, the distortion correction applied to frames of the animation of images is not a distortion correction that includes vertical perspective distortion correction, horizontal perspective distortion correction, and/or horizon. In some embodiments, the first distortion correction (e.g., face distortion correction) is applied within a predetermined period of time (e.g., within 1-60 seconds) of when the photo is captured. In some embodiments, the first distortion correction is applied to the previously captured media after a predetermined period time, such as a month, year, or day. In some embodiments, the facial distortion correction is applied in response to receiving a request to display the captured media. Displaying the plurality of representations of the previously captured media item with the eleventh distortion correction in response to receiving the input that corresponds to the request to display the animation of the previously captured media item provides the user with additional control over viewing the previously captured media item (e.g., a less computationally expensive viewing of the previously captured media item). Providing the user additional control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11) are also applicable in an analogous manner to the methods described above and below. For example, methods 700 and 900 optionally includes one or more of the characteristics of the various methods described above with reference to method 1100. For example, method 900 described above may be used to capture media that can be adjusted using the methods described below with respect to method 1100. For brevity, these details are not repeated below.

FIGS. 12A-12N illustrate exemplary user interfaces for managing the file format of media using an electronic device (e.g., a computer system) in accordance with some embodiments. The user interfaces in these figures are used to illustrate the processes described below, including the processes in FIGS. 13A-13C.

FIG. 12A illustrates electronic device 600 displaying a camera user interface, which includes a live preview 630 that, in some embodiments, extends from the top of the display to the bottom of the display. Live preview 630 shows a particular scene (e.g., the face of a person in FIG. 12A) that is in the field-of-view of a first camera (e.g., front-facing camera, rear-facing camera) of one or more cameras of device 600. Live preview 630 is a representation of a (e.g., partial) field-of-view of one or more cameras of device 600 ("the FOV").

The camera user interface of FIG. 12A includes indicator region 602 and control region 606. Indicator region 602 and control region 606 are displayed above and below, respectively, live preview 630 such that indicators and controls can be displayed concurrently with live preview 630. Camera display region 604 is between indicator region 602 and control region 606 and is substantially not overlaid with indicators or controls. In FIG. 12A, indicator region 602 and control region 606 optionally include a solid overlay and a portion of live preview 630 is not shown behind the solid overlay. In some embodiments, indicator region 602 and control region 606 include a translucent overlay and a portion of live preview 630 is shown behind the translucent overlay (and/or behind the indicators and controls of indicator region 602 and control region 606).

As illustrated in FIG. 12A, indicator region 602 includes indicators, such as flash indicator 602a, modes-to-settings indicator 602c, high-dynamic-range ("HDR") indicator 602h, and animated image capture indicator 602d. Flash indicator 602a indicates the state of a flash operation in which device 600 is currently configured to operate in when a request to capture media is received. At FIG. 12A, flash indicator 602a indicates that the flash operation is set to inactive. However, in some embodiments, flash indicator 602a can indicate that the flash operation is active or in another mode (e.g., automatic mode). In response to detecting a selection of flash indicator 602a, device 600 switches the state of the flash operation. Modes-to-settings indicator 602c indicates whether camera mode controls 620 are displayed or whether one or more camera settings are displayed in control region 606. In response to detecting a selection of modes-to-settings indicator 602c, device 600 replaces camera mode control 620 with a plurality of camera setting controls for controlling different aspects of the selected camera mode in control region 606. HDR indicator 602h indicates whether an HDR media capture mode is active or inactive. At FIG. 12A, HDR indicator 602h indicates that the HDR media capture mode is active, which indicates that device 600 is configured to capture HDR media. In some embodiments, when HDR indicator 602h indicates that the HDR mode is inactive, device 600 is configured to capture non-HDR media (or not configured to capture HDR media). In response to detecting selection of HDR indicator 602h, device 600 changes the state (e.g., inactive or active state) of the HDR capture mode. Animated image capture indicator 602d indicates whether the camera is configured to capture media (e.g., such as the media captured in response to detecting tap gesture 1050a or tap gesture 1050b, as described above in relation to FIGS. 10A-10C) that includes a sequence of images in response to detecting a request to capture media. In some embodiments, the series of images that are captured includes one or more images that were captured before the request to capture media was detected and one or more images that were captured after the request to capture media was detected.

As illustrated in FIG. 12A, camera display region 604 includes a portion of live preview 630 and zoom controls 622. Here, a "2×" zoom control is selected, which indicates that live preview 630 is being displayed at a 2× zoom level.

As illustrated in FIG. 12A, control region 606 includes shutter control 610, camera switcher control 614, a representation of media collection 612, and camera mode controls 620. Shutter control 610, when activated, causes device 600 to capture media (e.g., a photo), using the one or more camera sensors, based on the current state of live preview 630 and the current state of the camera application. The captured media is stored locally at electronic device 600 and/or transmitted to a remote server for storage. Camera switcher control 614, when activated, causes device 600 to switch to showing the FOV of a different camera(s) in live preview 630, such as by switching between a rear-facing camera sensor and a front-facing camera sensor. The representation of media collection 612 illustrated in FIG. 12A is a representation of media (an image, a video) that was most recently captured by device 600. As illustrated in FIG. 12A, camera mode controls 620 indicates which camera mode is currently selected and enables the user to change the camera mode. In FIG. 12A, camera modes controls 620a-620e are displayed, and photo camera mode 620c is indicated as being the current mode (e.g., a photo camera mode) in which the camera is operating by the bolding of the text. In response to detecting a request to capture media (e.g., detecting a selection of and/or activating shutter control 610), device 600 captures media of a type (e.g., photo media, video media) that is consistent with the current mode in which device 600 is operating (e.g., photo camera mode, video camera mode).

FIGS. 12A-12D illustrate exemplary user interfaces for displaying a file format indicator (e.g., 602r of FIG. 12D). In some embodiments, when a file format indicator is displayed, device 600 can be configured to capture and/or save media in one or more larger file formats than device 600 would normally be configured to capture and/or save media in (e.g., when the file format indicator is not displayed or not displayed in a particular state). In some embodiments, device 600 is normally configured to capture and/or save media in one or more smaller file formats (e.g., joint photographic experts group (JPEG) format, high efficiency image coding (HEIC) format) ("the normal file format").

In some embodiments, when a file format indicator is displayed, device 600 can capture and/or save media in one or more larger (or, in some embodiments, smaller) file formats than the normal file format ("the larger file format"), such as a raw image format and/or a minimally- or non-compressed format. In some embodiments, the compression applied to media is reduced when the media is saved in the larger file format than when the media is saved in the normal file format. In some embodiments, media saved in the larger file format contains data that is processed less than data that has been processed in the normal file format. In some embodiments, the larger file format contains more data (e.g., 2×-100× times) than the amount of data of the normal file format. In some embodiments, the color values of a respective media item are represented by a larger bitmap of color values when the media item is stored in the larger file format (e.g., color can be represented in 16 bits) than when the media item is stored in the normal file format (e.g., 8 bits, 10 bits, or 12 bits). In some embodiments, the larger file format includes information from multiple captured media items that are different, such as multiple frames of data. In some embodiments, the visual content (e.g., image data, video data) from each media item is merged into a set of one or more values (e.g., the color and/or brightness of a particular pixel or region is selected based on multiple captured frames of data) for a particular portion of a single media item (e.g., a media item that is representative of the frames of data).

At FIG. 12A, device 600 detects rightward swipe gesture 1250*a* on the bottom portion of control region 606.

As illustrated in FIG. 12B, in response to detecting rightward swipe gesture 1250*a*, device 600 displays the camera user interface with settings user interface 1200. Settings user interface 1200 includes camera settings 1202, which control various camera settings that device 600 can operate according to when the camera user interface is displayed. Camera settings 1200 includes HDR setting control 1202*a* and file-format-switcher-available-setting control 1202*b*. In FIG. 12B, HDR setting control 1202*a* is in an inactive state (e.g., as indicated by "OFF" displayed next to HDR setting control 1202*a*) and file-format-switcher-available-setting control 1202*b* is in an active state (e.g., as indicated by "ON" displayed next to file-format-switcher-available-setting control 1202*b*). Because HDR setting control 1202*a* is in the inactive state, device 600 is not configured to automatically blend images captured with different levels of exposure into a single image. Moreover, because file-format-switcher-available control 1202*b* is in the active state, device 600 is configured to display a file format indicator and, optionally, device 600 is configured to capture and save media in the large file format when file-format-switcher-available-setting control 1202*b* is set to inactive.

With regards to the HDR indicator 602*h* being displayed in FIG. 12A, device 600 displays HDR indicator 602*h* to allow a user the control (e.g., via a tap gesture to toggle the indicator on/off) over whether HDR media will be captured in responses to detecting a request to capture media. In FIG. 12A, device 600 displays HDR indicator 602*h* instead of displaying a file format indicator (as described below in relation to FIG. 12D) because HDR setting control 1202*a* is in the inactive state and irrespective to the state of file-format-switcher-available-setting control 1202*b*. Thus, in the embodiment shown in FIG. 12A, the display of HDR indicator 602*h* takes precedence over the display of a file format indicator and/or the state of HDR setting control 1202*a* takes precedence over (e.g., determines which indicator(s) are displayed in lieu of) the state of file-format-switcher-available control 1202*b*. At FIG. 12B, device 600 detects tap gesture 1250*b* on HDR control 1202*a*.

As illustrated in FIG. 12C, in response to detecting tap gesture 1250*b*, device 600 changes HDR setting control 1202*a* from being in the inactive state to being in the active state. When HDR setting control 1202*a* is in the active state, device 600 is configured to automatically blend images captured with different levels of exposure into a single image. At FIG. 12C, device 600 detects leftward swipe gesture 1250*c* on the bottom portion of settings user interface 1200.

As illustrated in FIG. 12D, in response to detecting leftward swipe gesture 1250*c*, device 600 re-displays the camera user interface. Additionally, in response to detecting leftward swipe gesture 1250*c*, a determination is made that file-format-switcher-available control 1202*b* is in the active state (e.g., device 600 is configured to display a file format indicator and, optionally, be configured to save and capture media of a larger format size) and HDR setting control 1202*a* is in the active state (e.g., device 600 is configured to automatically blend images captured with different levels of exposure into a single image). Based on this determination being made, device 600 displays file format indicator 602*r* and ceases to display HDR indicator 602*h*.

As illustrated in FIG. 12D, file format indicator 602*r* is displayed at the same location in indication region 602 in which HDR indicator 602*h* was previously displayed (e.g., as illustrated in FIG. 12A). In some embodiments, device 600 replaces HDR indicator 602*h* with file format indicator 602*r* because device has determined that a user cannot be allowed to control the capture of HDR media when HDR setting control 1202*a* is in the active state and file-format-switcher-available control 1202*b* is in the active state. In some embodiments, device 600 replaces HDR indicator 602*h* with file format indicator 602*r* because media stored in the larger file format includes the data (e.g., data corresponding to different levels of exposure) required to later display the captured media as HDR media or non-HDR media; accordingly, it is unnecessary for the user to manually control whether HDR media will be captured or not, while device 600 is configured to store media in the larger file format. In some embodiments, device 600 replaces HDR indicator 602*h* with file format indicator 602*r* because device 600 cannot be configured to capture HDR media in the large file format (e.g., to reserve system resources). In some embodiments, when file-format-switcher-available control 1202*b* is in the inactive state, device 600 does not display file format indicator 602*r* irrespective of the state in which HDR setting control 1202*a* is displayed.

As illustrated in FIG. 12D, file format indicator 602*r* is displayed in an inactive state. While file format indicator 602*r* is displayed in the inactive state, device 600 is configured to capture media and/or save in the normal file format instead of the larger file format. At FIG. 12D, device 600 detects tap gesture 1250*d* on shutter control 610.

As illustrated in FIG. 12E, in response to detecting tap gesture 1250*d*, device 600 initiates capture of media that is representative of live preview 630 of FIG. 12D and updates media collection 612 to show the representation of the newly captured media (e.g., the media that is representative of live preview 630 of FIG. 12D). At FIG. 12E, the newly captured media is a sequence of images because device 600 is currently configured to capture a sequence of images in response to receiving a request to capture media (e.g., indicated by animated image capture indicator 602d being displayed as active). Notably, in FIG. 12E, the representation of the newly captured media in media collection 612 includes the portions of live preview 630 that were displayed in camera display region 604 and does not include the portions of live preview 630 that was displayed in indicator region 602 (e.g., top of person's hair in FIG. 12D) and control region 604 (e.g., bottom of person's shirt pocket in FIG. 12D) of FIG. 12D. This is because, in the embodiment shown in FIG. 12E, device 600 does not present the portions of live preview 630 that were displayed in indicator region 602 (e.g., top of person's hair) and control region 604 (e.g., bottom of person's pocket) as a representation of the captured media in media collection 612 even when visual content (e.g., image data, video data) corresponding to the portions of live preview 630 that were displayed in indictor region 602 and control region 604 was captured after capture of the media was initiated. Thus, at FIG. 12E, the indicators (e.g., file format indicator 602r) and controls (e.g., shutter control 610) are displayed on top of the portions of live preview 630 that may not be included in a representation of captured media that is representative of the live preview. In some embodiments, the visual content that is captured, but not included in the representation of the captured media, is used to correct a representation of the captured media (e.g., using one or more techniques discussed above in relation to FIGS. 10A-10T). In some embodiments, device 600 captures images using one or more techniques described in U.S. Provisional Patent Application Ser. No. 63/020,462, filed on May 5, 2020, and titled "USER INTERFACES FOR CAPTURING AND MANAGING VISUAL MEDIA," which is incorporated by reference herein, in its entirety and especially for the disclosure relating to FIGS. 10A-10K and 11A-11C of that application.

In FIG. 12E, the media captured by device 600 is media that is saved in the normal format because format indicator 602r was displayed in the inactive state (e.g., device 600 is configured to capture and/or save media in the normal file format) when tap gesture 1250d was detected on shutter control 610 in FIG. 12D. At FIG. 12E, device 600 detects tap gesture 1250e on (e.g., at a location corresponding to a location of) file format indicator 602r.

As illustrated in FIG. 12F, in response to detecting tap gesture 1250e, device 600 changes file format indicator 602r from being in the inactive state (e.g., slash through the indicator in FIG. 12E) to being in an active state (e.g., no slash through the indicator). In response to detecting tap gesture 1250e, device 600 is also configured capture and/or save in the larger file format in response to detecting a request to capture media (e.g., detecting an input on shutter control 610). Additionally, in response to detecting tap gesture 1250e, device 600 also changes animated image capture indicator 602d from the active state to an inactive state. Thereby, in response to detecting tap gesture 1250e, device 600 is configured to not capture media that includes a sequence of images (e.g., using one or more techniques as described above in relation to FIGS. 10D-10E). Thus, in the embodiment illustrated in FIG. 12F, file format indicator 602r and animated image capture indicator 602d cannot be displayed in the active state at the same time. In other words, device 600 automatically switches the state of one of the indicators when a state of the other indicator has changed because a determination has been made that device 600 cannot capture and save animated images in the larger file format (e.g., due to concerns involving unintended use of available storage capacity). In some embodiments, device 600 receives a tap gesture while file format indicator 602r is displayed in the active state and, in response to receiving the tap gesture, device 600 changes file format indicator 602r to be displayed in the inactive state and changes animated image capture indicator to be displayed in the active state (or reverts to displaying animated image capture indicator in the state in which it was displayed before tap gesture 1250e was detected).

FIGS. 12F-12I illustrate an exemplary scenario that occurs after file format indicator 602r has been switched to be displayed in the active state (and/or device 600 is configured to capture media with the larger file format). The exemplary scenario of FIGS. 12F-12I is a scenario where device 600 automatically reverts or does not automatically (e.g., without intervening user input that corresponds to an express request to revert) revert file format indicator 602r back to being displayed in the inactive state based on a set of criteria. In particular, the exemplary scenario shown in FIGS. 12F-12I shows device 600 automatically reverting file format indicator 602r back to being in the inactive state when a predetermined period of time has passed (and not automatically reverting file format indicator 602r from being in the active state to being in the inactive state when the predetermined period of time has not passed) since the camera application associated with the camera user interface was the active application. The predetermined period of time used is 30 seconds in the scenario of FIGS. 12F-12I, but any other predetermined period of time(s) (e.g., 10-30 seconds, one or more days, one or more weeks) could be used.

In some embodiments, device 600 chooses to automatically revert file format indicator 602r back to the inactive state to avoid unintended use of available storage (e.g., an available storage of device 600 or a media storage system that is in communication with device 600). When device 600 automatically reverts file format indicator 602r back to being in the inactive state, device 600 is re-configured to capture and/or save media in the normal file format in response to a request to capture media, which is smaller in size (e.g., amount of data) than the media in the larger file format. Thereby, device 600 is able to save system resources (e.g., available storage capacity) by choosing to automatically capture and save media in the normal file format to avoid unintended (e.g., when a user has forgotten to switch the file format indicator back to inactive) capture of media that is saved in the larger file format and that would use up more available storage. At FIG. 12F, device 600 detects leftward swipe gesture 1250f.

As illustrated in FIG. 12G, device 600 displays messaging application user interface 1270 and ceases to display the camera user interface. Messaging application user interface 1270 is a user interface for a messaging application, which is different from the camera application that corresponds to the camera user interface. In FIG. 12G, when device 600 displays messaging application user interface 1270 and ceases to display the camera user interface, the messaging application user interface is the active application (e.g., or the application that is running in the foreground), and the camera application is an application that running in the background (or is a hibernated and/or suspended application) and is not an active application. At FIG. 12G, device 600 detects rightward swipe gesture 1250g. In response to detecting rightward swipe gesture 1250g (e.g., a request to re-display the camera user interface or a request to display the camera user interface), device 600 displays the camera user interface of FIG. 12H or FIG. 12I, where the camera user interface becomes the active application.

At FIG. 12H, thirty-one-second-time indication 1260a is provided to show that the camera application has not been the active application for 31 seconds. As illustrated in FIG. 12H, in response to detecting rightward swipe gesture 1250g, device 600 makes a determination that the camera application has not been an active application for more than a predetermined period of time (e.g., 1, 2, 5, 10, 15, 30, 60, 120, or 300 seconds) (and/or the messaging application (e.g., an application that is not the camera application) has been the active application for a predetermined period of time). Because of the determination that the camera application has not been active for a predetermined period of time, device 600 automatically reverts file format indicator 602r back to the inactive state (e.g., changes file format indicator 602r from being display in the active state in FIG. 12F to being displayed in the inactive state in 12H). Additionally, device 600 also automatically reverts animated image capture indicator 602d back to the active state (e.g., the state in which it was previously before tap gesture 1250e was detected). In other words, because of the determination that the camera application has not been active for a predetermined period of time, device 600 automatically re-configures device 600 to capture and save media, which includes a sequence of images (e.g., still images), in the normal file format.

At FIG. 12I, twenty-nine-second-time indication 1260b is provided to show that the camera application has not been the active application for 29 seconds. As illustrated in FIG. 12I, in response to detecting rightward swipe gesture 1250g, device 600 makes a determination that the camera application has been a background application (e.g., has not been an active application) for less than a predetermined period of time (e.g., 30 seconds) (e.g., 29 seconds being lesser than 30 seconds). Because of the determination that the camera application has been a background application for less than a predetermined period of time, device 600 does not automatically revert file format indicator 602r back to the inactive state and animated image capture indicator 602d to the active state. In other words, device 600 maintains file format indicator 602r in the active state (and animated image capture indicator 602d in the inactive state) because less than the predetermined amount has passed since the camera user interface was previously displayed (and/or before the camera user interface is re-displayed). At FIG. 12I, device 600 detects tap gesture 1250i on shutter control 610.

As illustrated in FIG. 12J, in response to detecting tap gesture 1250i, device 600 initiates capture of media representative of live preview 630 of FIG. 12I and updates media collection 612 to show the representation of the newly captured media (e.g., using one or more similar techniques to those discussed above in relation to the representation of the newly captured media of FIG. 12D). The representation of the newly captured media of FIG. 12I includes only the portion of live preview 630 that was displayed in camera region 604 in FIG. 12I (e.g., for similar reasons stated above in relation to the representation of the newly captured media of FIG. 12D). At FIG. 12J, the media captured (e.g., representative of live preview 630 of FIG. 12I) is saved in the larger file format. At FIG. 12J, device 600 detects tap gesture 1250j on animated image capture indicator 602d.

As illustrated in FIG. 12K, in response to detecting tap gesture 1250j, device 600 changes animated image capture indicator 602d to being in the active state and changes file format indicator 602r to being in the inactive state (e.g., for similar reasons as described above in relation to FIG. 12E). In response to detecting tap gesture 1250j, device 600 is configured to capture media, which includes a sequence of images, in the normal file format when a request to capture media is received. At FIG. 12K, device 600 detects rightward swipe gesture 1250k on camera display region 604.

As illustrated in FIG. 12L, in response to detecting rightward swipe gesture 1250k, device 600 moves camera controls 620 to the right and displays video camera mode control 620b as being selected. Thus, at FIG. 12L, device 600 is configured to be in a video capture mode instead of the photo capture mode that device 600 was previously in (e.g., as illustrated in FIGS. 12A-12K). At FIG. 12L, because device 600 is configured to be in the video capture mode, device 600 ceases to display file format indicator 602r. In some embodiments, device 600 ceases to display file format indicator 602r while device 600 is configured to be in the video capture mode based on a determination that is made that video media is not available to be saved in the larger file format (or can only be saved in the normal file format) (e.g., for similar reasons as stated above in relation to HDR control 1202a of FIG. 12B). At FIG. 12L, device 600 detects tap gesture 1250l on the representation of media collection 612.

As illustrated in FIG. 12M, in response to detecting tap gesture 1250l, device 600 displays a photo viewer user interface that includes enlarged representation 1234c and thumbnail media representations 1224a, 1224b, and 1224c. Thumbnail media representation 1224b corresponds to media captured in FIGS. 12D-12E (e.g., in response to detecting tap gesture 1250d), and thumbnail media representation 1224c and enlarged representation 1234c correspond to media captured in FIG. 12I-12J (e.g., in response to detecting tap gesture 1250i). Thumbnail media representations 1224a, 1224b, and 1224c are displayed in chronological order from left to right with respect to when each thumbnail's respective media was captured (e.g., the thumbnail that represents the most recently captured media is displayed furthest right in the photo viewer user interface). As illustrated in FIG. 12M, device 600 displays enlarged representation 1234c within the photo viewer user interface because enlarged representation 1234c represents the most recently captured media. As described above in relation to FIGS. 12I-12J, the media that is represented by enlarged representation 1234c was captured and saved in the larger file format when tap gesture 1250i was received while file format indicator 602r was displayed in an active state. At FIG. 12M, device 600 made a determination that the media represented by enlarged representation 1234c was captured and saved in the larger file format. Thus, because of this determination, a file format indication 1264 is displayed within the photo viewer user interface while enlarged representation 1234c is displayed concurrently displayed in the photo viewer user interface. Device 600 displays file format indication 1264 to indicate that the media represented by the enlarged representation 1234c was captured and saved in the large file format. At FIG. 12M, device 600 detects rightward swipe gesture 1250m on the photo viewer user interface.

As illustrated in FIG. 12N, in response to detecting rightward swipe gesture 1250m, device 600 ceases display of enlarged representation 1234c in the photo viewer user interface and displays enlarged representation 1234b within the photo viewer user interface. Enlarged representation 1234b is displayed in response to the detection of rightward swipe gesture 1250m because the media represented by enlarged representation 1234b was captured prior to capturing the media represented by enlarged representation 1234c. As described above in relation to FIGS. 12D-12E, the media that is represented by enlarged representation 1234b was captured while file format indicator 602r was displayed in an inactive state. Because device 600 made a determination that the media represented by enlarged representation 1234*b* was not captured and saved in the larger file format, the file format indication 1264 is not displayed within the photo viewer user interface of FIG. 12N while enlarged representation 1234*b* is displayed within the photo viewer user interface of FIG. 12N. In some embodiments, one or more other images included in enlarged representation 1234*b* are displayed (e.g., using one or more techniques as described above in relations to FIGS. 10I-10J) because enlarged representation 1234*b* is representative of media that was captured when animated capture indicator 602*d* was active (e.g., as described above in relation to FIGS. 12D-12E).

FIGS. 13A-13C are a flow diagram illustrating exemplary methods for managing the file format of media using an electronic device (e.g., a computer system) in accordance with some embodiments. Method 1300 is performed at a computer system (e.g., 100, 300, 500, 600). The computer system has one or more cameras (e.g., one or more cameras (e.g., dual cameras, triple camera, quad cameras, etc.) on the same side or different sides of the computer system (e.g., a front camera, a back camera))), where the computer system (e.g., 600) is in communication with a display generation component (e.g., a display controller, a touch-sensitive display system) and one or more input devices (e.g., a touch-sensitive surface).

Some operations in method 1300 are, optionally, combined, the orders of some operations are, optionally, changed, and some operations are, optionally, omitted.

As described below, method 1300 provides an intuitive way for managing the file format of media. The method reduces the cognitive burden on a user for managing the file format of media, thereby creating a more efficient human-machine interface. The method increases the availability of system resources (e.g., storage) by intelligently managing what types of media can be captured and/or saved in a particular file format. For battery-operated computing systems, enabling for managing the file format of media faster and more efficiently conserves power and increases the time between battery charges.

The computer system displays (1302), via the display generation component, a camera user interface (e.g., a user interface associated (included in, of) with a camera application (e.g., an application for managing the capture of media)). As a part of displaying the camera user interface, the computer system concurrently displaying a camera preview (e.g., a representation that updates over-time, a live preview feed of data from the camera) that includes a representation (e.g., 630) of one or more objects in a field-of-view of a first camera of the one or more cameras and a first selectable user interface object (e.g., 602*r*) for controlling a file format for storing media with the one or more cameras, where the first selectable user interface object is in a first state (e.g., 602*r* in FIG. 12D) (e.g., a state of being configured to be displayed in or being in (e.g., a pressed or depressed state, an appearance (e.g., color, font, text, translucency, opacity))) (e.g., a pressed or depressed state, an appearance (e.g., color, font, text, translucency, opacity)) that corresponds to a first file format. In some embodiments, in accordance with a determination that the first selectable user interface object is displayed in the first state for more than a predetermined period of time, the computer system maintains display of the first selectable user interface object in the first state. In some embodiments, the computer system continues to display the first selectable user interface object in the first state, irrespective of the time that the first selectable user interface object has been displayed. In some embodiments, the first selectable user interface object is displayed on a portion of the camera preview. In some embodiments, the user interface object is displayed above the camera preview (or below) the camera preview.

While displaying the camera user interface and while the first selectable user interface object is in the first state (e.g., 602*r* in FIG. 12E), the computer system detects (1304) a first input (e.g., 1250*e*) that corresponds to activation of the first selectable user interface object (e.g., a tap input on (e.g., or at a location corresponding to) the first selectable user interface object).

In response to detecting the first input (e.g., 1250*e*) that corresponds to activation of the first selectable user interface object, the computer system transitions (1306) (e.g., switches) the first selectable user interface object (e.g., 602*r*) from the first state (e.g., 602*r* in FIG. 12E) to a second state (e.g., 602*r* in FIG. 12F) (e.g., a state of being configured to be displayed in or being in (e.g., a pressed or depressed state, an appearance (e.g., color, font, text, translucency, opacity))) that is different from the first state, where the second state corresponds to a second file format that is different from the first file format.

After transitioning the first selectable user interface object from the first state to the second state, as a part of displaying (1308) the first selectable user interface object, the computer system, in accordance with a determination that a set of reversion criteria are met, wherein the set of reversion criteria includes a criterion that is met when a predetermined period of time (e.g., a non-zero period of time) (e.g., a predetermined period of time that is measured from when an application (e.g., music application, messaging application, web application) other than the application associated with the camera user interface (e.g., camera application) begins to operate as the active application; a predetermined period of time since the camera application transitioned from being the active application to being a background, suspended, or closed application); a predetermined period of time of inactivity (e.g., a predetermined period of time where no user inputs have been detected), a predetermined period of time of inactive capturing (e.g., a predetermined period of time where no request to capture media have been received), a predetermined period of time while the first selectable user interface object is displayed (e.g., actively displayed while the camera user interface is displayed) in the second state, a predetermined period of time while selectable user interface is in the second state, irrespective of whether the first selectable user interface object and/or whether one or more portions of the camera user interface are displayed) has elapsed, the computer system re-displays (1310) the first selectable user interface object in the first state (e.g., 602*r* in FIG. 12H).

After transitioning the first selectable user interface object from the first state to the second state, as a part of displaying (1308) the first selectable user interface object, the computer system, in accordance with a determination that the set of reversion criteria are not met, displays (1312) the first selectable user interface object in the second state (e.g., 602*r* in FIG. 12I). In some embodiments, the reversion criteria are not met when an additional input that corresponds to activation of the first selectable user interface object while the object is in the second state (e.g., an input that causes a transition from the second state to the first state) has been received).

The computer system receives (1314), via the one or more input devices, a second input (e.g., 1250*d*, 1250*i*) corresponding to a request to capture media with the one or more cameras (e.g., a tap on (e.g., at a location corresponding to)

a shutter button (e.g., 610) (e.g., a selectable user interface object for capturing media)). In some embodiments, the shutter button is displayed concurrently with the first selectable user interface object for controlling a file format for storing media.

In response to (1316) receiving the second input corresponding to the request to capture media with the one or more cameras and in accordance with (1318) a determination that the first selectable user interface object was in (e.g., displayed in) the first state (e.g., 602r in FIG. 12D) when the second input was received (e.g., 1250d), the computer system captures (1320) first media and stores (1322) the first media in the first file format (e.g., compressed format, such as JPEG for HEIC).

In response to (1316) receiving the second input corresponding to the request to capture media with the one or more cameras and in accordance with (1324) a determination that the first selectable user interface object was in (e.g., displayed in) the second state (e.g., 602r in FIG. 12I) when the second input was received (e.g., 1250i), the computer system captures (1326) second media and stores (1328) the second media in the second file format (e.g., a reduced compression data format (e.g., an expanded dynamic range or uncompressed data format); a format that stores unprocessed or minimally processed image sensor data or retains information from the capture of the image that would be lost in a more compressed data format) that is different from the first file format. Displaying a first selectable user interface object for controlling a file format for storing media that transitions between states in response to detecting input that corresponds to activation of the first selectable user interface object for controlling the file format for storing media provides the user with a single control that can change the file format in which media is captured. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Capturing media in a file format that is based on the state of the first selectable user interface object for controlling the file format for storing media in response to receiving an input corresponding to a request to capture media allows a user to capture media in a particular file format and, in some embodiments, provides additional data for the user to adjust the media in different ways without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently. Re-displaying the first selectable user interface object for controlling a file format for storing media in the first state after transitioning the first selectable user interface object for controlling the file format for storing media from the first state to the second state and/or automatically reverting back to the compressed format when prescribed conditions are met (e.g., when reversion criteria are met) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, a media item that is stored in the second file format (e.g., reduced-compressed file format) has color that is represented by a color gamut (e.g., 16 bits of data) that is larger than the color gamut (e.g., 12 bits of 10 bits of data) that is used to represent the color of a media item that is stored in the first file format (e.g., a compressed file format). In some embodiments, a media item that is stored in the second file format (e.g., reduced compression file format) is larger in size (e.g., 2 times, 4 times, or 6 times larger) than the size of the same media item that is stored in the first file format (e.g., a compressed file format).

In some embodiments, while (e.g., while displaying) the first selectable user interface object (602r) for controlling the file format for storing media with the one or more cameras is in the first state, the computer system receives an input corresponding to selection of the first selectable user interface object and, in response to receiving the input corresponding to selection of the first selectable user interface object, the computer system transitions the first selectable user interface object from being displayed in the first state to the second state. In some embodiments, while the first selectable user interface object for controlling the file format for storing media with the one or more cameras is in the second state, the computer system receives an input corresponding to selection of the first selectable user interface object and, in response to receiving the input corresponding to selection of the first selectable user interface object, transitions the first selectable user interface object from being displayed in the second state to being displayed in the first state.

In some embodiments, the first selectable user interface object (e.g., 602r) for controlling the file format for storing media with the one or more cameras is displayed concurrently with a selectable user interface object (e.g., 622) (e.g., one or more selectable user interface objects) for controlling the zoom level of media capture (e.g., one or more buttons, one or more sliders (e.g., a wheel)) (e.g., while the first selectable user interface object is in the first state or the second state), where selection (e.g., a tap input, a swipe input on or more zoom controls) of the selectable user interface object for controlling the zoom level of media capture causes the computer system to transition the camera preview from being displayed at a current zoom level to a new zoom level.

In some embodiments, the first selectable user interface object (e.g., 602r) for controlling the file format for storing media with the one or more cameras is displayed concurrently with a preview (e.g., 612) of recently captured media (e.g., one or more thumbnail representations of recently (e.g., most recently) captured media. In some embodiments, in response to detecting (e.g., or receiving) selection (e.g., 1250l) of the preview of recently captured media, the computer system displays a photo viewer user interface (and, in some embodiments, ceases to display the camera user interface) concurrently with an enlarged representation of the recently captured media.

In some embodiments, the predetermined period of time has elapsed when a period of time since the first selectable user interface object (e.g., 602r) transitioned from the first state to the second state exceeds a first predetermined value of time (e.g., 1-1000 seconds). In some embodiments, the predetermined period of time has elapsed when a determination is made that a first predetermined period of time has passed since the first selectable user interface object was initially displayed in the second state. Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that a first predetermined period of time has passed since the first selectable user interface object transitioned from the first state to the second state) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the predetermined period of time has elapsed when a period of time that the camera user interface has been inactive (e.g., not displayed) exceeds a second predetermined period of time (e.g., 1-1000 seconds) (e.g., after the first selectable user interface object transitioned from the first state to the second state). In some embodiments, the predetermined period of time is a predetermined period of time that a camera application that includes the camera user interface has been closed. In some embodiments, in response to receiving an input to cease displaying the camera user interface (e.g., close the camera user interface), the computer system causes the camera user interface to run in the background and/or ceases to display the camera user interface. Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that the camera user interface has been inactive for more than a second predetermined period of time) allows the computer system to revert back to capturing compressed media (e.g., first media) that has a smaller file size than the media that is in the reduced compression format media (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/ interacting with the device) which, additionally, reduces power usage and improves battery life of the system by enabling the user to use the system more quickly and efficiently.

In some embodiments, the predetermined period of time has elapsed when a period of time of media not being captured exceeds a third predetermined period of time (e.g., 1-1000 seconds) (e.g., after the first selectable user interface object transitioned from the first state to the second state (and while the first selectable user interface object is displayed in the second state)). Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that media has not been captured since a third predetermined period of time after the first selectable user interface object transitioned from the first state to the second state) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the predetermined period of time has elapsed when a period of time that has elapsed without (e.g., the computer system or one or more inputs devices that are in communication with the computer system) receiving any inputs (e.g., 1250d, 1250e, 1250i) directed to the media capture user interface exceeds a fourth predetermined period of time (e.g., 1-1000 second) (and while the first selectable user interface object is displayed in the second state). Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that a request has not been received for more than a fourth predetermined period of time after the first selectable user interface object transitioned from the first state to the second state) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the predetermined period of time has elapsed when a period of time that the first selectable user interface object (e.g., 602r) for controlling the file format for storing media has been displayed (e.g., actively displayed (e.g., while the camera user interface is displayed)) in the second state exceeds a fifth predetermined period of time (e.g., 1-1000 second). Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that the first selectable user interface object for controlling the file format for storing media has been displayed in the second state for more than a fifth predetermined period of time) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the predetermined period of time has elapsed when a period of time since an application (e.g., a camera application) (e.g., is a part of a camera application, a user interface that is included in the camera application) that corresponds to the camera user interface is not currently running as an active application exceeds a sixth predetermined period of time (e.g., 1-1000 seconds) (e.g., and/or a predetermined period of time has passed since an application that corresponds to the camera user interface is running as the background application (e.g., an application that is not currently configured to receive user input (e.g., an input that does not include a request to display the application) without a request to display the application being received by the computer system before the input (e.g., an input that does not include a request to display the application) is received) (e.g., an application other than the camera application is the active application (e.g., an application that is running in the foreground). In some embodiments, an active application is an application that is currently configured to receive user input (e.g., an input that does not include a request to display the application) without a request to display the application being received by the computer system before the input (e.g., an input that does not include a request to display the application) is received). In some embodiments, the application that corresponds to the camera user interface is not currently running as the active application because the computer system is in a locked state (e.g., a state where the computer system requires an access verification (e.g., of an authorized user) (e.g., a password to be entered, one or more biometric data to be verified) before one or more application are fully functional and/or can be displayed. In some embodiments, the application that corresponds to the camera user interface is not currently running as the active application because another application (e.g., a social media application, a communication application, a word processing application) is currently running as the active application. Re-displaying the first selectable user interface object for controlling the file format for storing media in the first state after transitioning the first selectable user interface object for controlling the file format for storing media from the first state to the second state and/or automatically reverting back to the compressed format when prescribed conditions are met (e.g., that a sixth predetermined period of time has passed since an application that corresponds to the camera user interface is not currently running as an active application) allows the computer system to revert back to capturing compressed media (e.g., first media) that has a smaller file size than the media that is in the reduced compression format (e.g., second media), which preserves system resources by avoiding unintentional capture of the second media (e.g., and/or a large number of media items in the reduced compression format). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, while displaying the camera user interface and while the first selectable user interface object (e.g., 602r) is in the first state (e.g., while displaying the first selectable user interface object in the first state), the computer system receives a second request (e.g., 1250d) to capture media (e.g., detect an input on a shutter control). In some embodiments, in response to receiving the second request (e.g., 1250d) to capture media, the computer system captures (e.g., initiate capture of the media) (e.g., via the one or more cameras) the first media and stores the first media in the first file format (e.g., compressed format, such as JPEG for HEIC). Capturing and storing media in a first file format media in response to receiving an input corresponding to a request to capture media allows a user to capture media in a particular file format without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, while displaying the camera user interface and while the first selectable user interface object (e.g., 602r) is in the second state (e.g., while displaying the first selectable user interface object in the second state), the computer receives a third request (e.g., 1250i) to capture media. In some embodiments, in response to receiving the third request to capture media (e.g., detect an input on a shutter control), the computer system captures (e.g., initiate capture of the media) (e.g., via the one or more cameras) the second media and stores the second media in the second file format (e.g., raw format). Capturing and storing media in a second file format media in response to receiving an input corresponding to a request to capture media allows a user to capture media in a particular file format without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, prior to displaying the camera user interface that includes concurrently displaying the camera preview (e.g., 630) and the first selectable user interface object (e.g., 602*r*), the computer system displays, concurrently in the camera user interface and while not displaying the first selectable user interface object (e.g., the first selectable user interface object is not displayed anywhere in the user interface; is not displayed anywhere on screen), the camera preview (e.g., 630) (e.g., a second camera preview that includes a representation of one or more objects in a field-of-view of the first camera of the one or more cameras) and a second selectable user interface object (e.g., 602*h*) for controlling an HDR (e.g., high dynamic range (e.g., range of tone-mapping, bit depth, luminance volume, and/or color volume)) capture mode that, when selected, transitions the computer system between being configured to capture HDR media and not being configured to capture HDR media, where the second selectable user interface object is displayed at a location that is occupied by the first selectable user interface object when the first selectable user interface object is displayed along with the camera preview (e.g., when the reduced compression file format capture options is enabled).

In some embodiments, while concurrently displaying the camera preview (e.g., 630) and the second user interface object (e.g., 602*h*) for controlling the HDR capture mode, the computer system detects that a set of selectable user interface object transition criteria are met (e.g., 1250*b*). In some embodiments, in response to detecting that the set of selectable user interface object transition criteria are met (e.g., a set of criteria that includes a criterion that is met when a mode for automatic selection of an HDR mode is enabled; a set of criteria that is not met when a mode for automatic selection of an HDR mode is disabled), the computer system ceases to display the second selectable user interface object (e.g., 602*h*) in the camera user interface (e.g., at a first location). In some embodiments, in response to detecting that the set of selectable user interface object transition criteria are met (e.g., a set of criteria that includes a criterion that is met when a mode for automatic selection of an HDR mode is enabled; a set of criteria that is not met when a mode for automatic selection of an HDR mode is disabled), the computer system displays the first selectable user interface object (e.g., 602*r*) in the camera user interface (e.g., at the first location (e.g., the location in which the second selectable user interface object was displayed). In some embodiments, the first selectable user interface object and the second selectable user interface object are displayed in the same location. In some embodiments, the first selectable user interface object and the second selectable user interface object are mutually exclusive in their display states such that the selectable objects are not concurrently displayed. In some embodiments, the first selectable user interface object for controlling the file format for storing media is displayed at a respective location on the camera user interface. In some embodiments, while displaying the first selectable user interface object for controlling the file format for storing media, the computer system receives an indication that a high-dynamic-range capture (HDR) setting is (e.g., has changed to being) inactive (e.g., an intelligent high-dynamic-range capture setting, where the computer system automatically determines whether the computer system should be operating or should not be operating in the HDR mode). In some embodiments, in response to receiving the indication that the HDR capture setting is inactive, the computer system ceases display of the first selectable user interface object for controlling the file format for storing media (e.g., at the first location) and/or displays a selectable user interface object for controlling an HDR capture mode (e.g., at the first location), where selection of the selectable user interface object for controlling the HDR capture mode transitions the computer system to be configured to or to not be configured to capture HDR media. In some embodiments, in response to receiving the indication that the HDR capture setting is active, ceasing display of the selectable user interface object for controlling an HDR capture mode and/or displaying the selectable user interface object for controlling the file format for storing media at the first location. In some embodiments, in response to receiving the indication that the HDR capture setting is inactive, replacing the selectable user interface object for controlling the HDR capture mode with the selectable user interface object for controlling the file format for storing media. In some embodiments, in response to receiving the indication that the HDR capture setting is inactive, replacing the HDR capture mode with the first selectable user interface object for controlling the file format for storing media with the first selectable user interface object for controlling the HDR capture mode. Choosing to display the first selectable user interface object for controlling the file format for storing media or displaying a selectable user interface object for controlling an HDR capture mode (e.g., a particular location) in response to receiving the indication that the HDR capture setting is inactive provides the user with an additional control for controlling the operation of the camera when the changing of the capturing of the file format may not be allowed. Providing the user additional control enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the camera user interface is a camera user interface for a first capture mode (e.g., 620*c*) (e.g., a photo capture mode). In some embodiments, while displaying the camera user interface that includes the first selectable user interface object (602*r*) for controlling the file format for storing media, the computer system receives a request (e.g., an input that corresponds to a swipe gesture that starts at a location on the camera user interface) to display a second camera user interface for a second capture mode (e.g., 620*b*) (e.g., a video mode) that is different from the first capture mode (e.g., 620*c*). In some embodiments, in response to receiving the request to display the second camera user interface, the computer system displays the second camera user interface (e.g., in FIG. 12L) without displaying the first selectable user interface object for controlling the file format for storing media (e.g., 602*r*). Displaying the second camera user interface without displaying the first selectable user interface object for controlling the file format for storing in response to receiving the request to display the second camera user interface provides the user with visual feedback that the changing of the file format is not allowed to capture media while displaying the user interface for the second capture mode. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second capture mode is a video capture mode (e.g., 620*b*) (e.g., when the computer system is operating in the video capture mode, the computer system captures a video in response to receiving a request to capture media). In some embodiments, when the second capture mode is a video capture mode, the first capture mode is a photo capture mode (e.g., when the computer system is operating in the photo capture mode, the computer system captures a photo in response to receiving a request to capture media). Forgoing display of the first selectable user interface object for controlling the file format for storing media in response to receiving the request to display the second camera user interface for the video capture mode while displaying the camera user interface that includes the first selectable user interface object for controlling the file format for storing media provides the user with visual feedback that the changing of the file format is not allowed to capture video media. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first capture mode is a first type of photo capture mode (e.g., 620*c*) (e.g., a capture mode for capturing still photos or photo sets that include multiple still photos captured in response to a single activation of a shutter button). In some embodiments, the second capture mode is a second type of photo capture mode (e.g., 620*e*) (e.g., a capture mode for capturing panorama photos (e.g., a photo mode that stitches multiple photos together)) that is different from the first type of photo capture mode. Forgoing display of the first selectable user interface object for controlling the file format for storing media in response to receiving the request to display the second camera user interface for the second type of photo capture mode while displaying the camera user interface that includes the first selectable user interface object for controlling the file format for storing media when in the first type of photo capture mode provides the user with visual feedback that the changing of the file format is not allowed to capture photo media in the second type of photo capture mode (or media of the second type of photo(s)). Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first selectable user interface object (e.g., 602*r*) is displayed in the camera user interface concurrently with a third selectable user interface object (e.g., a shutter control) (e.g., 610) that, when selected, initiates capturing of media. In some embodiments, the second input (e.g., 1250*d*, 1250*i*) corresponding to the request to capture media with the one or more cameras is an input corresponding to the third selectable user interface object. Concurrently displaying the user interface object for capturing media with the first selectable user interface object for controlling the file format for storing media provides the user with a user interface object for capturing media while also reducing the number of operations that it would take to determine the file format of the potential media that will be captured in response to receiving input on the first selectable user interface object for capturing media if the user interface object for controlling the file format for storing media was not displayed. Reducing the number of inputs to perform an operation user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first selectable user interface object for controlling the file format for storing media is displayed on (e.g., overlaid on) a portion (e.g., in 602) of the camera preview (e.g., 630) that includes the representation of the one or more objects in the field-of-view of the one or more cameras. Displaying the user interface object for controlling the file format for storing media on a portion of the camera preview provides the user with visual feedback in the line of sight of the user while the user is focusing on the scene that is being captured. Providing improved visual feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, as a part of displaying the camera preview, the computer system concurrently displays a first portion (e.g., 604) of the representation in a first region (e.g., a camera display region) of the camera user interface and a second portion (e.g., 602) of the representation in a second region (e.g., a camera control region) of the camera user interface. In some embodiments, the second region is visually distinguished (e.g., having a dimmed appearance) (e.g., having a semi-transparent overlay on the second portion of the field-of-view of the one or more cameras) from the first region. In some embodiments, the second portion of the representation has a dimmed appearance when compared to the representation of the first portion of the representation. In some embodiments, the second portion of the representation is positioned above and/or below the first portion of the representation. In some embodiments, the first portion of the representation is a representation of the field-of-view of a first camera of the one or more cameras, and the second portion of the representation is a representation of the field-of-view of a second camera of the one or more cameras. In some embodiments, the first camera is a different type (e.g., telephone camera, wide-angle camera, ultra-wide-angle camera) of camera than the second camera. In some embodiments, the first selectable user interface object (e.g., 602*r*) for controlling the file format for storing media is displayed on the second portion (e.g., 602) of the representation that is displayed in the second region (and is not displayed on the first portion of the representation and/or in the primary region). In some embodiments, the first region has more area than the secondary region (e.g., the area of the first region is larger than the area of the second region). In some embodiments, the second region includes a plurality of control affordances (e.g., a selectable user interface object) (e.g., proactive control affordance, a shutter affordance (e.g., 610), a camera selection affordance (e.g., 614), a plurality of camera mode affordances (e.g., 620)) for controlling a plurality of camera settings (e.g., flash, timer, filter effects, f-stop, aspect ratio, live photo, etc.) (e.g., changing a camera mode) (e.g., taking a photo) (e.g., activating a different camera (e.g., front-facing to rear-facing)). In some embodiments, in response to detecting the input corresponding to a request to capture media (e.g., video, photo) with the one or more cameras, the computer system captures, with the one or more cameras, a media item (e.g., video, photo) that includes visual content corresponding to (e.g., from) the first portion of the representation and visual content corresponding to the second portion (e.g., from) of the representation. In some embodiments, after capturing the media item, the computer system receives a request to display the media item (e.g., a request to display). In some embodiments, in response to receiving the request to display the media item, the computer system displays a representation of the visual content corresponding to the first portion of the representation without displaying a representation of at least a portion of (or all of) the visual content corresponding to the second portion of the representation. In some embodiments, the captured image data includes the representations of both the first and second portions of the representation. In some embodiments, the second portion of the representation is omitted from the displayed representation of the captured image data but can be used to modify the displayed representation of the captured image data. For example, visual content that corresponds to the second portion of the representation can be used for camera stabilization, object tracking, changing a camera perspective (e.g., without zooming), changing camera orientation (e.g., without zooming), and/or to provide additional image data that can be incorporated into the displayed representation of the captured image data. Displaying the user interface object for controlling the file format for storing media on the first selectable user interface object is displayed on the second portion of the representation that is displayed in the second region provides the user with visual feedback in a potentially less visually distracting portion of the line of sight of the user while the user is focusing on the scene that is being captured. Providing improved visual feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after (e.g., while) displaying the camera user interface, the computer system receives (1330) a request (e.g., 1250*l*, 1250*m*) (e.g., a tap on a photo well and/or a thumbnail representation of the previously captured media, a swipe gesture) to display a representation of a previously captured media item. In some embodiments, in response to (1332) receiving the request (e.g., 1250*l*, 1250*m*) to display the representation of a previously captured media item and in accordance with a determination that the previously captured media item (e.g., or the representation of the previously captured media item) was stored in the second file format, the computer system concurrently displays (1334) a representation (e.g., 1234*c*) of the previously captured media item with a media format indicator (e.g., 1264) (e.g., a graphical indicator that represents the file format in which the captured media is saved). In some embodiments, in response to (1332) receiving the request (e.g., 1250*l*, 1250*m*) to display the representation of a previously captured media item and in accordance with a determination that the previously captured media item (e.g., or the representation of the previously captured media item) was not stored in the second file format, the computer system displays (1336) the representation (e.g., 1234*b*) of the previously captured media item without displaying the media format indicator. In some embodiments, in accordance with a determination that the representation of the previously captured media item was saved in the first file format, the computer system does not display a media format indicator. In some embodiments, in accordance with a determination that the representation of the previously captured media item was not saved in the first file format, the computer system display a media form indicator. In some embodiments, while displaying the representation of the previously captured media item with the media format indicator, receiving a second request to display a second representation of second previously captured media (e.g., that is different from the previously captured media) and, in response to receiving the second request, displaying the second representation of the second previously captured media with the media format indicator. In some embodiments, the same (e.g., in appearance) media format indicator is displayed concurrently with (e.g., at one distinct location on the camera user interface) different representations of different media items that were stored (and/or captured) in the second file format. Choosing to display a media format indicator based on whether the representation of the previously captured media item was stored in the second file format provides the user with visual feedback concerning media that was captured in a format that is larger while also avoiding to display the indicator when it is unnecessary. Providing improved visual feedback enhances the operability of the computer system and makes the user-device interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second media (e.g., represented by 1234*c*) includes a plurality of captured media items. In some embodiments, the second file format (e.g., a non-compressed format, a raw format) includes content (e.g., data representing media) from the plurality of captured media items (e.g., multiple frames of data that are combined using computational photography algorithms). In some embodiments, the content from the plurality of captured media items is merged (e.g., composited) into a set of one or more values (e.g., a static set) that correspond to a particular portion (and/or characteristics of a particular portion) of the image (e.g., color and/or brightness of a particular pixel or region is selected based on multiple captured images).

In some embodiments, in response to detecting the first input (e.g., 1250*e*) that corresponds to activation of the first selectable user interface object (e.g., 602*r*), the computer system configures the one or more cameras to capture media, which does not include a sequence of images, in response to receiving the request to capture media with the one or more cameras. In some embodiments, in accordance with a determination that the first selectable user interface object was in (e.g., displayed in) the second state when the second input was received and/or the one or more cameras are configured to capture media, which does not include a sequence of images, in response to receiving the request to capture media with the one or more cameras, the second media that is stored in the second file format is not a sequence of still images (e.g., the second media is a still image but not a sequence of still images (e.g., a sequence of still images that optionally includes some images that were captured before the second input corresponding to the request to capture media with the one or more cameras was received). In some embodiments, the first selectable user interface object for controlling the file format for storing media is concurrently displayed with a fourth selectable user interface object for controlling capture of a sequence (e.g., a series) of images that is in an active state. In some embodiments, as a part of transitioning the first selectable user interface object for controlling the file format for storing media from the first state to the second state, the computer system transmits the fourth selectable user interface object for controlling capture of a sequence of images (e.g., media that includes a sequence of images) from the active state to the inactive state. In some embodiments, while the fourth selectable user interface object for controlling capture of a sequence of images (e.g., media that includes a sequence of images) is in the active state, the computer system receives a single request to capture media. In some embodiments, in response to receiving the single request to capture media while the fourth selectable user interface object for controlling capture of a sequence of images (e.g., media that includes a sequence of images) is in the active state (e.g., a single selection on a shutter control), the computer system initiates capture of animated image media, where multiple images are captured and saved in response to receiving the request to capture media. In some embodiments, some of the multiple images were captured before the request to capture media was received, and some of the multiple images were captured after the request to capture media was received.

In some embodiments, the camera user interface includes a fourth selectable user interface object for controlling capture (e.g., capture in response to a single request to capture image(s)) of a sequence (e.g., a series) of images (e.g., 602*d*) that is displayed in an active state prior to when the first input that corresponds to activation of the first selectable user interface object for controlling the file format for storing media was received. In some embodiments, in response to detecting the first input (e.g., 1250*e*) that corresponds to activation of the first selectable user interface object for controlling the file format for storing media (e.g., in response to receiving a request to configure the computer system to capture and save media in the second file format), the computer system transitions the fourth selectable user interface object (e.g., 602*d*) for controlling capture of the sequence of images from the active state (e.g., second state) to an inactive state (e.g., first state) (e.g., in addition to transitioning the first selectable user interface object for controlling the file format for storing media from the first state to the second state). In some embodiments, as a part of transitioning the fourth selectable user interface object for controlling capture of a sequence of images from the active state to the inactive state, the computer system displays an animation of the fourth selectable user interface object for controlling capture of a sequence of images (e.g., media that includes a sequence of images) transitioning from the active state to the inactive state (e.g., after transitioning the fourth selectable user interface object for controlling capture of a sequence of images (e.g., media that includes a sequence of images) from the active state to the inactive state, the fourth selectable user interface object for controlling capture of a sequence of images (e.g., media that includes a sequence of images) is displayed in the inactive state). In some embodiments, in response to detecting the first input (e.g., a single input (e.g., a tap)) that corresponds to activation of the first selectable user interface object for controlling the file format for storing media, states of fourth selectable user interface object for controlling capture of a sequence of images and the first selectable user interface object for controlling the file format for storing media are changed. In some embodiments, the state of the fourth selectable user interface object for controlling capture of a sequence of images and the state of the first selectable user interface object for controlling the file format for storing media are opposites states of each other (e.g., on/off, active/inactive, enabled/disabled) (e.g., before and after both are changed). In some embodiments, after transitioning (e.g., switching) the first selectable user interface object for controlling the file format for storing media from the first state to second state, the first selectable user interface object for controlling the file format for storing media is displayed in the second state). In some embodiments, after configuring the one or more cameras to capture media, which does not include the sequence of images, in response to receiving the request to capture media with the one or more cameras and in accordance with a determination that a set of reversion criteria are met, the computer system configures the one or more cameras to capture media, which includes the sequence of images, in response to receiving the request to capture media with the one or more cameras (e.g., as represented by 602*d* in FIG. 12H). In some embodiments, in accordance with a determination that the first selectable user interface object was in (e.g., displayed in) the first state when the second input was received and/or the one or more cameras are configured to capture media that does include a sequence of images in response to receiving the request to capture media with the one or more cameras, the first media that is stored in the first file format is a sequence of still images (e.g., the first media includes a sequence of still images (e.g., a sequence of still images that optionally includes some images that were captured before the second input corresponding to the request to capture media with the one or more cameras was received). In some embodiments, in accordance with a determination that a set of reversion criteria are met, displaying the fourth selectable user interface object for controlling capture of a sequence of images (e.g., media that includes a sequence of images) in the active state. Transitioning the first selectable user interface object for controlling the file format for storing media from the first state to the second state such that it includes transitioning the fourth selectable user interface object for controlling capture of a sequence of images from the active state to the inactive state provides the user with a single control that can change the file format in which media is captured and the control for changing the capture of a sequence of images. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Transitioning the first selectable user interface object for controlling the file format for storing media from the first state to the second state such that it includes transitioning the fourth selectable user interface object for controlling capture of a sequence of images from the active state to the inactive state in response to receiving an input corresponding to a request to capture media allows a user to capture media with settings that are compatible without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, in response to detecting the first input (e.g., 1250*e*) that corresponds to activation of the first selectable user interface object for controlling the file format for storing media, the computer system configures the computer system to capture and store media in the second file format in response to receiving the request to capture media with the one or more cameras. In some embodiments, while the computer system is configured to capture and store media in the second file format in response to receiving the request to capture media with the one or more cameras, the computer system receives a request (e.g., 1250*j*) (e.g., a tap (e.g., 1250*j*) on a fifth selectable user interface object (e.g., 602*d*) for controlling capture of a second sequence of images (e.g., media that includes a sequence of images) that is in an inactive state) to configure the one or more cameras to capture media, which includes a second sequence of images (e.g., a sequence of still images that optionally includes some images that were captured before the second input corresponding to the request to capture media with the one or more cameras was received), in response to receiving the request to capture media with the one or more cameras. In some embodiments, in response to receiving the request (e.g., 1250*j*) to configure the one or more cameras to capture media, which includes the second sequence of images, in response to receiving the request to capture media with the one or more cameras, the computer system configures the computer system to capture and store media in the first file format in response to receiving the request to capture media with the one or more cameras (e.g., represented by 602*r* in FIG. 12K) (and configured the one or more cameras to capture media that includes the sequence of images in response to receiving the request to capture media with the one or more cameras). In some embodiments, the first selectable user interface object for controlling the file format for storing media is concurrently displayed with a fifth selectable user interface object for controlling capture of a sequence of images (e.g., media that includes a sequence of images) that is in an inactive state. In some embodiments, while displaying the camera user interface and while the first selectable user interface object is in the second state (e.g., while displaying the first selectable user interface object in the second state), the computer system receives an input that corresponds to changing the fifth selectable user interface object for controlling capture of a sequence of images (e.g., media that includes a sequence of images) from the inactive state to an active state. In some embodiments, in response to receiving the input that corresponds to changing the fifth selectable user interface object for controlling capture of a sequence of images (e.g., media that includes a sequence of images) from the inactive state to the active state (e.g., detect an input on the fifth selectable user interface object for controlling capture of a sequence of images (e.g., media that includes a sequence of images)), the computer system transitions (e.g., switching) the fifth selectable user interface object for controlling capture of a sequence of images (e.g., media that includes a sequence of images) from the inactive state to an active state and transitions (e.g., switching) the first selectable user interface object for controlling the file format for storing media from the second state to the first state. In some embodiments, the camera user interface includes a fifth selectable user interface object (e.g., 602*d*) for controlling capture of the second sequence (e.g., a series) of images that is displayed in an inactive state prior to when the request to configure the one or more cameras to capture media that includes the second sequence of images was received. In some embodiments, in response to receiving the request (e.g., 1250*j*) (e.g., a single input (e.g., a tap) on a fifth selectable user interface object for controlling capture of a second sequence of images that is in an inactive state) to configure the one or more cameras to capture media that includes the second sequence of images in response to receiving the request to capture media with the one or more cameras, the computer system transitions the fifth selectable user interface (e.g., 602*d*) object for controlling capture of the second sequence of images from the inactive state to the active state. In some embodiments, as a part of transitioning the fifth selectable user interface object for controlling capture of the second sequence of images from the inactive state to the active state, the computer system displays an animation of the fifth selectable user interface object for controlling capture of the second sequence of images (e.g., media that includes a sequence of images) transitioning from the inactive state to the active state (e.g., after transitioning the fifth selectable user interface object for controlling capture of the second sequence of images (e.g., media that includes a sequence of images) from the inactive state to the active state, the of the fifth selectable user interface object for controlling capture of the second sequence of images (e.g., media that includes a sequence of images) is displayed in the active state). In some embodiments, in response to receiving the request (e.g., 1250*j*) (e.g., a single input (e.g., a tap) on a fifth selectable user interface object for controlling capture of a second sequence of images that is in an inactive state) to configure the one or more cameras to capture media that includes the second sequence of images in response to receiving the request to capture media with the one or more cameras, the computer system transitions (e.g., switches) the first selectable user interface object (e.g., 602*r*) for controlling the file format for storing media from the second state to the first state. In some embodiments, as a part of transitioning (e.g., switching) the first selectable user interface object for controlling the file format for storing media from the second state to the first state, the computer system displays an animation of the first selectable user interface object for controlling the file format for storing media transitioning from the second state to the first state (e.g., after transitioning (e.g., switching) the first selectable user interface object for controlling the file format for storing media from the second state to the first state, the first selectable user interface object for controlling the file format for storing media is displayed in the first state). In some embodiments, in response to receiving the request to configure the one or more cameras to capture media that includes a sequence of images in response to receiving the request to capture media with the one or more cameras, states of the fifth selectable user interface object for controlling capture of a sequence of images and the first selectable user interface object for controlling the file format for storing media are changed. In some embodiments, the state of the fifth selectable user interface object for controlling capture of a sequence of images and the state of the first selectable user interface object for controlling the file format for storing media are opposites of each other (e.g., on/off, active/inactive, enabled/disabled) (e.g., before and after both are changed). Transitioning (e.g., switching) the fifth selectable user interface object for controlling capture of a sequence of images (e.g., media that includes a sequence of images) from the inactive state to an active state and transitioning (e.g., switching) the first selectable user interface object for controlling the file format for storing media from the second state to the first state in response to receiving the input that corresponds to changing the fifth selectable user interface object for controlling capture of a sequence of images (e.g., media that includes a sequence of images) from the inactive state to the active state provides the user with a single control that can change the file format in which media is captured and the control for changing the capture of a sequence of images. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Transitioning (e.g., switching) the fifth selectable user interface object for controlling capture of a sequence of images (e.g., media that includes a sequence of images) from the inactive state to an active state and transitioning (e.g., switching) the first selectable user interface object for controlling the file format for storing media from the second state to the first state in response to receiving the input that corresponds to changing the fifth selectable user interface object for controlling capture of a sequence of images (e.g., media that includes a sequence of images) from the inactive state to the active state in response to receiving an input corresponding to a request to capture media allows a user to capture media with settings that are compatible without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, the first selectable user interface object for controlling the file format for storing media (e.g., 602r) is not displayed when a setting for controlling the file format (e.g., 1202b) is disabled (e.g., off) (e.g., via user input on a selectable user interface object for controlling display of the user interface object for controlling the file format for capture media) (e.g., irrespective of whether one or more other criterion are satisfied). In some embodiments, the first selectable user interface object for controlling the file format for storing media is displayed when a setting (e.g., or a plurality of settings for controlling the file format is enabled (e.g., not disabled, on).

Note that details of the processes described above with respect to method 1300 (e.g., FIGS. 13A-13C) are also applicable in an analogous manner to the methods described above. For example, methods 700, 900, 1100, and 1400 optionally include one or more of the characteristics of the various methods described above with reference to method 1300. For example, method 900 described above may be used to capture media that is saved in a file format that is set using the methods described above with respect to method 1300. For brevity, these details are not repeated below.

FIGS. 14A-14B are a flow diagram illustrating exemplary methods for storing media using an electronic device (e.g., a computer system) in accordance with some embodiments. Method 1400 is performed at a computer system (e.g., 100, 300, 500, 600). The computer system has one or more cameras (e.g., one or more cameras (e.g., dual cameras, triple camera, quad cameras, etc.) on the same side or different sides of the computer system (e.g., a front camera, a back camera))), where the computer system (e.g., 600) is in communication with a display generation component (e.g., a display controller, a touch-sensitive display system) and one or more input devices (e.g., a touch-sensitive surface).

Some operations in method 1400 are, optionally, combined, the orders of some operations are, optionally, changed, and some operations are, optionally, omitted.

As described below, method 1400 provides an intuitive way for storing media. The method reduces the cognitive burden on a user for capture media, thereby creating a more efficient human-machine interface. The method increases the availability of system resources (e.g., storage) by intelligently managing what types of media can be captured and/or saved in a particular file format. For battery-operated computing systems, enabling for storing media faster and more efficiently conserves power and increases the time between battery charges.

The computer system displays (1402), via the display generation component, a camera user interface (e.g., a user interface associated (included in, of) with a camera application (e.g., an application for managing the capture of media)).

While displaying the camera user interface, the computer system detects (1404) a request (e.g., 1250d, 1250i) to capture media (e.g., a selection of a shutter button) with the one or more cameras.

In response to (1406) detecting the request (e.g., 1250d, 1250i) to capture media with the one or more cameras and in accordance with a determination that the computer system is configured to store (and/or capture) media in a first file format (e.g., represented by 602r in FIG. 12D) (e.g., compressed format, such as JPEG for HEIC), the computer system stores (1408) a sequence of images in the first file format (e.g., 612 in FIG. 12E), wherein the sequence of images can be played back in temporal order in response to a user input detected after the sequence of images has been captured.

In response to (1406) detecting the request (e.g., 1250d, 1250i) to capture media with the one or more cameras and in accordance with a determination that the computer system is configured to store (and/or capture) media in a second file format (e.g., represented by 602r in FIG. 12I), the computer system stores (1410) a single image in the second file format (e.g., 612 in FIG. 12J) (e.g., without storing another image in the second file format in response to detecting the request to capture media with the one or more cameras), where the second file format is a reduced compression file format relative to the first file format (e.g., a reduced compression data format (e.g., an expanded dynamic range or uncompressed data format); a format that stores unprocessed or minimally processed image sensor data or retains information from the capture of the image that would be lost in a more compressed data format). In some embodiments, a media item that is stored in the second file format (e.g., reduced compression file format) has color that is represented by a color gamut (e.g., 16 bits of data) that is larger than the color gamut (e.g., 12 bits of 10 bits of data) that is used to represent color of a media item that is stored in the first file format (e.g., a compressed file format). In some embodiments, a media item that is stored in the second file format (e.g., reduced compression file format) is larger in size (e.g., 2 times, 4 times, or 6 times larger) than the size of the same media item that is stored in the first file format (e.g., a compressed file format). Choosing to store a particular type of media (e.g., a single still photo or sequence of images) when prescribed conditions are met (e.g., based on whether the computer system is configured to store media in the first file format or the second file format) allows a user to capture media with settings that are compatible without requiring further user input and that automatically manage system resources (e.g., storage). Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, while displaying the camera user interface and while the computer system is configured to capture and store a sequence of images in response to detecting the request to capture media with the one or more cameras, the computer system detects a request (e.g., 1250e) to configure the computer system to store media in the second file format. In some embodiments, in response to detecting the request to configured the computer system to store (e.g., and/or capture) media in the second file format, the computer system (e.g., without any additional user input) configures (e.g., changes one or more settings of the camera application, the cameras, and/or other applications/devices of the computer system or in communication with the computer system) the computer system to store media in the second file format in response to detecting the request to store media with the one or more cameras (e.g., as represented by 602r in FIG. 12F). In some embodiments, in response to detecting the request to configured the computer system to store (e.g., and/or capture) media in the second file format, the computer system (e.g., without any additional user input) configures (e.g., changes one or more settings of the camera application, the cameras, and/or other applications/devices of the computer system or in communication with the computer system) the computer system to store a second single image in response to detecting the request to store media with the one or more cameras (e.g., instead of storing a sequence of images) (e.g., as represented by 602d in FIG. 12F). In some embodiments, configuring the computer system to store the second single image in response to detecting the request to store media with the one or more cameras includes configuring the computer system to not store a sequence of images in response to detecting the request to store media with the one or more cameras, wherein the second sequence of images can be played back in temporal order in response to a user input detected after the sequence of images has been captured. In some embodiments, the camera user interface includes a selectable user interface object for controlling the file format. In some embodiments, in response to detecting the first input that corresponds to activation of the selectable user interface object, configuring the one or more cameras to store media, which does not include a sequence of images, in response to receiving the request to capture media with the one or more cameras. In some embodiments, in accordance with a determination that the selectable user interface object was in (e.g., displayed in) the second state when the second input was received and/or the one or more cameras are configured to store media, which does not include a sequence of images, in response to receiving the request to capture media with the one or more cameras, the second media that is stored in the second file format is not a sequence of still images (e.g., the second media is a still image but not a sequence of still images (e.g., a sequence of still images that optionally includes some images that were captured before the second input corresponding to the request to capture media with the one or more cameras was received). In some embodiments, the selectable user interface object for controlling the file format for storing media is concurrently displayed with a selectable user interface object for controlling store a sequence (e.g., a series) of images that is in an active state. In some embodiments, as a part of transitioning the selectable user interface object for controlling the file format for storing media from the first state to the second state, the computer system transmits the selectable user interface object for controlling capture of a sequence of images (e.g., media that includes a sequence of images) from the active state to the inactive state. In some embodiments, while the selectable user interface object for controlling capture of a sequence of images (e.g., media that includes a sequence of images) that is in the active state, the computer system receives a single request to capture media. In some embodiments, in response to receiving the single request to capture media while the selectable user interface object for controlling capture of a sequence of images (e.g., media that includes a sequence of images) that is in the active state (e.g., a single selection on a shutter control), the computer system initiates capture of animated image media, where multiple images are captured and saved in response to receiving the request to capture media. In some embodiments, some of the multiple images were captured before the request to capture media was received, and some of the multiple images were captured after the request to capture media was received. In some embodiments, while the computer system is configured to store media in the second file format in response to detecting the request to store media with the one or more cameras and while the computer system is not configured to capture and store a sequence of images in response to detecting the request to capture media with the one or more cameras, the computer system detects a request to configure the computer system to store media in the first file format (e.g., disabling storing media in the second file format). In some embodiments, in response to the request to configure the computer system to store media in the first file format, the computer system is configured to store media in the first file format and is also configured to capture and store a sequence of images in response to detecting the request to capture media with the one or more cameras. In some embodiments, in response to the request to configure the computer system to store media in the first file format, the computer system is configured to store media in the first file format but is not configured (e.g., re-configured) to capture and store a sequence of images in response to detecting the request to capture media with the one or more cameras (e.g., remains configured to store a second single image in response to detecting the request to store media with the one or more cameras.

In some embodiments, the camera user interface includes a selectable user interface object for controlling a file format for storing media (e.g., 602r) and a selectable user interface object for controlling capture of a sequence of images (e.g., 602d). In some embodiments, in response to detecting the request (e.g., 1250e) to configure the computer system to store media in the second file format (e.g., in response to detecting the first input (e.g., 1250e) that corresponds to activation of the selectable user interface object for controlling the file format for storing media), the computer system displays (e.g., without any further user input) the selectable user interface object for controlling the file format for storing media in an active state (e.g., 602r in FIG. 12F) (e.g., a state that indicates that the computer system is configured to capture and store media in the second file format in response to detecting a request to capture media). In some embodiments, in response to detecting the request (e.g., 1250e) to configure the computer system to store media in the second file format (e.g., in response to detecting the first input (e.g., 1250e) that corresponds to activation of the selectable user interface object for controlling the file format for storing media), the computer system (e.g., without any additional user input) displays (e.g., without any further user input) the selectable user interface object for controlling capture of the sequence of images in an inactive state (e.g., 602d in FIG. 12F) (e.g., a state that indicates that the computer system is not configured to capture and store media that includes a sequence of images that can be played back). In some embodiments, in response to detecting the request to configured the computer system to capture media in the second file format (e.g., in response to detecting the first input (e.g., 1250e) that corresponds to activation of the selectable user interface object for controlling the file format for storing media), the computer system transitions the selectable user interface object (e.g., 602d) for controlling capture of the sequence of images from the active state (e.g., second state) to an inactive state (e.g., first state) (e.g., in addition to transitioning the selectable user interface object for controlling the file format for storing media from the first state to the second state). In some embodiments, as a part of transitioning the selectable user interface object for controlling capture of a sequence of images from the active state to the inactive state, the computer system displays an animation of the selectable user interface object for controlling capture of a sequence of images (e.g., media that includes a sequence of images) transitioning from the active state to the inactive state (e.g., after transitioning the selectable user interface object for controlling capture of a sequence of images (e.g., media that includes a sequence of images) from the active state to the inactive state, the selectable user interface object for controlling capture of a sequence of images (e.g., media that includes a sequence of images) is displayed in the inactive state). In some embodiments, in response to detecting the first input (e.g., a single input (e.g., a tap)) that corresponds to activation of the selectable user interface object for controlling the file format for storing media, states of selectable user interface object for controlling capture of a sequence of images and the selectable user interface object for controlling the file format for storing media are changed. In some embodiments, the state of the selectable user interface object for controlling capture of a sequence of images and the state of the selectable user interface object for controlling the file format for storing media are opposites states of each other (e.g., on/off, active/inactive, enabled/disabled) (e.g., before and after both are changed). In some embodiments, after transitioning (e.g., switching) the selectable user interface object for controlling the file format for storing media from the first state to the second state, the selectable user interface object for controlling the file format for storing media is displayed in the second state). Displaying the selectable user interface object for controlling the file format for storing media in the active state and displaying the selectable user interface object for controlling capture of a sequence of images in an inactive state when prescribed conditions are met allows a user to capture media with settings that are compatible without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, after configuring the computer system to store media in the second file format in response to detecting the request to store media with the one or more cameras and configuring the computer system to store the second single image in response to detecting the request to store media with the one or more cameras and in accordance with a determination that a set of reversion criteria are met, wherein the set of reversion criteria includes a criterion that is met when a predetermined period of time (e.g., a non-zero period of time) (e.g., a predetermined period of time that is measured from when an application (e.g., music application, messaging application, web application) other than the application associated with the camera user interface (e.g., camera application) begins to operate as the active application; a predetermined period of time since the camera application transitioned from being the active application to being a background, suspended, or closed application); a predetermined period of time of inactivity (e.g., a predetermined period of time where no user inputs have been detected), a predetermined period of time of inactive capturing (e.g., a predetermined period of time where no request to capture media have been received), a predetermined period of time while the selectable user interface object is displayed (e.g., actively displayed while the camera user interface is displayed) in the second state, a predetermined period of time while selectable user interface is in the second state, irrespective of whether the selectable user interface object and/or whether one or more portions of the camera user interface are displayed) has elapsed, the computer system configures (e.g., changes one or more settings of the camera application, the cameras, and/or other applications/devices of the computer system or in communication with the computer system) the computer system to store media in the first file format in response to detecting the request to capture media with the one or more cameras (e.g., as represented by 602r in FIG. 12I) and configures (e.g., changes one or more settings of the camera application, the cameras, and/or other applications/devices of the computer system or in communication with the computer system) the computer system to store the sequence of images in response to detecting the request to capture media with the one or more cameras (e.g., as represented by 602d in FIG. 12I). In some embodiments, in accordance with a determination that a set of reversion criteria are met, the computer system displays (e.g., without any further user input) the selectable user interface object for controlling the file format for storing media in an inactive state (e.g., a state that indicates that the computer system is configured to capture and store media in the first file format in response to detecting a request to capture media) and displays (e.g., without any further user input) the selectable user interface object for controlling capture of a sequence of images in an active state (e.g., a state that indicates that the computer system is configured to capture and store media that includes a sequence of images that can be played back). In some embodiments, in accordance with a determination that a set of reversion criteria are not met, the computer system is configured to store media in the second file format in response to detecting the request to store media with the one or more cameras (e.g., as represented by 602r in FIG. 12H) and configured to store the second single image in response to detecting the request to store media with the one or more cameras (e.g., as represented by 602d in FIG. 12H).

In some embodiments, while displaying the camera user interface and while the computer system is configured to store media in the second file format in response to detecting the request to capture media with the one or more cameras (e.g., as represented by 602r in FIG. 12J), the computer system detects a request to configure the computer system to capture media that includes the sequence of images (e.g., the sequence of images that can be played back in temporal order in response to a user input detected after the sequence of images has been captured). In some embodiments, in response to detecting the request (e.g., 1250j) to configure the computer system to capture the media that includes the sequence of images, the computer system (e.g., without any additional user input), configures (e.g., changes one or more settings of the camera application, the cameras, and/or other applications/devices of the computer system or in communication with the computer system) the computer system to store media in the first file format in response to detecting the request to capture media with the one or more cameras (e.g., as represented by 602r in FIG. 12K) and configures (e.g., changes one or more settings of the camera application, the cameras, and/or other applications/devices of the computer system or in communication with the computer system) the computer system to store the sequence of images in response to detecting the request to capture media with the one or more cameras (e.g., as represented by 602d in FIG. 12K). In some embodiments, while the computer system is configured to store media in the first file format in response to detecting the request to capture media with the one or more cameras and while the computer system is configured to store the sequence of images in response to detecting the request to capture media with the one or more cameras, the computer system, the computer system detects a request to store a single image in response to detecting the request to store media with the one or more cameras (e.g., to no longer store the sequence of images in response to detecting the request to capture media with the one or more cameras). In some embodiments, in response to the request to store a single image in response to detecting the request to store media with the one or more cameras, the computer system is configured to store a single image in response to detecting the request to store media with the one or more cameras and is also configured (e.g., re-configured) to store media in the second file format in response to detecting the request to capture media with the one or more cameras. In some embodiments, in response to the request to store a single image in response to detecting the request to store media with the one or more cameras, the computer system is configured to store a single image in response to detecting the request to store media with the one or more cameras but is not configured (e.g., re-configured) to store media in the second file format in response to detecting the request to capture media with the one or more cameras (e.g., media continues to be stored in the first file format).

In some embodiments, the camera user interface includes a second selectable user interface object for controlling a file format for storing (e.g., and/or capturing) media and a second selectable user interface object for controlling capture of the third sequence of images. In some embodiments, in response to detecting the request (e.g., 1250j) to configure the computer system to capture media that includes the sequence of images, the computer system (e.g., without any additional user input) displays (e.g., without any further user input) the second selectable user interface object for controlling the file format for storing media (e.g., 602r in FIG. 12K) in an inactive state (e.g., a state that indicates that the computer system is configured to capture and store media in the first file format in response to detecting a request to capture media) and displays (e.g., without any further user input) the second selectable user interface object for controlling capture of the sequence of images (e.g., 602d in FIG. 12K) in an active state (e.g., a state that indicates that the computer system is configured to capture and store media that includes a sequence of images that can be played back). In some embodiments, the selectable user interface object for controlling the file format for storing media is concurrently displayed with the selectable user interface object for controlling capture of a sequence of images (e.g., media that includes a sequence of images) that is in an inactive state. In some embodiments, while displaying the camera user interface and while the selectable user interface object is in the second state (e.g., while displaying the selectable user interface object in the second state), the computer system receives an input that corresponds to changing the selectable user interface object for controlling capture of a sequence of images (e.g., media that includes a sequence of images) from the inactive state to an active state. In some embodiments, in response to receiving the input that corresponds to changing the selectable user interface object for controlling capture of a sequence of images (e.g., media that includes a sequence of images) from the inactive state to the active state (e.g., detect an input on the selectable user interface object for controlling capture of a sequence of images (e.g., media that includes a sequence of images)), the computer system transitions (e.g., switching) the selectable user interface object for controlling capture of a sequence of images (e.g., media that includes a sequence of images) from the inactive state to an active state and transitions (e.g., switching) the selectable user interface object for controlling the file format for storing media from the second state to the first state. In some embodiments, in response to detecting the request to configure the computer system to capture that includes the sequence of images that can be played back in temporal order in response to user input detected after the sequence of images has been captured, the computer transitions (e.g., switches) the selectable user interface (e.g., 602d) object for controlling capture of the second sequence of images from the inactive state to the active state. In some embodiments, as a part of transitioning the selectable user interface object for controlling capture of the second sequence of images from the inactive state to the active state, the computer system displays an animation of the selectable user interface object for controlling capture of the second sequence of images (e.g., media that a sequence of images) transitioning from the inactive state to the active state (e.g., after transitioning the selectable user interface object for controlling capture of the second sequence of images (e.g., media that includes a sequence of images) from the inactive state to the active state, the of the selectable user interface object for controlling capture of the second sequence of images (e.g., media that includes a sequence of images) is displayed in the active state). In some embodiments, in response to detecting the request to configure the computer system to capture that includes the sequence of images that can be played back in temporal order in response to user input detected after the sequence of images has been captured, the computer system transitions (e.g., switches) the selectable user interface object (e.g., 602r) for controlling the file format for storing media from the second state to the first state. In some embodiments, as a part of transitioning (e.g., switching) the selectable user interface object for controlling the file format for storing media from the second state to the first state, the computer system displays an animation of the selectable user interface object for controlling the file format for storing media transitioning from the second state to the first state (e.g., after transitioning (e.g., switching) the selectable user interface object for controlling the file format for storing media from the second state to the first state, the selectable user interface object for controlling the file format for storing media is displayed in the first state). In some embodiments, in response to receiving the request to configure the one or more cameras to capture media that includes a sequence of images in response to receiving the request to capture media with the one or more cameras, states of the selectable user interface object for controlling capture of a sequence of images and the selectable user interface object for controlling the file format for storing media are changed. In some embodiments, the state of the selectable user interface object for controlling capture of a sequence of images and the state of the selectable user interface object for controlling the file format for storing media are opposites of each other (e.g., on/off, active/ inactive, enabled/disabled) (e.g., before and after both are changed). Transitioning (e.g., switching) the selectable user interface object for controlling capture of a sequence of images (e.g., media that includes a sequence of images) from the inactive state to an active state and transitioning (e.g., switching) the selectable user interface object for controlling the file format for storing media from the second state to the first state in response to receiving the input that corresponds to changing the selectable user interface object for controlling capture of a sequence of images (e.g., media that includes a sequence of images) from the inactive state to the active state provides the user with a single control that can change the file format in which media is captured and the control for changing the capture of a sequence of images. Providing additional control of the computer system without cluttering the UI with additional displayed controls enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently. Transitioning (e.g., switching) the selectable user interface object for controlling capture of a sequence of images (e.g., media that includes a sequence of images) from the inactive state to an active state and transitioning (e.g., switching) the selectable user interface object for controlling the file format for storing media from the second state to the first state in response to receiving the input that corresponds to changing the selectable user interface object for controlling capture of a sequence of images (e.g., media that includes a sequence of images) from the inactive state to the active state in response to receiving an input corresponding to a request to capture media allows a user to capture media with settings that are compatible without requiring further user input. Performing an optimized operation when a set of conditions has been met without requiring further user input enhances the operability of the system and makes the user-system interface more efficient (e.g., by helping the user to provide proper inputs and reducing user mistakes when operating/ interacting with the device) which, additionally, reduces power usage and improves battery life of the system by enabling the user to use the system more quickly and efficiently. Displaying the selectable user interface object for controlling the file format for storing media in the inactive state and displaying the selectable user interface object for controlling capture of a sequence of images in the active state when prescribed conditions are met allows a user to capture media with settings that are compatible without requiring further user input. Performing an optimized operation when a set of conditions has been met without requiring further user input enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

In some embodiments, after capturing the media, while displaying the media (e.g., or a representation of the media), the computer system detects (1412) a second input corresponding to the media (e.g., a swipe input on a prior or subsequent image in a collection of images that corresponds to a request to navigate to the media, a long press input on an image in a collection of images that corresponds to a request to display an enlarged preview of the image, a button press or a keystroke while an image in a collection of images is selected that corresponds to a request to display an enlarged preview of the image) (e.g., corresponding to selection of the media or selection of a representation of the media). In some embodiments, in response to detecting (1414) the second input (e.g., 1250*l*, 1250*m*) and in accordance with a determination that the media (e.g., that the representation of the media) is part of a sequence of still images (e.g., and in the first file format), the computer system plays (1416) through (e.g., 1234*b*) (e.g., displaying (e.g., sequentially displaying one or more representations of the media) (e.g., without further user input) at least a portion of the sequence of still images (as described above in relation to FIGS. 10I-10T). In some embodiments, one or more of the sequence of still images were captured before the request to capture media was detected and one or more of the sequence of still images were captured after the request to capture media was detected. In some embodiments, in response to detecting (1414) the second input (e.g., 1250*l*, 1250*m*) and in accordance with a determination that the media (e.g., that the presentation of the media) is not part of a sequence of still images (e.g., and in the second file format), the computer system performs (1418) an operation (e.g., 1234*c* in FIG. 12M) (e.g., an operation that includes displaying a single representation of the media without displaying another (e.g., a different representation of the media) representation of the media) without playing through the sequence of still images. Playing through at least a portion of the still images or performing an operation without playing through the sequence of still images based on the media provides visual feedback to the user, which allows the user to be able to identify the type of media that was captured and saved. Providing improved visual feedback enhances the operability of the system and makes the user-system interface more efficient (e.g., by helping the user to provide proper inputs and reducing user mistakes when operating/interacting with the device) which, additionally, reduces power usage and improves battery life of the system by enabling the user to use the system more quickly and efficiently.

Note that details of the processes described above with respect to method 1400 (e.g., FIGS. 14A-14B) are also applicable in an analogous manner to the methods described above. For example, methods 700, 900, 1100, and 1300 optionally include one or more of the characteristics of the various methods described above with reference to method 1300. For example, method 900 described above may be used to capture media that is saved in a file format that is set using the methods described above with respect to method 1300. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to manage media. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable user better media management. Accordingly, use of such personal information data enable users to more easily capture, edit, and access media. In addition, user of such personal information data the devices to be able to automatically adjust media and perform complex operations that can beneficial to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing media, the present technology can be configured to allow users to select to "opt in" or "opt out" of participation in the collection of personal information data during registration for services or anytime thereafter. In another example, users can select not to upload or store there media on external systems. In yet another example, users can select to limit the length of time that their media is stored on external systems. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, images can be adjusted based on based on non-personal information data or a bare minimum amount of personal information, such as the content being requested by the device associated with a user, other non-personal information available to the media management system, or publicly available information.

What is claimed is:

1. A computer system, comprising:
one or more processors, wherein the computer system is in communication with a display generation component and one or more input devices;
one or more cameras; and
memory storing one or more programs configured to be executed by the one or more processors, the one or more programs including instructions for:
displaying, via the display generation component, a media capture user interface that includes a representation of a field-of-view of a first camera of the one or more cameras, wherein the representation of the field-of-view of the first camera of the one or more cameras has a first brightness level;
while displaying the media capture user interface that includes the representation of the first camera of the field-of-view of the one or more cameras at the first brightness level, receiving, via the one or more input devices, a request to capture media; and
in response to receiving the request to capture media:
initiating capture, via the one or more cameras, of media over a capture duration;
in accordance with a determination that a first set of criteria is satisfied, displaying, via the display generation component, wherein the first set of criteria includes a criterion that is satisfied when a determination is made that the computer system is operating in a low-light mode, a respective animation that includes a sequence of images, the sequence of images including a first image and a second image that is different from the first image, wherein the first image has a second brightness level that is greater than the first brightness level and the second image has a third brightness level that is less than the second brightness level, wherein the first image is displayed during a time period that occurs before the second image is displayed, and wherein the first and second images are displayed before capture of the media has ended and after the request to capture media was received; and
in accordance with a determination that a second set of criteria is satisfied, wherein the second set of criteria includes a criterion that is satisfied when a determination is made that the computer system is not operating in the low-light mode, forgoing display of the respective animation that includes the sequence of images.

2. The computer system of claim 1, wherein:
the second image is displayed while capturing the media;
the second image is generated based on combining a plurality of images that are captured after capture of media was initiated over the capture duration; and
the first image is not based on combining images that are captured after the capture of media was initiated over the capture duration.

3. The computer system of claim 1, wherein:
the first image has a first degree of variance in brightness of the image; and
the second image has a second degree of variance in brightness of the image that is greater than the first degree of variance in brightness of the image.

4. The computer system of claim 1, wherein:
the sequence of images includes a first set of one or more images that includes the first image and a second set of one or more images that includes the second image that are displayed after the first set of one or more images;
the first set of one or more images have a third degree of variance in brightness; and
the second set of one or more images have a fourth degree of variance in brightness that is greater than the third degree of variance in brightness.

5. The computer system of claim 1, wherein:
the sequence of images includes a third set of one or more images; and
the third set of one or more images includes visual information that is representative of visual content that has been captured by the one or more cameras.

6. The computer system of claim 1, wherein the first image has value of a visual characteristic that is determined based on one or more environmental conditions around a portion of the computer system.

7. The computer system of claim 1, wherein:
the first image has a first amount of a visual characteristic; and
the second image has a second amount of the visual characteristic that is different from the first amount of the visual characteristic.

8. The computer system of claim 1, wherein a duration of the respective animation is based on one or more environmental conditions around a portion of the computer system.

9. The computer system of claim 1, wherein:
the capture duration is set to a first capture duration; and
a duration of the respective animation is based on receiving user input to change the capture duration from being set to a first capture duration to being set to a second capture duration, different than the first capture duration.

10. The computer system of claim 1, wherein the first set of criteria includes a criterion that is satisfied when a determination is made that the first camera is a first type of camera.

11. The computer system of claim 10, wherein the one or more programs further include instructions for:
in response to receiving the request to capture media:
in accordance with a determination that a third set of criteria is satisfied, wherein the third set of criteria includes a criterion that is satisfied when a determination is made that the first camera is a second type of camera that is different from the first type of camera, displaying, via a display generation component, a second animation, different than the respective animation, wherein the second animation includes a sequence of images including a third image that has a level of brightness that is lesser than the first brightness level.

12. The computer system of claim 1, wherein the one or more programs further include instructions for:
in response to receiving the request to capture media:
in accordance with the determination that the second set of criteria is satisfied, displaying a fourth image without displaying the respective animation that includes the sequence of images.

13. The computer system of claim 1, wherein:
in response to receiving the request to capture media, the first image is displayed before initiating capture of media over the capture duration.

14. The computer system of claim 1, wherein the first image does not include one or more objects that were included in the representation of the field-of-view of the first camera.

15. The computer system of claim 1, wherein display of the first image impacts a visual characteristic of the captured media.

16. A non-transitory computer-readable storage medium storing one or more programs configured to be executed by one or more processors of a computer system having one or more cameras, wherein the computer system is in communication with a display generation component and one or more input devices, the one or more programs including instructions for:
- displaying, via the display generation component, a media capture user interface that includes a representation of a field-of-view of a first camera of the one or more cameras, wherein the representation of the field-of-view of the first camera of the one or more cameras has a first brightness level;
- while displaying the media capture user interface that includes the representation of the first camera of the field-of-view of the one or more cameras at the first brightness level, receiving, via the one or more input devices, a request to capture media; and
- in response to receiving the request to capture media:
  - initiating capture, via the one or more cameras, of media over a capture duration;
  - in accordance with a determination that a first set of criteria is satisfied, displaying, via the display generation component, wherein the first set of criteria includes a criterion that is satisfied when a determination is made that the computer system is operating in a low-light mode, a respective animation that includes a sequence of images, the sequence of images including a first image and a second image that is different from the first image, wherein the first image has a second brightness level that is greater than the first brightness level and the second image has a third brightness level that is less than the second brightness level, wherein the first image is displayed during a time period that occurs before the second image is displayed, and wherein the first and second images are displayed before capture of the media has ended and after the request to capture media was received; and
  - in accordance with a determination that a second set of criteria is satisfied, wherein the second set of criteria includes a criterion that is satisfied when a determination is made that the computer system is not operation in the low-light mode, forgoing display of the respective animation that includes the sequence of images.

17. The non-transitory computer-readable storage medium of claim 16, wherein:
- the second image is displayed while capturing the media;
- the second image is generated based on combining a plurality of images that are captured after capture of media was initiated over the capture duration; and
- the first image is not based on combining images that are captured after the capture of media was initiated over the capture duration.

18. The non-transitory computer-readable storage medium of claim 16, wherein:
- the first image has a first degree of variance in brightness of the image; and
- the second image has a second degree of variance in brightness of the image that is greater than the first degree of variance in brightness of the image.

19. The non-transitory computer-readable storage medium of claim 16, wherein:
- the sequence of images includes a first set of one or more images that includes the first image and a second set of one or more images that includes the second image that are displayed after the first set of one or more images;
- the first set of one or more images have a third degree of variance in brightness; and
- the second set of one or more images have a fourth degree of variance in brightness that is greater than the third degree of variance in brightness.

20. The non-transitory computer-readable storage medium of claim 16, wherein:
- the sequence of images includes a third set of one or more images; and
- the third set of one or more images includes visual information that is representative of visual content that has been captured by the one or more cameras.

21. The non-transitory computer-readable storage medium of claim 16, wherein the first image has value of a visual characteristic that is determined based on one or more environmental conditions around a portion of the computer system.

22. The non-transitory computer-readable storage medium of claim 16, wherein:
- the first image has a first amount of a visual characteristic; and
- the second image has a second amount of the visual characteristic that is different from the first amount of the visual characteristic.

23. The non-transitory computer-readable storage medium of claim 16, wherein a duration of the respective animation is based on one or more environmental conditions around a portion of the computer system.

24. The non-transitory computer-readable storage medium of claim 16, wherein:
- the capture duration is set to a first capture duration; and
- a duration of the respective animation is based on receiving user input to change the capture duration from being set to a first capture duration to being set to a second capture duration, different than the first capture duration.

25. The non-transitory computer-readable storage medium of claim 16, wherein the first set of criteria includes a criterion that is satisfied when a determination is made that the first camera is a first type of camera.

26. The non-transitory computer-readable storage medium of claim 25, wherein the one or more programs further include instructions for:
- in response to receiving the request to capture media:
  - in accordance with a determination that a third set of criteria is satisfied, wherein the third set of criteria includes a criterion that is satisfied when a determination is made that the first camera is a second type of camera that is different from the first type of camera, displaying, via a display generation component, a second animation, different than the respective animation, wherein the second animation includes a sequence of images including a third image that has a level of brightness that is lesser than the first brightness level.

27. The non-transitory computer-readable storage medium of claim 16, wherein the one or more programs further include instructions for:
- in response to receiving the request to capture media:
  - in accordance with the determination that the second set of criteria is satisfied, displaying a fourth image without displaying the respective animation that includes the sequence of images.

28. The non-transitory computer-readable storage medium of claim 16, wherein:
in response to receiving the request to capture media, the first image is displayed before initiating capture of media over the capture duration.

29. The non-transitory computer-readable storage medium of claim 16, wherein the first image does not include one or more objects that were included in the representation of the field-of-view of the first camera.

30. The non-transitory computer-readable storage medium of claim 16, wherein display of the first image impacts a visual characteristic of the captured media.

31. A method, comprising:
at a computer system having one or more cameras, wherein the computer system is in communication with a display generation component and one or more input devices:
displaying, via the display generation component, a media capture user interface that includes a representation of a field-of-view of a first camera of the one or more cameras, wherein the representation of the field-of-view of the first camera of the one or more cameras has a first brightness level;
while displaying the media capture user interface that includes the representation of the first camera of the field-of-view of the one or more cameras at the first brightness level, receiving, via the one or more input devices, a request to capture media; and
in response to receiving the request to capture media:
initiating capture, via the one or more cameras, of media over a capture duration;
in accordance with a determination that a first set of criteria is satisfied, displaying, via the display generation component, wherein the first set of criteria includes a criterion that is satisfied when a determination is made that the computer system is operating in a low-light mode, a respective animation that includes a sequence of images, the sequence of images including a first image and a second image that is different from the first image, wherein the first image has a second brightness level that is greater than the first brightness level and the second image has a third brightness level that is less than the second brightness level, wherein the first image is displayed during a time period that occurs before the second image is displayed, and wherein the first and second images are displayed before capture of the media has ended and after the request to capture media was received; and
in accordance with a determination that a second set of criteria is satisfied, wherein the second set of criteria includes a criterion that is satisfied when a determination is made that the computer system is not operating in the low-light mode, forgoing display of the respective animation that includes the sequence of images.

32. The method of claim 31, wherein:
the second image is displayed while capturing the media;
the second image is generated based on combining a plurality of images that are captured after capture of media was initiated over the capture duration; and
the first image is not based on combining images that are captured after the capture of media was initiated over the capture duration.

33. The method of claim 31, wherein:
the first image has a first degree of variance in brightness of the image; and
the second image has a second degree of variance in brightness of the image that is greater than the first degree of variance in brightness of the image.

34. The method of claim 31, wherein:
the sequence of images includes a first set of one or more images that includes the first image and a second set of one or more images that includes the second image that are displayed after the first set of one or more images;
the first set of one or more images have a third degree of variance in brightness; and
the second set of one or more images have a fourth degree of variance in brightness that is greater than the third degree of variance in brightness.

35. The method of claim 31, wherein:
the sequence of images includes a third set of one or more images; and
the third set of one or more images includes visual information that is representative of visual content that has been captured by the one or more cameras.

36. The method of claim 31, wherein the first image has value of a visual characteristic that is determined based on one or more environmental conditions around a portion of the computer system.

37. The method of claim 31, wherein:
the first image has a first amount of a visual characteristic; and
the second image has a second amount of the visual characteristic that is different from the first amount of the visual characteristic.

38. The method of claim 31, wherein a duration of the respective animation is based on one or more environmental conditions around a portion of the computer system.

39. The method of claim 31, wherein:
the capture duration is set to a first capture duration; and
a duration of the respective animation is based on receiving user input to change the capture duration from being set to a first capture duration to being set to a second capture duration, different than the first capture duration.

40. The method of claim 31, wherein the first set of criteria includes a criterion that is satisfied when a determination is made that the first camera is a first type of camera.

41. The method of claim 40, further comprising:
in response to receiving the request to capture media:
in accordance with a determination that a third set of criteria is satisfied, wherein the third set of criteria includes a criterion that is satisfied when a determination is made that the first camera is a second type of camera that is different from the first type of camera, displaying, via a display generation component, a second animation, different than the respective animation, wherein the second animation includes a sequence of images including a third image that has a level of brightness that is lesser than the first brightness level.

42. The method of claim 31, further comprising:
in response to receiving the request to capture media:
in accordance with the determination that the second set of criteria is satisfied, displaying a fourth image without displaying the respective animation that includes the sequence of images.

43. The method of claim 31, wherein:
in response to receiving the request to capture media, the first image is displayed before initiating capture of media over the capture duration.

44. The method of claim 31, wherein the first image does not include one or more objects that were included in the representation of the field-of-view of the first camera.

45. The method of claim 31, wherein display of the first image impacts a visual characteristic of the captured media.

* * * * *

UNITED STATES PATENT AND TRADEMARK OFFICE
CERTIFICATE OF CORRECTION

PATENT NO. : 11,212,449 B1
APPLICATION NO. : 17/220596
DATED : December 28, 2021
INVENTOR(S) : Behkish J. Manzari et al.

It is certified that error appears in the above-identified patent and that said Letters Patent is hereby corrected as shown below:

In the Claims

In Claim 16, at Column 133, Line 47, delete "operation" and insert -- operating --, therefor.

Signed and Sealed this
Twenty-second Day of November, 2022

*Katherine Kelly Vidal*

Katherine Kelly Vidal
*Director of the United States Patent and Trademark Office*